US012491385B2

United States Patent
Wang et al.

(10) Patent No.: US 12,491,385 B2
(45) Date of Patent: Dec. 9, 2025

(54) TARGETING SARS-COV-2 VIRAL-IMMUNE INTERACTION FOR COVID-19 THERAPY

(71) Applicants: NEW YORK UNIVERSITY, New York, NY (US); AB STUDIO INC., Hayward, CA (US)

(72) Inventors: Jun Wang, New York, NY (US); Qiao Lu, New York, NY (US); Jia Liu, New York, NY (US); Chao Bai Huang, San Leandro, CA (US); Jianbo Dong, Santa Clara, CA (US); Yue Liu, Foster City, CA (US)

(73) Assignee: New York University, New York, NY (US)

( * ) Notice: Subject to any disclaimer, the term of this patent is extended or adjusted under 35 U.S.C. 154(b) by 134 days.

(21) Appl. No.: 17/484,483

(22) Filed: Sep. 24, 2021

(65) Prior Publication Data

US 2022/0089695 A1   Mar. 24, 2022

Related U.S. Application Data

(60) Provisional application No. 63/106,507, filed on Oct. 28, 2020, provisional application No. 63/083,060, filed on Sep. 24, 2020.

(51) Int. Cl.
| | |
|---|---|
| *A61P 31/14* | (2006.01) |
| *C07K 16/10* | (2006.01) |
| *C07K 16/28* | (2006.01) |
| *C07K 16/40* | (2006.01) |
| *C12N 15/79* | (2006.01) |
| *G01N 33/569* | (2006.01) |

(52) U.S. Cl.
CPC .............. *C07K 16/40* (2013.01); *A61P 31/14* (2018.01); *C07K 16/1003* (2023.08); *C07K 16/28* (2013.01); *C07K 16/2851* (2013.01); *C12N 15/79* (2013.01); *G01N 33/56983* (2013.01); *C07K 2317/31* (2013.01); *C07K 2317/565* (2013.01); *C07K 2317/622* (2013.01); *C07K 2317/76* (2013.01); *C07K 2319/30* (2013.01); *C12N 2800/10* (2013.01); *G01N 2333/165* (2013.01)

(58) Field of Classification Search
CPC .... C07K 16/10; C07K 16/28; C07K 16/2851; C07K 16/40; C07K 2317/31; C07K 2317/565; C07K 2317/622; C07K 2317/76; C07K 2319/30; C07K 2317/56; C07K 2317/569; A61P 31/14; C12N 15/79; C12N 2800/10; G01N 33/56983; G01N 2333/165; G01N 2469/10
See application file for complete search history.

(56) References Cited

FOREIGN PATENT DOCUMENTS

WO   2021216537   10/2021

OTHER PUBLICATIONS

Chouchane et. al. (JCI insight. 6(5):1-17. (2021)) (Year: 2021).*
Bannas et. al. (Front. Immunol. 8:1-13. (2017)) (Year: 2017).*
Rabaan et. al. Le Infezioni in Medicina. 2:174-178. (2020) (Year: 2020).*
Stedman's Medical dictionary, 2012, p. 11760 (Year: 2012).*
Alvarez, C.P., Lasala, F., Carrillo, J., Muniz, O., Corbi, A.L., and Delgado, R. (2002). C-type lectins DC-SIGN and L-Sign mediate cellular entry by Ebola virus in cis and in trans. J Virol 76, 6841-6844.
Bolen, C.R., Ding, S., Robek, M.D., and Kleinstein, S.H. (2013). Dynamic expression profiling of Type I and Type III Interferon-stimulated hepatocytes reveals a stable hierarchy of gene expression. Hepatology. Apr. 2014;59(4):1262-72.
Bost, P., Giladi, A., Liu, Y., Bendjelal, Y., Xu, G., David, E., Blecher-Gonen, R., Cohen, M., Medaglia, C., Li, H., et al. (2020). Host-Viral Infection Maps Reveal Signatures of Severe COVID-19 Patients. Cell 181, 1475-1488 e1412.
Brouwer, P.J.M., Caniels, T.G., van der Straten, K., Snitselaar, J.L., Aldon, Y., Bangaru, S., Torres, J.L., Okba, N.M.A., Claireaux, M., Kerster, G., et al. (2020). Potent neutralizing antibodies from COVID-19 patients define multiple targets of vulnerability. Science. Aug. 7, 2020;369(6504):643-650.
Cantuti-Castelvetri, L., Ojha, R., Pedro, L.D., Djannatian, M., Franz, J., Kuivanen, S., Kallio, K., Kaya, T., Anastasina, M., Smura, T., et al. (2020). Neuropilin-1 facilitates SARS-COV-2 cell entry and provides a possible pathway into the central nervous system. bioRxiv, 2020.2006.2007.137802. 36 pages.
Cao, Y., Su, B., Guo, X., Sun, W., Deng, Y., Bao, L., Zhu, Q., Zhang, X., Zheng, Y., Geng, C., et al. (2020). Potent neutralizing antibodies against SARS-COV-2 identified by high-throughput single-cell sequencing of convalescent patients' B cells. Cell. Jul. 9, 2020;182(1):73-84.e16. doi: 10.1016/j.cell.2020.05.025. Epub May 18, 2020.
Chen, S.T., Lin, Y.L., Huang, M.T., Wu, M.F., Cheng, S.C., Lei, H.Y., Lee, C.K., Chiou, T.W., Wong, C.H., and Hsieh, S.L. (2008). CLEC5A is critical for dengue-virus-induced lethal disease. Nature 453, 672-676.

(Continued)

*Primary Examiner* — Meera Natarajan
*Assistant Examiner* — Francesca Edgingtongiordano
(74) *Attorney, Agent, or Firm* — Riverside Law LLP

(57) ABSTRACT

The invention provides compositions and methods for inhibiting the interaction of the SARS-CoV-2 S protein and one or more SARS-CoV-2 S protein interacting protein, and methods of use thereof.

14 Claims, 61 Drawing Sheets
(43 of 61 Drawing Sheet(s) Filed in Color)
Specification includes a Sequence Listing.

(56) References Cited

OTHER PUBLICATIONS

Chen, X., Li, R., Pan, Z., Qian, C., Yang, Y., You, R., Zhao, J., Liu, P., Gao, L., Li, Z., et al. (2020a). Human monoclonal antibodies block the binding of SARS-COV-2 spike protein to angiotensin converting enzyme 2 receptor. Cell Mol Immunol 17, 647-649.

Clausen, T.M., Sandoval, D.R., Spliid, C.B., Pihl, J., Painter, C.D., Thacker, B.E., Glass, C.A., Narayanan, A., Majowicz, S.A., Zhang, Y., et al. (2020). SARS-COV-2 Infection Depends on Cellular Heparan Sulfate and ACE2. Nov. 12;183(4): 1043-1057.e15. doi: 10.1016/j.cell.2020.09.033. Epub Sep. 14, 2020.

Cormier, E.G., Durso, R.J., Tsamis, F., Boussemart, L., Manix, C., Olson, W.C., Gardner, J.P., and Dragic, T. (2004). L-SIGN (CD209L) and DC-SIGN (CD209) mediate transinfection of liver cells by hepatitis C virus. Proc Natl Acad Sci USA 101, 14067-14072.

Crawford, K.H.D., Eguia, R., Dingens, A.S., Loes, A.N., Malone, K.D., Wolf, C.R., Chu, H.Y., Tortorici, M.A., Veesler, D., Murphy, M., et al. (2020). Protocol and Reagents for Pseudotyping Lentiviral Particles with SARS-CoV-2 Spike Protein for Neutralization Assays. Viruses 12. 15 pages.

Da Silva, R.C., Segat, L., and Crovella, S. (2011). Role of DC-SIGN and L-SIGN receptors in HIV-1 vertical transmission. Hum Immunol 72, 305-311.

Daly, J.L., Simonetti, B., Antón-Plágaro, C., Kavanagh Williamson, M., Shoemark, D.K., Simón-Gracia, L., Klein, K., Bauer, M., Hollandi, R., Greber, U.F., et al. (2020). Neuropilin-1 is a host factor for SARS-COV-2 infection. bioRxiv, 2020.2006.2005.134114. 28 pages.

De Witte, L., Abt, M., Schneider-Schaulies, S., van Kooyk, Y., and Geijtenbeek, T.B. (2006). Measles virus targets DC-SIGN to enhance dendritic cell infection. J Virol 80, 3477-3486.

Diao, B., Wang, C., Tan, Y., Chen, X., Liu, Y., Ning, L., Chen, L., Li, M., Liu, Y., Wang, G., et al. (2020). Reduction and Functional Exhaustion of T Cells in Patients With Coronavirus Disease 2019 (COVID-19). Front Immunol 11, 827. 7 pages.

Dobin, A., Davis, C.A., Schlesinger, F., Drenkow, J., Zaleski, C., Jha, S., Batut, P., Chaisson, M., and Gingeras, T.R. (2013). STAR: ultrafast universal RNA-seq aligner. Bioinformatics 29, 15-21.

Dong, J., Huang, B., Jia, Z., Wang, B., Gallolu Kankanamalage, S., Titong, A., and Liu, Y. (2020). Development of multi-specific humanized llama antibodies blocking SARS-COV-2/ACE2 interaction with high affinity and avidity. Emerg Microbes Infect 9, 1034-1036.

Feng, Z., Diao, B., Wang, R., Wang, G., Wang, C., Tan, Y., Liu, L., Wang, C., Liu, Y., et al. (2020b). The Novel Severe Acute Respiratory Syndrome Coronavirus 2 (SARS-COV-2) Directly Decimates Human Spleens and Lymph Nodes. medRxiv, 2020.2003.2027. 20045427. 18 pages.

Geijtenbeek, T.B., Torensma, R., van Vliet, S.J., van Duijnhoven, G.C., Adema, G.J., van Kooyk, Y., and Figdor, C.G. (2000). Identification of DC-SIGN, a novel dendritic cell-specific ICAM-3 receptor that supports primary immune responses. Cell 100, 575-585.

Giamarellos-Bourboulis, E.J., Netea, M.G., Rovina, N., Akinosoglou, K., Antoniadou, A., Antonakos, N., Damoraki, G., Gkavogianni, T., Adami, M.E., Katsaounou, P., et al. (2020). Complex Immune Dysregulation in COVID-19 Patients with Severe Respiratory Failure. Cell Host Microbe 27, 992-1000 e1003.

Gong, J., Dong, H., Xia, S.Q., Huang, Y.Z., Wang, D., Zhao, Y., Liu, W., Tu, S., Zhang, M., Wang, Q., et al. (2020). Correlation Analysis Between Disease Severity and Inflammation-related Parameters in Patients with COVID-19 Pneumonia. medRxiv, 2020.2002.2025. 20025643. 17 pages.

Gramberg, T., Hofmann, H., Moller, P., Lalor, P.F., Marzi, A., Geier, M., Krumbiegel, M., Winkler, T., Kirchhoff, F., Adams, D.H., et al. (2005). LSECtin interacts with filovirus glycoproteins and the spike protein of SARS coronavirus. Virology 340, 224-236.

Grant, O.C., Montgomery, D., Ito, K., and Woods, R.J. (2020). Analysis of the SARS-CoV-2 spike protein glycan shield: implications for immune recognition. bioRxiv. May 1, 2020;2020.04.07. 030445. 18 pages.

Grein, J., Ohmagari, N., Shin, D., Diaz, G., Asperges, E., Castagna, A., Feldt, T., Green, G., Green, M.L., Lescure, F. X., et al. (2020). Compassionate Use of Remdesivir for Patients with Severe Covid-19. N Engl J Med 382, 2327-2336.

Han, D.P., Lohani, M., and Cho, M.W. (2007). Specific asparagine-linked glycosylation sites are critical for DC-SIGN-and L-SIGN-mediated severe acute respiratory syndrome coronavirus entry. J Virol 81, 12029-12039.

Hillaire, M.L., Nieuwkoop, N.J., Boon, A.C., de Mutsert, G., Vogelzang-van Trierum, S.E., Fouchier, R.A., Osterhaus, A.D., and Rimmelzwaan, G.F. (2013). Binding of DC-SIGN to the hemagglutinin of influenza A viruses supports virus replication in DC-SIGN expressing cells. PLoS One 8, e56164. 10 pages.

Hoffmann, M., Kleine-Weber, H., and Pohlmann, S. (2020a). A Multibasic Cleavage Site in the Spike Protein of SARS-CoV-2 Is Essential for Infection of Human Lung Cells. Mol Cell 78, 779-784 e775.

Hoffmann, M., Kleine-Weber, H., Schroeder, S., Kruger, N., Herrler, T., Erichsen, S., Schiergens, T.S., Herrler, G., Wu, N.H., Nitsche, A., et al. (2020b). SARS-CoV-2 Cell Entry Depends on ACE2 and TMPRSS2 and Is Blocked by a Clinically Proven Protease Inhibitor. Cell 181, 271-280 e278.

Jeffers, S.A., Tusell, S.M., Gillim-Ross, L., Hemmila, E.M., Achenbach, J.E., Babcock, G.J., Thomas, W.D., Jr., Thackray, L.B., Young, M.D., Mason, R.J., et al. (2004). CD209L (L-SIGN) is a receptor for severe acute respiratory syndrome coronavirus. Proc Natl Acad Sci U S A 101, 15748-15753.

Ju, B., Zhang, Q., Ge, J., Wang, R., Sun, J., Ge, X., Yu, J., Shan, S., Zhou, B., Song, S., et al. (2020). Human neutralizing antibodies elicited by SARS-CoV-2 infection. Nature. Aug.;584(7819):115-119.

Korber, B., Fischer, W.M., Gnanakaran, S., Yoon, H., Theiler, J., Abfalterer, W., Hengartner, N., Giorgi, E.E., Bhattacharya, T., Foley, B., et al. (2020). Tracking Changes in SARS-CoV-2 Spike: Evidence that D614G Increases Infectivity of the COVID-19 Virus. Cell. Aug. 20, 2020;182(4):812-827.e19. doi: 10.1016/j.cell.2020. 06.043. Epub Jul. 3, 2020.

Lan, J., Ge, J., Yu, J., Shan, S., Zhou, H., Fan, S., Zhang, Q., Shi, X., Wang, Q., Zhang, L., et al. (2020). Structure of the SARS-CoV-2 spike receptor-binding domain bound to the ACE2 receptor. Nature 581, 215-220.

Langmead, B., and Salzberg, S.L. (2012). Fast gapped-read alignment with Bowtie 2. Nat Methods 9, 357-359.

Li, H., Handsaker, B., Wysoker, A., Fennell, T., Ruan, J., Homer, N., Marth, G., Abecasis, G., Durbin, R., and Genome Project Data Processing, S. (2009). The Sequence Alignment/Map format and SAMtools. Bioinformatics 25, 2078-2079.

Li, Q., Wu, J., Nie, J., Zhang, L., Hao, H., Liu, S., Zhao, C., Zhang, Q., Liu, H., Nie, L., Qin, H., Wang, M., Lu, Q., Li, X., Sun, Q., Liu, J., Zhang, L., Li, X., Huang, W., Wang, Y. (2020). The impact of mutations in SARS-CoV-2 spike on viral infectivity and antigenicity. Cell. Jan. 17, 2022;23(1):bbab375. 21 pages.

Liao, M., Liu, Y., Yuan, J., Wen, Y., Xu, G., Zhao, J., Cheng, L., Li, J., Wang, X., Wang, F., et al. (2020). Single-cell landscape of bronchoalveolar immune cells in patients with COVID-19. Nat Med 26, 842-844.

Liu, L., Chopra, P., Li, X., Wolfert, M.A., Tompkins, S.M., and Boons, G.J. (2020). SARS-CoV-2 spike protein binds heparan sulfate in a length- and sequence-dependent manner. bioRxiv. : https://doi.org/10.1101/2020.05.10.087288; posted May 10, 2020. 15 pages.

Londrigan, S.L., Turville, S.G., Tate, M.D., Deng, Y.M., Brooks, A.G., and Reading, P.C. (2011). N-linked glycosylation facilitates sialic acid-independent attachment and entry of influenza A viruses into cells expressing DC-SIGN or L-SIGN. J Virol 85, 2990-3000.

Lu, Q., Grotzke, J.E., and Cresswell, P. (2018). A novel probe to assess cytosolic entry of exogenous proteins. Nat Commun 9, 3104. 11 pages.

(56) References Cited

OTHER PUBLICATIONS

Lu, R., Zhao, X., Li, J., Niu, P., Yang, B., Wu, H., Wang, W., Song, H., Huang, B., Zhu, N., et al. (2020). Genomic characterisation and epidemiology of 2019 novel coronavirus: implications for virus origins and receptor binding. Lancet 395, 565-574.

Maere, S., Heymans, K., and Kuiper, M. (2005). BINGO: a Cytoscape plugin to assess overrepresentation of gene ontology categories in biological networks. Bioinformatics 21, 3448-3449.

Marzi, A., Gramberg, T., Simmons, G., Moller, P., Rennekamp, A.J., Krumbiegel, M., Geier, M., Eisemann, J., Turza, N., Saunier, B., et al. (2004). DC-SIGN and DC-SIGNR interact with the glycoprotein of Marburg virus and the S protein of severe acute respiratory syndrome coronavirus. J Virol 78, 12090-12095.

McMahon, C., Baier, A.S., Pascolutti, R., Wegrecki, M., Zheng, S., Ong, J.X., Erlandson, S.C., Hilger, D., Rasmussen, S.G.F., Ring, A.M., et al. (2018). Yeast surface display platform for rapid discovery of conformationally selective nanobodies. Nat Struct Mol Biol 25, 289-296.

Mehta, P., Porter, J.C., Manson, J.J., Isaacs, J.D., Openshaw, P.J.M., McInnes, I.B., Summers, C., and Chambers, R.C. (2020). Therapeutic blockade of granulocyte macrophage colony-stimulating factor in COVID-19-associated hyperinflammation: challenges and opportunities. Lancet Respir Med. 9 pages.

Merad, M., and Martin, J.C. (2020). Pathological inflammation in patients with COVID-19: a key role for monocytes and macrophages. Nature reviews Immunology 20, 355-362.

Moore, J.B., and June, C.H. (2020). Cytokine release syndrome in severe COVID-19. Science 368, 473-474.

Morniroli, D., Gianni, M.L., Consales, A., Pietrasanta, C., and Mosca, F. (2020). Human Sialome and Coronavirus Disease-2019 (COVID-19) Pandemic: An Understated Correlation? Front Immunol 11, 1480. 4 pages.

Patterson, B.K., et al., (2020). Disruption of the CCL5/RANTES-CCR5 Pathway Restores Immune Homeostasis and Reduces Plasma Viral Load in Critical COVID-19. MedRxiv. 24 pages.

Perlman, S., and Dandekar, A.A. (2005). Immunopathogenesis of coronavirus infections: implications for SARS. Nat Rev Immunol 5, 917-927.

Pertea, M., Pertea, G.M., Antonescu, C.M., Chang, T.C., Mendell, J.T., and Salzberg, S.L. (2015). StringTie enables improved reconstruction of a transcriptome from RNA-seq reads. Nat Biotechnol 33, 290-295.

Pinto, D., Park, Y.J., Beltramello, M., Walls, A.C., Tortorici, M.A., Bianchi, S., Jaconi, S., Culap, K., Zatta, F., De Marco, A., et al. (2020). Cross-neutralization of SARS-CoV-2 by a human monoclonal SARS-CoV antibody. Nature 583, 290-295.

Pohlmann, S., Baribaud, F., Lee, B., Leslie, G.J., Sanchez, M.D., Hiebenthal-Millow, K., Munch, J., Kirchhoff, F., and Doms, R.W. (2001). DC-SIGN interactions with human immunodeficiency virus type 1 and 2 and simian immunodeficiency virus. J Virol 75, 4664-4672.

Shajahan, A., Supekar, N.T., Gleinich, A.S., and Azadi, P. (2020). Deducing the N- and O- glycosylation profile of the spike protein of novel coronavirus SARS-CoV-2. Glycobiology. Dec. 9, 2020;30(12):981-988.

Shang, J., Ye, G., Shi, K., Wan, Y., Luo, C., Aihara, H., Geng, Q., Auerbach, A., and Li, F. (2020). Structural basis of receptor recognition by SARS-CoV-2. Nature 581, 221-224.

Shannon, P., Markiel, A., Ozier, O., Baliga, N.S., Wang, J.T., Ramage, D., Amin, N., Schwikowski, B., and Ideker, T. (2003). Cytoscape: a software environment for integrated models of biomolecular interaction networks. Genome Res 13, 2498-2504.

Smith, T., Heger, A., and Sudbery, I. (2017). UMI-tools: modeling sequencing errors in Unique Molecular Identifiers to improve quantification accuracy. Genome Res 27, 491-499.

Tassaneetrithep, B., Burgess, T.H., Granelli-Piperno, A., Trumpfheller, C., Finke, J., Sun, W., Eller, M.A., Pattanapanyasat, K., Sarasombath, S., Birx, D.L., et al. (2003). DC-SIGN (CD209) mediates dengue virus infection of human dendritic cells. J Exp Med 197, 823-829.

Trimble, R.B., and Maley, F. (1984). Optimizing hydrolysis of N-linked high-mannose oligosaccharides by endo-beta-N-acetylglucosaminidase H. Anal Biochem 141, 515-522.

Vabret, N., Britton, G.J., Gruber, C., Hegde, S., Kim, J., Kuksin, M., Levantovsky, R., Malle, L., Moreira, A., Park, M.D., et al. (2020). Immunology of COVID-19: Current State of the Science. Immunity 52, 910-941.

Walls, A.C., Park, Y.J., Tortorici, M.A., Wall, A., McGuire, A.T., and Veesler, D. (2020). Structure, Function, and Antigenicity of the SARS-CoV-2 Spike Glycoprotein. Cell 181, 281-292 e286.

Walls, A.C., Xiong, X., Park, Y.J., Tortorici, M.A., Snijder, J., Quispe, J., Cameroni, E., Gopal, R., Dai, M., Lanzavecchia, A., et al. (2019). Unexpected Receptor Functional Mimicry Elucidates Activation of Coronavirus Fusion. Cell 176, 1026-1039 e1015.

Wang, J., Sanmamed, M.F., Datar, I., Su, T.T., Ji, L., Sun, J., Chen, L., Chen, Y., Zhu, G., Yin, W., et al. (2019). Fibrinogen-like Protein 1 Is a Major Immune Inhibitory Ligand of LAG-3. Cell 176, 334-347 e312.

Wang, K., Chen, W., Zhou, Y.-S., Lian, J.-Q., Zhang, Z., Du, P., Gong, L., Zhang, Y., Cui, H.-Y., Geng, J.-J., et al. (2020). SARS-CoV-2 invades host cells via a novel route: CD147-spike protein. bioRxiv, 2020.2003.2014.988345. 10 pages.

Watanabe, Y., Allen, J.D., Wrapp, D., McLellan, J.S., and Crispin, M. (2020). Site-specific glycan analysis of the SARS-CoV-2 spike. Science. Jul. 17, 2020;369(6501):330-333.

Wen, W., Su, W., Tang, H., Le, W., Zhang, X., Zheng, Y., Liu, X., Xie, L., Li, J., Ye, J., et al. (2020). Immune cell profiling of COVID-19 patients in the recovery stage by single-cell sequencing. Cell Discov 6, 31. 18 pages.

Wu, F., Zhao, S., Yu, B., Chen, Y.M., Wang, W., Song, Z.G., Hu, Y., Tao, Z.W., Tian, J.H., Pei, Y.Y., et al. (2020a). A new coronavirus associated with human respiratory disease in China. Nature 579, 265-269.

Wu, M.F., Chen, S.T., Yang, A.H., Lin, W.W., Lin, Y.L., Chen, N.J., Tsai, I.S., Li, L., and Hsieh, S.L. (2013). CLEC5A is critical for dengue virus-induced inflammasome activation in human macrophages. Blood 121, 95-106.

Wu, Y., Wang, F., Shen, C., Peng, W., Li, D., Zhao, C., Li, Z., Li, S., Bi, Y., Yang, Y., et al. (2020b). A noncompeting pair of human neutralizing antibodies block COVID-19 virus binding to its receptor ACE2. Science 368, 1274-1278.

Xia, S., Lan, Q., Su, S., Wang, X., Xu, W., Liu, Z., Zhu, Y., Wang, Q., Lu, L., and Jiang, S. (2020). The role of furin cleavage site in SARS-CoV-2 spike protein-mediated membrane fusion in the presence or absence of trypsin. Signal Transduct Target Ther 5, 92. 3 pages.

Xie, X., Muruato, A., Lokugamage, K.G., Narayanan, K., Zhang, X., Zou, J., Liu, J., Schindewolf, C., Bopp, N.E., Aguilar, P.V., et al. (2020). An Infectious cDNA Clone of SARS-CoV-2. Cell Host Microbe 27, 841-848 e843.

Zang, R., Gomez Castro, M.F., McCune, B.T., Zeng, Q., Rothlauf, P.W., Sonnek, N.M., Liu, Z., Brulois, K.F., Wang, X., Greenberg, H.B., et al. (2020). TMPRSS2 and TMPRSS4 promote SARS-CoV-2 infection of human small intestinal enterocytes. Sci Immunol 5. 11 pages.

Zhao, D., Han, X., Zheng, X., Wang, H., Yang, Z., Liu, D., Han, K., Liu, J., Wang, X., Yang, W., et al. (2016). The Myeloid LSECtin Is a DAP12-Coupled Receptor That Is Crucial for Inflammatory Response Induced by Ebola Virus Glycoprotein. PLoS Pathog 12, e1005487. 20 pages.

Zhou, J., Chu, H., Li, C., Wong, B.H., Cheng, Z.S., Poon, V.K., Sun, T., Lau, C.C., Wong, K.K., Chan, J.Y., et al. (2014). Active replication of Middle East respiratory syndrome coronavirus and aberrant induction of inflammatory cytokines and chemokines in human macrophages: implications for pathogenesis. J Infect Dis 209, 1331-1342.

Zhou, P., Yang, X.L., Wang, X.G., Hu, B., Zhang, L., Zhang, W., Si, H.R., Zhu, Y., Li, B., Huang, C.L., et al. (2020a). A pneumonia outbreak associated with a new coronavirus of probable bat origin. Nature 579, 270-273.

Zhou, Y., Fu, B., Zheng, X., Wang, D., Zhao, C., qi, Y., Sun, R., Tian, Z., Xu, X., and Wei, H. (2020b). Aberrant pathogenic GM-

(56) References Cited

OTHER PUBLICATIONS

CSF+ T cells and inflammatory CD14+ CD16+ monocytes in severe pulmonary syndrome patients of a new coronavirus. bioRxiv, 2020.2002.2012.945576. 10 pages.

Zhu, J., Kim, J., Xiao, X., Wang, Y., Luo, D., Chen, R., Xu, L., Zhang, H., Xiao, G., Schoggins, J.W., et al. (2020). The immune vulnerability landscape of the 2019 Novel Coronavirus, SARS-CoV-2. bioRxiv, 2020.2002.2008.939553. 14 pages.

* cited by examiner

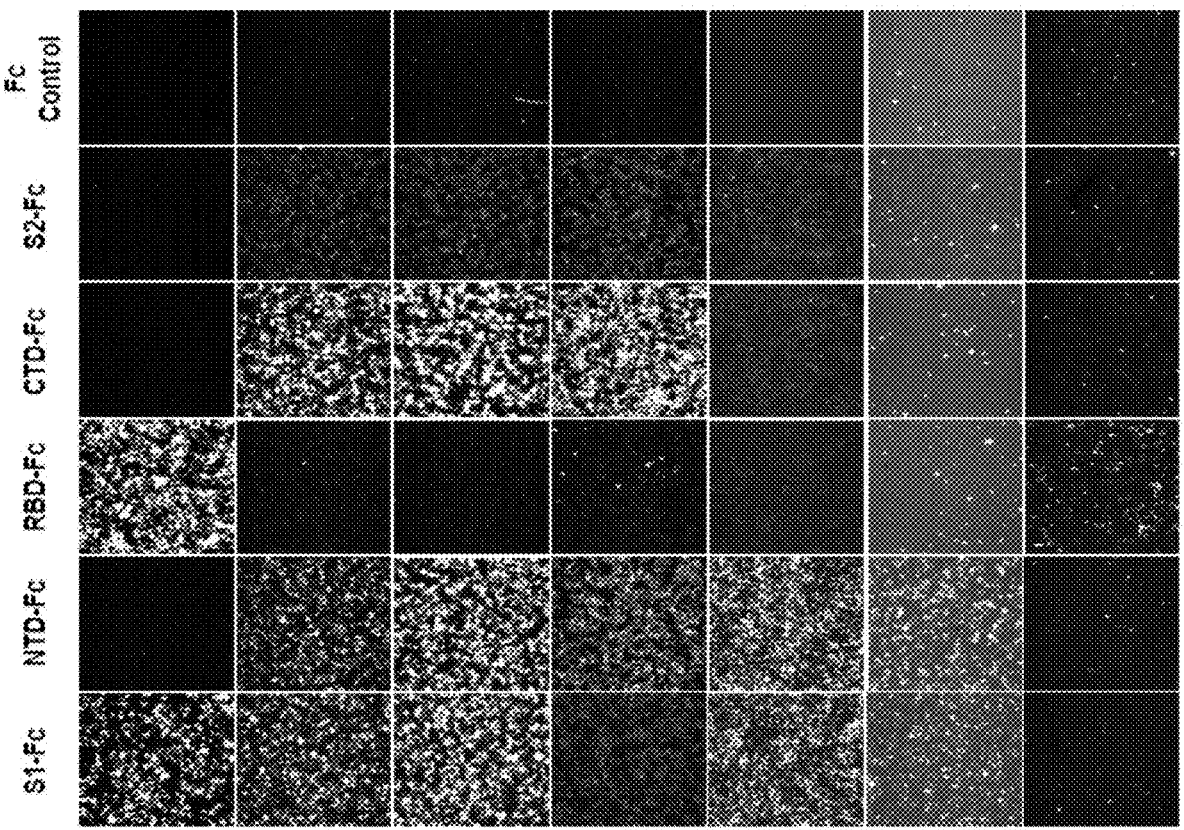
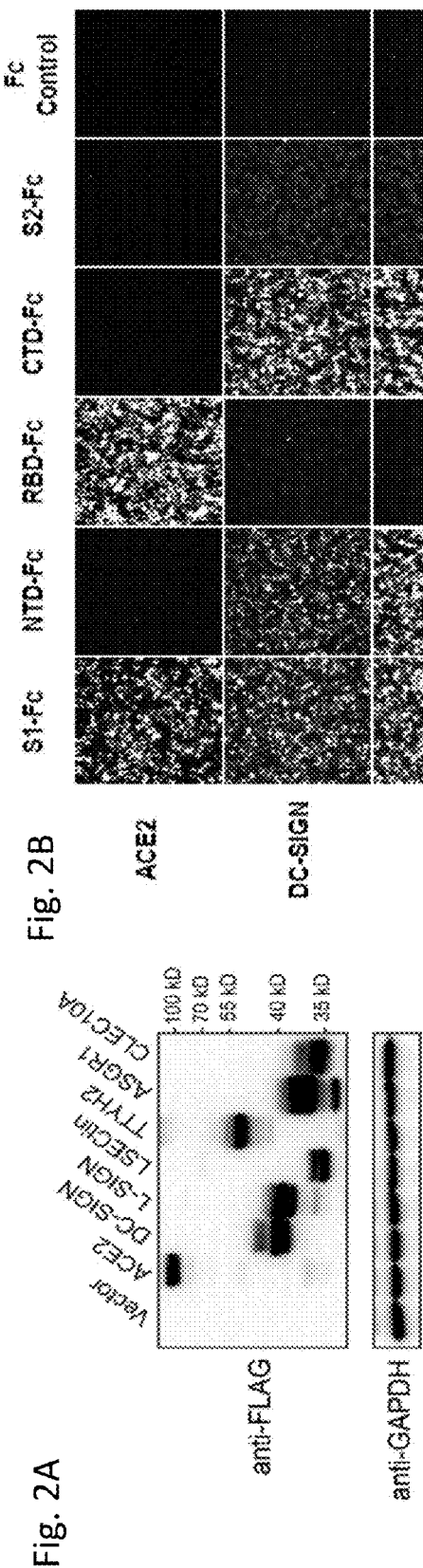
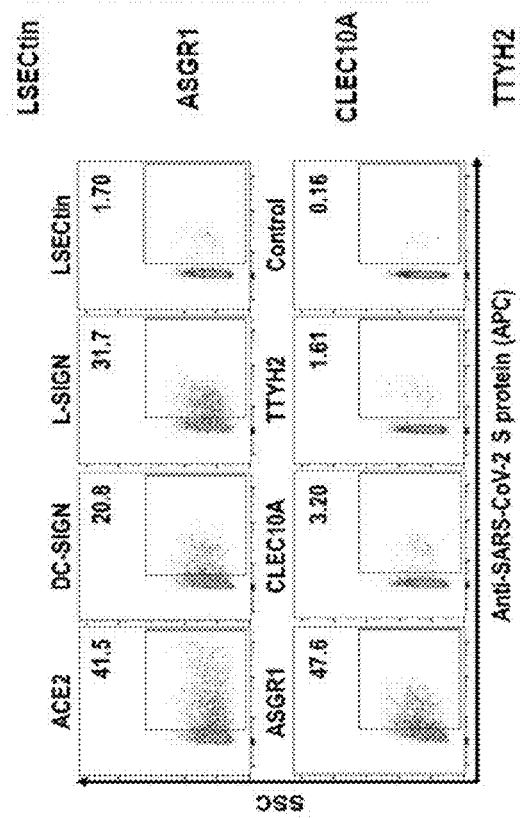
Fig. 2A
Fig. 2B
Fig. 2C

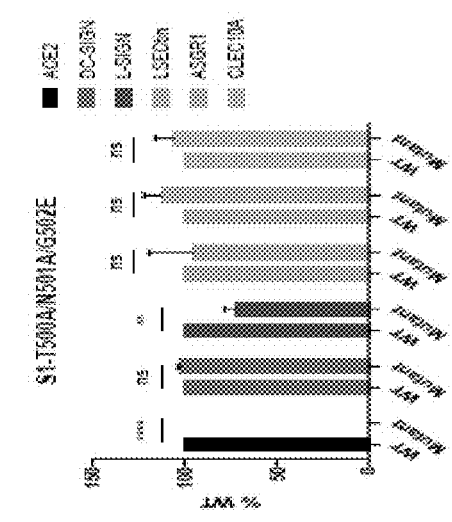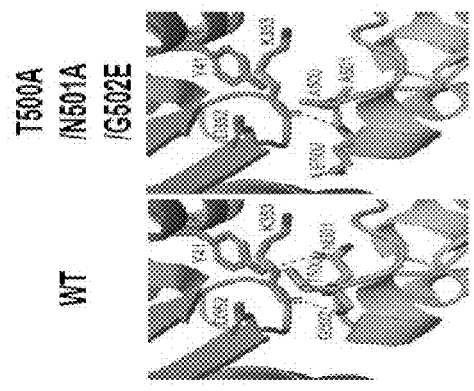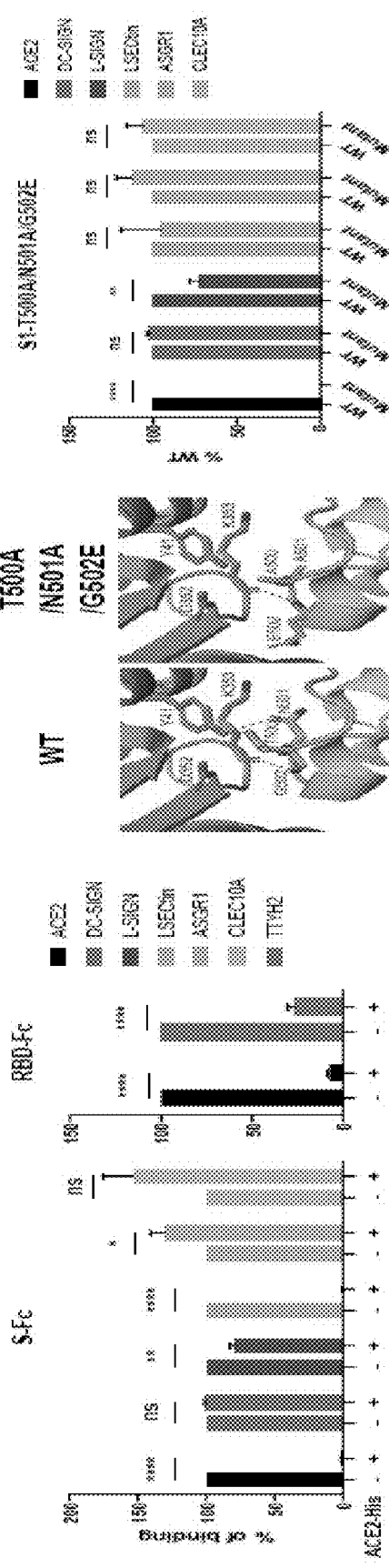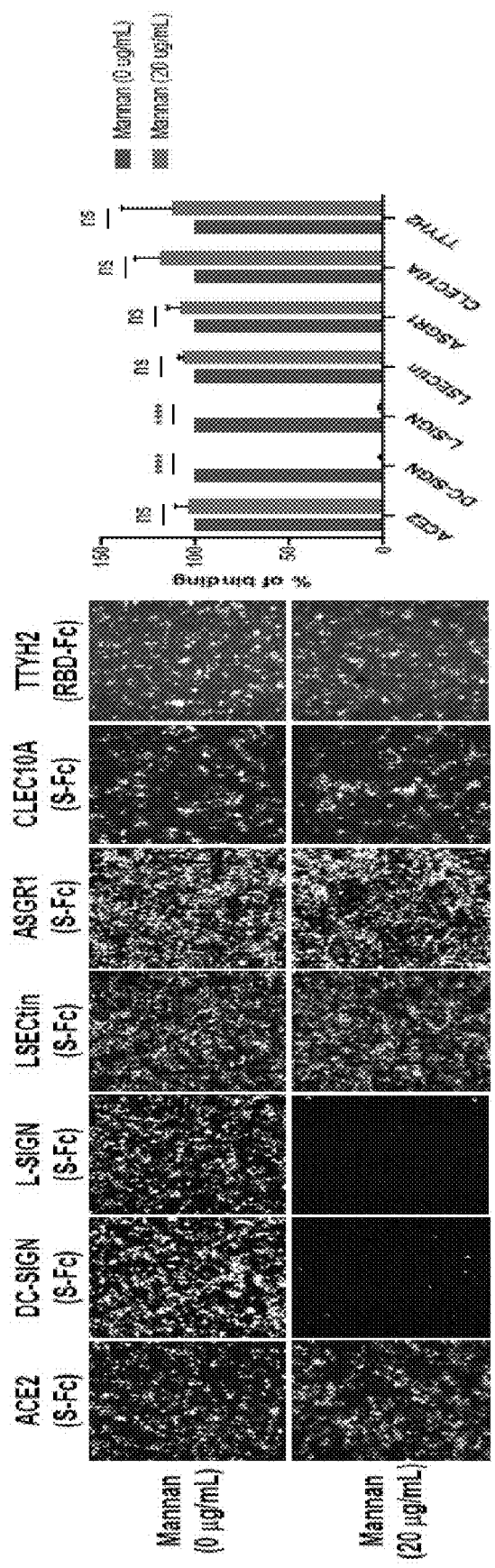
Fig. 3A
Fig. 3B
Fig. 3C
Fig. 3D

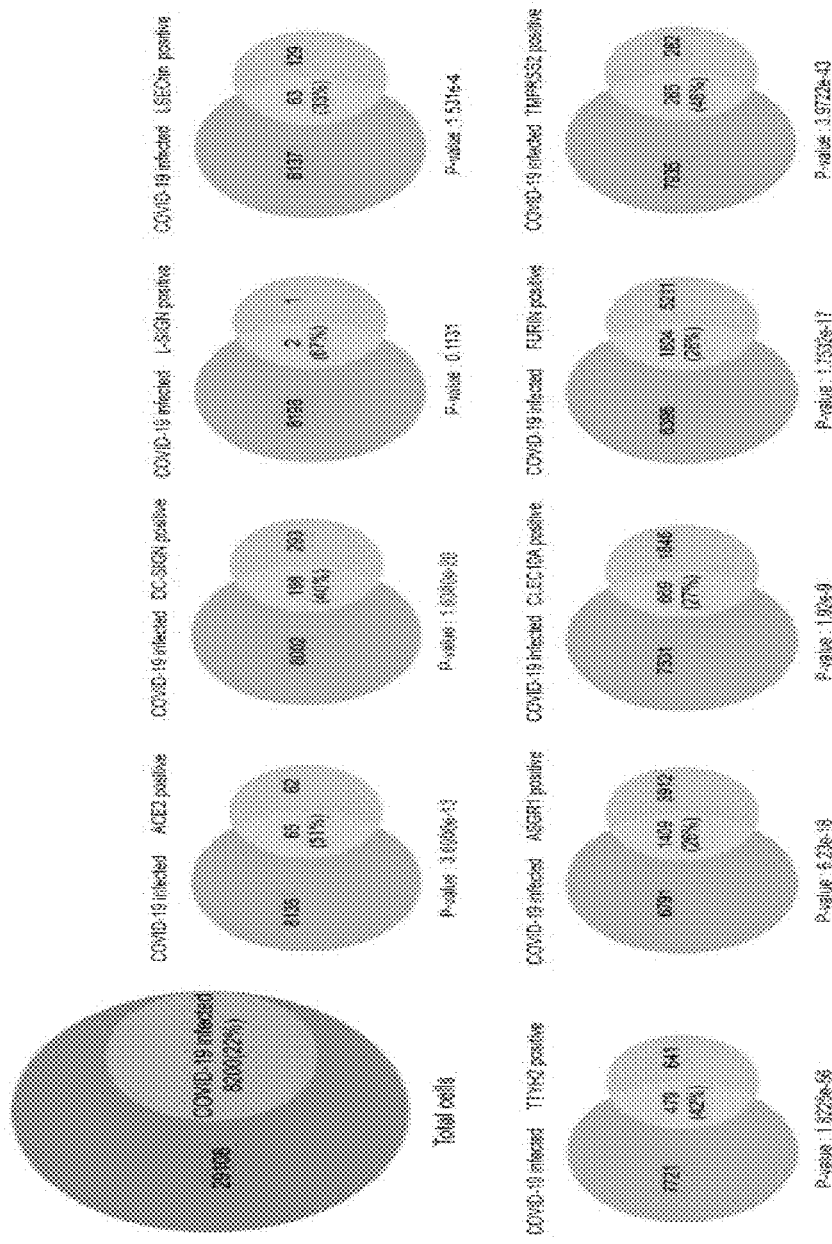

| Ab | Binding Section | Ab | Binding Section | Ab | Binding Section |
|---|---|---|---|---|---|
| Ab2 | NTD | Ab7 | RBD | Ab12 | S2 |
| Ab3 | CTD | Ab8 | RBD | Ab13 | S2 |
| Ab4 | NTD | Ab9 | S2 | Ab14 | S2 |
| Ab5 | NTD | Ab10 | N.S. | Ab15 | NTD |
| Ab6 | NTD | Ab11 | S2 | Ab16 | S2 |

Fig. 11A

TARGETING SARS-COV-2 VIRAL-IMMUNE INTERACTION FOR COVID-19 THERAPY

CROSS REFERENCE TO RELATED APPLICATIONS

This application claims priority to U.S. Provisional Application No. 63/083,060, filed Sep. 24, 2020 and to U.S. Provisional Application No. 63/106,507, filed Oct. 28, 2020, each of which is hereby incorporated by reference herein in its entirety.

REFERENCE TO A "SEQUENCE LISTING," A TABLE, OR A COMPUTER PROGRAM LISTING APPENDIX SUBMITTED AS AN ASCII TEXT FILE

The Sequence Listing written in the ASCII text file: 206265-0050-00US_SequenceListing.txt; created on Sep. 10, 2021, and 64,242 bytes in size, is hereby incorporated by reference.

BACKGROUND OF THE INVENTION

Severe acute respiratory syndrome coronavirus 2 (SARS-CoV-2), the etiological agent of Coronavirus Disease 2019 (COVID-19), has caused a global pandemic, resulting in over 18 million confirmed cases and more than 0.6 million deaths as of July 2020. The high morbidity and mortality of COVID-19 is associated with dysregulated immune responses. Excessive lung inflammation induced by SARS-CoV-2 infection is postulated to be the major causes of disease severity in COVID-19 patients (Mehta et al., 2020), manifested by the clinical observations of acute respiratory distress syndrome, cytokine release syndrome, and lymphopenia despite excessive myeloid cell-dominant inflammation (Bost et al., 2020; Chen et al., 2020b; Diao et al., 2020; Giamarellos-Bourboulis et al., 2020; Gong et al., 2020; Liao et al., 2020; Moore and June, 2020; Vabret et al., 2020). Furthermore, pharmacological interventions aimed at reducing SARS-CoV-2 replication have been relatively ineffective at improving clinical symptoms in severe COVID-19 cases (Grein et al., 2020), pointing to the hyperactive immunopathology as a driving force for late-stage diseases. However, little information is available on the mechanisms for immunopathogenesis, which is a key to the identification of therapeutic targets.

Angiotensin-converting enzyme 2 (ACE2) was identified as the major cellular receptor for SARS-CoV-2 entry into host epithelial cells (Hoffmann et al., 2020b; Wu et al., 2020a; Zhou et al., 2020a). Similar to SARS-CoV, SARS-CoV-2 spike (S) glycoprotein binds to ACE2 via the receptor-binding domain (RBD) (Lu et al., 2020; Zhou et al., 2020a). Following receptor engagement, several host serine proteases including TMPRSS2, TMPRSS4, furin, and endosomal cathepsins, cleave the SARS-CoV-2 S protein at the junction between S1 and S2 fragments, enabling host and viral membrane fusion and the delivery of the viral genome into the cytosol (Hoffmann et al., 2020a; Hoffmann et al., 2020b; Zang et al., 2020). While proteases such as TMPRSS2 and cathepsins are utilized by both SARS-CoV-2 and SARS-CoV (Hoffmann et al., 2020b), S cleavage by furin is unique to SARS-CoV-2 due to the presence of a polybasic (RRAR) site at the SARS-CoV-2 S1-52 junction (Xia et al., 2020). In addition to ACE2, a number of other host molecules are reported to support SARS-CoV-2 binding to cells and act as entry factors, including CD147 (Wang et al., 2020), neuropilin-1 (Cantuti-Castelvetri et al., 2020; Daly et al., 2020), sialic acid (Morniroli et al., 2020), and heparan sulfate (Clausen et al., 2020; Liu et al., 2020). However, the functional relevance of these attachment factors and receptors, especially to immune cells, is unclear. Nevertheless, these studies highlight that SARS-CoV-2 may be able to infect cells independently of ACE2, and that the current therapeutic approaches to block S protein RBD-ACE2 interaction (Brouwer et al., 2020; Cao et al., 2020; Chen et al., 2020a; Ju et al., 2020; Wu et al., 2020b) may not be sufficient. Intriguingly, the increasingly prevalent D614G mutation in S protein also lies outside the RBD domain (Korber et al., 2020), suggesting the contribution of other regions to increased viral infectivity.

Recent single-cell RNA-sequencing (scRNA-seq) studies using bronchoalveolar lavage fluid from COVID-19 patients detected SARS-CoV-2 RNA in not only pulmonary epithelial cells but also immune cell populations, particularly in myeloid cells (Bost et al., 2020). Evidence supports a central role of myeloid cells in pathogenesis, as the recruitment of inflammatory monocytes and expansion of monocyte-derived macrophages in infected pulmonary tissues (Liao et al., 2020; Wen et al., 2020) can serve as sources of proinflammatory cytokine and chemokines (chen et al., 2020b; Giamarellos-Bourboulis et al., 2020; Moore and June, 2020; Zhou et al., 2020b) and contribute to the reduced T cell functionality. These hyperactive myeloid cells positively correlate with increased systemic levels of proinflammatory cytokines, including interleukin (IL)-6, C-X-C motif chemokine (CXCL)-10, and tumor necrosis factor (TNF)-$\alpha$ (chen et al., 2020b; Diao et al., 2020; Giamarellos-Bourboulis et al., 2020; Gong et al., 2020; Liao et al., 2020; Moore and June, 2020; Vabret et al., 2020).

Based on these results and the relative lack of ACE2 expression or other putative SARS-CoV-2 receptors in myeloid cells, there remains a need in the art for compositions and methods for treating SARS-CoV-2 infection and compositions and methods for treating or preventing diseases and disorders associated with SARS-CoV-2 infection. This invention satisfies this unmet need.

SUMMARY OF THE INVENTION

In one embodiment, the invention relates to an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the inhibitor is a small molecule, nucleic acid, protein, peptide, antibody, antibody fragment, antagonist, aptamer, or peptidomimetic or any combination thereof.

In one embodiment, the inhibitor comprises an antibody or antibody fragment. In one embodiment, the antibody or antibody fragment is a monoclonal antibody, a polyclonal antibody, a single chain antibody, an immunoconjugate, a glycoengineered antibody, or a bispecific antibody or other multispecific antibody. In one embodiment, the antibody is a humanized antibody, a chimeric antibody, a fully human antibody, or an antibody mimetic. In one embodiment, the antibody or antibody fragment binds with an affinity of at least $10^{-6}$ M.

In one embodiment, the antibody or antibody fragment comprises a therapeutic agent or a detection moiety.

In one embodiment, the antibody is a single chain antibody. In one embodiment, the single chain antibody is a nanobody. In one embodiment, the nanobody binds to SARS-CoV-2 S protein, ACE-2, a C-type lectin or TTYH2. In one embodiment, the C-type lectin is DC-SIGN, L-SIGN, LSECtin, ASGR1, or CLEC10A.

In one embodiment, the antibody comprises a heavy chain comprising at least one CDR sequence selected from the group consisting of SEQ ID NO: 1-3. In one embodiment, the antibody comprises a heavy chain comprising at least one CDR sequence selected from the group consisting of SEQ ID NO: 5-7. In one embodiment, the antibody comprises a heavy chain comprising at least one CDR sequence selected from the group consisting of SEQ ID NO: 9-11. In one embodiment, the antibody comprises a heavy chain comprising at least one CDR sequence selected from the group consisting of SEQ ID NO: 13-15. In one embodiment, the antibody comprises a heavy chain comprising at least one CDR sequence selected from the group consisting of SEQ ID NO: 17-19. In one embodiment, the antibody comprises a heavy chain comprising at least one CDR sequence selected from the group consisting of SEQ ID NO: 21-23. In one embodiment, the antibody comprises a heavy chain comprising at least one CDR sequence selected from the group consisting of SEQ ID NO: 25-27. In one embodiment, the antibody comprises a heavy chain comprising at least one CDR sequence selected from the group consisting of SEQ ID NO 29-31. In one embodiment, the antibody comprises a heavy chain comprising at least one CDR sequence selected from the group consisting of SEQ ID NO: 33-35. In one embodiment, the antibody comprises a heavy chain comprising at least one CDR sequence selected from the group consisting of SEQ ID NO: 37-39. In one embodiment, the antibody comprises a heavy chain comprising at least one CDR sequence selected from the group consisting of SEQ ID NO: 41-43. In one embodiment, the antibody comprises a heavy chain comprising at least one CDR sequence selected from the group consisting of SEQ ID NO: 45-47. In one embodiment, the antibody comprises a heavy chain comprising at least one CDR sequence selected from the group consisting of SEQ ID NO: 49-51.

In one embodiment, the antibody comprises a heavy chain comprising each of the CDR sequences selected from the group consisting of SEQ ID NO: 1-3. In one embodiment, the antibody comprises a heavy chain comprising each of the CDR sequences selected from the group consisting of SEQ ID NO: 5-7. In one embodiment, the antibody comprises a heavy chain comprising each of the CDR sequences selected from the group consisting of SEQ ID NO: 9-11. In one embodiment, the antibody comprises a heavy chain comprising each of the CDR sequences selected from the group consisting of SEQ ID NO: 13-15. In one embodiment, the antibody comprises a heavy chain comprising each of the CDR sequences selected from the group consisting of SEQ ID NO: 17-19. In one embodiment, the antibody comprises a heavy chain comprising each of the CDR sequences selected from the group consisting of SEQ ID NO: 21-23. In one embodiment, the antibody comprises a heavy chain comprising each of the CDR sequences selected from the group consisting of SEQ ID NO: 25-27. In one embodiment, the antibody comprises a heavy chain comprising each of the CDR sequences selected from the group consisting of SEQ ID NO 29-31. In one embodiment, the antibody comprises a heavy chain comprising each of the CDR sequences selected from the group consisting of SEQ ID NO: 33-35. In one embodiment, the antibody comprises a heavy chain comprising each of the CDR sequences selected from the group consisting of SEQ ID NO: 37-39. In one embodiment, the antibody comprises a heavy chain comprising each of the CDR sequences selected from the group consisting of SEQ ID NO: 41-43. In one embodiment, the antibody comprises a heavy chain comprising each of the CDR sequences selected from the group consisting of SEQ ID NO: 45-47. In one embodiment, the antibody comprises a heavy chain comprising each of the CDR sequences selected from the group consisting of SEQ ID NO: 49-51.

In one embodiment, the antibody comprises a heavy chain of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, or SEQ ID NO:52.

In one embodiment, the inhibitor comprises an Fc fusion of at least one SARS-CoV-2 S protein interacting protein. In one embodiment, the inhibitor serves as a decoy receptor.

In one embodiment, the inhibitor comprises an Fc fusion molecule comprising an Fc domain of an immunoglobulin molecule fused to a heavy chain of an antibody. In one embodiment, the Fc fusion molecule of the invention comprises an amino acid sequence as set forth in SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO: 112, or SEQ ID NO:116 fused to an Fc domain of an immunoglobulin. In one embodiment, the Fc fusion molecule comprises an A8-Fc, comprising an amino acid sequence as set forth in SEQ ID NO:117. In one embodiment, the Fc fusion molecule comprises a G11-Fc, comprising an amino acid sequence as set forth in SEQ ID NO:118.

In one embodiment, the inhibitor comprises a bispecific antibody. In one embodiment, the bispecific antibody comprises a heavy chain comprising at least one CDR sequence selected from the group consisting of SEQ ID NO: 1-3. In one embodiment, the bispecific antibody comprises a heavy chain comprising at least one CDR sequence selected from the group consisting of SEQ ID NO: 5-7. In one embodiment, the bispecific antibody comprises a heavy chain comprising at least one CDR sequence selected from the group consisting of SEQ ID NO: 9-11. In one embodiment, the bispecific antibody comprises a heavy chain comprising at least one CDR sequence selected from the group consisting of SEQ ID NO: 13-15. In one embodiment, the bispecific antibody comprises a heavy chain comprising at least one CDR sequence selected from the group consisting of SEQ ID NO: 17-19. In one embodiment, the bispecific antibody comprises a heavy chain comprising at least one CDR sequence selected from the group consisting of SEQ ID NO: 21-23. In one embodiment, the bispecific antibody comprises a heavy chain comprising at least one CDR sequence selected from the group consisting of SEQ ID NO: 25-27. In one embodiment, the bispecific antibody comprises a heavy chain comprising at least one CDR sequence selected from the group consisting of SEQ ID NO 29-31. In one embodiment, the bispecific antibody comprises a heavy chain comprising at least one CDR sequence selected from the group consisting of SEQ ID NO: 33-35. In one embodiment, the bispecific antibody comprises a heavy chain comprising at least one CDR sequence selected from the group consisting of SEQ ID NO: 37-39. In one embodiment, the bispecific antibody comprises a heavy chain comprising at least one CDR sequence selected from the group consisting of SEQ ID NO: 41-43. In one embodiment, the bispecific antibody comprises a heavy chain comprising at least one CDR sequence selected from the group consisting of SEQ ID NO: 45-47. In one embodiment, the bispecific antibody comprises a heavy chain comprising at least one CDR sequence selected from the group consisting of SEQ ID NO: 49-51. In one embodiment, the bispecific antibody comprises a heavy chain comprising at least one CDR sequence selected from the group consisting of SEQ ID NO: 53-55. In one embodiment, the bispecific antibody comprises a heavy chain comprising at least one CDR sequence selected from the group consisting of SEQ ID NO: 57-59. In one embodiment, the bispecific antibody comprises a heavy chain comprising at least one CDR sequence selected from the group consisting of SEQ ID NO: 61-63. In one embodiment, the bispecific antibody comprises a heavy chain comprising at least one CDR sequence selected from the group consisting of SEQ ID NO: 65-67. In one embodiment, the bispecific antibody comprises a heavy chain comprising at least one CDR sequence selected from the group consisting of SEQ ID NO: 69-71. In one embodiment, the bispecific antibody comprises a heavy chain comprising at least one CDR sequence selected from the group consisting of SEQ ID NO: 73-75. In one embodiment, the bispecific antibody comprises a heavy chain comprising at least one CDR sequence selected from the group consisting of SEQ ID NO: 77-79. In one embodiment, the bispecific antibody comprises a heavy chain comprising at least one CDR sequence selected from the group consisting of SEQ ID NO: 81-83. In one embodiment, the bispecific antibody comprises a heavy chain comprising at least one CDR sequence selected from the group consisting of SEQ ID NO: 85-87. In one embodiment, the bispecific antibody comprises a heavy chain comprising at least one CDR sequence selected from the group consisting of SEQ ID NO: 89-91. In one embodiment, the bispecific antibody comprises a heavy chain comprising at least one CDR sequence selected from the group consisting of SEQ ID NO: 93-95. In one embodiment, the bispecific antibody comprises a heavy chain comprising at least one CDR sequence selected from the group consisting of SEQ ID NO: 97-99. In one embodiment, the bispecific antibody comprises a heavy chain comprising at least one CDR sequence selected from the group consisting of SEQ ID NO: 101-103. In one embodiment, the bispecific antibody comprises a heavy chain comprising at least one CDR sequence selected from the group consisting of SEQ ID NO: 105-107. In one embodiment, the bispecific antibody comprises a heavy chain comprising at least one CDR sequence selected from the group consisting of SEQ ID NO: 109-111. In one embodiment, the bispecific antibody comprises a heavy chain comprising at least one CDR sequence selected from the group consisting of SEQ ID NO:112-115.

In one embodiment, the bispecific antibody comprises a heavy chain comprising at least one CDR sequence selected from the group consisting of SEQ ID NO: 1-3. In one embodiment, the bispecific antibody comprises a heavy chain comprising at least one CDR sequence selected from the group consisting of SEQ ID NO: 5-7. In one embodiment, the bispecific antibody comprises a heavy chain comprising at least one CDR sequence selected from the group consisting of SEQ ID NO: 9-11. In one embodiment, the bispecific antibody comprises a heavy chain comprising at least one CDR sequence selected from the group consisting of SEQ ID NO: 13-15. In one embodiment, the bispecific antibody comprises a heavy chain comprising at least one CDR sequence selected from the group consisting of SEQ ID NO: 17-19. In one embodiment, the bispecific antibody comprises a heavy chain comprising at least one CDR sequence selected from the group consisting of SEQ ID NO: 21-23. In one embodiment, the bispecific antibody comprises a heavy chain comprising at least one CDR sequence selected from the group consisting of SEQ ID NO: 25-27. In one embodiment, the bispecific antibody comprises a heavy chain comprising at least one CDR sequence selected from the group consisting of SEQ ID NO 29-31. In one embodiment, the bispecific antibody comprises a heavy chain comprising at least one CDR sequence selected from the group consisting of SEQ ID NO: 33-35. In one embodiment, the bispecific antibody comprises a heavy chain comprising at least one CDR sequence selected from the group consisting of SEQ ID NO: 37-39. In one embodiment, the bispecific antibody comprises a heavy chain comprising at least one CDR sequence selected from the group consisting of SEQ ID NO: 41-43. In one embodiment, the bispecific antibody comprises a heavy chain comprising at least one CDR sequence selected from the group consisting of SEQ ID NO: 45-47. In one embodiment, the bispecific antibody comprises a heavy chain comprising at least one CDR sequence selected from the group consisting of SEQ ID NO: 49-51. In one embodiment, the bispecific antibody comprises a heavy chain comprising at least one CDR sequence selected from the group consisting of SEQ ID NO: 53-55. In one embodiment, the bispecific antibody comprises a heavy chain comprising at least one CDR sequence selected from the group consisting of SEQ ID NO: 57-59. In one embodiment, the bispecific antibody comprises a heavy chain comprising at least one CDR sequence selected from the group consisting of SEQ ID NO: 61-63. In one embodiment, the bispecific antibody comprises a heavy chain comprising at least one CDR sequence selected from the group consisting of SEQ ID NO: 65-67. In one embodiment, the bispecific antibody comprises a heavy chain comprising at least one CDR sequence selected from the group consisting of SEQ ID NO: 69-71. In one embodiment, the bispecific antibody comprises a heavy chain comprising at least one CDR sequence selected from the group consisting of SEQ ID NO: 73-75. In one embodiment, the bispecific antibody comprises a heavy chain comprising at least one CDR sequence selected from the group consisting of SEQ ID NO: 77-79. In one embodiment, the bispecific antibody comprises a heavy chain comprising at least one CDR sequence selected from the group consisting of SEQ ID NO: 81-83. In one embodiment, the bispecific antibody comprises a heavy chain comprising at least one CDR sequence selected from the group consisting of SEQ ID NO: 85-87. In one embodiment, the bispecific antibody comprises a heavy chain comprising at least one CDR sequence selected from the group consisting of SEQ ID NO: 89-91. In one embodiment, the bispecific antibody comprises a heavy chain comprising at least one CDR sequence selected from the group consisting of SEQ ID NO: 93-95. In one embodiment, the bispecific antibody comprises a heavy chain comprising at least one CDR sequence selected from the group consisting of SEQ ID NO: 97-99. In one embodiment, the bispecific antibody comprises a heavy chain comprising at least one CDR sequence selected from the group consisting of SEQ ID NO: 101-103. In one embodiment, the bispecific antibody comprises a heavy chain comprising at least one CDR sequence selected from the group consisting of SEQ ID NO: 105-107. In one embodiment, the bispecific antibody comprises a heavy chain comprising at least one CDR sequence selected from the group consisting of SEQ ID NO: 109-111. In one embodiment, the bispecific antibody comprises a heavy chain comprising at least one CDR sequence selected from the group consisting of SEQ ID NO:112-115.

In one embodiment, the bispecific antibody comprises at least two of: a heavy chain comprising at least one CDR sequence selected from the group consisting of SEQ ID NO: 1-3, a heavy chain comprising at least one CDR sequence selected from the group consisting of SEQ ID NO: 5-7, a heavy chain comprising at least one CDR sequence selected from the group consisting of SEQ ID NO: 9-11, a heavy chain comprising at least one CDR sequence selected from the group consisting of SEQ ID NO: 13-15, a heavy chain comprising at least one CDR sequence selected from the group consisting of SEQ ID NO: 17-19, a heavy chain comprising at least one CDR sequence selected from the group consisting of SEQ ID NO: 21-23, a heavy chain comprising at least one CDR sequence selected from the group consisting of SEQ ID NO: 25-27, a heavy chain comprising at least one CDR sequence selected from the group consisting of SEQ ID NO 29-31, a heavy chain comprising at least one CDR sequence selected from the group consisting of SEQ ID NO: 33-35, a heavy chain comprising at least one CDR sequence selected from the group consisting of SEQ ID NO: 37-39, a heavy chain comprising at least one CDR sequence selected from the group consisting of SEQ ID NO: 41-43, a heavy chain comprising at least one CDR sequence selected from the group consisting of SEQ ID NO: 45-47, a heavy chain comprising at least one CDR sequence selected from the group consisting of SEQ ID NO: 49-51, a heavy chain comprising at least one CDR sequence selected from the group consisting of SEQ ID NO: 53-55, a heavy chain comprising at least one CDR sequence selected from the group consisting of SEQ ID NO: 57-59, a heavy chain comprising at least one CDR sequence selected from the group consisting of SEQ ID NO: 61-63, a heavy chain comprising at least one CDR sequence selected from the group consisting of SEQ ID NO: 65-67, a heavy chain comprising at least one CDR sequence selected from the group consisting of SEQ ID NO: 69-71, a heavy chain comprising at least one CDR sequence selected from the group consisting of SEQ ID NO: 73-75, a heavy chain comprising at least one CDR sequence selected from the group consisting of SEQ ID NO: 77-79, a heavy chain comprising at least one CDR sequence selected from the group consisting of SEQ ID NO: 81-83, a heavy chain comprising at least one CDR sequence selected from the group consisting of SEQ ID NO: 85-87, a heavy chain comprising at least one CDR sequence selected from the group consisting of SEQ ID NO: 89-91, a heavy chain comprising at least one CDR sequence selected from the group consisting of SEQ ID NO: 93-95, a heavy chain comprising at least one CDR sequence selected from the group consisting of SEQ ID NO: 97-99, a heavy chain comprising at least one CDR sequence selected from the group consisting of SEQ ID NO: 101-103, a heavy chain comprising at least one CDR sequence selected from the group consisting of SEQ ID NO: 105-107, a heavy chain comprising at least one CDR sequence selected from the group consisting of SEQ ID NO: 109-111, and a heavy chain comprising at least one CDR sequence selected from the group consisting of SEQ ID NO:112-115.

In one embodiment, the bispecific antibody comprises at least one of: SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, and SEQ ID NO:116.

In one embodiment, the bispecific antibody comprises at least two of: SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, and SEQ ID NO:116.

In one embodiment, the bispecific antibody comprises at least one, two or all three CDR sequences of SEQ ID NO:57-59 and at least one, two or all three CDR sequences of SEQ ID NO:93-95. In one embodiment, the bispecific antibody comprises an amino acid sequence as set forth in SEQ ID NO:60 and an amino acid sequence as set forth in SEQ ID NO:96. In one embodiment, the bispecific antibody comprises an amino acid sequence as set forth in SEQ ID NO:119.

In one embodiment, the invention relates to a composition comprising an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the composition further comprises one or more additional antibody or antibody fragment comprising a heavy chain comprising an amino acid sequence of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO: 112, or SEQ ID NO:116.

In one embodiment, the composition comprises three or more antibodies or antibody fragments comprising a heavy chain comprising an amino acid sequence selected from SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO: 116.

In one embodiment, the invention relates to a nucleic acid molecule comprising a nucleotide sequence encoding an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the invention relates to a composition comprising a nucleic acid molecule comprising a nucleotide sequence encoding an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the invention relates to an expression vector comprising a nucleotide sequence encoding an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the invention relates to an isolated host cell comprising a nucleic acid molecule comprising a nucleotide sequence encoding an inhibitor of the binding of SARS-CoV-2 S protein to one or more SARS-CoV-2 S protein interacting partner. In one embodiment, the SARS-CoV-2 S protein interacting partner is ACE-2, a C-type lectin or TTYH2.

In one embodiment, the invention relates to a method of treating or preventing a disease or disorder in a subject in need thereof, the method comprising the step of administering an inhibitor of the binding of SARS-CoV-2 S protein to one or more SARS-CoV-2 S protein interacting partner to the subject. In one embodiment, the disease is COVID-19.

In one embodiment, the invention relates to a method of treating or preventing a disease or disorder in a subject in need thereof, the method comprising the step of administering a composition comprising an inhibitor of the binding of SARS-CoV-2 S protein to one or more SARS-CoV-2 S protein interacting partner to the subject. In one embodiment, the disease is COVID-19.

In one embodiment, the invention relates to a method of treating or preventing a disease or disorder in a subject in need thereof, the method comprising the step of administering a nucleic acid molecule comprising a nucleotide sequence encoding an inhibitor of the binding of SARS-CoV-2 S protein to one or more SARS-CoV-2 S protein interacting partner to the subject. In one embodiment, the disease is COVID-19.

In one embodiment, the invention relates to a method of treating or preventing a disease or disorder in a subject in need thereof, the method comprising the step of administering a composition comprising a nucleic acid molecule comprising a nucleotide sequence encoding an inhibitor of the binding of SARS-CoV-2 S protein to one or more SARS-CoV-2 S protein interacting partner to the subject. In one embodiment, the disease is COVID-19.

In one embodiment, the invention relates to a method of detecting the presence of the SARS-CoV-2 S protein in a sample, the method comprising contacting a sample with an inhibitor of the binding of SARS-CoV-2 S protein to one or more SARS-CoV-2 S protein interacting partner or a composition comprising the same, and detecting the presence of SARS-CoV-2 S protein in the sample of the subject.

In one embodiment, the sample is a biological sample of a subject, and the method further comprises diagnosing the subject as having a SARS-CoV-2 infection.

In one embodiment, the method comprises the further step of administering a treatment to the subject that was diagnosed as having a SARS-CoV-2 infection.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description of embodiments of the invention will be better understood when read in conjunction with the appended drawings. It should be understood that the invention is not limited to the precise arrangements and instrumentalities of the embodiments shown in the drawings.

FIG. 1A depicts a schematic description of the myeloid cell receptor discovery approach. Individual myeloid cell receptors were transfected into HEK293T cells in a 384-well plate format. Human IgG1 Fc-tagged SARS-CoV-2 Spike recombinant protein mixture (S-Fc, S1-Fc, and RBD-Fc) and AF647-labelled anti-human IgG Fc detection antibody were added to each well for assessing the binding of S protein or its subunits. S protein subunits and subdomains relative to ACE2 binding RBD domain are shown at the lower right corner. FIG. 1B depicts data demonstrating that, along with ACE2, DC-SIGN, L-SIGN, LSECtin, ASGR1, CLEC10A and TTYH2 were identified as additional receptors for SARS-CoV-2 Spike protein. Fc receptors (labeled in blue) served as internal positive controls. FIG. 1C depicts representative images of the binding of Fc-tagged S protein or its subunits to the indicated immune receptors and ACE2 measured by the cellular detection system (CDS). FIG. 1D depicts quantification of the interaction between S protein subdomains and the indicated receptors. HEK293T cells were transfected with individual receptors as indicated on the x-axis, and different Fc-tagged S subdomain/subunit proteins were added to the culture for evaluating the binding. Normalized binding capacity, is shown on the y-axis (the sum of the total fluorescent intensity from each Fc-tagged S subdomain/subunit proteins binding to the indicated receptor was set to 100). Data were analyzed by CellProfiler software (n=4). FIG. 1E depicts HEK293T cells were transfected with indicated receptors and allowed for interaction with SARS-CoV-2 pseudovirus on ice. The virus binding to indicated receptors was quantified by FACS (n=5). Data presented as the mean±SEM; *, $p<0.05$; , $p<0.01$; *, $p<0.001$; ****, $p<0.0001$ by student's t test. n refers to the number of independent experiment.

FIG. 2A through FIG. 2D depict exemplary experimental results demonstrating the validation of SARS-CoV-2 S protein binding to C-type lectins and TTYH2. FIG. 2A depicts data demonstrating that HEK293T cells were transfected with indicated receptors with FLAG-tag. At 24 hours post-transfection, cell lysates were harvested for western blot and examined by anti-FLAG and anti-GAPDH antibodies. FIG. 2B depicts representative images of the interaction between S protein subdomains and indicated receptors. Images were captured by the cellular detection system (CDS) (n=5). FIG. 2C depicts data demonstrating that HEK293T cells were transfected with indicated receptors and allowed for interaction with SARS-CoV-2 pseudovirus on ice. Representative FACS dot plot of the SARS-CoV-2 pseudovirus binding to HEK293T cells expressing individual receptors or control empty vector (Control) were shown (n=4). FIG. 2D depicts an assessment of the binding affinity of His-tagged S1 of SARS-CoV-2 to indicated receptors using ELISA (n=3). n refers to the number of independent experiment.

FIG. 3A through FIG. 3H depict exemplary experimental results demonstrating ACE2-independent, glycan-involved SARS-CoV-2 interactions. FIG. 3A depicts a quantification of S-Fc or RBD-Fc binding to HEK293T cells expressing indicated receptors in the presence or the absence of pre-bound ACE2. S-Fc or RBD-Fc were incubated with 100× excess soluble ACE2-His (in the mass ratio) overnight at 4° C., followed by addition to each well to evaluate the binding (n=3). FIG. 3B depicts the interaction between the Lys352-Asp353, Tyr41 surface of human ACE2 and the Thr500-Asn501-Gly502 loop segment of the WT SARS-CoV-2 receptor binding motif (RBM) (PDB 6M0J, left panel) or the Ala500-Ala501-Glu502 SARS-CoV-2 RBM mutant (right panel). The SARS-CoV-2 RBM is shown in cyan, and ACE2 is shown in green. FIG. 3C depicts a quantitative comparison of the binding to indicated receptors between WT S1/RBD and mutant S1/RBD (n=3). FIG. 3D depicts representative images (left panel) and quantification (right panel) of the binding of S-Fc or RBD-Fc (for TTYH2) to the indicated receptors in the presence or absence of mannan (n=3). FIG. 3E depicts a glycosylated SARS-CoV-2 S protein model highlighting N165, N282, N343, and N603 glycans. SARS-CoV-2 RBD is colored cyan and ACE2 N-terminal peptidase domain is shown in green. FIG. 3F depicts a quantification of representative S1 Asn mutants that block interaction with ACE2 (N343Q, left panel) or C-type lectins (N603Q, right panel) (n=3). FIG. 3G depicts a quantification of representative S1 Asn mutants that enhance interaction with ACE2 (N282Q, left panel) or C-type lectins (N165Q, right panel) (n=3). FIG. 3H depicts a schematic description of the distribution of N- or O-glycosylation sites in the S1 subunit (upper panel), the natural mutation related to these sites among ~5000 SARS-CoV-2 viral genomes, and quantitative analysis of the effect of glycan mutations on S protein binding to the indicated cellular receptors. All fluorescent images were captured by CDS and data were analyzed by CellProfiler software and presented as the mean±SEM. ns, not significant; *, $p<0.05$; , $p<0.01$; *, $p<0.001$; ****, $p<0.0001$ by student's t-test. n refers to the number of independent experiments.

FIG. 4A depicts representative fluorescent images of S-Fc (left) or RBD-Fc (right) binding to HEK293T cells expressing indicated receptors in the presence or absence of pre-bound ACE2. S-Fc or RBD-Fc were incubated with 100 times soluble ACE2-His (in the mass ratio) overnight at 4° C., followed by addition to each well for binding evaluation (n=3). FIG. 4B depicts representative WT S1-Fc and mutant S1-Fc binding to indicated receptors (n=3). FIG. 4C depicts blocking the S protein interaction by Endo H and PNGase F. S-Fc or RBD-Fc were first incubated with Endo H and PNGase F at 37° C. for 30 min and then added to each well together with anti-human Fc detection antibody (n=3). FIG. 4D depicts a mutagenesis screen to identify glycans involved in the receptor binding. 13 Asn (N) were individually mutated to Gln (Q) to remove each N-glycan in the S1 subunit. 1 Thr (T) and 1 Ser (S) were jointly mutated to Ala (A) to remove the two 0-glycans. Human Fc-tagged WT S1 and S1 mutants were added to the cell culture to evaluate binding to indicated receptors overexpressed by HEK293T (n=3, see more details in STAR Methods). All fluorescent images were captured by CDS and data were analyzed by CellProfiler software and presented as the mean±SEM. ns, not significant; *, $p<0.05$; , $p<0.01$; *, $p<0.001$; ****, $p<0.0001$ by student's t-test. n refers to the number of independent experiments.

FIG. 5A depicts Uniform Manifold Approximation and Projection (UMAP) visualizations of single cells isolated from bronchoalveolar lavage fluids from six severe COVID-19 patients with color-coded clusters. Levels of SARS-CoV-2 viral RNA and indicated host transcripts were individually plotted. FIG. 5B depicts the mRNA level of indicated genes in three cell populations (epithelial cells, T cells, and myeloid cells). FIG. 5C depicts a Gene Ontology (GO) pathway enrichment connectivity diagram displaying pathways enriched in infected cells expressing the indicated genes. FIG. 5D depicts the gene expression of myeloid receptors and pro-inflammatory cytokine/chemokines in BAL myeloid cells isolated from individuals without pneumonia and those with bacterial pneumonia and COVID-19.

FIG. 6A through FIG. 6H depict exemplary experimental results demonstrating the association of C-type lectins and TTYH2 with virus genome and immune signature genes in COVID-19 patients. FIG. 6A depicts a Venn diagrams depicting the overlapping of cells positive for indicated genes (C-type lectins, TTYH2, ACE2, and other viral infection-related genes) and positive for virus genome. p-value was calculated by hypergeometric test. FIG. 6B and FIG. 6C depict representative histograms of the expression of ACE2 (FIG. 6B) and L-SIGN (FIG. 6C) on PBMD-derived myeloid cells checked by FACS. FIG. 6D depicts comparisons of the enrichment (red) or reduction (blue) of indicated genes in epithelial cells, T cells, and myeloid cells. FIG. 6E through FIG. 6H depict exemplary experimental results demonstrating the expression of indicated receptors in PBMC isolated from health donors and myeloid populations in BAL samples isolated from severe COVID19 patients. FIG. 6E depicts the expression of the indicated receptors by undifferentiated PBMC (Undiff) or differentiated PBMC-derived myeloid cells (Diff) isolated from healthy donors. FIG. 6F through FIG. 6G depict the expression of the indicated receptor by $CD45^+CD14^{lo}CD11c^+CD206^+$ myeloid cells in the BAL samples isolated from severe COVID-19 patients. HLA-DR$^{hi}$ (FIG. 6F) and HLA-DR$^{lo}$ (FIG. 6G) subpopulations were individually plotted. Histogram plots from one representative patient (left) and statistical analyses of seven patients (right) are shown. Data are presented as paired dots (grey dots for isotype control and red dots for specific antibody staining) to indicate data from individual patients. ns, not significant; *, $p<0.05$; , $p<0.01$; *, $p<0.001$; ****, $p<0.0001$ by two-tailed paired Student's t-test. FIG. 6H depicts exemplary experimental western blot results of TTYH2 expression by HEK293T (Con), HEK293T overexpressing (OE) TTYH2, undifferentiated (Undiff) and differentiated (Diff) PBMC-derived myeloid cells isolated from healthy donors, and BAL samples isolated from severe COVID-19 patients. # numbers denoted different patients.

FIG. 7A depicts exemplary experimental results demonstrating that HEK293T cells were transfected with individual plasmids of genes encoding indicated receptors or vector control and infected with SARS-CoV-2 GFP pseudovirus (MOI=1) with wild-type or mutant S protein (T500A, N501A, and G502E) in the presence or absence of mannan (100 μg/mL). At 48 hr post-infection, HEK293T cells were harvested and analyzed by flow cytometry. Representative flow cytometry plots were shown in the left panel and statistical analysis was shown in the right panel (n=3). Data were presented as mean±SEM of a representative experiment. **, $p<0.0001$ by two-way ANOVA. Figure BA depicts exemplary experimental results demonstrating that infection of human PBMC-derived myeloid cells by SARS-CoV-2-GFP pseudovirus (MOI=1) in the presence or absence of mannan (100 μg/mL) followed by flow cytometry analysis at 48 hr post-infection (n=3). Data were presented as mean±SEM of a representative experiment. , $p<0.0001$ by two-tailed unpaired student's t-test. Figure CA depicts exemplary experimental results demonstrating that HEK293T cells with or without ACE2 overexpression (left panel) and human PBMC-derived myeloid cells (right panel) were infected with SARS-CoV-2-GFP pseudovirus (MOI=1) in the presence of Fc control or anti-ACE2 antibody (20 μg/mL). GFP-positive cells were quantified by flow cytometry at 48 hr post-infection (n=3). Data were presented as mean±SEM of a representative experiment. ns, not significant; **, p<0.0001 by one-way ANOVA (left panel) or two-tailed unpaired student's t-test (right panel). FIG. 7D and FIG. 7E depict exemplary experimental results demonstrating that infection of PBMC-derived human primary myeloid cells by SARS-CoV-2-GFP pseudo-virus (MOI=1) (FIG. 7D) or a clinical isolate of SARS-CoV-2 (MOI=1) (FIG. 7E) with or without Fc-tagged soluble S protein receptor(s) (25 μg/mL of each). The viral mRNA level was normalized to the host GADPH level and the average value of the Fc control group was set to 100 (E) (n=3). Data were presented as mean±SEM of a representative experiment. ns, not significant; *, p<0.05; *, p<0.001; **, p<0.0001 by one-way ANOVA. n refers to the number of independent experiments.

FIG. 8A through FIG. 8G depict exemplary experimental results demonstrating SARS-CoV-2 infection through the immune receptors. FIG. 8A depicts that HEK293T cells were transfected with indicated genes with or without the addition of FURIN and/or TMPRSS2 and infected with wild-type SARS-CoV-2-GFP pseudo-virus. Representative FACS plots were shown in the upper panel and statistical analysis was shown in the lower panel (n=3). FIG. 8B depicts a western blot analysis of the expression of DC-SIGN (upper panel) and L-SIGN (lower panel) in the undifferentiated (Undiff) THP-1 cells or differentiated (Diff) THP-1 cells in the presence or absence of Non-targeting shRNA control (NT) or relevant shRNA(s). FIG. 8C depicts SARS-CoV-2-GFP Pseudovirus infection of differentiated THP-1 cells with or without DC-SIGN or L-SIGN knockdown. Representative FACS plots were shown in the left panel and statistical analysis was shown in the right panel (n=3). FIG. 8D depicts an RT-PCR analysis of viral mRNA (N protein) in HEK293T cells expressing indicated receptors infected by authentic SARS-CoV-2 virus (n=3). FIG. 8E depicts the blocking the binding of S protein to HEK293T cells expressing indicated receptors by Fc or His-tagged receptor(s) (n=3). Mock control was performed using conditioned media (n=3). Data presented as mean±SEM. ns, not significant; *, p<0.05; , p<0.01; *, p<0.001; ****, p<0.0001 by student's t-test. n refers to the number of independent experiments. FIG. 8F through FIG. 8G depict exemplary experimental results demonstrating that HEK293T cells expressing individual receptors (FIG. 8F) or human PBMC-derived myeloid cells (FIG. 8G) were co-cultured with HIV-GFP virus pseudotyped with SARS-CoV-2 S protein in the presence or absence of nevirapine (20 g/mL) followed by flow cytometry analysis at 48 hours later.

FIG. 9A depicts exemplary experimental results demonstrating that human primary myeloid cells were isolated from the peripheral blood of four healthy donors and were infected with a clinical isolate of SARS-CoV-2 (MOI=0.5). Cells were lysed and RNA was harvested at 24 hours post-infection. mRNA levels of SARS-CoV-2 N and indicated cytokine and chemokines were measured by RT-PCR and normalized to that of GAPDH. Data were presented as mean±SEM of four pooled cohorts. *, p<0.05; , p<0.01; , p<0.0001 by two-tailed paired student's t-test. FIG. 9B through FIG. 9D depict exemplary experimental results demonstrating that human PBMC-derived myeloid cells of one representative donor were infected with a clinical isolate of SARS-CoV-2 (MOI=0.5) followed by RNA-seq analysis to compare the gene expression in the infected cells versus the uninfected cells. Volcano plot of differential gene expression (FIG. 9B), GO pathway enrichment connectivity diagram (FIG. 9C), and KEGG pathway enrichment bubble chart (FIG. 9D) are shown. FIG. 9F through FIG. 9G depict exemplary experimental results demonstrating that hyperinflammatory responses are correlated with COVID-19 diseases status and the expression of the myeloid receptors. FIG. 9E depicts proinflammatory gene expression in BAL myeloid cell subsets from healthy control (HC) individuals and those with mild or severe COVID-19. FIG. 9F depicts Proinflammatory gene expression in BAL myeloid cell subsets was plotted for healthy individuals (control) or individuals with COVID-19 with different disease statuses. Data are presented as boxplots with the indicated mean line (black). *p<0.001 by Wilcoxon rank-sum test. FIG. 9G depicts the correlation between the expression of myeloid receptors and the cytokines/chemokines in the myeloid cell subsets from COVID-19 BAL samples. Data presented in FIG. 9F and FIG. 9G were from the same scRNA-seq dataset.

FIG. 10A depicts FACS plots of Vero or human primary myeloid cells infected by a mNeonGreen SARS-CoV-2 reporter virus. FIG. 10B depicts that HEK293T cells expressing indicated receptors were infected by a mNeonGreen SARS-CoV-2 reporter virus (MOI=10). Cells were harvested and fixed for FACS analysis at 24 hours post infection. Representative FACS plots were shown on the left and statistical analysis was shown on the right. Data presented as mean±SEM. ns, not significant; *, p<0.05; , p<0.01; *, p<0.001; ****, p<0.0001 by student's t-test. n refers to the number of independent experiments.

FIG. 11A through FIG. 11E depict exemplary experimental results demonstrating screening of nanobodies that block SARS-CoV-2 virus-host interactions.

FIG. 11A depicts exemplary experimental results demonstrating binding domains of human antibodies derived from recovered COVID-19 patients in SARS-CoV-2 S protein. HEK293T cells were transfected with individual plasmids of genes encoding S, S1, NTD, RBD, CTD or S2 domain fused with a transmembrane domain, followed by addition of human antibodies and anti-human Fc detection antibody. Binding to the individual S protein subunits were detected by CDS. N.S. denotes no specific binding. FIG. 11B depicts exemplary experimental results demonstrating the quantification of human antibodies derived from COVID-19 patients for their capacity of blocking the interaction between S1-Fc protein and ACE2 or the indicated myeloid receptors (RBD-Fc for TTYH2). The binding intensity was measured by CDS and analyzed by CellProfiler software (n=3). Data were presented as mean±SEM of a representative experiment. FIG. 11C and FIG. 11D depict exemplary experimental results demonstrating the quantification of VHH nanobodies (FIG. 11C) and A8-Fc and G11-Fc antibodies (FIG. 11D) for their blockade capacity on S1-Fc protein interaction with ACE2 and the indicated myeloid receptors (RBD-Fc for TTYH2). Human Fc-tagged S1 or RBD were used in (FIG. 11C) while mouse Fc-tagged S1 or RBD were used in (FIG. 11D). The binding intensity was measured by CDS and analyzed by CellProfiler software (n=3). Data were presented as mean±SEM of three pooled independent experiments. non-RBD interacting nanobodies are labeled with a star (*) in (FIG. 11C). FIG. 11E depicts exemplary experimental results demonstrating that HEK293T cells overexpressing ACE2, DC-SIGN or L-SIGN were infected with SARS-CoV-2-GFP pseudovirus (MOI=0.5) in the presence of Fc control, A8-Fc, G11-Fc, or A8-G11-Fc (25 µg/mL). Cells were analyzed by flow cytometry 48 hours post-infection (n=3). Data presented as mean±SEM of a representative experiment. , p<0.01; *, p<0.001; ****, p<0.0001 by two-way ANOVA. n refers to the number of independent experiments.

FIG. 12A depicts a schematic description of the nanobody development program. Llama naïve nanobody library as well as an engineered humanized VHH nanobody library was used to screen for binders to SARS-CoV-2 Spike protein. S protein binders of VHH nanobodies were tested for their capabilities to block S protein interaction with both ACE2 and myeloid cell receptors. Selected candidates were further engineered to develop the bi-specific antibodies. FIG. 12 B depicts a clustered heatmap of the relative blocking score for each VHH nanobody. Clone A8 and G11 are highlighted in the rectangular areas and non-RBD interacting nanobodies are labeled with a star (*) (n=3). FIG. 12C depicts exemplary experimental results demonstrating a probe-life kinetic analysis of the binding of A8-Fc, G11-Fc and A8-G11-Fc to the spike protein. $K_D$, $K_{on}$, and $K_{off}$ values of individual antibodies are shown in the table. FIG. 12D depicts exemplary experimental results demonstrating that human PBMC-derived myeloid cells were infected with SARS-CoV-2 GFP pseudovirus (MOI=1) in the presence of Fc Ctr, A8-Fc, G11-Fc, or A8-G11-Fc (50 µg/mL) for 48 hours, followed by flow cytometry (n=3). Data were presented as mean±SEM of a representative experiment. *, p<0.001; **, p<0.0001 by one-way ANOVA. FIG. 12E depicts exemplary experimental results demonstrating the neutralization of S-interacting decoy receptor cocktail (ACE2-Fc/L-SIGN-Fc) and bi-specific antibody (A8-G11-Fc) to an mNeonGreen SARS-CoV-2 reporter virus (MOI=1) in HEK293T cells expressing ACE2. Data were shown as mean±SEM of a representative experiment. FIG. 12F and FIG. 12G depict exemplary experimental results demonstrating that human primary myeloid cells were isolated from the peripheral blood of two healthy donors and were infected with a clinical isolate of SARS-CoV-2 (MOI=0.5) in the presence of Fc control protein (50 µg/mL), ACE2-Fc/L-SIGN-Fc cocktail (25 µg/mL of each), or A8-G11-Fc bi-specific antibody (50 µg/mL). Cells were lysed for RNA extraction and supernatant was harvested at 24 hours post-infection. mRNA levels of indicated cytokine and chemokines were measured by RT-PCR and normalized to that of GAPDH (FIG. 12F) and cytokines in the supernatant were quantified by a multiplex magnetic bead assay (FIG. 12G). Data were presented as mean±SEM of four pooled independent experiments. ns, not significant; *, p<0.05; , p<0.01; *, p<0.001 by one-way ANOVA. n refers to the number of independent experiments.

FIG. 13A depicts the binding of S1-Fc with or without the indicated mutations to HEK293T cells expressing indicated receptors. FIG. 13B depicts the binding of RBD-Fc or RBD-N501Y-Fc to HEK293T cells expressing ACE2 or TTHY2.

DETAILED DESCRIPTION

Figure 1A:
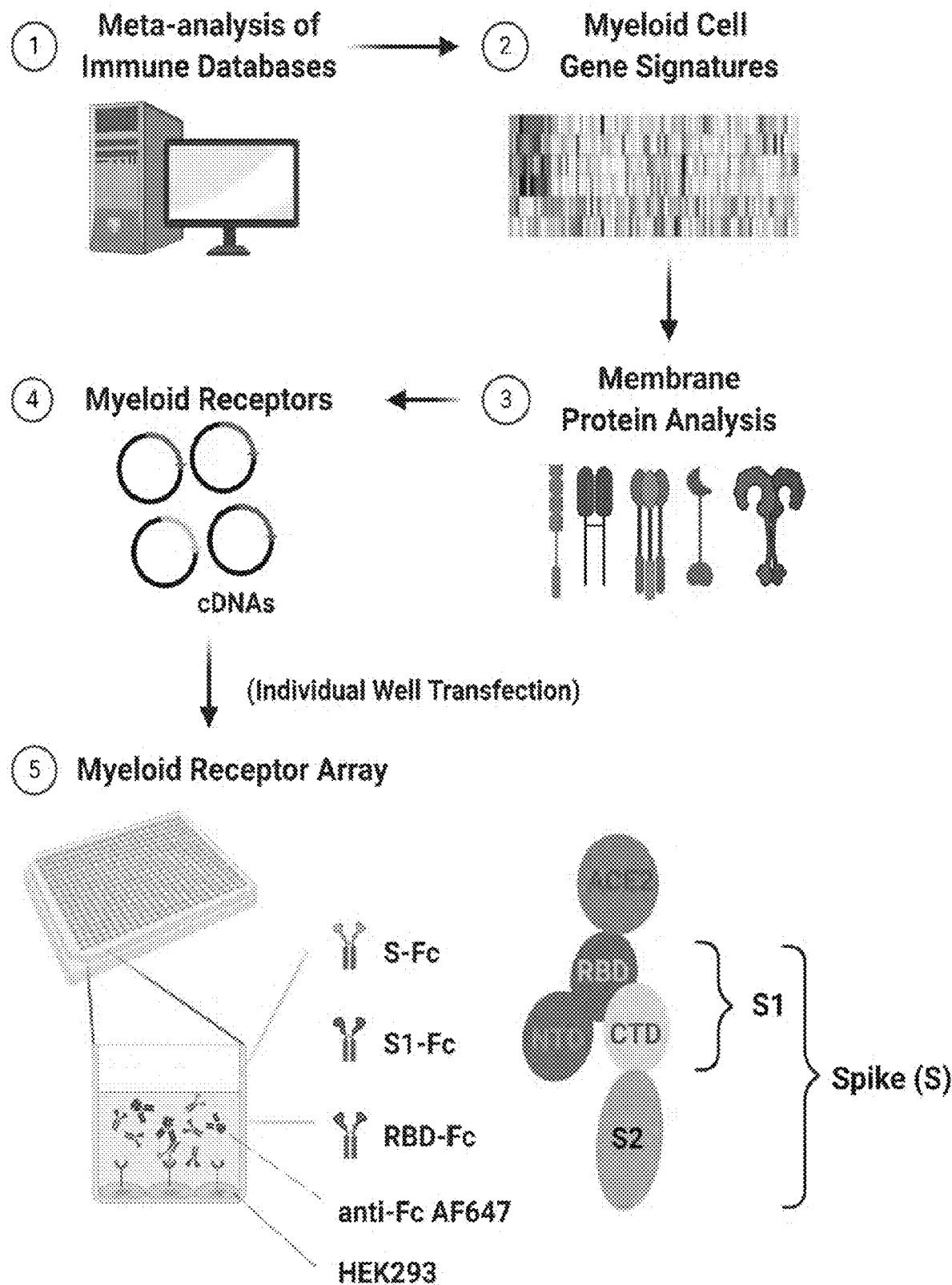
FIG. 1A through FIG. 1E depict exemplary experimental results demonstrating the discovery of C-type lectins and TTYH2 as receptors for SARS-CoV-2 S protein.
Figure 1B:
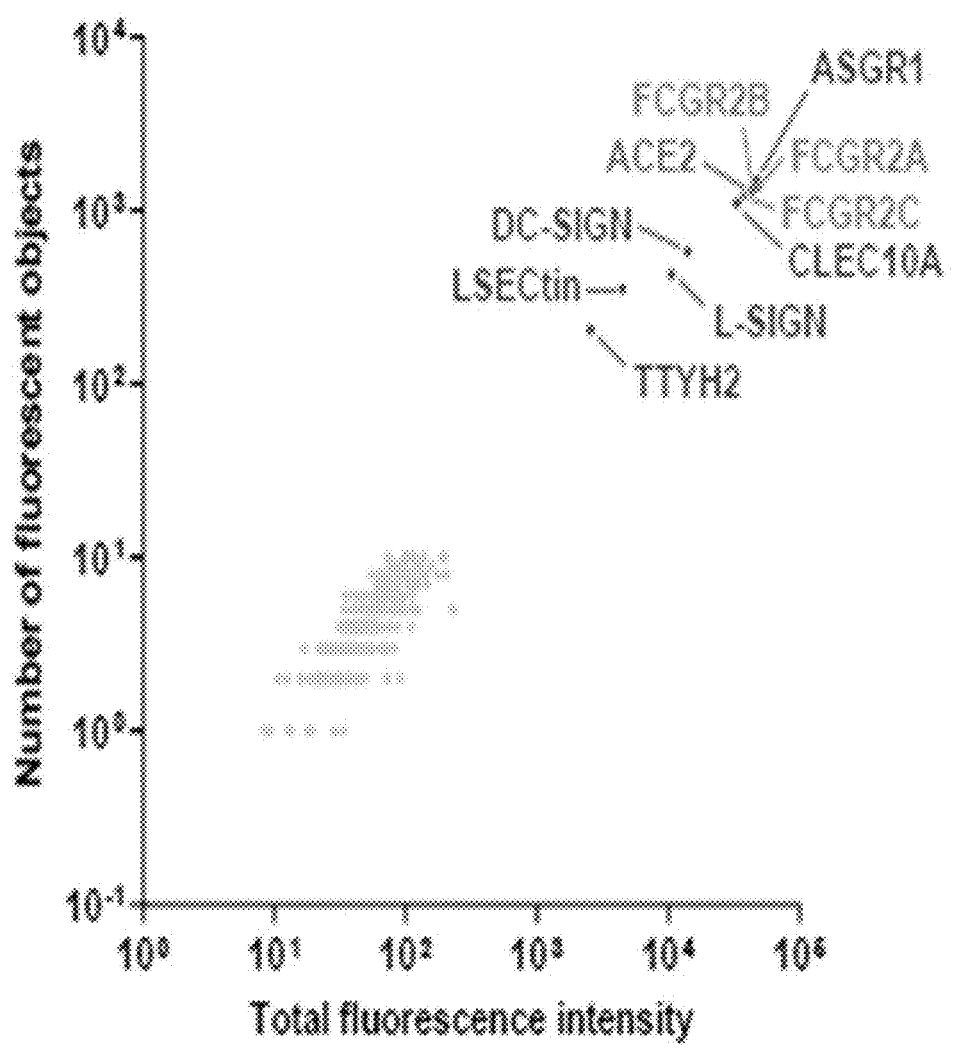

The present invention provides compositions for treating or preventing SARS-CoV-2 infection and SARS-CoV-2-associated diseases and disorders, including, but not limited to, COVID-19.

In one embodiment, the present invention provides a composition that inhibits the interaction between SARS-CoV-2 Spike (S) protein and one or more S protein interacting partner. In one embodiment, the composition comprises an inhibitor of a SARS-CoV-2 S protein interacting partner, wherein the inhibitor reduces or inhibits the expression, activity, or both of the SARS-CoV-2 S protein interacting partner. In one embodiment, the composition comprises an inhibitor of SARS-CoV-2 S protein, wherein the inhibitor reduces or inhibits the expression, activity, or both of SARS-CoV-2 S protein. In one embodiment, the composition comprises an agent that reduces or inhibits the binding of S protein to at least one of Angiotensin-converting enzyme 2 (ACE2), a C-type lectin and Tweety Family Member 2 (TTYH2) in a host. In one embodiment, the C-type lectin is dendritic cell-specific intercellular adhesion molecule-3-grabbing nonintegrin (DC-SIGN), liver/lymph node-specific intercellular adhesion molecule-3-grabbing integrin (L-SIGN), liver and lymph node sinusoidal endothelial cell C-type lectin (LSECtin), Asialoglycoprotein Receptor 1 (ASGR1), or C-type lectin domain family 10 member A (CLEC10A). In one embodiment, the composition comprises an inhibitor of DC-SIGN, L-SIGN, LSECtin, ASGR1, or CLEC10A wherein the inhibitor reduces or inhibits the expression, activity, or both of DC-SIGN, L-SIGN, LSECtin, ASGR1, or CLEC10A. For example, in one embodiment, the composition comprises an agent that binds to S protein, thereby preventing SARS-CoV-2 S-protein from binding at least one of ACE2, DC-SIGN, L-SIGN, LSECtin, ASGR1, CLEC10A and TTYH2. In one embodiment, the composition comprises an agent that binds to the endogenous ACE2, DC-SIGN, L-SIGN, LSECtin, ASGR1, CLEC10A or TTYH2, thereby preventing at least one of ACE2, DC-SIGN, L-SIGN, LSECtin, ASGR1, CLEC10A or TTYH2 from binding S-protein.

In one embodiment, the agent that inhibits the interaction of SARS-CoV-2 S protein and one or more SARS-CoV-2 S protein interacting partner comprises an antibody or nanobody that binds to at least one of SARS-CoV-2 S protein and one or more SARS-CoV-2 S protein interacting partner. In one embodiment, the antibody or nanobody specifically binds to at least one of SARS-CoV-2 S protein, ACE2, DC-SIGN, L-SIGN, LSECtin, ASGR1, CLEC10A and TTYH2.

In one embodiment, the agent that inhibits the interaction of SARS-CoV-2 S protein and one or more SARS-CoV-2 S protein interacting partner comprises a decoy receptor that binds to SARS-CoV-2 S protein to prevent binding of the SARS-CoV-2 S protein to endogenous SARS-CoV-2 S protein interacting partner. In one embodiment, the decoy receptor is a decoy receptor of at least one of ACE2, DC-SIGN, L-SIGN, LSECtin, ASGR1, CLEC10A and TTYH2. For example, in one embodiment, the decoy receptor comprises ACE2, DC-SIGN, L-SIGN, LSECtin, ASGR1, CLEC10A or TTYH2, or a fragment thereof.

In one aspect, the present invention provides a method for treating or preventing SARS-CoV-2 infection and SARS-CoV-2-associated diseases and disorders, such as COVID-19, in a subject. In one embodiment, the method comprises administering to a subject having a SARS-CoV-2 infection, a composition that inhibits the interaction between S protein and the SARS-CoV-2 S protein interacting partner. In one embodiment, the method comprises administering to a subject at risk for developing a SARS-CoV-2 infection, a composition that inhibits the interaction between S protein and the SARS-CoV-2 S protein interacting partner. In one embodiment, the method comprises administering to the subject a composition comprising an inhibitor of ACE2, a C-type lectin or TTYH2, wherein the inhibitor reduces or inhibits the expression, activity, or both of ACE2, the C-type lectin or TTYH2. In one embodiment, the C-type lectin is DC-SIGN, L-SIGN, LSECtin, ASGR1, or CLEC10A. Therefore, in one embodiment, the method comprises administering to the subject a composition comprising an inhibitor of DC-SIGN, L-SIGN, LSECtin, ASGR1, or CLEC10A wherein the inhibitor reduces or inhibits the expression, activity, or both of DC-SIGN, L-SIGN, LSECtin, ASGR1, or CLEC10A. In one embodiment, the method comprises administering to the subject a composition comprising an inhibitor of S protein, wherein the inhibitor reduces or inhibits the expression, activity, or both of S protein. In one embodiment, the method comprises administering to the subject a composition comprising an agent that reduces or inhibits the binding of S protein to endogenous ACE2, C-type lectin or TTYH2 in a host. For example, in one embodiment, the method comprises administering to the subject a composition comprising an agent that binds to S protein, thereby preventing S-protein from binding endogenous ACE2, DC-SIGN, L-SIGN, LSECtin, ASGR1, CLEC10A or TTYH2. In one embodiment, the method comprises administering to the subject a composition comprising an agent that binds to endogenous ACE2, DC-SIGN, L-SIGN, LSECtin, ASGR1, CLEC10A or TTYH2, thereby preventing ACE2, DC-SIGN, L-SIGN, LSECtin, ASGR1, CLEC10A or TTYH2 from binding S-protein.

Definitions

Unless defined otherwise, all technical and scientific terms used herein have the same meaning as commonly understood by one of ordinary skill in the art to which this invention belongs.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of 20%, ±10%, ±5%, ±1%, or ±0.1% from the specified value, as such variations are appropriate to perform the disclosed methods.

There term "in combination with" is used herein to that the indicated treatments are administered concurrently or that a first treatment is administered sequentially with one or more additional treatment.

The term "diagnosis" refers to a relative probability that a disease (e.g. an autoimmune, inflammatory autoimmune, cancer, infectious, immune, or other disease) is present in the subject. Similarly, the term "prognosis" refers to a relative probability that a certain future outcome may occur in the subject with respect to a disease state. For example, in the context of the present invention, prognosis can refer to the likelihood that an individual will develop a disease (e.g. an autoimmune, inflammatory autoimmune, cancer, infectious, immune, or other disease), or the likely severity of the disease (e.g., duration of disease). The terms are not intended to be absolute, as will be appreciated by any one of skill in the field of medical diagnostics.

A "disease" is a state of health of an animal wherein the animal cannot maintain homeostasis, and wherein if the disease is not ameliorated then the animal's health continues to deteriorate.

The terms "effective amount" and "pharmaceutically effective amount" or "therapeutically effective amount" refer to a sufficient amount of an agent to provide the desired biological result. That result can be reduction and/or alleviation of a sign, symptom, or cause of a disease or disorder, or any other desired alteration of a biological system. An appropriate effective amount in any individual case may be determined by one of ordinary skill in the art using routine experimentation.

The term "fusion protein" used herein refers to two or more peptides, polypeptides, or proteins operably linked to each other.

An "individual" is a vertebrate, preferably a mammal, more preferably a human. Mammals include, but are not limited to, farm animals, sport animals, pets, primates, mice and rats. In some embodiments, the individual is human. In some embodiments, the individual is an individual other than human.

The term "inhibit," as used herein, means to suppress or block an activity or function relative to a control value. Preferably, the activity is suppressed or blocked by 10% compared to a control value, more preferably by 50%, and even more preferably by 95%.

Nucleic acid" or "oligonucleotide" or "polynucleotide" or grammatical equivalents used herein means at least two nucleotides covalently linked together. The term "nucleic acid" includes single-, double-, or multiple-stranded DNA, RNA and analogs (derivatives) thereof. Oligonucleotides are typically from about 5, 6, 7, 8, 9, 10, 12, 15, 25, 30, 40, 50 or more nucleotides in length, up to about 100 nucleotides in length. Nucleic acids and polynucleotides are a polymers of any length, including longer lengths, e.g., 200, 300, 500, 1000, 2000, 3000, 5000, 7000, 10,000, etc. In certain embodiments, the nucleic acids herein contain phosphodiester bonds. In other embodiments, nucleic acid analogs are included that may have alternate backbones, comprising, e.g., phosphoramidate, phosphorothioate, phosphorodithioate, or O-methylphosphoroamidite linkages (see Eckstein, Oligonucleotides and Analogues: A Practical Approach, Oxford University Press); and peptide nucleic acid backbones and linkages. Other analog nucleic acids include those with positive backbones; non-ionic backbones, and non-ribose backbones, including those described in U.S. Pat. Nos. 5,235,033 and 5,034,506, and Chapters 6 and 7, ASC Symposium Series 580, Carbohydrate Modifications in Antisense Research, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made.

A nucleotide sequence is "operably linked" when it is placed into a functional relationship with another nucleotide sequence. For example, a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are near each other, and, in the case of a secretory leader, contiguous and in reading phase. However, enhancers do not have to be contiguous. Linking is accomplished by ligation at convenient restriction sites. If such sites do not exist, the synthetic oligonucleotide adaptors or linkers are used in accordance with conventional practice.

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or higher identity over a specified region when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 10 amino acids or 20 nucleotides in length, or more preferably over a region that is 10-50 amino acids or 20-50 nucleotides in length. As used herein, percent (%) amino acid sequence identity is defined as the percentage of amino acids in a candidate sequence that are identical to the amino acids in a reference sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For sequence comparisons, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

A "comparison window", as used herein, includes reference to a segment of any one of the number of contiguous positions selected from the group consisting of from 10 to 600, usually about 50 to about 200, more usually about 100 to about 150 in which a sequence may be compared to a reference sequence of the same number of contiguous positions after the two sequences are optimally aligned. Methods of alignment of sequences for comparison are well-known in the art. Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by manual alignment and visual inspection (see, e.g., Current Protocols in Molecular Biology (Ausubel et al., eds. 1995 supplement)).

The phrase "selectively (or specifically) hybridizes to" refers to the binding, duplexing, or hybridizing of a molecule only to a particular nucleotide sequence with a higher affinity, e.g., under more stringent conditions, than to other nucleotide sequences (e.g., total cellular or library DNA or RNA).

The phrase "stringent hybridization conditions" refers to conditions under which a probe will hybridize to its target subsequence, typically in a complex mixture of nucleic acids, but to no other sequences. Stringent conditions are sequence-dependent and will be different in different circumstances. Longer sequences hybridize specifically at higher temperatures. An extensive guide to the hybridization of nucleic acids is found in Tijssen, Techniques in Biochemistry and Molecular Biology—Hybridization with Nucleic Probes, "Overview of principles of hybridization and the strategy of nucleic acid assays" (1993). Generally, stringent conditions are selected to be about 5-10° C. lower than the thermal melting point ($T_m$) for the specific sequence at a defined ionic strength pH. The $T_m$ is the temperature (under defined ionic strength, pH, and nucleic concentration) at which 50% of the probes complementary to the target hybridize to the target sequence at equilibrium (as the target sequences are present in excess, at $T_m$, 50% of the probes are occupied at equilibrium). Stringent conditions may also be achieved with the addition of destabilizing agents such as formamide. For selective or specific hybridization, a positive signal is at least two times background, preferably 10 times background hybridization. Exemplary stringent hybridization conditions can be as following: 50% formamide, 5×SSC, and 1% SDS, incubating at 42° C., or, 5×SSC, 1% SDS, incubating at 65° C., with wash in 0.2×SSC, and 0.1% SDS at 65° C.

Nucleic acids that do not hybridize to each other under stringent conditions are still substantially identical if the polypeptides which they encode are substantially identical. This occurs, for example, when a copy of a nucleic acid is created using the maximum codon degeneracy permitted by the genetic code. In such cases, the nucleic acids typically hybridize under moderately stringent hybridization conditions. Exemplary "moderately stringent hybridization conditions" include a hybridization in a buffer of 40% formamide, 1 M NaCl, 1% SDS at 37° C., and a wash in IX SSC at 45° C. A positive hybridization is at least twice background. Those of ordinary skill will readily recognize that alternative hybridization and wash conditions can be utilized to provide conditions of similar stringency. Additional guidelines for determining hybridization parameters are provided in numerous reference, e.g., and Current Protocols in Molecular Biology, ed. Ausubel, et al.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

Twenty amino acids are commonly found in proteins. Those amino acids can be grouped into nine classes or groups based on the chemical properties of their side chains. Substitution of one amino acid residue for another within the same class or group is referred to herein as a "conservative" substitution. Conservative amino acid substitutions can frequently be made in a protein without significantly altering the conformation or function of the protein. Substitution of one amino acid residue for another from a different class or group is referred to herein as a "non-conservative" substitution. In contrast, non-conservative amino acid substitutions tend to modify conformation and function of a protein.

TABLE 1

Example of amino acid classification

| | |
|---|---|
| Small/Aliphatic residues: | Gly, Ala, Val, Leu, Ile |
| Cyclic Imino Acid: | Pro |
| Hydroxyl-containing Residues: | Ser, Thr |
| Acidic Residues: | Asp, Glu |
| Amide Residues: | Asn, Gln |
| Basic Residues: | Lys, Arg |
| Imidazole Residue: | His |
| Aromatic Residues: | Phe, Tyr, Trp |
| Sulfur-containing Residues: | Met, Cys |

In some embodiments, the conservative amino acid substitution comprises substituting any of glycine (G), alanine (A), isoleucine (I), valine (V), and leucine (L) for any other of these aliphatic amino acids; serine (S) for threonine (T) and vice versa; aspartic acid (D) for glutamic acid (E) and vice versa; glutamine (Q) for asparagine (N) and vice versa; lysine (K) for arginine (R) and vice versa; phenylalanine (F), tyrosine (Y) and tryptophan (W) for any other of these aromatic amino acids; and methionine (M) for cysteine (C) and vice versa. Other substitutions can also be considered conservative, depending on the environment of the particular amino acid and its role in the three-dimensional structure of the protein. For example, glycine (G) and alanine (A) can frequently be interchangeable, as can alanine (A) and valine (V). Methionine (M), which is relatively hydrophobic, can frequently be interchanged with leucine and isoleucine, and sometimes with valine. Lysine (K) and arginine (R) are frequently interchangeable in locations in which the significant feature of the amino acid residue is its charge and the differing pKs of these two amino acid residues are not significant. Still other changes can be considered "conservative" in particular environments (see, e.g., BIOCHEMISTRY at pp. 13-15, 2nd ed. Lubert Stryer ed. (Stanford University); Henikoff et al, Proc. Nat'l Acad. Set USA (1992) 89: 10915-10919; Lei et al., J. Biol. Chem. (1995) 270(20): 1 1882-1 1886).

In some embodiments, the non-conservative amino acid substitution comprises substituting any of glycine (G), alanine (A), isoleucine (I), valine (V), and leucine (L) for any of serine (S), threonine (T), aspartic acid (D), glutamic acid (E), glutamine (Q), asparagine (N), lysine (K), arginine (R), phenylalanine (F), tyrosine (Y), tryptophan (W), methionine (M), cysteine (C), histidine (H), and proline (P). In some embodiments, the non-conservative amino acid substitution comprises substituting any of serine (S) and threonine (T) for any of glycine (G), alanine (A), isoleucine (I), valine (V), leucine (L), aspartic acid (D), glutamic acid (E), glutamine (Q), asparagine (N), lysine (K), arginine (R), phenylalanine (F), tyrosine (Y), tryptophan (W), methionine (M), cysteine (C), histidine (H) and proline (P). In some embodiments, the non-conservative amino acid substitution comprises substituting any of aspartic acid (D) and glutamic acid (E) for any of glycine (G), alanine (A), isoleucine (I), valine (V), leucine (L), serine (S), threonine (T), glutamine (Q), asparagine (N), lysine (K), arginine (R), phenylalanine (F), tyrosine (Y), tryptophan (W), methionine (M), cysteine (C), histidine (H), and proline (P). In some embodiments, the non-conservative amino acid substitution comprises substituting any of glutamine (Q) and asparagine (N) for any of glycine (G), alanine (A), isoleucine (I), valine (V), leucine (L), serine (S), threonine (T), aspartic acid (D), glutamic acid (E), lysine (K), arginine (R), phenylalanine (F), tyrosine (Y), tryptophan (W), methionine (M), cysteine (C), histidine (H), and proline (P). In some embodiments, the non-conservative amino acid substitution comprises substituting any of lysine (K) and arginine (R) for any of glycine (G), alanine (A), isoleucine (I), valine (V), leucine (L), serine (S), threonine (T), aspartic acid (D), glutamic acid (E), glutamine (Q), asparagine (N), phenylalanine (F), tyrosine (Y), tryptophan (W), methionine (M), cysteine (C), histidine (H), and proline (P). In some embodiments, the non-conservative amino acid substitution comprises substituting any of phenylalanine (F), tyrosine (Y), and tryptophan (W) for any of glycine (G), alanine (A), isoleucine (I), valine (V), leucine (L), serine (S), threonine (T), aspartic acid (D), glutamic acid (E), glutamine (Q), asparagine (N), lysine (K), arginine (R), methionine (M), cysteine (C), histidine (H), and proline (P). In some embodiments, the non-conservative amino acid substitution comprises substituting any of methionine (M) and cysteine (C) for any of glycine (G), alanine (A), isoleucine (I), valine (V), leucine (L), serine (S), threonine (T), aspartic acid (D), glutamic acid (E), glutamine (Q), asparagine (N), lysine (K), arginine (R), phenylalanine (F), tyrosine (Y), tryptophan (W), histidine (H), and proline (P). In some embodiments, the non-conservative amino acid substitution comprises substituting histidine (H) for any of glycine (G), alanine (A), isoleucine (I), valine (V), leucine (L), serine (S), threonine (T), aspartic acid (D), glutamic acid (E), glutamine (Q), asparagine (N), lysine (K), arginine (R), phenylalanine (F), tyrosine (Y), tryptophan (W), methionine (M), cysteine (C), and proline (P). In some embodiments, the non-conservative amino acid substitution comprises substituting proline (P) for any of glycine (G), alanine (A), isoleucine (I), valine (V), leucine (L), serine (S), threonine (T), aspartic acid (D), glutamic acid (E), glutamine (Q), asparagine (N), lysine (K), arginine (R), phenylalanine (F), tyrosine (Y), tryptophan (W), methionine (M), cysteine (C), and histidine (H).

"Polypeptide," "peptide," and "protein" are used herein interchangeably and mean any peptide-linked chain of amino acids, regardless of length or post-translational modification. As noted below, the polypeptides described herein can be, e.g., wild-type proteins, biologically-active fragments of the wild-type proteins, or variants of the wild-type proteins or fragments. Variants, in accordance with the disclosure, can contain amino acid substitutions, deletions, or insertions. The substitutions can be conservative or non-conservative. In some embodiments, conservative substitutions typically include substitutions within the following groups: glycine and alanine; valine, isoleucine, and leucine; aspartic acid and glutamic acid; asparagine, glutamine, serine and threonine; lysine, histidine and arginine; and phenylalanine and tyrosine.

Following expression, the proteins (e.g. antibodies, antigen-binding fragments thereof, nanobodies, nanobody-conjugates) can be isolated. The term "purified" or "isolated" as applied to any of the proteins described herein (e.g., a conjugate described herein, antibody or antigen-binding fragment thereof described herein) refers to a polypeptide that has been separated or purified from components (e.g., proteins or other naturally-occurring biological or organic molecules) which naturally accompany it, e.g., other proteins, lipids, and nucleic acid in a prokaryote expressing the proteins. Typically, a polypeptide is purified when it constitutes at least 60 (e.g., at least 65, 70, 75, 80, 85, 90, 92, 95, 97, or 99) %, by weight, of the total protein in a sample.

A "label" or a "detectable moiety" is a composition detectable by spectroscopic, photochemical, biochemical, immunochemical, chemical, magnetic resonance imaging, or other physical means. For example, useful detectable moieties include $^{32}$P, fluorescent dyes, electron-dense reagents, enzymes (e.g., as commonly used in an ELISA), biotin, digoxigenin, paramagnetic molecules, paramagnetic nanoparticles, ultrasmall superparamagnetic iron oxide ("USPIO") nanoparticles, USPIO nanoparticle aggregates, superparamagnetic iron oxide ("SPIO") nanoparticles, SPIO nanoparticle aggregates, standard superparamagnetic iron oxide ("SSPIO"), SSPIO nanoparticle aggregates, polydisperse superparamagnetic iron oxide ("PSPIO"), PSPIO nanoparticle aggregates, monochrystalline SPIO, monochrystalline SPIO aggregates, monochrystalline iron oxide nanoparticles, monochrystalline iron oxide, other nanoparticle contrast agents, liposomes or other delivery vehicles containing Gadolinium chelate ("Gd-chelate") molecules, Gadolinium, radioisotopes, radionuclides (e.g. carbon-11, nitrogen-13, oxygen-15, fluorine-18, rubidium-82), fluorodeoxyglucose (e.g. fluorine-18 labeled), any gamma ray emitting radionuclides, positron-emitting radionuclide, radiolabeled glucose, radiolabeled water, radiolabeled ammonia, biocolloids, microbubbles (e.g. including microbubble shells including albumin, galactose, lipid, and/or polymers; microbubble gas core including air, heavy gas(es), perfluorcarbon, nitrogen, octafluoropropane, perflexane lipid microsphere, perflutren, etc.), iodinated contrast agents (e.g. iohexol, iodixanol, ioversol, iopamidol, ioxilan, iopromide, diatrizoate, metrizoate, ioxaglate), barium sulfate, thorium dioxide, gold, gold nanoparticles, gold nanoparticle aggregates, fluorophores, two-photon fluorophores, or haptens and proteins or other entities which can be made detectable, e.g., by incorporating a radiolabel into a peptide or antibody specifically reactive with a target peptide. Detectable moieties also include any of the above compositions encapsulated in nanoparticles, particles, aggregates, coated with additional compositions, derivatized for binding to a targeting agent (e.g. antibody or antigen binding fragment). Any method known in the art for conjugating an antibody to the label may be employed, e.g., using methods described in Hermanson, Bioconjugate Techniques 1996, Academic Press, Inc., San Diego.

As used herein, the term "pharmaceutically acceptable" is used synonymously with "physiologically acceptable" and "pharmacologically acceptable". A pharmaceutical composition will generally comprise agents for buffering and preservation in storage, and can include buffers and carriers for appropriate delivery, depending on the route of administration. The term "diagnostically acceptable" is used synonymously with "physiologically acceptable" and "pharmacologically acceptable" and refers to diagnostic compositions.

"Pharmaceutically acceptable excipient" and "pharmaceutically acceptable carrier" refer to a substance that aids the administration of an active agent to and absorption by a subject and can be included in the compositions of the present invention without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethylcellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the invention. One of skill in the art will recognize that other pharmaceutical excipients are useful in the present invention.

The terms "subject," "patient," "individual," and the like are used interchangeably herein, and refer to any animal, or cells thereof whether in vitro or in situ, amenable to the methods described herein. In certain non-limiting embodiments, the patient, subject or individual is a human.

The term "sub-therapeutic" as used herein means a treatment at a dose known to be less than what is known to induce a therapeutic effect.

The term "therapeutic" as used herein means a treatment and/or prophylaxis. A therapeutic effect is obtained by suppression, remission, or eradication of a disease state.

The term "therapeutic agent" use herein refers to any agent that has a therapeutic effect and/or elicits a desired biological and/or pharmacological effect, when administered to a subject. In some embodiments, an agent is considered to be a therapeutic agent if its administration to a relevant population is statistically correlated with a desired or beneficial therapeutic outcome in the population, whether or not a particular subject to whom the agent is administered experiences the desired or beneficial therapeutic outcome.

By "therapeutically effective dose or amount" as used herein is meant a dose that produces effects for which it is administered (e.g. treating or preventing a disease). The exact dose and formulation will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Remington: The Science and Practice of Pharmacy, 20th Edition, Gennaro, Editor (2003), and Pickar, Dosage Calculations (1999)). For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a standard control. A therapeutically effective dose or amount may ameliorate one or more symptoms of a disease. A therapeutically effective dose or amount may prevent or delay the onset of a disease or one or more symptoms of a disease when the effect for which it is being administered is to treat a person who is at risk of developing the disease.

As used herein, the terms "treat" and "prevent" may refer to any delay in onset, reduction in the frequency or severity of symptoms, amelioration of symptoms, improvement in patient comfort or function, decrease in severity of the disease state, etc. The effect of treatment can be compared to an individual or pool of individuals not receiving a given treatment, or to the same patient prior to, or after cessation of, treatment. The term "prevent" generally refers to a decrease in the occurrence of a given disease (e.g. an autoimmune, inflammatory autoimmune, cancer, infectious, immune, or other disease) or disease symptoms in a patient. As indicated above, the prevention may be complete (no detectable symptoms) or partial, such that fewer symptoms are observed than would likely occur absent treatment.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. Examples of viral vectors include, but are not limited to, adenoviral vectors, adeno-associated virus vectors, retroviral vectors, lentiviral vectors, and the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

The present invention provides compositions for treating SARS-CoV-2 infection and treating or preventing SARS-CoV-2-associated diseases and disorders, such as COVID-19. The present invention is based upon the unexpected discovery that several C-type lectins (DC-SIGN, L-SIGN, LSECtin) and Tweety Family Member 2 (TTYH2) interact with SARS-CoV-2 Spike (S) protein, mostly through regions outside of the receptor-binding domain (RBD), and the development of spike-specific nanobodies, some of which demonstrated potent blocking activity for both virus-immune and virus-ACE2 interactions. Thus, the present invention provides compositions and methods for treating SARS-CoV-2 infection and for treating or preventing SARS-CoV-2-associated diseases and disorders by inhibiting or preventing the interaction between the SARS-CoV-2 S protein and SARS-CoV-2 S protein interacting partners.

In some embodiments, the composition comprises an inhibitor of a SARS-CoV-2 S protein interacting partner. In one embodiment, the SARS-CoV-2 S protein interacting partner is ACE2. In one embodiment, the SARS-CoV-2 S protein interacting partner is a C-type lectin. In one embodiment, the SARS-CoV-2 S interacting partner is DC-SIGN, L-SIGN, LSECtin, ASGR1, or CLEC10A. In one embodiment, the SARS-CoV-2 S protein interacting partner is TTYH2.

In some embodiments, the composition comprises an isolated nucleic acid (e.g., siRNA, miRNA, ribozyme, antisense RNA, gRNA, etc.) that reduces the expression level of S protein or a SARS-CoV-2 S protein interacting partner of the invention. In one embodiment, the isolated nucleic acid molecule reduces the expression level of ACE2. In one embodiment, the isolated nucleic acid molecule reduces the expression level of a C-type lectin. In one embodiment, the isolated nucleic acid molecule reduces the expression level of DC-SIGN, L-SIGN, LSECtin, ASGR1, or CLEC10A. In one embodiment, the isolated nucleic acid molecule reduces the expression level of TTYH2.

In some embodiments, the composition comprises an inhibitor of S protein and/or the activity of a SARS-CoV-2 S protein interacting partner of the invention. Thus, in various embodiments, the composition comprises a small molecule, nucleic acid, protein, peptide, antibody, antibody fragment, antagonist, aptamer, or peptidomimetic or any combination thereof that reduces the activity of S protein or a SARS-CoV-2 S protein interacting partner of the invention. In one embodiment, the inhibitor reduces the activity of ACE2. In one embodiment, the inhibitor reduces the activity of a C-type lectin. In one embodiment, the inhibitor reduces the activity of DC-SIGN, L-SIGN, LSECtin, ASGR1, or CLEC10A. In one embodiment, the inhibitor reduces the activity of TTYH2.

In some embodiments, the composition comprises an agent that inhibits, reduces, or prevents binding of S protein to the SARS-CoV-2 S protein interacting partner of the invention. For example, in one embodiment, the composition comprises an agent that binds to S protein, thereby preventing S-protein from binding one or more SARS-CoV-2 S protein interacting partner of the invention. In one embodiment, the composition comprises an agent that binds to one or more SARS-CoV-2 S protein interacting partner of the invention, thereby preventing one or more SARS-CoV-2 S protein interacting partner from binding S-protein. In various embodiments, the agent comprises a small molecule, protein, peptide, peptidomimetic, antibody, antibody fragment, or nucleic acid. In one embodiment, the agent comprises a nanobody specific for binding to S protein or one or more SARS-CoV-2 S protein interacting partner of the invention. In one embodiment, the nanobody is specific for binding to ACE2. In one embodiment, the nanobody is specific for binding to a C-type lectin. In one embodiment, the nanobody is specific for binding to DC-SIGN, L-SIGN, LSECtin, ASGR1, or CLEC10A. In one embodiment, the nanobody is specific for binding to TTYH2.

Inhibitors

In one embodiment, the invention provides compositions for treating or preventing SARS-CoV-2 infection and SARS-CoV-2-associated diseases and disorders in a subject by inhibiting the interaction between SARS-CoV-2 S protein and one or more SARS-CoV-2 S protein interacting partner. In one embodiment, the composition inhibits the expression, activity, or both of S protein or one or more SARS-CoV-2 S protein interacting partner. In one embodiment, the composition inhibits the expression, activity, or both of S protein. In one embodiment, the composition inhibits the expression, activity, or both of ACE2. In one embodiment, the composition inhibits the expression, activity, or both of a C-type lectin. In one embodiment, the composition inhibits the expression, activity, or both of DC-SIGN, L-SIGN, LSECtin, ASGR1, or CLEC10A. In one embodiment, the composition inhibits the expression, activity, or both of TTYH2.

In one embodiment, the composition of the invention comprises an agent that inhibits, reduces, or prevents the interaction between S protein and one or more SARS-CoV-2 S protein interacting partner of the invention. In one embodiment, the composition of the invention comprises an agent that inhibits, reduces, or prevents the interaction between S protein and ACE2. In one embodiment, the composition of the invention comprises an agent that inhibits, reduces, or prevents the interaction between S protein and a C-type lectin. In one embodiment, the composition of the invention comprises an agent that inhibits, reduces, or prevents the interaction between S protein and DC-SIGN, L-SIGN, LSECtin, ASGR1, or CLEC10A. In one embodiment, the composition of the invention comprises an agent that inhibits, reduces, or prevents the interaction between S protein and TTYH2. In various embodiments, the inhibitor of S protein is any compound, molecule, or agent that reduces, inhibits, or prevents the expression, activity, or function of S protein. Thus, an inhibitor of S protein is any compound, molecule, or agent that reduces S protein expression, activity, or both. In various embodiments, the inhibitor of S protein is a nucleic acid, a peptide, an antibody, a nanobody, a small molecule, a siRNA, a ribozyme, an antisense nucleic acid, an antagonist, an aptamer, a peptidomimetic, or any combination thereof.

In various embodiments, the inhibitor of a SARS-CoV-2 S protein interacting partner is any compound, molecule, or agent that reduces, inhibits, or prevents the expression, activity, or function of one or more SARS-CoV-2 S protein interacting partner. Thus, an inhibitor of one or more SARS-CoV-2 S protein interacting partner is any compound, molecule, or agent that reduces expression, activity, or both of one or more SARS-CoV-2 S protein interacting partner. In various embodiments, the inhibitor of one or more SARS-CoV-2 S protein interacting partner is a nucleic acid, a peptide, an antibody, a nanobody, a small molecule, a siRNA, a ribozyme, an antisense nucleic acid, an antagonist, an aptamer, a peptidomimetic, or any combination thereof.

Polypeptide Inhibitors

In some embodiments, the inhibitor is a peptide or polypeptide inhibitor that inhibits SARS-CoV-2 S protein or a SARS-CoV-2 S protein interacting partner of the invention. For example, in one embodiment, the peptide inhibitor of the invention inhibits SARS-CoV-2 S protein or a SARS-CoV-2 S protein interacting partner of the invention directly by binding to SARS-CoV-2 S protein or a SARS-CoV-2 S protein interacting partner of the invention thereby preventing the normal functional activity of SARS-CoV-2 S protein or a SARS-CoV-2 S protein interacting partner of the invention. In another embodiment, the peptide inhibitor of the invention inhibits SARS-CoV-2 S protein or a SARS-CoV-2 S protein interacting partner of the invention by competing with endogenous SARS-CoV-2 S protein or a SARS-CoV-2 S protein interacting partner of the invention. In yet another embodiment, the peptide inhibitor of the invention inhibits the activity of SARS-CoV-2 S protein or a SARS-CoV-2 S protein interacting partner of the invention by acting as a transdominant negative mutant. In one embodiment, the peptide inhibitor of the invention comprises a decoy receptor which inhibits, reduces, or prevents binding of the SARS-CoV-2 S protein to one or more SARS-CoV-2 S protein interacting partner. In one embodiment, the decoy receptor is a decoy of one or more of ACE2, DC-SIGN, L-SIGN, LSECtin, ASGR1, CLEC10A and TTYH2, or a fragment or variant thereof.

In some embodiments, the decoy receptor is a variant of one or more of ACE2, DC-SIGN, L-SIGN, LSECtin, ASGR1, CLEC10A and TTYH2. Variants of the peptides and polypeptides according to the present invention may be (i) one in which one or more of the amino acid residues are substituted with a conserved or non-conserved amino acid residue and such substituted amino acid residue may or may not be one encoded by the genetic code, (ii) one in which there are one or more modified amino acid residues, e.g., residues that are modified by the attachment of substituent groups, (iii) one in which the polypeptide is an alternative splice variant of the polypeptide of the present invention, (iv) fragments of the polypeptides and/or (v) one in which the polypeptide is fused with another polypeptide, such as a leader or secretory sequence or a sequence which is employed for purification (for example, His-tag) or for detection (for example, Sv5 epitope tag). The fragments include polypeptides generated via proteolytic cleavage (including multi-site proteolysis) of an original sequence. Variants may be post-translationally, or chemically modified. Such variants are deemed to be within the scope of those skilled in the art from the teaching herein.

Antibody Inhibitors

In some embodiments, the inhibitor is an antibody, or antibody fragment. In some embodiments, the inhibitor is an antibody, or antibody fragment, that specifically binds to S protein or a S protein interacting partner of the invention. That is, the antibody can inhibit S protein or a S protein interacting partner of the invention to provide a beneficial effect.

The antibodies may be intact monoclonal or polyclonal antibodies, and immunologically active fragments (e.g., a Fab or (Fab)$_2$ fragment), an antibody heavy chain, an antibody light chain, humanized antibodies, a genetically engineered single chain Fv molecule (Ladner et al, U.S. Pat. No. 4,946,778), or a chimeric antibody, for example, an antibody which contains the binding specificity of a murine antibody, but in which the remaining portions are of human origin. In some embodiments, the antibodies comprises a portion of an immunoglobulin molecule, such as the Fc portion of an immunoglobulin, for example, an IgG. Antibodies including monoclonal and polyclonal antibodies, humanized antibodies, fragments and chimeras, may be prepared using methods known to those skilled in the art.

The antibody may comprise a heavy chain and a light chain complementarity determining region ("CDR") set, respectively interposed between a heavy chain and a light chain framework ("FR") set which provide support to the CDRs and define the spatial relationship of the CDRs relative to each other. The CDR set may contain three hypervariable regions of a heavy or light chain V region. Proceeding from the N-terminus of a heavy or light chain, these regions are denoted as "CDR1," "CDR2," and "CDR3," respectively. An antigen-binding site, therefore, may include six CDRs, comprising the CDR set from each of a heavy and a light chain V region.

The antibody can be an immunoglobulin (Ig). The Ig can be, for example, IgA, IgM, IgD, IgE, and IgG. The immunoglobulin can include the heavy chain polypeptide and the light chain polypeptide. The heavy chain polypeptide of the immunoglobulin can include a VH region, a CH1 region, a hinge region, a CH2 region, and a CH3 region. The light chain polypeptide of the immunoglobulin can include a VL region and CL region.

The antibody can be a polyclonal or monoclonal antibody. The antibody can be a chimeric antibody, a single chain antibody, an affinity matured antibody, a human antibody, a humanized antibody, or a fully human antibody. The humanized antibody can be an antibody from a non-human species that binds the desired antigen having one or more complementarity determining regions (CDRs) from the non-human species and framework regions from a human immunoglobulin molecule.

The antibody can be a bispecific antibody. The bispecific antibody can bind or react with two antigens, for example, two of the antigens described below in more detail. The bispecific antibody can be comprised of fragments of two of the antibodies described herein, thereby allowing the bispecific antibody to bind or react with two desired target molecules, which may include the antigen, which is described below in more detail, a ligand, including a ligand for a receptor, a receptor, including a ligand-binding site on the receptor, a ligand-receptor complex, and a marker. Bispecific antibodies can comprise a first antigen-binding site that specifically binds to a first target and a second antigen-binding site that specifically binds to a second target, with particularly advantageous properties such as producibility, stability, binding affinity, biological activity, specific targeting of certain T cells, targeting efficiency and reduced toxicity. In some instances, there are bispecific antibodies, wherein the bispecific antibody binds to the first target with high affinity and to the second target with low affinity. In other instances, there are bispecific antibodies, wherein the bispecific antibody binds to the first target with low affinity and to the second target with high affinity. In other instances, there are bispecific antibodies, wherein the bispecific antibody binds to the first target with a desired affinity and to the second target with a desired affinity.

Antibodies can be prepared using intact polypeptides or fragments containing an immunizing antigen of interest. The polypeptide or oligopeptide used to immunize an animal may be obtained from the translation of RNA or synthesized chemically and can be conjugated to a carrier protein, if desired. Suitable carriers that may be chemically coupled to peptides include bovine serum albumin and thyroglobulin, keyhole limpet hemocyanin. The coupled polypeptide may then be used to immunize the animal (e.g., a mouse, a rat, or a rabbit).

Nanobodies

In some embodiments, the invention provides antibodies or nanobodies that bind with high affinity to SARS-CoV-2 S protein to inhibit interaction of SARS-CoV-2 S protein and one or more SARS-CoV-2 S protein interacting partner. In one embodiment, the antibodies or nanobodies of the invention comprises an agent that inhibits, reduces, or prevents the interaction between SARS-CoV-2 S protein and ACE2. In one embodiment, the antibodies or nanobodies of the invention comprises an agent that inhibits, reduces, or prevents the interaction between SARS-CoV-2 S protein and a C-type lectin. In one embodiment, the antibodies or nanobodies of the invention comprises an agent that inhibits, reduces, or prevents the interaction between S protein and DC-SIGN, L-SIGN, LSECtin, ASGR1, or CLEC10A. In one embodiment, the antibodies or nanobodies of the invention comprises an agent that inhibits, reduces, or prevents the interaction between S protein and TTYH2.

In some embodiments, the invention relates to methods of using the proteins or peptides (e.g, antibodies or nanobodies) of the invention to bind to their target protein. In some embodiments, the invention relates to methods of using the proteins or peptides (e.g, antibodies or nanobodies) of the invention to treat or prevent a disease or disorder (e.g., COVID-19). In various embodiments, the invention is directed to compositions and methods for treating a disease or disorder (e.g., COVID-19) in an individual by administering to a subject in need thereof at least one protein or peptide (e.g, antibody or nanobody) of the invention.

In certain embodiments, the protein or peptide of the invention is considered an antibody because it binds to a target (e.g., SARS-CoV-2 S protein or a SARS-CoV-2 S protein interacting partner). In one embodiment, the antibody comprises a heavy chain constant region, such as an IgG1, IgG2, IgG3, IgG4, IgA, IgE, IgM or IgD constant region. In certain embodiments, the heavy chain constant region is an IgG1 heavy chain constant region or an IgG4 heavy chain constant region. Furthermore, the antibody can comprise a light chain constant region, either a kappa light chain constant region or a lambda light chain constant region. In one embodiment, the antibody comprises a kappa light chain constant region. Alternatively, the antibody portion can be, for example, a Fab fragment, an engineered Fc antibody (Fcab), or a single chain Fv fragment.

In some embodiments, the peptide compositions of the invention decrease the level or activity (e.g., enzymatic activity, substrate binding activity, receptor binding activity, etc.) of one or more target SARS-CoV-2 S protein interacting partner. The binding peptides of the invention include a variety of forms of antibodies including, for example, polyclonal antibodies, monoclonal antibodies, intracellular antibodies ("intrabodies"), Fv, Fab and F(ab)2, single chain antibodies (scFv), heavy chain antibodies (such as camelid antibodies), synthetic antibodies, chimeric antibodies, and humanized antibodies.

In some embodiments, the invention provides heavy chain antibodies, or nanobodies. As with other antibodies of non-human origin, an amino acid sequence of a nanobody can be altered recombinantly to obtain a sequence that more closely resembles a human sequence, i.e., the nanobody can be "humanized" to thereby further reduce the potential immunogenicity of the antibody.

In some embodiments, the invention relates to the binding portion of an antibody or nanobody that comprises one or more fragments of an antibody or nanobody that retain the ability to specifically bind to binding partner molecule. It has been shown that the binding function of an antibody can be performed by fragments of a full-length antibody. Examples of binding fragments encompassed within the term "binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al., (1989) Nature 341:544-546), which consists of a VH domain; and (vi) an isolated complementarity determining region (CDR). Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see e.g., Bird et al. (1988) Science 242:423-426; and Huston et al. (1988) Proc. Natl. Acad. Sci. USA 85:5879-5883). Such single chain antibodies are also intended to be encompassed within the term "binding portion" of an antibody. These antibody fragments are obtained using conventional techniques known to those with skill in the art, and the fragments are screened for utility in the same manner as are intact antibodies. Binding portions can be produced by recombinant DNA techniques, or by enzymatic or chemical cleavage of intact immunoglobulins.

In some embodiments, the invention provides single chain antibodies, or nanobody polypeptides, that are directed against or can specifically bind to at least one of SARS-CoV-2 Spike protein or a SARS-CoV-2 Spike protein interacting partner, as well as compounds and constructs, (e.g., fusion proteins and polypeptides) that comprise at least one such amino acid sequence, and nucleic acid molecules encoding the nanobodies of the invention.

It should be noted that, in general, the term nanobody as used herein is not limited to a specific biological material or a specific method of preparation. For example, methods for preparing the nanobodies of the present invention include, but are not limited to, (1) isolation of a $V_{HH}$ domain of a natural heavy chain antibody, (2) expression of a nucleotide sequence encoding a natural $V_{HH}$ domain, (3) humanization of natural $V_{HH}$ domains or expression of nucleic acids encoding the humanized VHH domains, and (4) camelization of natural $V_H$ domains from any animal species, particularly mammals (eg, humans), or expression of a nucleic acid encoding a camelized $V_H$ domain, (5) and synthesis of nanobodies or nucleic acids encoding nanobodies using amino acid or nucleic acid synthesis techniques. Suitable methods and techniques for carrying out the above will be apparent to those skilled in the art based on the disclosure herein, including, for example, the methods and techniques detailed below.

In some embodiments, the nanobodies of the present invention comprise an amino acid sequence that matches the amino acid sequence of a natural $V_{HH}$ domain, but is "humanized" by substitution of one or more amino acid residues of the amino acid sequence of said native $V_{HH}$ sequence with one or more amino acid residues occurring at corresponding positions of a VH domain from a conventional human 4-chain antibody. The humanized nanobody of the present invention can be obtained by any suitable method known in the art.

In some embodiments, the nanobodies of the present invention are derived from a conventional 4-chain antibody by "camelization" (ie, substitution of one or more amino acid residues of a $V_H$ domain with one or more amino acid residues occurring at corresponding positions in the $V_{HH}$ domain of the heavy chain antibody). In some embodiments, the camelization occurs at the amino acid position present at the $V_H$-$V_L$ junction and so-called Camelidae characteristic residues (see eg WO 94/04678). The camelized nanobody of the present invention can be obtained by any appropriate method known in the art.

In one embodiment, the inhibitor comprises an Fc fusion molecule comprising an Fc domain of an immunoglobulin molecule fused to a heavy chain of an antibody or a nanobody of the invention.

In various embodiments, the invention provides nucleic acid molecules encoding the nanobodies, including humanized or camelized nanobodies, of the invention. is It can be carried out by expressing the nucleotide sequence thus obtained, In some embodiments, a nucleotide sequence encoding the humanized or camelized nanobody of interest of the present invention is designed, and the nucleic acid sequences thus obtained can be expressed in order to provide the nanobodies of interest of the present invention.

In one embodiment, the nanobodies of the invention binds to and, thereby partially or substantially alters at least one biological activity of the target (e.g., enzymatic activity, substrate binding activity, receptor binding activity, etc.).

In some embodiments, the invention includes compositions comprising an antibody or nanobody that specifically binds to SARS-CoV-2 S protein or a SARS-CoV-2 S protein interacting partner. In one embodiment, the SARS-CoV-2 S protein interacting partner is ACE2. In one embodiment, the SARS-CoV-2 S protein interacting partner is a C-type lectin. In one embodiment, the SARS-CoV-2 S protein interacting partner is DC-SIGN, L-SIGN, LSECtin, ASGR1, or CLEC10A. In one embodiment, the SARS-CoV-2 S protein interacting partner is TTYH2.

In some embodiments, a nanobody that binds to SARS-CoV-2 S protein or a SARS-CoV-2 S protein interacting partner of the invention inhibits, blocks, or interferes with at least one activity of the protein or peptide (e.g., enzymatic activity, substrate binding activity, receptor binding activity, etc.), in vitro, in situ and/or in vivo.

In one embodiment, the isolated antibody, or binding portion thereof, comprises a heavy chain comprising at least one, two or all three CDR sequences of SEQ ID NO: 1-3. In one embodiment, the isolated antibody, or binding portion thereof, comprises a heavy chain comprising at least one, two or all three CDR sequences of SEQ ID NO: 5-7. In one embodiment, the isolated antibody, or binding portion thereof, comprises a heavy chain comprising at least one, two or all three CDR sequences of SEQ ID NO: 9-11. In one embodiment, the isolated antibody, or binding portion thereof, comprises a heavy chain comprising at least one, two or all three CDR sequences of SEQ ID NO: 13-15. In one embodiment, the isolated antibody, or binding portion thereof, comprises a heavy chain comprising at least one, two or all three CDR sequences of SEQ ID NO: 17-19. In one embodiment, the isolated antibody, or binding portion thereof, comprises a heavy chain comprising at least one, two or all three CDR sequences of SEQ ID NO: 21-23. In one embodiment, the isolated antibody, or binding portion thereof, comprises a heavy chain comprising at least one, two or all three CDR sequences of SEQ ID NO: 25-27. In one embodiment, the isolated antibody, or binding portion thereof, comprises a heavy chain comprising at least one, two or all three CDR sequences of SEQ ID NO 29-31. In one embodiment, the isolated antibody, or binding portion thereof, comprises a heavy chain comprising at least one, two or all three CDR sequences of SEQ ID NO: 33-35. In one embodiment, the isolated antibody, or binding portion thereof, comprises a heavy chain comprising at least one, two or all three CDR sequences of SEQ ID NO: 37-39. In one embodiment, the isolated antibody, or binding portion thereof, comprises a heavy chain comprising at least one, two or all three CDR sequences of SEQ ID NO: 41-43. In one embodiment, the isolated antibody, or binding portion thereof, comprises a heavy chain comprising at least one, two or all three CDR sequences of SEQ ID NO: 45-47. In one embodiment, the isolated antibody, or binding portion thereof, comprises a heavy chain comprising at least one, two or all three CDR sequences of SEQ ID NO: 49-51.

In some embodiments, the invention comprises a nucleic acid molecule comprising a nucleotide sequence encoding a nanobody comprising at least one, two or all three CDR sequences of SEQ ID NO: 1-3. In some embodiments, the invention comprises a nucleic acid molecule comprising a nucleotide sequence encoding a nanobody comprising at least one, two or all three CDR sequences of SEQ ID NO: 5-7. In some embodiments, the invention comprises a nucleic acid molecule comprising a nucleotide sequence encoding a nanobody comprising at least one, two or all three CDR sequences of SEQ ID NO: 9-11. In some embodiments, the invention comprises a nucleic acid molecule comprising a nucleotide sequence encoding a nanobody comprising at least one, two or all three CDR sequences of SEQ ID NO: 13-15. In some embodiments, the invention comprises a nucleic acid molecule comprising a nucleotide sequence encoding a nanobody comprising at least one, two or all three CDR sequences of SEQ ID NO: 17-19. In some embodiments, the invention comprises a nucleic acid molecule comprising a nucleotide sequence encoding a nanobody comprising at least one, two or all three CDR sequences of SEQ ID NO: 21-23. In some embodiments, the invention comprises a nucleic acid molecule comprising a nucleotide sequence encoding a nanobody comprising at least one, two or all three CDR sequences of SEQ ID NO:

25-27. In some embodiments, the invention comprises a nucleic acid molecule comprising a nucleotide sequence encoding a nanobody comprising at least one, two or all three CDR sequences of SEQ ID NO 29-31. In some embodiments, the invention comprises a nucleic acid molecule comprising a nucleotide sequence encoding a nanobody comprising at least one, two or all three CDR sequences of SEQ ID NO: 33-35. In some embodiments, the invention comprises a nucleic acid molecule comprising a nucleotide sequence encoding a nanobody comprising at least one, two or all three CDR sequences of SEQ ID NO: 37-39. In some embodiments, the invention comprises a nucleic acid molecule comprising a nucleotide sequence encoding a nanobody comprising at least one, two or all three CDR sequences of SEQ ID NO: 41-43. In some embodiments, the invention comprises a nucleic acid molecule comprising a nucleotide sequence encoding a nanobody comprising at least one, two or all three CDR sequences of SEQ ID NO: 45-47. In some embodiments, the invention comprises a nucleic acid molecule comprising a nucleotide sequence encoding a nanobody comprising at least one, two or all three CDR sequences of SEQ ID NO: 49-51.

The antibody CDR sequences described herein establish a novel family of SARS-CoV-2 S protein or SARS-CoV-2 S protein interacting partner binding proteins, comprising polypeptides that include the CDR sequences listed. To generate and to select CDRs of the invention having binding and/or detection and/or inhibitory activity, standard methods known in the art for generating binding proteins of the present invention and assessing the binding and/or detection and/or inhibitory characteristics of those binding protein may be used, including but not limited to those specifically described herein.

In some embodiments, the invention comprises a nanobody comprising an amino acid sequence selected from the group consisting of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, and SEQ ID NO:52. In some embodiments, the invention comprises a nucleic acid molecule comprising a nucleotide sequence encoding a nanobody comprising an amino acid sequence selected from the group consisting of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, and SEQ ID NO:52.

In some embodiments, the invention includes compositions comprising a bispecific antibody or nanobody that specifically binds to one or more SARS-CoV-2 S protein or a SARS-CoV-2 S protein interacting partner. In one embodiment, the bispecific antibody or nanobody binds to two different epitopes of a SARS-CoV-2 S protein interacting partner. In one embodiment, the bispecific antibody or nanobody binds to an epitope of two different SARS-CoV-2 S protein interacting partners.

In one embodiment, the bispecific antibody, or nanobody, comprises a heavy chain comprising at least one, two or all three CDR sequences of SEQ ID NO: 1-3. In one embodiment, the bispecific antibody, or nanobody, comprises a heavy chain comprising at least one, two or all three CDR sequences of SEQ ID NO: 5-7. In one embodiment, the bispecific antibody, or nanobody, comprises a heavy chain comprising at least one, two or all three CDR sequences of SEQ ID NO: 9-11. In one embodiment, the bispecific antibody, or nanobody, comprises a heavy chain comprising at least one, two or all three CDR sequences of SEQ ID NO: 13-15. In one embodiment, the bispecific antibody, or nanobody, comprises a heavy chain comprising at least one, two or all three CDR sequences of SEQ ID NO: 17-19. In one embodiment, the bispecific antibody, or nanobody, comprises a heavy chain comprising at least one, two or all three CDR sequences of SEQ ID NO: 21-23. In one embodiment, the bispecific antibody, or nanobody, comprises a heavy chain comprising at least one, two or all three CDR sequences of SEQ ID NO: 25-27. In one embodiment, the bispecific antibody, or nanobody, comprises a heavy chain comprising at least one, two or all three CDR sequences of SEQ ID NO 29-31. In one embodiment, the bispecific antibody, or nanobody, comprises a heavy chain comprising at least one, two or all three CDR sequences of SEQ ID NO: 33-35. In one embodiment, the bispecific antibody, or nanobody, comprises a heavy chain comprising at least one, two or all three CDR sequences of SEQ ID NO: 37-39. In one embodiment, the bispecific antibody, or nanobody, comprises a heavy chain comprising at least one, two or all three CDR sequences of SEQ ID NO: 41-43. In one embodiment, the bispecific antibody, or nanobody, comprises a heavy chain comprising at least one, two or all three CDR sequences of SEQ ID NO: 45-47. In one embodiment, the bispecific antibody, or nanobody, comprises a heavy chain comprising at least one, two or all three CDR sequences of SEQ ID NO: 49-51. In one embodiment, the bispecific antibody, or nanobody, comprises a heavy chain comprising at least one, two or all three CDR sequences of SEQ ID NO: 53-55. In one embodiment, the bispecific antibody, or nanobody, comprises a heavy chain comprising at least one, two or all three CDR sequences of SEQ ID NO: 57-59. In one embodiment, the bispecific antibody, or nanobody, comprises a heavy chain comprising at least one, two or all three CDR sequences of SEQ ID NO: 61-63. In one embodiment, the bispecific antibody, or nanobody, comprises a heavy chain comprising at least one, two or all three CDR sequences of SEQ ID NO: 65-67. In one embodiment, the bispecific antibody, or nanobody, comprises a heavy chain comprising at least one, two or all three CDR sequences of SEQ ID NO: 69-71. In one embodiment, the bispecific antibody, or nanobody, comprises a heavy chain comprising at least one, two or all three CDR sequences of SEQ ID NO: 73-75. In one embodiment, the bispecific antibody, or nanobody, comprises a heavy chain comprising at least one, two or all three CDR sequences of SEQ ID NO: 77-79. In one embodiment, the bispecific antibody, or nanobody, comprises a heavy chain comprising at least one, two or all three CDR sequences of SEQ ID NO: 81-83. In one embodiment, the bispecific antibody, or nanobody, comprises a heavy chain comprising at least one, two or all three CDR sequences of SEQ ID NO: 85-87. In one embodiment, the bispecific antibody, or nanobody, comprises a heavy chain comprising at least one, two or all three CDR sequences of SEQ ID NO: 89-91. In one embodiment, the bispecific antibody, or nanobody, comprises a heavy chain comprising at least one, two or all three CDR sequences of SEQ ID NO: 93-95. In one embodiment, the bispecific antibody, or nanobody, comprises a heavy chain comprising at least one, two or all three CDR sequences of SEQ ID NO: 97-99. In one embodiment, the bispecific antibody, or nanobody, comprises a heavy chain comprising at least one, two or all three CDR sequences of SEQ ID NO: 101-103. In one embodiment, the bispecific antibody, or nanobody, comprises a heavy chain comprising at least one, two or all three CDR sequences of SEQ ID NO: 105-107. In one embodiment, the bispecific antibody, or nanobody, comprises a heavy chain comprising at least one, two or all three CDR sequences of SEQ ID NO: 109-111. In one embodiment, the bispecific antibody, or nanobody, comprises a heavy chain comprising at least one, two or all three CDR sequences of SEQ ID NO: 113-115.

In some embodiments, the invention comprises a nucleic acid molecule comprising a nucleotide sequence encoding a bispecific antibody, or nanobody, comprising at least one, two or all three CDR sequences of SEQ ID NO: 1-3. In some embodiments, the invention comprises a nucleic acid molecule comprising a nucleotide sequence encoding a bispecific antibody, or nanobody, comprising at least one, two or all three CDR sequences of SEQ ID NO: 5-7. In some embodiments, the invention comprises a nucleic acid molecule comprising a nucleotide sequence encoding a bispecific antibody, or nanobody, comprising at least one, two or all three CDR sequences of SEQ ID NO: 9-11. In some embodiments, the invention comprises a nucleic acid molecule comprising a nucleotide sequence encoding a bispecific antibody, or nanobody, comprising at least one, two or all three CDR sequences of SEQ ID NO: 13-15. In some embodiments, the invention comprises a nucleic acid molecule comprising a nucleotide sequence encoding a bispecific antibody, or nanobody, comprising at least one, two or all three CDR sequences of SEQ ID NO: 17-19. In some embodiments, the invention comprises a nucleic acid molecule comprising a nucleotide sequence encoding a bispecific antibody, or nanobody, comprising at least one, two or all three CDR sequences of SEQ ID NO: 21-23. In some embodiments, the invention comprises a nucleic acid molecule comprising a nucleotide sequence encoding a bispecific antibody, or nanobody, comprising at least one, two or all three CDR sequences of SEQ ID NO: 25-27. In some embodiments, the invention comprises a nucleic acid molecule comprising a nucleotide sequence encoding a bispecific antibody, or nanobody, comprising at least one, two or all three CDR sequences of SEQ ID NO 29-31. In some embodiments, the invention comprises a nucleic acid molecule comprising a nucleotide sequence encoding a bispecific antibody, or nanobody, comprising at least one, two or all three CDR sequences of SEQ ID NO: 33-35. In some embodiments, the invention comprises a nucleic acid molecule comprising a nucleotide sequence encoding a bispecific antibody, or nanobody, comprising at least one, two or all three CDR sequences of SEQ ID NO: 37-39. In some embodiments, the invention comprises a nucleic acid molecule comprising a nucleotide sequence encoding a bispecific antibody, or nanobody, comprising at least one, two or all three CDR sequences of SEQ ID NO: 41-43. In some embodiments, the invention comprises a nucleic acid molecule comprising a nucleotide sequence encoding a bispecific antibody, or nanobody, comprising at least one, two or all three CDR sequences of SEQ ID NO: 45-47. In some embodiments, the invention comprises a nucleic acid molecule comprising a nucleotide sequence encoding a bispecific antibody, or nanobody, comprising at least one, two or all three CDR sequences of SEQ ID NO: 49-51. In one embodiment, the invention comprises a nucleic acid molecule comprising a nucleotide sequence encoding a bispecific antibody, or nanobody, comprising at least one, two or all three CDR sequences of SEQ ID NO: 53-55. In one embodiment, the invention comprises a nucleic acid molecule comprising a nucleotide sequence encoding a bispecific antibody, or nanobody, comprising at least one, two or all three CDR sequences of SEQ ID NO: 57-59. In one embodiment, the invention comprises a nucleic acid molecule comprising a nucleotide sequence encoding a bispecific antibody, or nanobody, comprising at least one, two or all three CDR sequences of SEQ ID NO: 61-63. In one embodiment, the invention comprises a nucleic acid molecule comprising a nucleotide sequence encoding a bispecific antibody, or nanobody, comprising at least one, two or all three CDR sequences of SEQ ID NO: 65-67. In one embodiment, the invention comprises a nucleic acid molecule comprising a nucleotide sequence encoding a bispecific antibody, or nanobody, comprising at least one, two or all three CDR sequences of SEQ ID NO: 69-71. In one embodiment, the invention comprises a nucleic acid molecule comprising a nucleotide sequence encoding a bispecific antibody, or nanobody, comprising at least one, two or all three CDR sequences of SEQ ID NO: 73-75. In one embodiment, the invention comprises a nucleic acid molecule comprising a nucleotide sequence encoding a bispecific antibody, or nanobody, comprising at least one, two or all three CDR sequences of SEQ ID NO: 77-79. In one embodiment, the invention comprises a nucleic acid molecule comprising a nucleotide sequence encoding a bispecific antibody, or nanobody, comprising at least one, two or all three CDR sequences of SEQ ID NO: 81-83. In one embodiment, the invention comprises a nucleic acid molecule comprising a nucleotide sequence encoding a bispecific antibody, or nanobody, comprising at least one, two or all three CDR sequences of SEQ ID NO: 85-87. In one embodiment, the invention comprises a nucleic acid molecule comprising a nucleotide sequence encoding a bispecific antibody, or nanobody, comprising at least one, two or all three CDR sequences of SEQ ID NO: 89-91. In one embodiment, the invention comprises a nucleic acid molecule comprising a nucleotide sequence encoding a bispecific antibody, or nanobody, comprising at least one, two or all three CDR sequences of SEQ ID NO: 93-95. In one embodiment, the invention comprises a nucleic acid molecule comprising a nucleotide sequence encoding a bispecific antibody, or nanobody, comprising at least one, two or all three CDR sequences of SEQ ID NO: 97-99. In one embodiment, the invention comprises a nucleic acid molecule comprising a nucleotide sequence encoding a bispecific antibody, or nanobody, comprising at least one, two or all three CDR sequences of SEQ ID NO: 101-103. In one embodiment, the invention comprises a nucleic acid molecule comprising a nucleotide sequence encoding a bispecific antibody, or nanobody, comprising at least one, two or all three CDR sequences of SEQ ID NO: 105-107. In one embodiment, the invention comprises a nucleic acid molecule comprising a nucleotide sequence encoding a bispecific antibody, or nanobody, comprising at least one, two or all three CDR sequences of SEQ ID NO: 109-111. In one embodiment, the invention comprises a nucleic acid molecule comprising a nucleotide sequence encoding a bispecific antibody, or nanobody, comprising at least one, two or all three CDR sequences of SEQ ID NO: 113-115.

In some embodiments, the invention comprises a bispecific antibody, or nanobody, comprising an amino acid sequence of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO:116. In some embodiments, the invention comprises a nucleic acid molecule comprising a nucleotide sequence encoding a bispecific antibody, or nanobody, comprising an amino acid sequence of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO: 100, SEQ ID NO:104, SEQ ID NO:108, SEQ ID NO:112, or SEQ ID NO: 116.

In one embodiment, the bispecific antibody, or nanobody, of the invention comprises at least two amino acid sequences of SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO: 100, SEQ ID NO:104, SEQ ID NO:108, SEQ ID NO:112, or SEQ ID NO: 116.

In one embodiment, the bispecific antibody, or nanobody, of the invention comprises at least one two or all three CDR sequences of SEQ ID NO:57-59 and at least one two or all three CDR sequences of SEQ ID NO:93-95. In one embodiment, the bispecific antibody, or nanobody, of the invention comprises an amino acid sequence as set forth in SEQ ID NO:60 and an amino acid sequence as set forth in SEQ ID NO:96. In one embodiment, the bispecific antibody, or nanobody, of the invention comprises a sequence as set forth in SEQ ID NO:119.

In one embodiment, the nucleotide sequence encoding the bispecific antibody, or nanobody, of the invention encodes at least one two or all three CDR sequences of SEQ ID NO:57-59 and at least one two or all three CDR sequences of SEQ ID NO:93-95. In one embodiment, the nucleotide sequence encoding the bispecific antibody, or nanobody, of the invention encodes an amino acid sequence as set forth in SEQ ID NO:60 and an amino acid sequence as set forth in SEQ ID NO:96. In one embodiment, the nucleotide sequence encoding the bispecific antibody, or nanobody, of the invention encodes a sequence as set forth in SEQ ID NO:119.

In one embodiment, the invention relates to an Fc fusion molecule comprising an Fc domain of an immunoglobulin molecule fused to a heavy chain of an antibody or nanobody of the invention. In one embodiment, the Fc fusion molecule of the invention comprises an amino acid sequence as set forth in SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO:116 fused to an Fc domain of an immunoglobulin. Exemplary Fc fusion molecules include, but are not limited to, A8-Fc, comprising an amino acid sequence as set forth in SEQ ID NO:117, and G11-Fc, comprising an amino acid sequence as set forth in SEQ ID NO:118.

In one embodiment, the invention relates to a nucleic acid molecule encoding an Fc fusion molecule comprising an Fc domain of an immunoglobulin molecule fused to a heavy chain of an antibody or nanobody of the invention. In one embodiment, the nucleic acid molecule encodes an amino acid sequence as set forth in SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO:116 fused to an Fc domain of an immunoglobulin. In one embodiment, the nucleic acid molecule encodes SEQ ID NO:117 or SEQ ID NO:118.

Multiparatopic Antibodies

In some embodiments, the present invention provides amino acid sequences and antibody compositions that are capable of binding to two or more different antigenic determinants, or epitopes. In this context, the amino acid sequences and polypeptides of the invention are also referred to as "multiparatopic" (such as e.g. "biparatopic" or "triparatopic", etc.) amino acid sequences and polypeptides. The multiparatopic amino acid sequences and polypeptides of the invention can be directed against any antigenic determinants, or epitopes. For example, and generally, a biparatopic polypeptide of the invention may comprise at least one amino acid sequence or nanobody directed against a first antigenic determinant or epitope, and at least one amino acid sequence or nanobody directed against a second antigenic determinant or epitope different from the first antigenic determinant or epitope. In some embodiments, the amino acid sequences and/or nanobodies are linked, for example via a suitable linker.

A triparatopic polypeptide of the invention may comprise at least one further amino acid sequence or nanobody of the invention directed against a third antigenic determinant or epitope, different from both the first and second antigenic determinant, epitope, part or domain.

In some embodiments, multiparatopic polypeptides of the invention may contain at least two amino acid sequences or nanobodies of the invention directed against at least two different antigenic determinants or epitopes of SARS-CoV-2 S protein or the same SARS-CoV-2 S protein interacting partner. In some embodiments, multiparatopic polypeptides of the invention may contain at least two amino acid sequences or nanobodies of the invention directed against at least two different antigenic determinants or epitopes of at least two different SARS-CoV-2 S protein interacting partners.

Multi-Valent Antibody Cocktails

The present invention also provides multi-valent compositions comprising a combination of at least one inhibitor of the invention and one or more additional inhibitor of the interaction between SARS-CoV-2 S protein and a SARS-CoV-2 S protein interacting partner.

In some embodiments, the multi-valent composition of the invention comprises at least 1, 2, 3, 4, 5, 6, 7, 8, 9, 10 or more than 10 inhibitors of the invention. In some embodiments, the invention provides multi-valent compositions comprising at least 1, 2, 3, 4, 5, 6, 7, 8, 9, 10 or more than 10 antibodies or antibody fragments comprising amino acid sequences selected from SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, or variants thereof comprising at least one CDR sequence thereof.

In some embodiments, the multi-valent composition of the invention comprises at least 1, 2, 3, 4, 5, 6, 7, 8, 9, 10 or more than 10 inhibitors of the invention in combination with at least 1, 2, 3, 4, 5, 6, 7, 8, 9, 10 or more than 10 additional inhibitors of the interaction between SARS-CoV-2 S protein and a SARS-CoV-2 S protein interacting partner. Exemplary additional inhibitors of the interaction between SARS-CoV-2 S protein and a SARS-CoV-2 S protein interacting partner include, but are not limited to, antibodies and antibody fragments comprising a variable heavy chain amino acid sequence as set forth in SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO:116 or variants thereof.

In some embodiments, the multi-valent composition of the invention comprises at least 2, 3, 4, 5, 6, 7, 8, 9, 10 or variable heavy chain amino acid sequences as set forth in SEQ ID NO:4, SEQ ID NO:8, SEQ ID NO:12, SEQ ID NO:16, SEQ ID NO:20, SEQ ID NO:24, SEQ ID NO:28, SEQ ID NO:32, SEQ ID NO:36, SEQ ID NO:40, SEQ ID NO:44, SEQ ID NO:48, SEQ ID NO:52, SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO:112, or SEQ ID NO:116.

In some embodiments, the multi-valent composition of the invention comprises SEQ ID NO:60 and SEQ ID NO:96. In some embodiments, the multi-valent composition of the invention comprises SEQ ID NO:119.

Small Molecule Inhibitors

In some embodiments, the inhibitor is a small molecule. When the inhibitor is a small molecule, a small molecule may be obtained using standard methods known to the skilled artisan. Such methods include chemical organic synthesis or biological means. Biological means include purification from a biological source, recombinant synthesis and in vitro translation systems, using methods well known in the art. In one embodiment, a small molecule inhibitor of the invention comprises an organic molecule, inorganic molecule, biomolecule, synthetic molecule, and the like.

Combinatorial libraries of molecularly diverse chemical compounds potentially useful in treating a variety of diseases and conditions are well known in the art, as are method of making the libraries. The method may use a variety of techniques well-known to the skilled artisan including solid phase synthesis, solution methods, parallel synthesis of single compounds, synthesis of chemical mixtures, rigid core structures, flexible linear sequences, deconvolution strategies, tagging techniques, and generating unbiased molecular landscapes for lead discovery vs. biased structures for lead development.

In a general method for small library synthesis, an activated core molecule is condensed with a number of building blocks, resulting in a combinatorial library of covalently linked, core-building block ensembles. The shape and rigidity of the core determines the orientation of the building blocks in shape space. The libraries can be biased by changing the core, linkage, or building blocks to target a characterized biological structure ("focused libraries") or synthesized with less structural bias using flexible cores.

The small molecule and small molecule compounds described herein may be present as salts even if salts are not depicted and it is understood that the invention embraces all salts and solvates of the inhibitors depicted here, as well as the non-salt and non-solvate form of the inhibitors, as is well understood by the skilled artisan. In some embodiments, the salts of the inhibitors of the invention are pharmaceutically acceptable salts.

Where tautomeric forms may be present for any of the inhibitors described herein, each and every tautomeric form is intended to be included in the present invention, even though only one or some of the tautomeric forms may be explicitly depicted. For example, when a 2-hydroxypyridyl moiety is depicted, the corresponding 2-pyridone tautomer is also intended.

The invention also includes any or all of the stereochemical forms, including any enantiomeric or diasteriomeric forms of the inhibitors described. The recitation of the structure or name herein is intended to embrace all possible stereoisomers of inhibitors depicted. All forms of the inhibitors are also embraced by the invention, such as crystalline or non-crystalline forms of the inhibitors. Compositions comprising an inhibitor of the invention are also intended, such as a composition of substantially pure inhibitor, including a specific stereochemical form thereof, or a composition comprising mixtures of inhibitors of the invention in any ratio, including two or more stereochemical forms, such as in a racemic or non-racemic mixture.

In one embodiment, the small molecule inhibitor of the invention comprises an analog or derivative of an inhibitor described herein.

In one embodiment, the small molecules described herein are candidates for derivatization. As such, in certain instances, the analogs of the small molecules described herein that have modulated potency, selectivity, and solubility are included herein and provide useful leads for drug discovery and drug development. Thus, in certain instances, during optimization new analogs are designed considering issues of drug delivery, metabolism, novelty, and safety.

In some instances, small molecule inhibitors described herein are derivatized/analoged as is well known in the art of combinatorial and medicinal chemistry. The analogs or derivatives can be prepared by adding and/or substituting functional groups at various locations. As such, the small molecules described herein can be converted into derivatives/analogs using well known chemical synthesis procedures. For example, all of the hydrogen atoms or substituents can be selectively modified to generate new analogs. Also, the linking atoms or groups can be modified into longer or shorter linkers with carbon backbones or hetero atoms. Also, the ring groups can be changed so as to have a different number of atoms in the ring and/or to include hetero atoms. Moreover, aromatics can be converted to cyclic rings, and vice versa. For example, the rings may be from 5-7 atoms, and may be homocycles or heterocycles.

As used herein, the term "analog," "analogue," or "derivative" is meant to refer to a chemical compound or molecule made from a parent compound or molecule by one or more chemical reactions. As such, an analog can be a structure having a structure similar to that of the small molecule inhibitors described herein or can be based on a scaffold of a small molecule inhibitor described herein, but differing from it in respect to certain components or structural makeup, which may have a similar or opposite action metabolically. An analog or derivative of any of a small molecule inhibitor in accordance with the present invention can be used to treat an autoimmune disease or disorder.

In one embodiment, the small molecule inhibitors described herein can independently be derivatized/analoged by modifying hydrogen groups independently from each other into other substituents. That is, each atom on each molecule can be independently modified with respect to the other atoms on the same molecule. Any traditional modification for producing a derivative/analog can be used. For example, the atoms and substituents can be independently comprised of hydrogen, an alkyl, aliphatic, straight chain aliphatic, aliphatic having a chain hetero atom, branched aliphatic, substituted aliphatic, cyclic aliphatic, heterocyclic aliphatic having one or more hetero atoms, aromatic, heteroaromatic, polyaromatic, polyamino acids, peptides, polypeptides, combinations thereof, halogens, halo-substituted aliphatics, and the like. Additionally, any ring group on a compound can be derivatized to increase and/or decrease ring size as well as change the backbone atoms to carbon atoms or hetero atoms.

Nucleic Acid Inhibitors

In some embodiments, the inhibitor is nucleic acid. In various embodiments, the inhibitor is an siRNA, miRNA, shRNA, or an antisense molecule, which inhibits S protein or an S protein interacting partner of the invention.

In one embodiment, the nucleic acid comprises a promoter/regulatory sequence such that the nucleic acid is capable of directing expression of the inhibitor nucleic acid. Thus, the invention encompasses expression vectors and methods for the introduction of exogenous DNA into cells with concomitant expression of the exogenous DNA in the cells such as those described, for example, in Sambrook et al. (2012, Molecular Cloning: A Laboratory Manual, Cold Spring Harbor Laboratory, New York), and in Ausubel et al. (1997, Current Protocols in Molecular Biology, John Wiley & Sons, New York) and as described elsewhere herein.

In another aspect of the invention, S protein or a S protein interacting partner of the invention can be inhibited by way of inactivating and/or sequestering S protein or the S protein interacting partner of the invention. As such, inhibiting the activity of S protein or one or more S protein interacting partner of the invention can be accomplished by using a transdominant negative mutant or a nucleic acid molecule encoding a transdominant negative mutant.

In one embodiment, siRNA is used to decrease the level of S protein or a S protein interacting partner of the invention. RNA interference (RNAi) is a phenomenon in which the introduction of double-stranded RNA (dsRNA) into a diverse range of organisms and cell types causes degradation of the complementary mRNA. In the cell, long dsRNAs are cleaved into short 21-25 nucleotide small interfering RNAs, or siRNAs, by a ribonuclease known as Dicer. The siRNAs subsequently assemble with protein components into an RNA-induced silencing complex (RISC), unwinding in the process. Activated RISC then binds to complementary transcript by base pairing interactions between the siRNA antisense strand and the mRNA. The bound mRNA is cleaved and sequence specific degradation of mRNA results in gene silencing. See, for example, U.S. Pat. No. 6,506,559; Fire et al., 1998, Nature 391(19): 306-311; Timmons et al., 1998, Nature 395:854; Montgomery et al., 1998, TIG 14 (7):255-258; David R. Engelke, Ed., RNA Interference (RNAi) Nuts & Bolts of RNAi Technology, DNA Press, Eagleville, P A (2003); and Gregory J. Hannon, Ed., RNAi A Guide to Gene Silencing, Cold Spring Harbor Laboratory Press, Cold Spring Harbor, NY (2003). Soutschek et al. (2004, Nature 432:173-178) describe a chemical modification to siRNAs that aids in intravenous systemic delivery. Optimizing siRNAs involves consideration of overall G/C content, C/T content at the termini, Tm and the nucleotide content of the 3' overhang. See, for instance, Schwartz et al., 2003, Cell, 115:199-208 and Khvorova et al., 2003, Cell 115:209-216. Therefore, the present invention also includes methods of decreasing levels of S protein or a S protein interacting partner of the invention using RNAi technology.

In another aspect, the invention includes a vector comprising an siRNA or antisense nucleic acid. In one embodiment, the siRNA or antisense polynucleotide is capable of inhibiting the expression of a target polypeptide, wherein the target polypeptide is S protein or a S protein interacting partner of the invention. The incorporation of a desired polynucleotide into a vector and the choice of vectors is well-known in the art as described in, for example, Sambrook et al. (2012), and in Ausubel et al. (1997), and elsewhere herein.

In some embodiments, the expression vectors described herein encode a short hairpin RNA (shRNA) inhibitor. shRNA inhibitors are well known in the art and are directed against the mRNA of a target, thereby decreasing the expression of the target. In some embodiments, the encoded shRNA is expressed by a cell, and is then processed into siRNA. For example, in certain instances, the cell possesses native enzymes (e.g., dicer) that cleaves the shRNA to form siRNA.

The siRNA, shRNA, or antisense nucleic acid can be cloned into a number of types of vectors as described elsewhere herein. For expression of the siRNA or antisense polynucleotide, at least one module in each promoter functions to position the start site for RNA synthesis.

In order to assess the expression of the siRNA, shRNA, or antisense nucleic, the expression vector to be introduced into a cell can also contain either a selectable marker gene or a reporter gene or both to facilitate identification and selection of expressing cells from the population of cells sought to be transfected or infected using a viral vector. In other embodiments, the selectable marker may be carried on a separate piece of DNA and used in a co-transfection procedure. Both selectable markers and reporter genes may be flanked with appropriate regulatory sequences to enable expression in the host cells. Useful selectable markers are known in the art and include, for example, antibiotic-resistance genes, such as neomycin resistance and the like.

Therefore, in another aspect, the invention relates to a vector, comprising the nucleotide sequence of the invention or the construct of the invention. The choice of the vector will depend on the host cell in which it is to be subsequently introduced. In a particular embodiment, the vector of the invention is an expression vector. Suitable host cells include a wide variety of prokaryotic and eukaryotic host cells. In specific embodiments, the expression vector is selected from the group consisting of a viral vector, a bacterial vector and a mammalian cell vector. Prokaryote- and/or eukaryote-vector based systems can be employed for use with the present invention to produce polynucleotides, or their cognate polypeptides. Many such systems are commercially and widely available.

Further, the expression vector may be provided to a cell in the form of a viral vector. Viral vector technology is well known in the art and is described, for example, in Sambrook et al. (2012), and in Ausubel et al. (1997), and in other virology and molecular biology manuals. Viruses, which are useful as vectors include, but are not limited to, retroviruses, adenoviruses, adeno-associated viruses, herpes viruses, and lentiviruses. In general, a suitable vector contains an origin of replication functional in at least one organism, a promoter sequence, convenient restriction endonuclease sites, and one or more selectable markers. (See, e.g., WO 01/96584; WO 01/29058; and U.S. Pat. No. 6,326,193.

By way of illustration, the vector in which the nucleic acid sequence is introduced can be a plasmid, which is or is not integrated in the genome of a host cell when it is introduced in the cell. Illustrative, non-limiting examples of vectors in which the nucleotide sequence of the invention or the gene construct of the invention can be inserted include a tet-on inducible vector for expression in eukaryote cells.

The vector may be obtained by conventional methods known by persons skilled in the art (Sambrook et al., 2012). In a particular embodiment, the vector is a vector useful for transforming animal cells.

In one embodiment, the recombinant expression vectors may also contain nucleic acid molecules, which encode a peptide or peptidomimetic inhibitor of invention, described elsewhere herein.

A promoter may be one naturally associated with a gene or polynucleotide sequence, as may be obtained by isolating the 5' non-coding sequences located upstream of the coding segment and/or exon. Such a promoter can be referred to as "endogenous." Similarly, an enhancer may be one naturally associated with a polynucleotide sequence, located either downstream or upstream of that sequence. Alternatively, certain advantages will be gained by positioning the coding polynucleotide segment under the control of a recombinant or heterologous promoter, which refers to a promoter that is not normally associated with a polynucleotide sequence in its natural environment. A recombinant or heterologous enhancer refers also to an enhancer not normally associated with a polynucleotide sequence in its natural environment. Such promoters or enhancers may include promoters or enhancers of other genes, and promoters or enhancers isolated from any other prokaryotic, viral, or eukaryotic cell, and promoters or enhancers not "naturally occurring," i.e., containing different elements of different transcriptional regulatory regions, and/or mutations that alter expression. In addition to producing nucleic acid sequences of promoters and enhancers synthetically, sequences may be produced using recombinant cloning and/or nucleic acid amplification technology, including PCR, in connection with the compositions disclosed herein (U.S. Pat. Nos. 4,683,202, 5,928, 906). Furthermore, it is contemplated the control sequences that direct transcription and/or expression of sequences within non-nuclear organelles such as mitochondria, chloroplasts, and the like, can be employed as well.

In some embodiments, a promoter and/or enhancer is used that effectively directs the expression of the DNA segment in the cell type, organelle, and organism chosen for expression. Those of skill in the art of molecular biology generally know how to use promoters, enhancers, and cell type combinations for protein expression, for example, see Sambrook et al. (2012). The promoters employed may be constitutive, tissue-specific, inducible, and/or useful under the appropriate conditions to direct high level expression of the introduced DNA segment, such as is advantageous in the large-scale production of recombinant proteins and/or peptides. The promoter may be heterologous or endogenous.

The recombinant expression vectors may also contain a selectable marker gene, which facilitates the selection of transformed or transfected host cells. Suitable selectable marker genes are genes encoding proteins such as G418 and hygromycin, which confer resistance to certain drugs, β-galactosidase, chloramphenicol acetyltransferase, firefly luciferase, or an immunoglobulin or portion thereof such as the Fc portion of an immunoglobulin, such as IgG. The selectable markers may be introduced on a separate vector from the nucleic acid of interest.

Following the generation of the siRNA polynucleotide, a skilled artisan will understand that the siRNA polynucleotide will have certain characteristics that can be modified to improve the siRNA as a therapeutic compound. Therefore, the siRNA polynucleotide may be further designed to resist degradation by modifying it to include phosphorothioate, or other linkages, methylphosphonate, sulfone, sulfate, ketyl, phosphorodithioate, phosphoramidate, phosphate esters, and the like (see, e.g., Agrwal et al., 1987, Tetrahedron Lett. 28:3539-3542; Stec et al., 1985 Tetrahedron Lett. 26:2191-2194; Moody et al., 1989 Nucleic Acids Res. 12:4769-4782; Eckstein, 1989 Trends Biol. Sci. 14:97-100; Stein, In: Oligodeoxynucleotides. Antisense Inhibitors of Gene Expression, Cohen, ed., Macmillan Press, London, pp. 97-117 (1989)).

Any polynucleotide may be further modified to increase its stability in vivo. Possible modifications include, but are not limited to, the addition of flanking sequences at the 5' and/or 3' ends; the use of phosphorothioate or 2' O-methyl rather than phosphodiester linkages in the backbone; and/or the inclusion of nontraditional bases such as inosine, queosine, and wybutosine and the like, as well as acetyl- methyl-, thio- and other modified forms of adenine, cytidine, guanine, thymine, and uridine.

In one embodiment of the invention, an antisense nucleic acid sequence, which is expressed by a plasmid vector is used to inhibit expression of S protein or a S protein interacting partner of the invention. The antisense expressing vector is used to transfect a cell or the subject itself, thereby causing reduced endogenous expression of S protein or a S protein interacting partner of the invention.

Antisense molecules and their use for inhibiting gene expression are well known in the art (see, e.g., Cohen, 1989, In: Oligodeoxyribonucleotides, Antisense Inhibitors of Gene Expression, CRC Press). Antisense nucleic acids are DNA or RNA molecules that are complementary, as that term is defined elsewhere herein, to at least a portion of a specific mRNA molecule (Weintraub, 1990, Scientific American 262:40). In the cell, antisense nucleic acids hybridize to the corresponding mRNA, forming a double-stranded molecule thereby inhibiting the translation of genes.

The use of antisense methods to inhibit the translation of genes is known in the art, and is described, for example, in Marcus-Sakura (1988, Anal. Biochem. 172:289). Such antisense molecules may be provided to the cell via genetic expression using DNA encoding the antisense molecule as taught by Inoue, 1993, U.S. Pat. No. 5,190,931.

Alternatively, antisense molecules of the invention may be made synthetically and then provided to the cell. Antisense oligomers of between may be about 10 to about 30, nucleotides. In some embodiments, antisense oligomers are about 15 nucleotides. Antisense oligomers about 10 to about 30 nucleotides are easily synthesized and introduced into a target cell. Synthetic antisense molecules contemplated by the invention include oligonucleotide derivatives known in the art which have improved biological activity compared to unmodified oligonucleotides (see U.S. Pat. No. 5,023,243).

In one embodiment of the invention, a ribozyme is used to inhibit protein expression of S protein or a S protein interacting partner of the invention. Ribozymes useful for inhibiting the expression of a target molecule may be designed by incorporating target sequences into the basic ribozyme structure, which are complementary, for example, to the mRNA sequence encoding S protein or a S protein interacting partner of the invention. Ribozymes targeting S protein or a S protein interacting partner of the invention, may be synthesized using commercially available reagents (Applied Biosystems, Inc., Foster City, CA) or they may be genetically expressed from DNA encoding them.

In one embodiment, the inhibitor of S protein or a S protein interacting partner of the invention may comprise one or more components of a CRISPR-Cas system. CRISPR methodologies employ a nuclease, CRISPR-associated (Cas), that complexes with small RNAs as guides (gRNAs) to cleave DNA in a sequence-specific manner upstream of the protospacer adjacent motif (PAM) in any genomic location. CRISPR may use separate guide RNAs known as the crRNA and tracrRNA. These two separate RNAs have been combined into a single RNA to enable site-specific mammalian genome cutting through the design of a short guide RNA. Cas and guide RNA (gRNA) may be synthesized by known methods. Cas/guide-RNA (gRNA) uses a non-specific DNA cleavage protein Cas, and an RNA oligo to hybridize to target and recruit the Cas/gRNA complex. In one embodiment, a guide RNA (gRNA) targeted to a gene encoding S protein or a S protein interacting partner of the invention, and a CRISPR-associated (Cas) peptide form a complex to induce mutations within the targeted gene. In one embodiment, the inhibitor comprises a gRNA or a nucleic acid molecule encoding a gRNA. In one embodiment, the inhibitor comprises a Cas peptide or a nucleic acid molecule encoding a Cas peptide.

The guide RNA sequence can be a sense or anti-sense sequence. In the CRISPR-Cas system derived from *S. pyogenes* (spCas9), the target DNA typically immediately precedes a 5'-NGG or NAG proto-spacer adjacent motif (PAM). Other Cas9 orthologs may have different PAM specificities. For example, Cas9 from *S. thermophilus* (stCas9) requires 5'-NNAGAA for CRISPR 1 and 5'-NGGNG for CRISPR3 and Neiseria menigiditis (nmCas9) requires 5'-NNNNGATT. Cas9 from *Staphylococcus aureus* subsp. *aureus* (saCas9) requires 5'-NNGRRT (R=A or G). The specific sequence of the guide RNA may vary, but, regardless of the sequence, useful guide RNA sequences will be those that minimize off-target effects while achieving high efficiency mutation of S protein or a S protein interacting partner of the invention.

In some embodiments, the composition comprises multiple different gRNA molecules, each targeted to a different target sequence. In some embodiments, this multiplexed strategy provides for increased efficacy. These multiplex gRNAs can be expressed separately in different vectors or expressed in one single vector.

The isolated nucleic acid molecules of the invention, including the RNA molecules (e.g., crRNA, tracrRNA, gRNA) or nucleic acids encoding the RNA molecules, may be produced by standard techniques. For example, polymerase chain reaction (PCR) techniques can be used to obtain an isolated nucleic acid containing a nucleotide sequence described herein, including nucleotide sequences encoding a polypeptide described herein. PCR can be used to amplify specific sequences from DNA as well as RNA, including sequences from total genomic DNA or total cellular RNA. Various PCR methods are described in, for example, *PCR Primer: A Laboratory Manual, 2$^{nd}$ edition*, Dieffenbach and Dveksler, eds., Cold Spring Harbor Laboratory Press, 2003. Generally, sequence information from the ends of the region of interest or beyond is employed to design oligonucleotide primers that are identical or similar in sequence to opposite strands of the template to be amplified. Various PCR strategies also are available by which site-specific nucleotide sequence modifications can be introduced into a template nucleic acid.

The isolated nucleic acids also can be chemically synthesized, either as a single nucleic acid molecule (e.g., using automated DNA synthesis in the 3' to 5' direction using phosphoramidite technology) or as a series of oligonucleotides. Isolated nucleic acids of the invention also can be obtained by mutagenesis of, e.g., a naturally occurring portion crRNA, tracrRNA, RNA-encoding DNA, or of a Cas9-encoding DNA In some embodiments, the isolated RNA molecules are synthesized from an expression vector encoding the RNA molecule, as described in detail elsewhere herein.

In one embodiment, the Cas9 protein comprises an amino acid sequence identical to the wild type *Streptococcus pyogenes* Cas9 amino acid sequence. In some embodiments, the Cas protein may comprise the amino acid sequence of a Cas protein from other species, for example other *Streptococcus* species, such as *thermophilus; Pseudomonas aeruginosa, Escherichia coli*, or other sequenced bacteria genomes and archaea, or other prokaryotic microorganisms. Other Cas proteins, useful for the present invention, known or can be identified, using methods known in the art (see e.g., Esvelt et al., 2013, Nature Methods, 10: 1116-1121). In some embodiments, the Cas protein may comprise a modified amino acid sequence, as compared to its natural source. For example, in one embodiment, the wild type *Streptococcus pyrogenes* Cas9 sequence can be modified. For example, in some embodiments, the Cas9 protein comprises dCas9 having point mutations D10A and H840A, thereby rendering the protein as catalytically deficient. In some embodiments, the amino acid sequence can be codon optimized for efficient expression in human cells (i.e., "humanized) or in a species of interest.

Pharmaceutical Compositions

The formulations of the pharmaceutical compositions described herein may be prepared by any method known or hereafter developed in the art of pharmacology. In general, such preparatory methods include the step of bringing the active ingredient into association with a carrier or one or more other accessory ingredients, and then, if necessary or desirable, shaping or packaging the product into a desired single- or multi-dose unit.

Although the description of pharmaceutical compositions provided herein are principally directed to pharmaceutical compositions which are suitable for ethical administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and perform such modification with merely ordinary, if any, experimentation. Subjects to which administration of the pharmaceutical compositions of the invention is contemplated include, but are not limited to, humans and other primates, mammals including commercially relevant mammals such as non-human primates, cattle, pigs, horses, sheep, cats, and dogs.

Pharmaceutical compositions that are useful in the methods of the invention may be prepared, packaged, or sold in formulations suitable for ophthalmic, oral, rectal, vaginal, parenteral, topical, pulmonary, intranasal, buccal, intravenous, intracerebroventricular, intradermal, intramuscular, or another route of administration. Other contemplated formulations include projected nanoparticles, liposomal preparations, resealed erythrocytes containing the active ingredient, and immunogenic-based formulations.

A pharmaceutical composition of the invention may be prepared, packaged, or sold in bulk, as a single unit dose, or as a plurality of single unit doses. As used herein, a "unit dose" is discrete amount of the pharmaceutical composition comprising a predetermined amount of the active ingredient. The amount of the active ingredient is generally equal to the dosage of the active ingredient, which would be administered to a subject or a convenient fraction of such a dosage such as, for example, one-half or one-third of such a dosage.

The relative amounts of the active ingredient, the pharmaceutically acceptable carrier, and any additional ingredients in a pharmaceutical composition of the invention will vary, depending upon the identity, size, and condition of the subject treated and further depending upon the route by which the composition is to be administered. By way of example, the composition may comprise between 0.1% and 100% (w/w) active ingredient.

In addition to the active ingredient, a pharmaceutical composition of the invention may further comprise one or more additional pharmaceutically active agents.

Controlled- or sustained-release formulations of a pharmaceutical composition of the invention may be made using conventional technology.

As used herein, "parenteral administration" of a pharmaceutical composition includes any route of administration characterized by physical breaching of a tissue of a subject and administration of the pharmaceutical composition through the breach in the tissue. Parenteral administration thus includes, but is not limited to, administration of a pharmaceutical composition by injection of the composition, by application of the composition through a surgical incision, by application of the composition through a tissue-penetrating non-surgical wound, and the like. In particular, parenteral administration is contemplated to include, but is not limited to, intraocular, intravitreal, subcutaneous, intraperitoneal, intramuscular, intradermal, intrasternal injection, intratumoral, intravenous, intracerebroventricular and kidney dialytic infusion techniques.

Formulations of a pharmaceutical composition suitable for parenteral administration comprise the active ingredient combined with a pharmaceutically acceptable carrier, such as sterile water or sterile isotonic saline. Such formulations may be prepared, packaged, or sold in a form suitable for bolus administration or for continuous administration. Injectable formulations may be prepared, packaged, or sold in unit dosage form, such as in ampules or in multi-dose containers containing a preservative. Formulations for parenteral administration include, but are not limited to, suspensions, solutions, emulsions in oily or aqueous vehicles, pastes, and implantable sustained-release or biodegradable formulations. Such formulations may further comprise one or more additional ingredients including, but not limited to, suspending, stabilizing, or dispersing agents. In one embodiment of a formulation for parenteral administration, the active ingredient is provided in dry (i.e. powder or granular) form for reconstitution with a suitable vehicle (e.g. sterile pyrogen-free water) prior to parenteral administration of the reconstituted composition.

The pharmaceutical compositions may be prepared, packaged, or sold in the form of a sterile injectable aqueous or oily suspension or solution. This suspension or solution may be formulated according to the known art, and may comprise, in addition to the active ingredient, additional ingredients such as the dispersing agents, wetting agents, or suspending agents described herein. Such sterile injectable formulations may be prepared using a non-toxic parenterally-acceptable diluent or solvent, such as water or 1,3-butane diol, for example. Other acceptable diluents and solvents include, but are not limited to, Ringer's solution, isotonic sodium chloride solution, and fixed oils such as synthetic mono- or di-glycerides. Other parentally-administrable formulations which are useful include those which comprise the active ingredient in microcrystalline form, in a liposomal preparation, or as a component of a biodegradable polymer systems. Compositions for sustained release or implantation may comprise pharmaceutically acceptable polymeric or hydrophobic materials such as an emulsion, an ion exchange resin, a sparingly soluble polymer, or a sparingly soluble salt.

A pharmaceutical composition of the invention may be prepared, packaged, or sold in a formulation suitable for pulmonary administration via the buccal cavity. Such a formulation may comprise dry particles which comprise the active ingredient and which have a diameter in the range from about 0.5 to about 7 nanometers, In certain embodiments, the formulation may comprise dry particles which comprise the active ingredient and which have a diameter in the range from about 1 to about 6 nanometers. Such compositions are conveniently in the form of dry powders for administration using a device comprising a dry powder reservoir to which a stream of propellant may be directed to disperse the powder or using a self-propelling solvent/powder-dispensing container such as a device comprising the active ingredient dissolved or suspended in a low-boiling propellant in a sealed container. In certain embodiments, such powders comprise particles wherein at least 98% of the particles by weight have a diameter greater than 0.5 nanometers and at least 95% of the particles by number have a diameter less than 7 nanometers. In certain embodiments, at least 95% of the particles by weight have a diameter greater than 1 nanometer and at least 90% of the particles by number have a diameter less than 6 nanometers. In certain embodiments, dry powder compositions include a solid fine powder diluent such as sugar and are conveniently provided in a unit dose form.

Low boiling propellants generally include liquid propellants having a boiling point of below 65° F. at atmospheric pressure. Generally, the propellant may constitute 50 to 99.9% (w/w) of the composition, and the active ingredient may constitute 0.1 to 20% (w/w) of the composition. The propellant may further comprise additional ingredients such as a liquid non-ionic or solid anionic surfactant or a solid diluent (in certain instances having a particle size of the same order as particles comprising the active ingredient).

Formulations of a pharmaceutical composition suitable for parenteral administration comprise the active ingredient combined with a pharmaceutically acceptable carrier, such as sterile water or sterile isotonic saline. Such formulations may be prepared, packaged, or sold in a form suitable for bolus administration or for continuous administration. Injectable formulations may be prepared, packaged, or sold in unit dosage form, such as in ampules or in multi-dose containers containing a preservative. Formulations for parenteral administration include, but are not limited to, suspensions, solutions, emulsions in oily or aqueous vehicles, pastes, and implantable sustained-release or biodegradable formulations. Such formulations may further comprise one or more additional ingredients including, but not limited to, suspending, stabilizing, or dispersing agents. In one embodiment of a formulation for parenteral administration, the active ingredient is provided in dry (i.e., powder or granular) form for reconstitution with a suitable vehicle (e.g., sterile pyrogen-free water) prior to parenteral administration of the reconstituted composition.

The pharmaceutical compositions may be prepared, packaged, or sold in the form of a sterile injectable aqueous or oily suspension or solution. This suspension or solution may be formulated according to the known art, and may comprise, in addition to the active ingredient, additional ingredients such as the dispersing agents, wetting agents, or suspending agents described herein. Such sterile injectable formulations may be prepared using a non-toxic parenterally-acceptable diluent or solvent, such as water or 1,3-butane diol, for example. Other acceptable diluents and solvents include, but are not limited to, Ringer's solution, isotonic sodium chloride solution, and fixed oils such as synthetic mono- or di-glycerides. Other parentally-administrable formulations that are useful include those that comprise the active ingredient in microcrystalline form, in a liposomal preparation, or as a component of a biodegradable polymer system. Compositions for sustained release or implantation may comprise pharmaceutically acceptable polymeric or hydrophobic materials such as an emulsion, an ion exchange resin, a sparingly soluble polymer, or a sparingly soluble salt.

As used herein, "additional ingredients" include, but are not limited to, one or more of the following: excipients; surface active agents; dispersing agents; inert diluents; granulating and disintegrating agents; binding agents; lubricating agents; sweetening agents; flavoring agents; coloring agents; preservatives; physiologically degradable compositions such as gelatin; aqueous vehicles and solvents; oily vehicles and solvents; suspending agents; dispersing or wetting agents; emulsifying agents, demulcents; buffers; salts; thickening agents; fillers; emulsifying agents; antioxidants; antibiotics; antifungal agents; stabilizing agents; and pharmaceutically acceptable polymeric or hydrophobic materials. Other "additional ingredients" which may be included in the pharmaceutical compositions of the invention are known in the art and described, for example in Remington's Pharmaceutical Sciences (1985, Genaro, ed., Mack Publishing Co., Easton, PA), which is incorporated herein by reference.

Methods of Use

In some embodiments, the binding molecules (e.g., nanobodies, etc.) of the present invention, exhibit a high capacity to detect and bind their target in a complex mixture of salts, compounds and other polypeptides, e.g., as assessed by any one of several in vitro and in vivo assays known in the art. The skilled artisan will understand that the binding molecules (e.g., nanobodies, etc.) described herein as useful in the methods of diagnosis and treatment and prevention of disease, are also useful in procedures and methods of the invention that include, but are not limited to, an immunochromatography assay, an immunodot assay, a Luminex assay, an ELISA assay, an ELISPOT assay, a protein microarray assay, a Western blot assay, a mass spectrophotometry assay, a radioimmunoassay (RIA), a radioimmunodiffusion assay, a liquid chromatography-tandem mass spectrometry assay, an ouchterlony immunodiffusion assay, reverse phase protein microarray, a rocket immunoelectrophoresis assay, an immunohistostaining assay, an immunoprecipitation assay, a complement fixation assay, FACS, a protein chip assay, separation and purification processes, and affinity chromatography (see also, 2007, Van Emon, Immunoassay and Other Bioanalytical Techniques, CRC Press; 2005, Wild, Immunoassay Handbook, Gulf Professional Publishing; 1996, Diamandis and Christopoulos, Immunoassay, Academic Press; 2005, Joos, Microarrays in Clinical Diagnosis, Humana Press; 2005, Hamdan and Righetti, Proteomics Today, John Wiley and Sons; 2007).

In some embodiments, the SARS-CoV-2 S protein or SARS-CoV-2 S protein interacting partner-binding molecule (e.g., nanobody, etc.) binds to its target protein with a KD of $1\times10^{-6}$ M or less, more preferably $1\times10^{-7}$ M or less, more preferably $1\times10^{-8}$ M or less, more preferably $5\times10^{-9}$ M or less, more preferably $1\times10^{-9}$ M or less or even more preferably $3\times10^{-10}$ M or less. The term "does not substantially bind" to a protein or cells, as used herein, means does not bind or does not bind with a high affinity to the protein or cells, i.e., binds to the protein or cells with a KD of greater than $1\times10^{6}$ M or more, more preferably $1\times10^{5}$ M or more, more preferably $1\times10^{4}$ M or more, more preferably $1\times10^{3}$ M or more, even more preferably $1\times10^{2}$ M or more. The term "KD", as used herein, is intended to refer to the dissociation constant, which is obtained from the ratio of Kd to Ka (i.e., Kd/Ka) and is expressed as a molar concentration (M). KD values for SARS-CoV-2 S protein or SARS-CoV-2 S protein interacting partner binding molecule (e.g., nanobody, etc.) can be determined using methods well established in the art. In one embodiment, the method for determining the KD of a binding molecule (e.g., antibody, etc.) is by using surface plasmon resonance, preferably using a biosensor system such as a Biacore© system.

As used herein, the term "high affinity" refers to a nanobody having a KD of $1\times10^{-7}$ M or less, more preferably $5\times10^{-8}$ M or less, even more preferably $1\times10^{-8}$ M or less, even more preferably $5\times10^{-9}$ M or less and even more preferably $1\times10^{-9}$ M or less for a target binding partner molecule. However, "high affinity" binding can vary between antibody isotypes. For example, "high affinity" binding for an IgM isotype refers to an antibody having a KD of $10^{-6}$ M or less, more preferably $10^{-7}$ M or less, even more preferably $10^{-8}$ M or less.

In one embodiment, the invention relates to a method of detecting a SARS-CoV-2 Spike protein in a sample, the method comprising: a) contacting the sample with the antibody or antibody fragment that specifically binds to SARS-CoV-2 Spike protein, and b) detecting binding of the antibody or antibody fragment to SARS-CoV-2 Spike protein.

In one embodiment, the invention relates to a method of diagnosing a SARS-CoV-2 infection in a subject in need thereof, the method comprising: a) contacting a biological sample of the subject with the antibody or antibody fragment that specifically binds to SARS-CoV-2 Spike protein, b) detecting binding of the antibody or antibody fragment to SARS-CoV-2 Spike protein, and c) diagnosing the subject with a SARS-CoV-2 infection. In one embodiment, the method further comprises a step of administering a treatment to the subject that was diagnosed as having a SARS-CoV-2 infection.

In one embodiment, the present invention provides a method for treating SARS-CoV-2 infection or treating or preventing SARS-CoV-2-associated diseases and disorders in a subject. In one aspect, the present invention provides a method for treating or preventing COVID-19 in a subject.

In one embodiment, the method comprises administering to a subject having a SARS-CoV-2 infection, a composition that inhibits the interaction between S protein and one or more S protein interacting partner of the invention. In one embodiment, the method comprises administering to a subject at risk for developing a SARS-CoV-2 infection, a composition that inhibits the interaction between S protein and one or more S protein interacting partner of the invention.

In one embodiment, the method comprises administering to a subject having a SARS-CoV-2-associated disease or disorder, a composition that inhibits the interaction between S protein and one or more S protein interacting partner of the invention. In one embodiment, the method comprises administering to a subject at risk for developing a SARS-CoV-2-associated disease or disorder, a composition that inhibits the interaction between S protein and one or more S protein interacting partner of the invention.

In one embodiment, the method comprises administering to a subject having COVID-19, a composition that inhibits the interaction between S protein and a S protein interacting partner of the invention. In one embodiment, the method comprises administering to a subject at risk for developing COVID-19, a composition that inhibits the interaction between S protein and a S protein interacting partner of the invention.

In one embodiment, the method comprises administering to the subject a composition comprising an inhibitor of a S protein interacting partner of the invention, wherein the inhibitor reduces or inhibits the expression, activity, or both of a S protein interacting partner of the invention. In one embodiment, the method comprises administering to the subject a composition comprising an inhibitor of S protein, wherein the inhibitor reduces or inhibits the expression, activity, or both of S protein. In one embodiment, the method comprises administering to the subject a composition comprising an agent that reduces or inhibits the binding of S protein to an endogenous S protein interacting partner in a host. For example, in one embodiment, the method comprises administering to the subject a composition comprising an agent that binds to S protein, thereby preventing S-protein from binding one or more endogenous S protein binding partner. In one embodiment, the method comprises administering to the subject a composition comprising an agent that binds to an endogenous S protein binding partner, thereby preventing the S protein binding partner from binding S-protein.

In one embodiment, the composition is administered to a subject having an infection, disease, or disorder associated with SARS-CoV-2. In one embodiment, the composition is administered to a subject at risk for developing an infection, disease, or disorder associated with SARS-CoV-2. For example, the composition may be administered to a subject who is at risk for being in contact with SARS-CoV-2. In one embodiment, the composition is administered to a subject who lives in, traveled to, or is expected to travel to a geographic region in which SARS-CoV-2 is prevalent. In one embodiment, the composition is administered to a subject who is in contact with or expected to be in contact with another person who lives in, traveled to, or is expected to travel to a geographic region in which SARS-CoV-2 is prevalent. In one embodiment, the composition is administered to a subject who has knowingly been exposed to SARS-CoV-2 through their occupation or contact.

It will be appreciated that the composition of the invention may be administered to a subject either alone, or in conjunction with another agent.

The therapeutic and prophylactic methods of the invention thus encompass the use of pharmaceutical compositions described herein to practice the methods of the invention. The pharmaceutical compositions useful for practicing the invention may be administered to deliver a dose of from 1 ng/kg/day and 100 mg/kg/day. In one embodiment, the invention envisions administration of a dose, which results in a concentration of the compound of the present invention from 10 nM and 10 µM in a mammal.

Typically, dosages which may be administered in a method of the invention to a mammal, such as a human, range in amount from 0.01 µg to about 50 mg per kilogram of body weight of the mammal, while the precise dosage administered will vary depending upon any number of factors, including but not limited to, the type of mammal and type of disease state being treated, the age of the mammal and the route of administration. In certain embodiments, the dosage of the compound will vary from about 0.1 µg to about 10 mg per kilogram of body weight of the mammal. In certain embodiments, the dosage will vary from about 1 µg to about 1 mg per kilogram of body weight of the mammal.

The composition may be administered to a mammal as frequently as several times daily, or it may be administered less frequently, such as once a day, once a week, once every two weeks, once a month, or even less frequently, such as once every several months or even once a year or less. The frequency of the dose will be readily apparent to the skilled artisan and will depend upon any number of factors, such as, but not limited to, the type and severity of the disease being treated, the type and age of the mammal, etc.

Use in Combination

The present invention also provides a method of treating, protecting against, and/or preventing disease in a subject in need thereof by administering a combination of the inhibitor of the invention and one or more additional inhibitor of the interaction between SARS-CoV-2 S protein and a SARS-CoV-2 S protein interacting partner. In some embodiments, at least 1, 2, 3, 4, 5, 6, 7, 8, 9, 10 or more than 10 inhibitors of the invention are administered in combination.

In some embodiments, at least 1, 2, 3, 4, 5, 6, 7, 8, 9, 10 or more than 10 inhibitors of the invention are administered in combination with at least 1, 2, 3, 4, 5, 6, 7, 8, 9, 10 or more than 10 additional inhibitors of the interaction between SARS-CoV-2 S protein and a SARS-CoV-2 S protein interacting partner. Exemplary inhibitors of the interaction between SARS-CoV-2 S protein and a SARS-CoV-2 S protein interacting partner that can be administered in combination with the inhibitors of the invention include, but are not limited to, antibodies and antibody fragments comprising a variable heavy chain amino acid sequence as set forth in SEQ ID NO:56, SEQ ID NO:60, SEQ ID NO:64, SEQ ID NO:68, SEQ ID NO:72, SEQ ID NO:76, SEQ ID NO:80, SEQ ID NO:84, SEQ ID NO:88, SEQ ID NO:92, SEQ ID NO:96, SEQ ID NO:100, SEQ ID NO:104, SEQ ID NO:108, SEQ ID NO: 112, or SEQ ID NO: 116 or variants thereof.

The present invention also provides a method of treating, protecting against, and/or preventing disease in a subject in need thereof by administering a combination of at least one inhibitor of the invention and at least one additional therapeutic agent. In one embodiment, the therapeutic agent is an antiviral agent. In one embodiment, the therapeutic is an antibiotic agent. In one embodiment, the therapeutic agent is a SARS-CoV-2 vaccine. In one embodiment, the therapeutic agent is a small-molecule drug or biologic.

The inhibitor of the invention and a therapeutic agent may be administered using any suitable method such that a combination of the inhibitor of the invention and therapeutic agent are both present in the subject. In one embodiment, the method may comprise administration of a first composition comprising an inhibitor of the invention by any of the methods described in detail above and administration of a second composition comprising a therapeutic agent less than 1, less than 2, less than 3, less than 4, less than 5, less than 6, less than 7, less than 8, less than 9 or less than 10 days following administration of the inhibitor of the invention. In one embodiment, the method may comprise administration of a first composition comprising an inhibitor of the invention by any of the methods described in detail above and administration of a second composition comprising a therapeutic agent more than 1, more than 2, more than 3, more than 4, more than 5, more than 6, more than 7, more than 8, more than 9 or more than 10 days following administration of the synthetic antibody. In one embodiment, the method may comprise administration of a first composition comprising a therapeutic agent and administration of a second composition comprising an inhibitor of the invention by any of the methods described in detail above less than 1, less than 2, less than 3, less than 4, less than 5, less than 6, less than 7, less than 8, less than 9 or less than 10 days following administration of the therapeutic agent. In one embodiment, the method may comprise administration of a first composition comprising a therapeutic agent and administration of a second composition comprising an inhibitor of the invention by any of the methods described in detail above more than 1, more than 2, more than 3, more than 4, more than 5, more than 6, more than 7, more than 8, more than 9 or more than 10 days following administration of the therapeutic agent. In one embodiment, the method may comprise administration of a first composition comprising an inhibitor of the invention by any of the methods described in detail above and a second composition comprising a therapeutic agent concurrently. In one embodiment, the method may comprise administration of a first composition comprising an inhibitor of the invention by any of the methods described in detail above and a second composition comprising a therapeutic agent concurrently. In one embodiment, the method may comprise administration of a single composition comprising an inhibitor of the invention and a therapeutic agent.

Non-limiting examples of antibiotics that can be used in combination with the inhibitor of the invention include aminoglycosides (e.g., gentamicin, amikacin, tobramycin), quinolones (e.g., ciprofloxacin, levofloxacin), cephalosporins (e.g., ceftazidime, cefepime, cefoperazone, cefpirome, ceftobiprole), antipseudomonal penicillins: carboxypenicillins (e.g., carbenicillin and ticarcillin) and ureidopenicillins (e.g., mezlocillin, azlocillin, and piperacillin), carbapenems (e.g., meropenem, imipenem, doripenem), polymyxins (e.g., polymyxin B and colistin) and monobactams (e.g., aztreonam).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be construed as limiting in any way the remainder of the disclosure.

Example 1: ACE-2-Independent Myeloid Cell Interactions of SARS-CoV-2 Exacerbate Inflammatory Responses Despite months of intensive research, the mechanisms governing dysregulated immune responses in COVID-19 patients is just beginning to be unraveled. In this study, the cellular origins and molecular basis of immune dysregulation in COVID-19 diseases are defined. DC-SIGN, L-SIGN, LSECtin, ASGR1, CLEC10A, and TTYH2 were identified and characterized as new SARS-CoV-2 cellular receptors on immune cells. The data suggest that these immune receptors directly mediate SARS-CoV-2 binding of myeloid cells, which may initiate subsequent cytokine production that may prove pathologic in a disease setting. Five of the six SARS-CoV-2 receptors are C-type lectins. DC-SIGN and L-SIGN are bound by a variety of viruses. DC-SIGN was first identified as a receptor for HIV-1 (Geijtenbeek et al., 2000), which can also use L-SIGN for entry (da Silva et al., 2011), and both are engaged by SARS-CoV for entry into DCs (Jeffers et al., 2004; Marzi et al., 2004). Besides their roles in viral adsorption or attachment, these receptors were also postulated to serve as capture receptors that help infect bystander cells (Cormier et al., 2004), although the relevance of this phenomenon in the context of SARS-CoV-2 remains to be determined. Whether DC-SIGN/L-SIGN engagement is directly linked to NF-κB signaling and cytokine production is likewise unclear. LSECtin is enriched in myeloid cells as a ligand that suppresses T cells, and in the case of Ebola virus, triggers inflammatory responses downstream of the receptor (Zhao et al., 2016). ASGR1 has been shown to directly bind to HBV and HEV, which facilitate the viral entry (Yang et al., 2010; Zhang et al., 2016; Zhang et al., 2011). CLEC10A is capable of promoting the infection of Ebola virus and Filovirus (Brudner et al., 2013; Takada et al., 2004) and enhance the cytokine production induced by TLR7/8 (Heger et al., 2018). A relatively under-characterized protein, TTYH2, currently has no known role in virus infection or immune signaling. In addition to myeloid cells, it is also highly expressed in the intestine at the RNA level, where abnormalities and injuries are seen in COVID-19 patients. Further functional and structural analyses are warranted to examine its interplay with SARS-CoV-2 and anti-S protein neutralizing antibodies.

The data reveal a critical role of non-RBD epitopes in S protein (CTD and NTD) in binding to the immune receptors. Since the current antibody studies focus on blocking RBD and ACE2 interactions, the results may have broad implications for immunotherapies based on nanobodies targeting both ACE2 and myeloid cell receptors. NTD and CTD have not been well studied, and appear to be more glycosylated than the RBD, with unknown implications and steric considerations. The SARS-CoV-2 S trimer has been suggested to have two conformations, a 'closed' structure and an 'open' structure, and it is possible that these regions allosterically impact the conformation of RBD required for proper interaction with ACE2 (Walls et al., 2020). S2 is also capable of weak binding to C-type lectins—given that the co-expression of furin enhances pseudovirus infection via LSECtin, ASGR1, and CLEC10A this binding may play a functional role at the fusion step in addition to the initial viral attachment.

The results also highlight an important role of glycosylation in both repressing and enhancing SARS-CoV-2-cellular receptor interactions. The N343 residue, whose mutation to Q completely blocked the binding of S protein to ACE2, is highly conserved between SARS-CoV-2 and SARS-CoV (equivalent to N330) and across human and animal isolates of clade 1, 2 and 3 sarbecoviruses, implying a selective pressure to maintain ACE2 interaction (Lu et al., 2020; Walls et al., 2019). A recent structural study of S protein showed that the N343 glycan is proximal to and surrounds the ACE2-interacting motif in the RBD (Watanabe et al., 2020). Interestingly, an antibody targets the core fucose moiety of N343 neutralize without affecting ACE2 binding, although the mechanism of neutralization is not clearly understood (Pinto et al., 2020). The three ACE2-binding motifs are buried at the interface in the aforementioned 'closed' ACE2 structure, and the 'open' structure is expected to be necessary for interacting with ACE2 (Walls et al., 2020). Without being bound by theory, it was hypothesized that the N343 glycan may be responsible for the conformational switch or the maintenance of the 'open' structure for the interaction with ACE2, though why this glycan only enhances binding to DC-SIGN is unclear. A detailed study of other glycan mutants, particularly those that occur naturally (N282, N165, etc.) and may give additional insight into the mechanism of viral engagement at a structural level and which interfaces are best targeted to disrupt viral entry and myeloid cell activity.

Both SARS-CoV-2 pseudovirus and wild-type SARS-CoV-2 can engage with HEK293T cells overexpressing immune receptors and PBMC-derived myeloid cells. A strong induction of cytokine expression was observed but active replication of authentic SARS-CoV-2 in primary myeloid cells was not detected. Viral RNA levels did not decrease significantly within the first 24 hours, implying no RNA degradation. Some immune cells may prevent or stall virus replication and use the viral RNA to enhance cell-intrinsic innate immune response. In addition, it is important to test, in the future, whether myeloid cells from severe COVID-19 patients have higher expression of these novel receptors, are more susceptible to SARS-CoV-2 infection and the induction of immune responses.

To explore the therapeutic utility of these findings, an antibody discovery approach was employed to identify candidates that interfere with SARS-CoV-2 interactions beyond ACE2. While several vaccine programs have shown some initial encouraging data in generating neutralizing antibody titers in humans, the quality and quantity of this repertoire can be difficult to control. With a lower cost for production and enhanced stability, nanobodies have major advantages over traditional antibodies, including the small size, which allows for enhanced penetration into the vast surface area of the lung via aerosolization. Currently, screening of neutralizing antibodies mostly target RBD to block S protein-ACE2 interaction—however, the data presented here shows that non-RBD epitopes may be an alternative target to neutralize ACE2 and other receptor binding. Due to the large and complex structure of S trimers, one single antibody or nanobody may not be as effective at blocking all viral receptors. Thus, multi-specific nanobody cocktails that circumvent antibody-dependent enhancement while blocking SARS-CoV-2 binding to DC-SIGN, L-SIGN, LSECtin, ASGR1, CLEC10A, TTYH2, and ACE2 may prove beneficial. Simultaneous blockade of virus targeting epithelial cells and reducing the myeloid cell-derived cytokine production represents a promising therapeutic strategy for COVID-19 treatment.

The materials and methods used in the experiments are now described

Plasmids and Fusion Proteins

The human cDNA library constructs encoding ~300 full-length myeloid-cell associated membrane proteins were purchased from Genecopoeia (Rockville, MD), DNASU (Tempe, AZ), or were individually cloned by the Wang laboratory at the NYU Langone Medical Center. All of the genes used for the myeloid cell receptor discovery were cloned into a mammalian expression vector. Human fusion proteins were provided by KACTUS Biosystems (Woburn, MA), purchased from Sino Biological (Wayne, PA), and ACRO Biosystems (Newark, DE), or were individually generated by tagging the extracellular domain with human IgG1 Fc and expressed in Expi293F cells. ACE2 (in a pcDNA3.1/nV5-DEST vector) and TMPRSS2 (in a pLX304 lentiviral vector) were used as previously described (Zang et al., 2020). Furin was cloned into a pLenti6.3/V5-DEST vector with a C-terminal V5 tag and a blasticidin selection marker.

Cell Lines

Human embryonic kidney cell line HEK293T cells (CRL-1573) were purchased from American Type Culture Collection (ATCC) and cultured in complete Dulbecco's Modified Eagle Medium (DMEM), supplemented with 10% heat-inactivated fetal bovine serum (FBS), 2 mM L-Glutamine, 1% Penicillin/Streptomycin, 1 mM Sodium Pyruvate, and 20 mM HEPES. THP-1 cells were cultured in RPMI 1640 medium supplemented with 10% FBS, 20 mM HEPES, 1 mM Sodium Pyruvate, and 1% Penicillin/Streptomycin. To perform THP-1 differentiation, THP-1 monocytes were resuspended in complete media supplemented with rhIL-4 (200 ng/mL), rhGM-CSF (100 ng/mL), rhTNF-a (20 ng/mL), and ionomycin (200 ng/mL) at a concentration of $2 \times 10^5$ cells/mL, followed by incubation at 37° C. for 72 hr. Vero-E6 (CRL-1586) and Vero (CCL81) cells were cultured in DMEM supplemented with 10% FBS, 10 mM HEPES, 1 mM Sodium Pyruvate, 0.1 mM non-essential amino acids (NEAA), and 100 U/mL of Penicillin/Streptomycin. 293FT were purchased from Thermo Fisher Scientific (Waltham, MA), cultured in DMEM supplemented with 4.5 g/L Glucose, 10% FBS, 0.1 mM NEAA, 6 mM L-glutamine, 1 mM Sodium Pyruvate, and 1% Penicillin/Streptomycin. Expi293F cells were purchased from Thermo Fisher Scientific (Waltham, MA) and cultured in Expi293™ Expression Medium (Thermo Fisher, A1435101). All cells were maintained at 37° C. and 5% $CO_2$ atmosphere, except for Expi293F cells that were cultured at 37° C. and 8% $CO_2$ atmosphere with 125 rpm orbital shaking.

Primary Cells

Human primary myeloid cells were generated as described before (Lu et al., 2018). Briefly, human PBMCs were isolated from buffy coat blood obtained by the New York Blood Center (NYBC) from healthy donors. PBMCs were allowed to attach to the bottom of a T75 flask in RPMI 1640 media, supplemented with L-Glutamine, 0.5% FBS, and 30 µg/mL DNase I (Roche), at 37° C. for 1 hr. Cell culture was aspirated and attached cells were gently washed with 30 mL PBS for 3 times. Cells were then cultured in RPMI 1640 media, supplemented with L-Glutamine, 10% FBS, Penicillin/Streptomycin, 30 ng/mL human GM-CSF (R&D Systems), and 10 ng/mL human IL-4 (R&D Systems) for 5-7 days to promote myeloid cell differentiation. Cells were maintained at 37° C. in a 5% $CO_2$ atmosphere.

The Myeloid Cell Receptor Discovery

The myeloid cell receptor discovery approach was modified from a previous study (Wang et al., 2019). ~300 genes encoding transmembrane proteins were selected based on the myeloid cell-related expression profiles (bioinformatics analysis using BioGPS databases). To express the transmembrane proteins, cDNA library plasmids were individually transfected into HEK293T cells in a 384-well plate (Applied Biosystems, 4307723). Briefly, an equal volume of plasmid (pre-diluted to 4 µg/mL in OptiMEM) and Lipofectamine 2000 (pre-diluted to 7 µL/mL in OptiMEM) was mixed and incubated at room temperature (RT) for 15 min. 20 µL of the mixture were added to each well of the 384-well plate followed by 30 min incubation at RT. 40,000 HEK293T cells in 40 µL complete medium were then added into each well and incubated at 37° C. for 18 hr. For the initial screening experiment, 10 ng of S-hFc, S1-hFc, and RBD-hFc (in total 30 ng) (KACTUS Biosystems) or 30 ng human IgG recombinant proteins, and 45 ng of Alexa Fluor 647 Mouse Anti-Human IgG secondary antibody (SouthernBiotech)

were added into each well. The plates were read 24 hr later in the Applied Biosystems (Foster City, CA) 8200 cellular detection system (CDS) and analyzed by the CellProfiler software. Human Fc receptors served as internal positive controls and human IgG recombinant proteins served as negative controls for each transmembrane protein.

To validate and characterize the binding to the identified receptors, HEK293T cells were transfected with individual receptors as described above. 10 ng of S-hFc (KACTUS Biosystems), S1-hFc (KACTUS Biosystems or homemade), NTD-hFc (homemade), RBD-hFc (KACTUS Biosystems or homemade), CTD-hFc (homemade) S2-hFc (homemade), and 15 ng of anti-human IgG secondary antibody (Invitrogen) were added to each well, followed by 24 hr incubation before plate reading using CDS. Data were analyzed by CellProfiler software.

For the glycan mutagenesis screening, HEK293T cells were transfected with individual receptors or FCGR2A as described above. 50 µL homemade WT S1-hFc or mutant S1-hFc in Expi293F media was added to each well together with 15 ng anti-human IgG secondary antibody (SouthernBiotech). The fluorescence intensity was calculated by CellProfiler software. Binding of S1-hFC (WT or mutant) to receptors was normalized to the protein amount determined by its binding to FCGR2A.

To examine the blocking of S protein binding in the presence or absence of VHH nanobody, HEK293T cells were transfected with individual receptors as described above. 10 ng S1-hFc (KACTUS Biosystems) (to check the binding to ACE2 and LSECtin) or RBD-hFc (KACTUS Biosystems) (to check the binding to TTYH2) were incubated with 50 µL VHH (various amount from 10 µg to 400 µg) overnight at 4° C. to allow the binding of VHH to S protein and then added to each well in a 384-well plate. 15 ng AF647-conjugated anti-human IgG secondary antibody (Invitrogen) were added to each well and incubated for 24 hr. Data was then collected by CDS and analyzed by CellProfiler software.

Pseudovirus Generation and Infection

SARS-CoV-2-GFP pseudoviruses were generated by co-transfecting pcDNA3.1-SARS-CoV-2-S, pCMV-dR8.2 dvpr (Addgene, 8455) (encoding HIV backbone) and pCDH-GFP (encoding the GFP reporter) at 1:2:3 mass ratio into Expi293F cells using PEI at 3:1 (PEI:DNA) mass ratio. Four days post-transfection, the supernatant was harvested and filtered through a 0.45 µm sterile syringe filter, followed by concentration using Amicon Ultra-15 Centrifugal Filter Unit (Millipore, UFC910024). Pseudoviruses were stored at −80° C. For pseudovirus infection, media containing 100,000 cells/mL were mixed with the virus at a 1:1 volume ratio. The medium was changed 12 hr after and cells were incubated for an additional 48 hr before analysis by flow cytometry to determine GFP expression.

SARS-CoV-2 Virus and Infection

A clinical isolate of SARS-CoV-2 (2019-nCoV/USA-WA1/2020 strain) was obtained from the Centers for Disease Control and Prevention (a gift of Natalie Thornburg). A mNeonGreen SARS-CoV-2 reporter virus was used as previously described (Xie et al., 2020). SARS-CoV-2 viruses were passaged in Vero CCL81 cells or Huh7.5 cells and titrated using a focus-forming assay on Vero-E6 cells. Human PBMC-derived myeloid cells were infected with SARS-CoV-2 (MOI=0.5) with or without centrifugation at 1200×g for 2 hr at RT. Total RNA was harvested in Trizol or Lysis Buffer from PureLink RNA Mini Kit (Thermo Fisher Scientific, Waltham, MA) either at 2 hr post-infection or 24 hr post-infection after incubation at 37° C.

RNA Extraction and Quantitative PCR

Total RNA was extracted from cells using Trizol and reverse transcription was performed with High Capacity RT kit and random hexamers as previously described (Bolen et al., 2013). RT-PCR was performed using the AriaMX (Agilent) with a 25 µL reaction, composed of 50 ng of cDNA, 12.5 µL Power SYBR Green for VSV-N, IFNA2, IFNB, IFNG, IL1B, IL18, IL6, CXCL10, CXCL11, CCL5, MX1, DC-SIGN, L-SIGN, GAPDH or Taqman master mix for SARS-CoV-2 N (Applied Biosystems), and 200 nM of each forward and reverse primer.

RNA-Sequencing

Total RNA from mock or SARS-CoV-2 infected human primary myeloid cells was extracted using Trizol. RNA sample quality was examined by the NanoDrop spectrophotometer (Thermo Fisher) and Bioanalyzer 2100 (Agilent). Libraries were sequenced on the BGISEQ-500 platform. The SE reads were aligned to the hg19 build using Bowtie2 to map clean reads to reference gene and using HISAT2 to reference genome with the following parameters: --phred64 --sensitive -I 1 -X 1000. Reads were counted using Subread and differential gene expression analysis was performed using DESeq2BGI. Data were analyzed using DESeq2.

Flow Cytometry

To validate the binding of S protein to the receptor candidates, SARS-CoV-2 pseudoviruses were first incubated with HEK293T cells expressing different receptors on ice for 1 hr. Cells were then incubated with rabbit anti-SARS-CoV-2 S protein antibody (Sino Biological, 40589-T62, dilution 1:200) on ice for 45 min, and stained with AF647 donkey anti-rabbit IgG antibody (Biolegend, 406414, dilution 1:500) on ice for 45 min. Data were acquired on a ZE5 Cell Analyzer (Bio-Rad) and analyzed using the FlowJo software (version 10.6.1).

HEK293T cells, THP-1 cells, and human primary myeloid cells were stained using the following fluorescently-labeled anti-human antibodies: from BioLegend (San Diego, CA): PE, APC mouse anti-human CD209 (DC-SIGN) antibody (330106, 330107, dilution 1:100), PE mouse anti-human CD80 antibody (305207, dilution 1:100), APC mouse anti-human CD83 antibody (305311, dilution 1:100), APC mouse anti-human CD86 antibody (305411, dilution 1:100), PerCP/Cyanine5.5 mouse anti-human CD11c antibody (301623, dilution 1:100); from eBioscience (San Diego, CA): APC mouse anti-human CD299 (DC-SIGN/L) antibody (17-2999-42, dilution 1:100); and from R&D Systems (Minneapolis, MN): APC mouse anti-human LSECtin/CLEC4G antibody (FAB2947A, dilution 1:100). For THP-1 cells and human primary myeloid cells, TrueStain Monocyte Blocker was used for staining (Biolegend, 426102, dilution 1:50). For the infection experiment, all cells were infected by SARS-Cov-2-GFP pseudovirus and analyzed by an LSRII flow cytometer (BD) 48 hours later. Data were analyzed by FlowJo software (version 10.6.1).

For checking authentic SARS-CoV-2 infection, the infected cells were washed in PBS followed by fixation then resuspended in FACS buffer containing 1×PBS with 0.5% bovine serum albumin and 0.05% sodium azide. Cells were analyzed by Accuri C6 (BD Biosciences, CA) and data was analyzed by FlowJo software (version 10.6.1).

Western Blot

HEK293T cells were transfected with FLAG-tagged receptors. 24 hr post-transfection, cells were lysed and the lysates were harvested for western blot using the following antibodies: from Proteintech (Rosemont, IL): mouse anti-GAPDH antibody (60004-1-lg, dilution 1:5,000) and rabbit anti-DC-SIGN antibody (25404-1-AP, dilution 1:1,000);

from Sigma-Aldrich (St. Louis, MO): mouse anti-FLAG antibody (F3165, dilution 1:10,000); from Abcam (Cambridge, MA): rabbit anti-L-SIGN antibody (ab169783, dilution 1:1,000); and from Cell Signaling Technology (Danvers, MA): HRP-conjugated anti-mouse IgG (7076, dilution 1:5,000) and HRP-conjugated anti-rabbit IgG (7074, dilution 1:5,000).

VHH Nanobody

94 VHH nanobodies were generated from a naïve llama VHH library through two panning strategies. In the first screen, 81 VHH nanobodies were selected for high-affinity binding to SARS-CoV-2 S protein through three rounds of S1 panning as described before (Dong et al., 2020). In the second screen, VHH libraries after the second round of S1 panning were depleted by RBD-Fc protein, and followed by an additional S1 panning step. ELISA was performed to examine the binding to S1 and RBD, and the top 13 candidates with strong binding to S1 but weak or no binding to RBD were selected for the second screen. Selected VHH nanobodies were further tested for their capability to block S protein binding to ACE2, DC-SIGN, L-SIGN, LSECtin, and TTYH2, by cellular detection system (for ACE2, LSECtin, and TTYH2) or ELISA (for DC-SIGN and L-SIGN).

ELISA 96-well plates (Nunc-468667) were coated with 2 μg/mL recombinant SARS-CoV-2-S1 protein with His tag (Kactus Biosystems, China) overnight. The plates were washed with TBST (TBS+0.1% Tween-20) three times and blocked using 2% BSA (Sangon Biotech (Shanghai) Co., Ltd, China) in PBST (PBS+0.1% Tween-20) for 1 hr at 37° C. The wells were incubated with recombinant ACE2 (Kactus Biosystems, China), CD209, CLEC4M (Sino Biological), and CLEC4G (Acro Biosystems) with human Fc tag from 2-10 μg to 0.2 ng to 1 ng at 37° C. for 6 hr. Following three times washes with TBST, HRP conjugated anti-human Fc tag antibody (Sino Biological) was added and incubated at 37° C. for 1 hr. Plates were washed three times with TBST and 200 L of the mixture of TMB Substrate Solution Set (Sino Biological) was added to each well. While protected from light, plates were incubated at room temperature for 20 min. Stop solution (2M $H_2SO_4$) was added and the microplate was read at OD450.

VHH was generated from the bacterial culture containing a high concentration of mannan that can block S protein interaction with DC-SIGN and L-SIGN. To overcome this problem, ELISA was used and the capability of VHH to block S protein binding to DC-SIGN and L-SIGN was evaluated. S1-His (KACTUS Biosystems) were added at 50 ng per well for plate coating at 4° C. overnight. The S1-His-coated plate was first blocked using 10% FBS in PBS at RT for 1 hour and then incubated with 100 μL VHH at 37° C. for 4 hours. Following washes using PBS supplemented with 0.1% Tween-20 (American Bio, AB02038-00500) to remove free mannan and unbound VHH, 2 μg/mL hFc-tagged DC-SIGN, 5 μg/mL L-SIGN (Sino Biological) or equal concentration of recombinant hIgG1, served as the negative control, were added and incubated at 37° C. for 2 hours. Results were assessed by spectrophotometric measurement of absorbance at 450 nm using a FlexStation 3 Multi-Mode Microplate Reader (Molecular Devices, San Jose, CA).

Structural Analysis of SARS-CoV-2 S Protein Glycosylation Sites

Figures 3E, 3F, 3G:
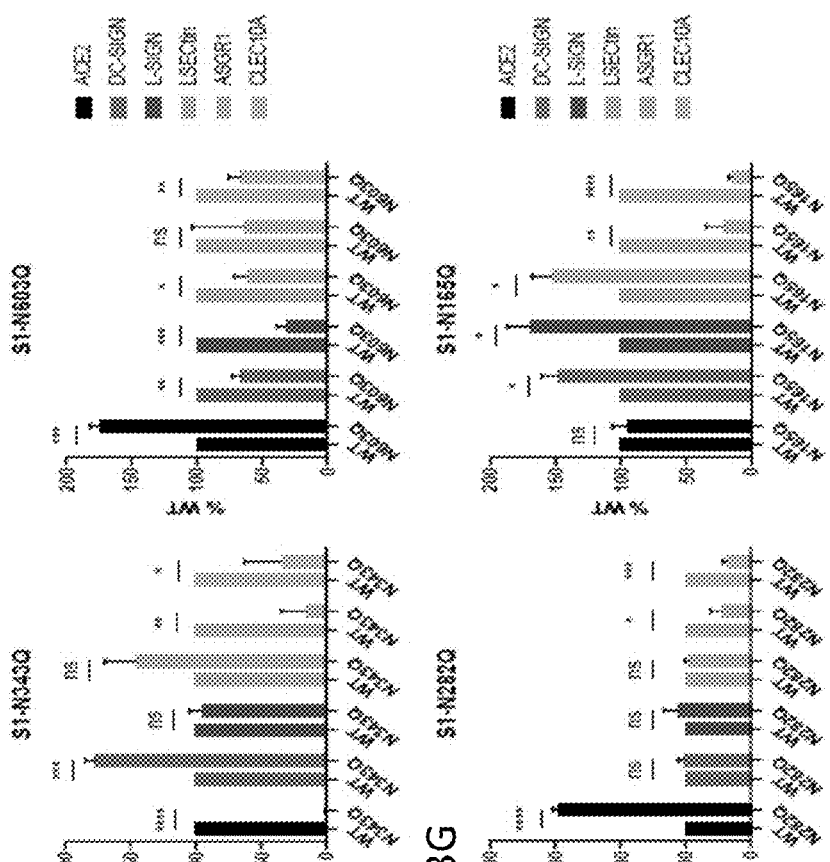
Figure 3H:
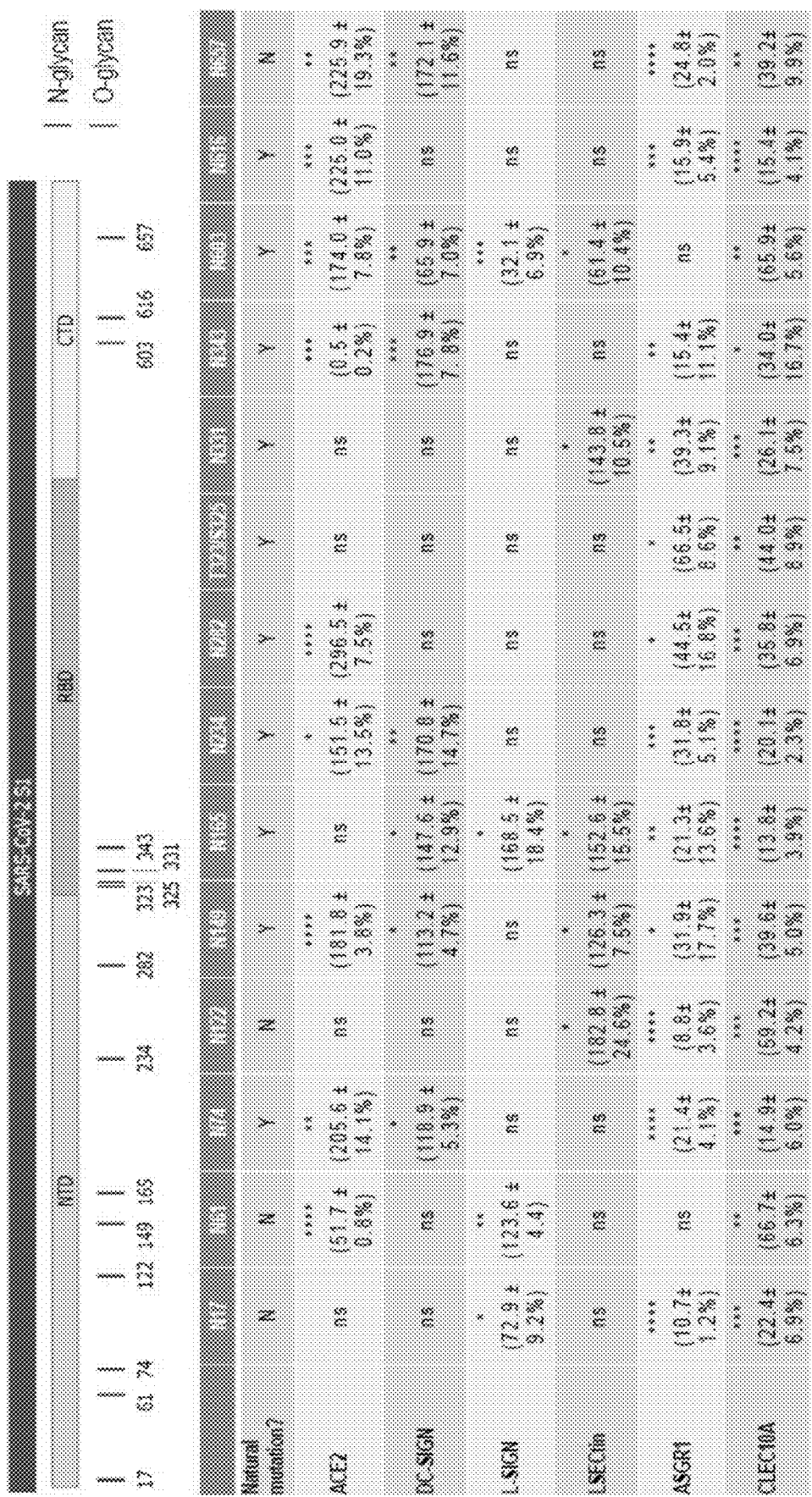

The site-specific Swiss-Model homology model based on PDBID 6VSB (Grant et al., 2020) was used in FIG. 3E. Structures of the glycans attached at each glycosylation site are based on the mass spectrometry data (Watanabe et al., 2020). N343 FA2, N603 M5, N165 FA2, and N282 FA2B glycans (glycan naming system from (Watanabe et al., 2020)) are shown as atom-type colored space-filling models, with carbons colored blue for N-acetyl-glucosamine, green for mannose and red for fucose moieties. The position of the bound human ACE2 N-terminal peptidase domain was modeled using the structure of the complex (PDBID 6M0J) (Lan et al., 2020).

Bioinformatics Analysis of the COVID-19 Bronchoalveolar Lavage Fluid (BALF) Dataset Detection of SARS-CoV-2 expression. The single-cell RNA-seq raw data was collected from the Gene Expression Omnibus (GEO) database through the accession number GSE145926 (https://www.ncbi.nlm.nih.gov/geo/query/acc.cgi?acc=GSE15078) The SARS-CoV-2 and human reference genome were downloaded from the viruSITE website (http://wwvv.virusite.org/archive/2020.2/genomes.fasta.zip) and Ensembl database (https://www.ensembl.org/info/data/ftp/index.html). The computational framework of Vitaltrack (Bost et al., 2020) was applied to detect SARS-CoV-2 RNA reads in each cell with default parameters.

Data quality control. The following criteria were applied to filter all the cells: gene number between 200 and 6,000, UMI count>1,000, and mitochondrial gene percentage <10%. After filtering, a total of 37,308 cells were left for the downstream analysis.

Dimensionality reduction. The filtered gene barcode matrix was first normalized and logarithmic converted using 'normalized_total' and 'log 1p' methods in the preprocess function of scanpy (github.com/theislab/scanpy). The top 2,000 highly variable genes were then identified using the 'highly_variable_genes' function. PCA was performed on the gene expression of these 2,000 genes. BBKNN (Batch balanced k-nearest neighbors) was performed on the low dimension data to compute the weighted adjacency matrix that removed the batch effect to describe the distance between cells. Then UMAP was performed on the matrix for visualization.

Statistical analysis. To determine SARS-CoV-2 infection, the number of infected cells, the intersection of infected cells, and the positive cells of the indicated gene were calculated. The hypergeometric test was adopted to calculate the p-value of the enrichment of SARS-CoV-2 to selected cells on the last step. 'rank_genes_groups' in scanpy tools function was invoked to perform differential gene expression analysis. For each set of selected cells, DEGs (differential expression genes) of infected cells and uninfected cells were calculated using the 'rank_genes_groups' method, parameter 'n_genes' is set to the number of all genes, with other parameters using the default value. A gene was considered significant with a p-value<0.05. Pathway enrichment bubble plots were generated using the BiNGO Application (Maere et al., 2005) and Cytoscape (Shannon et al., 2003).

Statistical Analysis of Non-scRNAseg Data

Student's t test was applied for statistical analysis in GraphPad Prism 8. P values were calculated and reported as follows: ns, not significant; *, p<0.05; , p<0.01; *, p<0.001, ****, p<0.0001. The error bars in each figure represent standard error of the mean (SEM).

The experimental results are now described

C-Type Lectins and TTYH2 Interact with SARS-CoV-2 S Protein

Figure 1C:
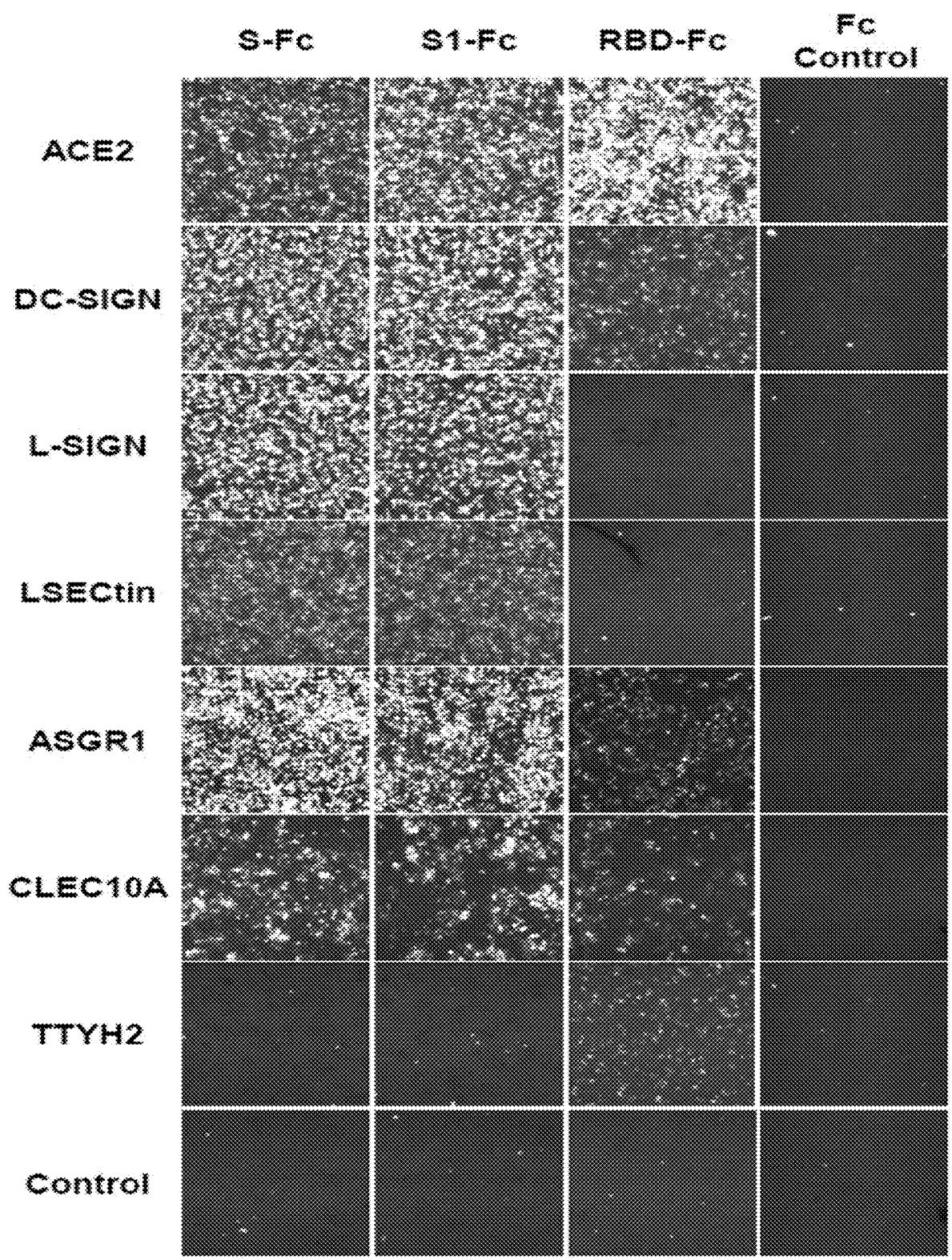
Figure 1D:
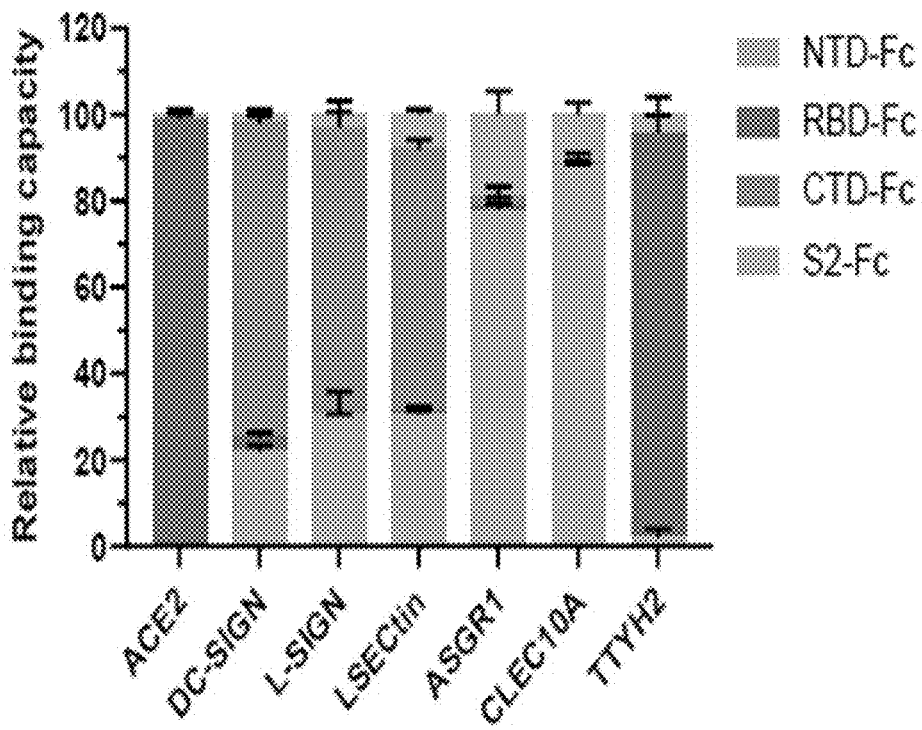
Figure 1E:
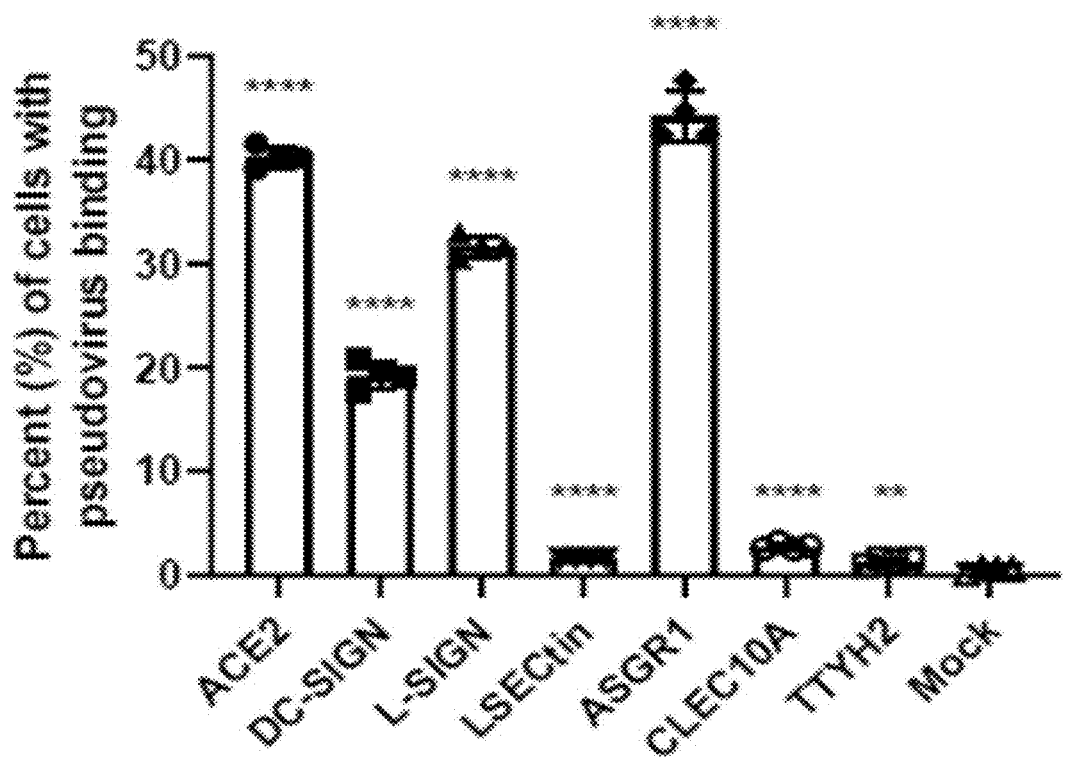
Figure 2D:
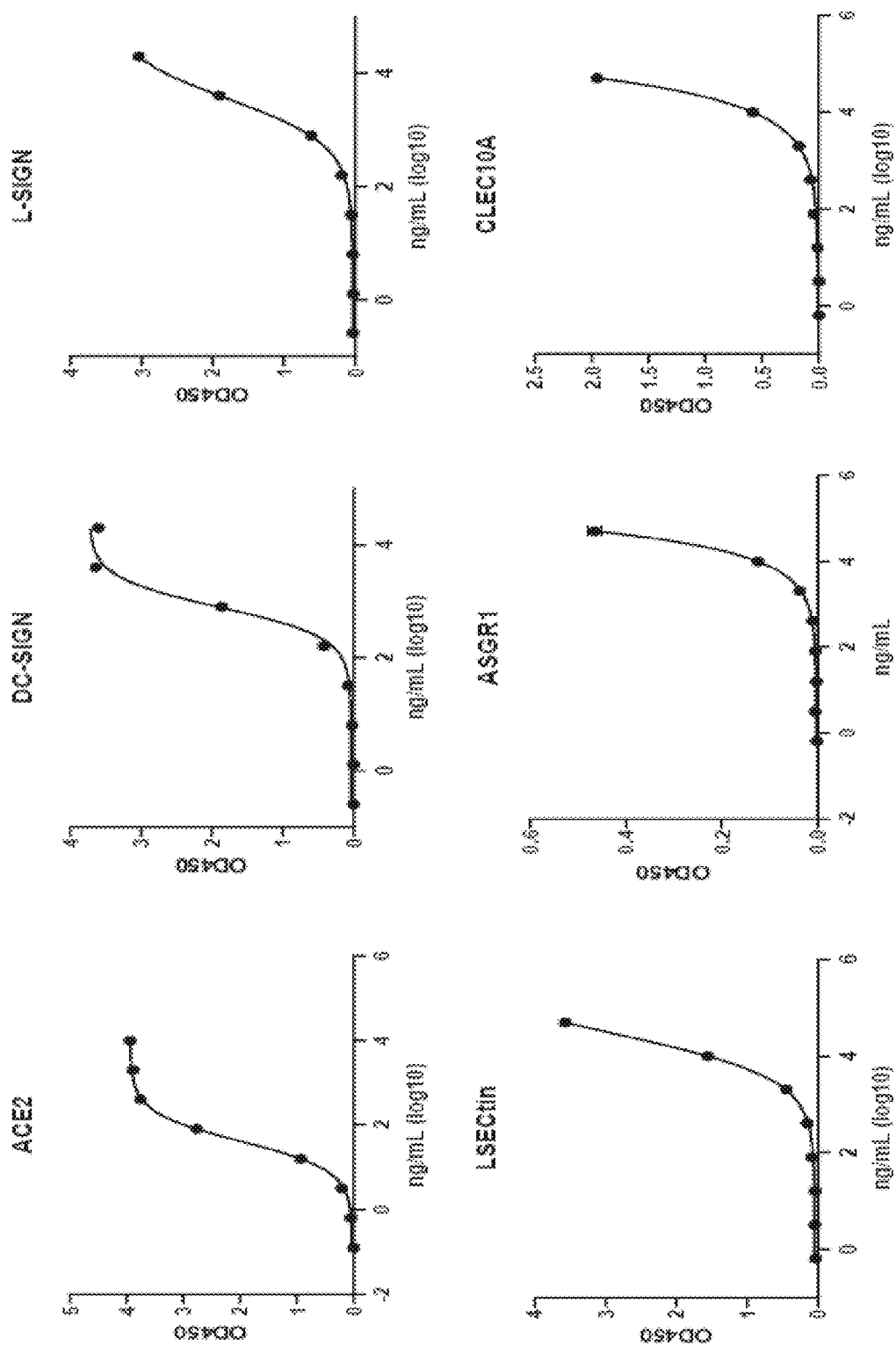

To identify novel myeloid-cell associated receptors for SARS-CoV-2, a human cDNA overexpression library of ~300 host membrane proteins that are preferentially expressed in myeloid cells, (i.e., monocyte, macrophage, and dendritic cell populations) was assembled. Human immunoglobulin Fc-tagged SARS-CoV-2 S, S1, and RBD recombinant proteins produced by mammalian cells were used and their ability to bind to HEK293T cells transfected with individual cDNA was tested (FIG. 1A). ACE2 and Fc receptors served as the positive controls in this assay. Through this myeloid cell receptor discovery approach, six proteins were identified that interact with SARS-CoV-2 S protein or its subunits, including five C-type lectins (DC-SIGN, L-SIGN, LSECtin, ASGR1, and CLEC10A) and TTYH2 (FIG. 1). All six candidate genes were expressed at comparable levels as ACE2 (FIG. 2A). In contrast to ACE2, which strongly bound to RBD-Fc, S-Fc, and S1-Fc, C-type lectins primarily interacted with S-Fc and S1-Fc, with weak or no binding to RBD-Fc (FIG. 1C). These data suggest that C-type lectins likely interact with SARS-CoV-2 S protein via non-RBD epitopes (e.g., the N-terminal domain (NTD) and the C-terminal domain (CTD)) within the S1 region. TTYH2 interacted weakly with RBD-Fc but not with S-Fc or S1-Fc (FIG. 1C). To map the interaction domain, recombinant NTD-Fc, RBD-Fc, CTD-Fc, and S2-Fc proteins were generated. Consistent with the screening results, DC-SIGN, L-SIGN, and LSECtin predominantly associated with CTD-Fc and, to a lesser extent, with NTD-Fc, ASGR1 and CLEC10A mainly interact with NTD-Fc, whereas ACE2 and TTYH2 primarily bound to RBD-Fc (FIG. 1D and FIG. 2B). As SARS-CoV-2 S protein forms a trimer on virions (Walls et al., 2020), lentiviruses pseudotyped with SARS-CoV-2 S protein (Crawford et al., 2020) was used to validate these interactions. SARS-CoV-2 pseudovirus bound nicely to HEK293T cells overexpressing ACE2, DC-SIGN, L-SIGN or ASGR1 and exhibited weaker but significant binding to HEK293 cells expressing LSECtin, CLEC10A or TTYH2 (FIG. 1E and FIG. 2C). Finally, the relative protein-protein binding of the S1 subunit from SARS-CoV-2 to the recombinant receptor ectodomains was assessed by an enzyme-linked immunosorbent assay (ELISA), except for TTYH2, which has multiple extracellular domains. Although DC-SIGN, L-SIGN and ASGR1 showed similar binding capacity to SARS-CoV-2 pseudovirus as ACE2 (FIG. 1E), DC-SIGN/L-SIGN/ASGR1-Fc did not bind to S1 with the same strength as ACE2-Fc by ELISA (FIG. 2D), consistent with the noteworthy lower mean fluorescent intensity (MFI) when SARS-CoV-2 pseudovirus bound to the three receptors, compared to ACE2 (FIG. 2C). Collectively, the results provide evidence that DC-SIGN, L-SIGN, LSECtin, ASGR1, CLEC10A, and TTYH2 can bind to SARS-CoV-2 S protein and mediate pseudovirus attachment to cells.

C-Type Lectins Bind to SARS-CoV-2 S Protein Via Distinct Residues from ACE2 and TTYH2

Figure 4A:
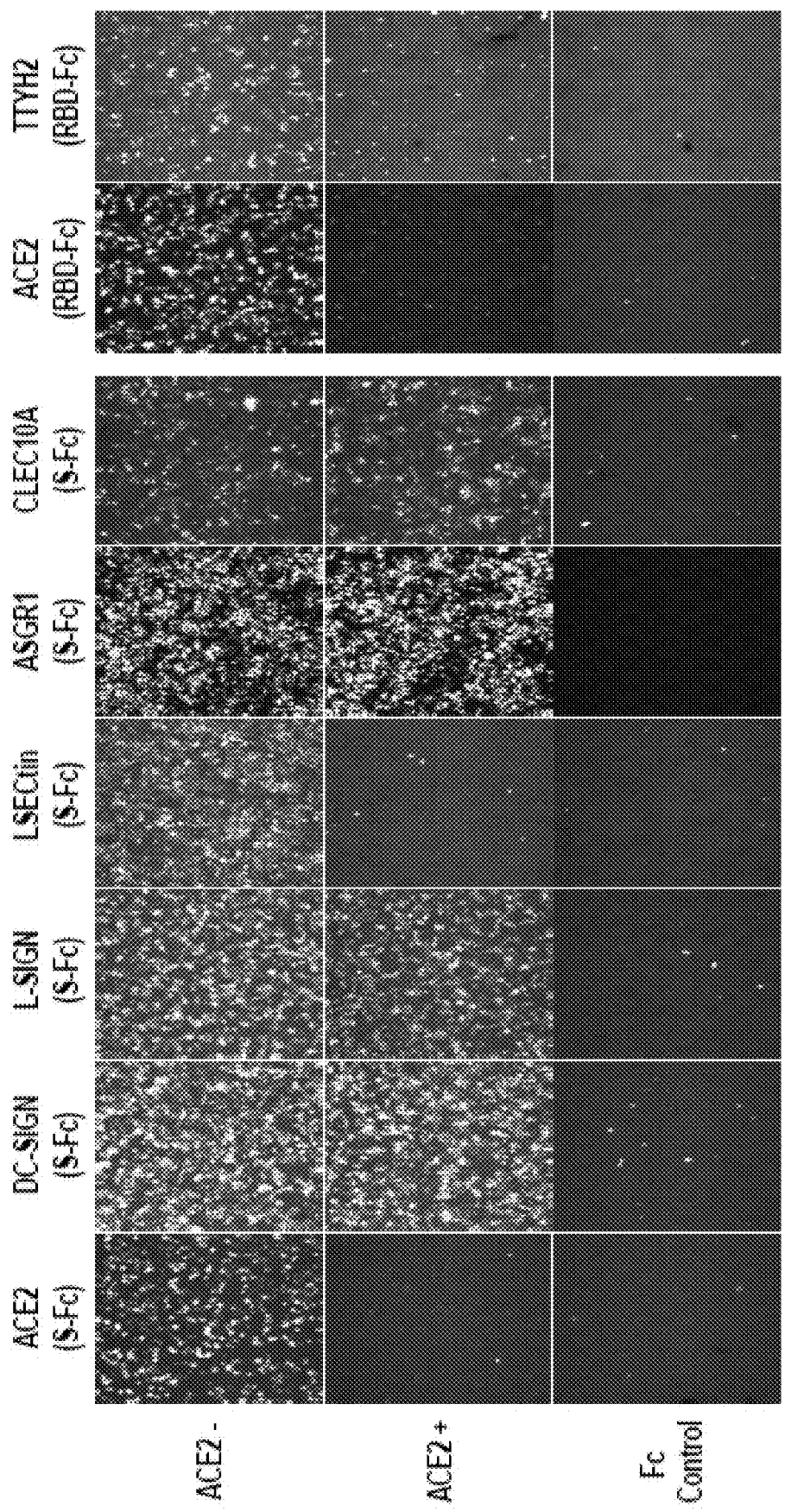
FIG. 4A through FIG. 4D depict exemplary experimental results demonstrating the characterization of SARS-CoV-2 interactions.
Figure 4B:
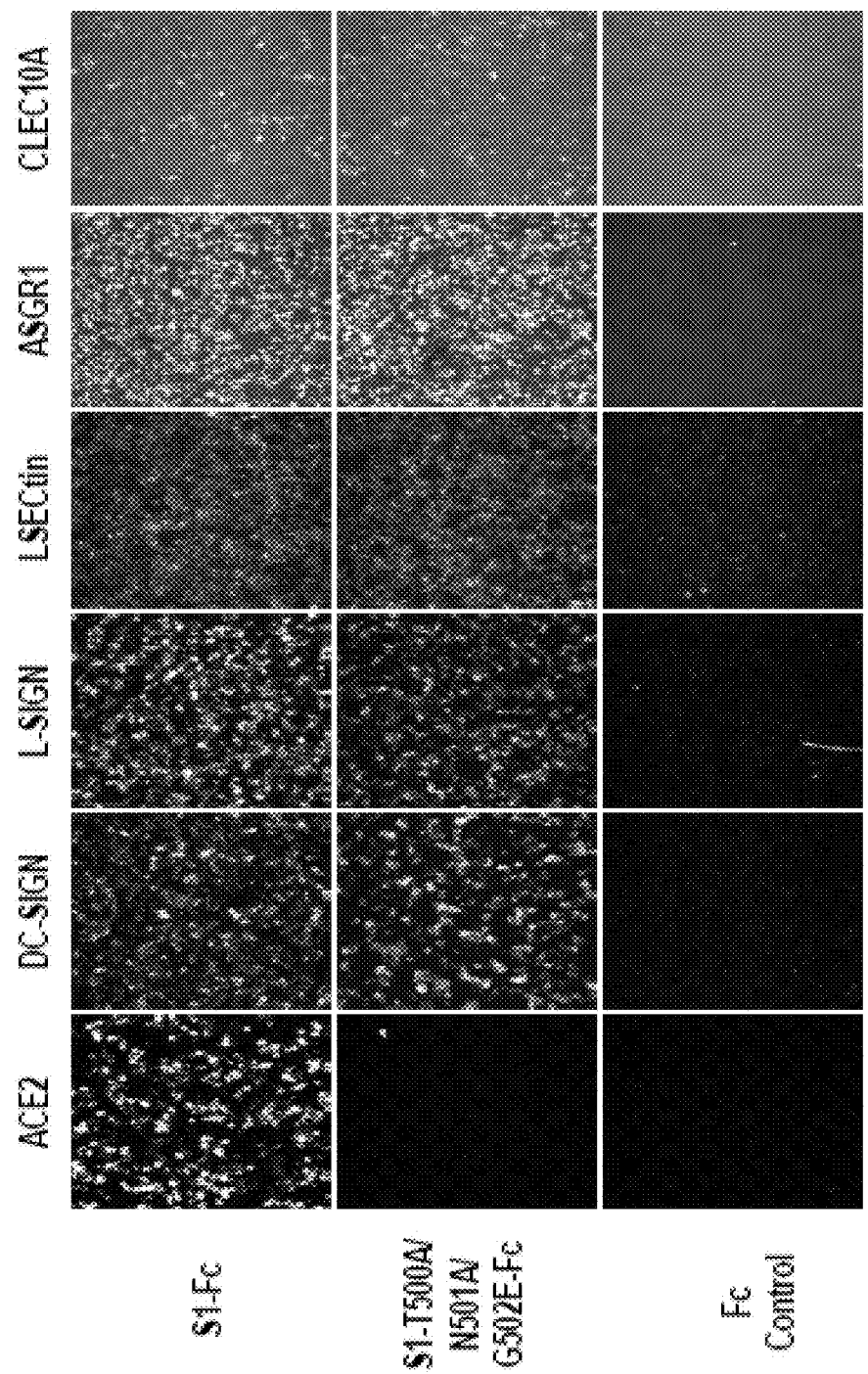

Next, the interaction interfaces of SARS-CoV-2 S protein with newly identified myeloid receptors in comparison with ACE2 was characterized in detail. As expected, pre-incubation of His-tagged soluble ectodomain of ACE2 recombinant protein (ACE2-His) with S-Fc or RBD-Fc completely blocked ACE2 binding (FIG. 3A and FIG. 4A). In addition, soluble ACE2-His blocked the binding of RBD-Fc to TTYH2 (FIG. 3A and FIG. 4A), likely due to potentially shared binding motifs between ACE2 and TTYH2 in the RBD. Surprisingly, S protein binding to LSECtin was completely abolished in the presence of pre-bound ACE2-His (FIG. 3A and FIG. 4A), suggesting that LSECtin may associate with an RBD-proximal region of S protein that is sterically hindered upon binding of ACE2. In contrast, other C-type lectins binding to S protein was not affected by soluble ACE2 (FIG. 3A and FIG. 4A). Based on the RBD-ACE2 structure (Shang et al., 2020), an S1-Fc mutant was generated bearing three point mutations in the RBD (T500A/N501A/G502E), resulting in a loss of two hydrogen bonds and an unfavorable interaction between RBD and ACE2 (FIG. 3B). This S1 protein mutant retained the binding capacity to C-type lectins but not to ACE2 (FIG. 3C and FIG. 4B), confirming that the C-type lectin interface is different from that of ACE2.

Figure 4C:
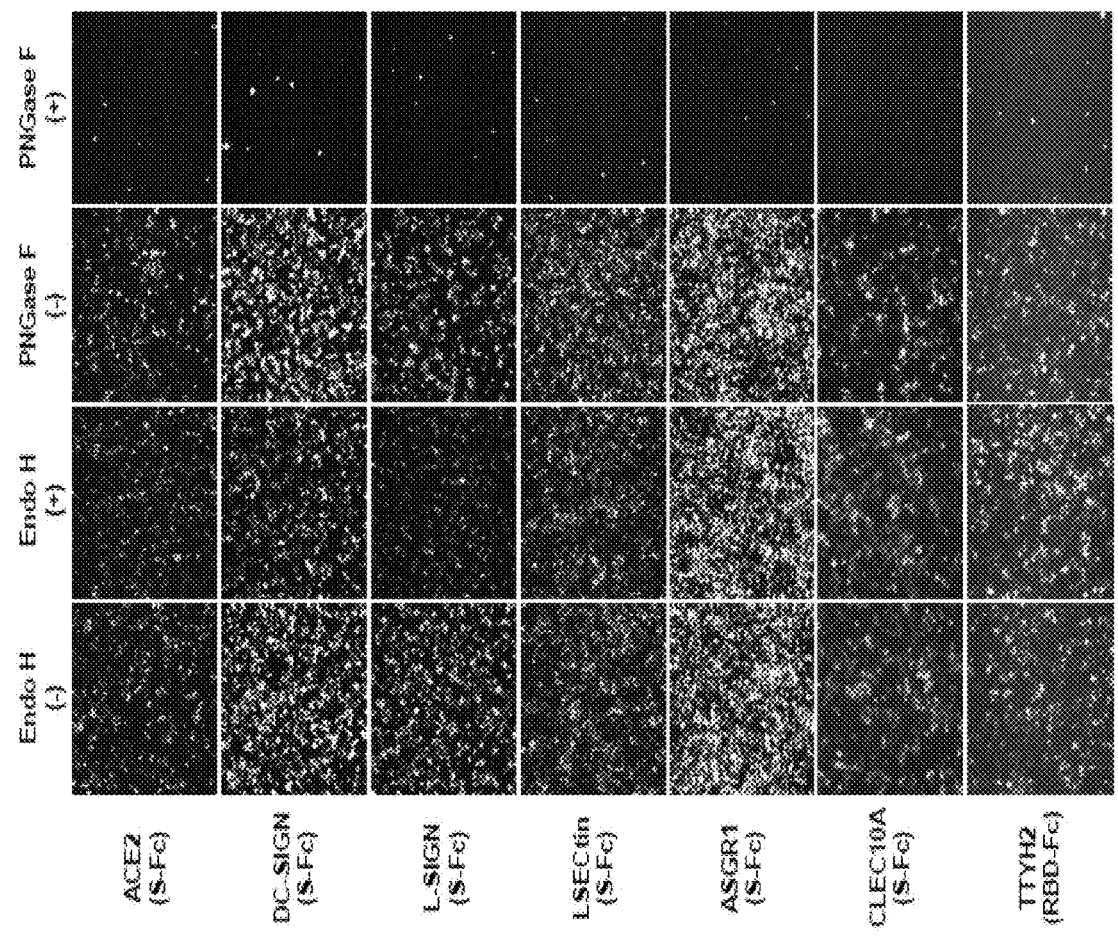
Figure 4C:
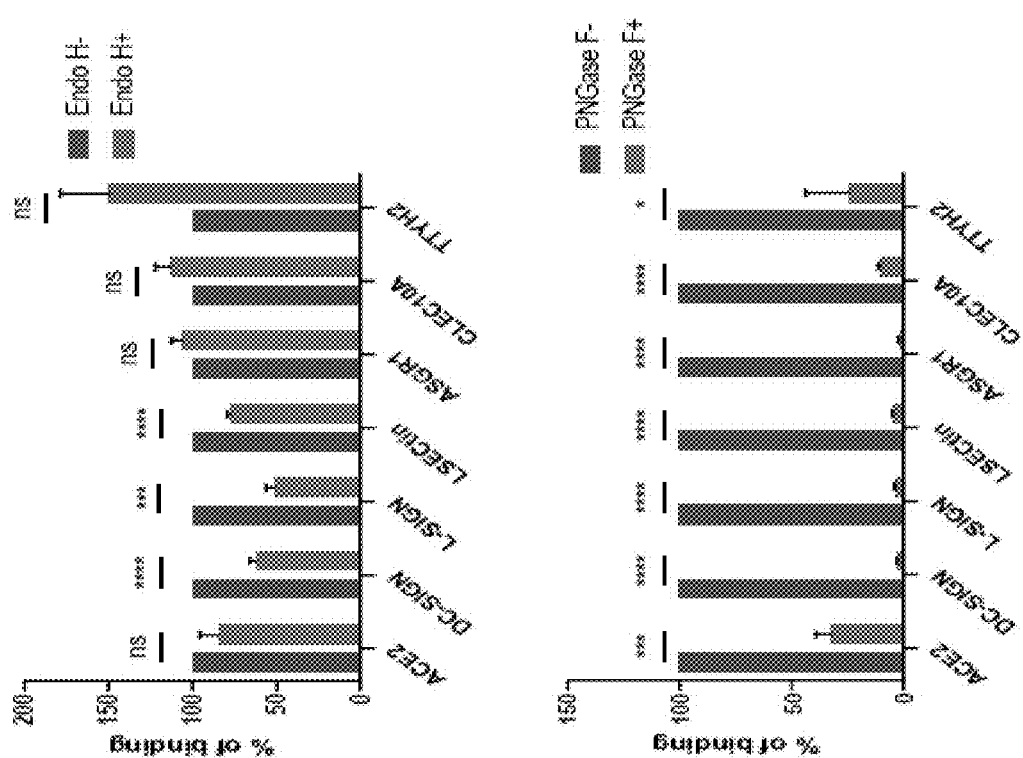
Figure 4D:
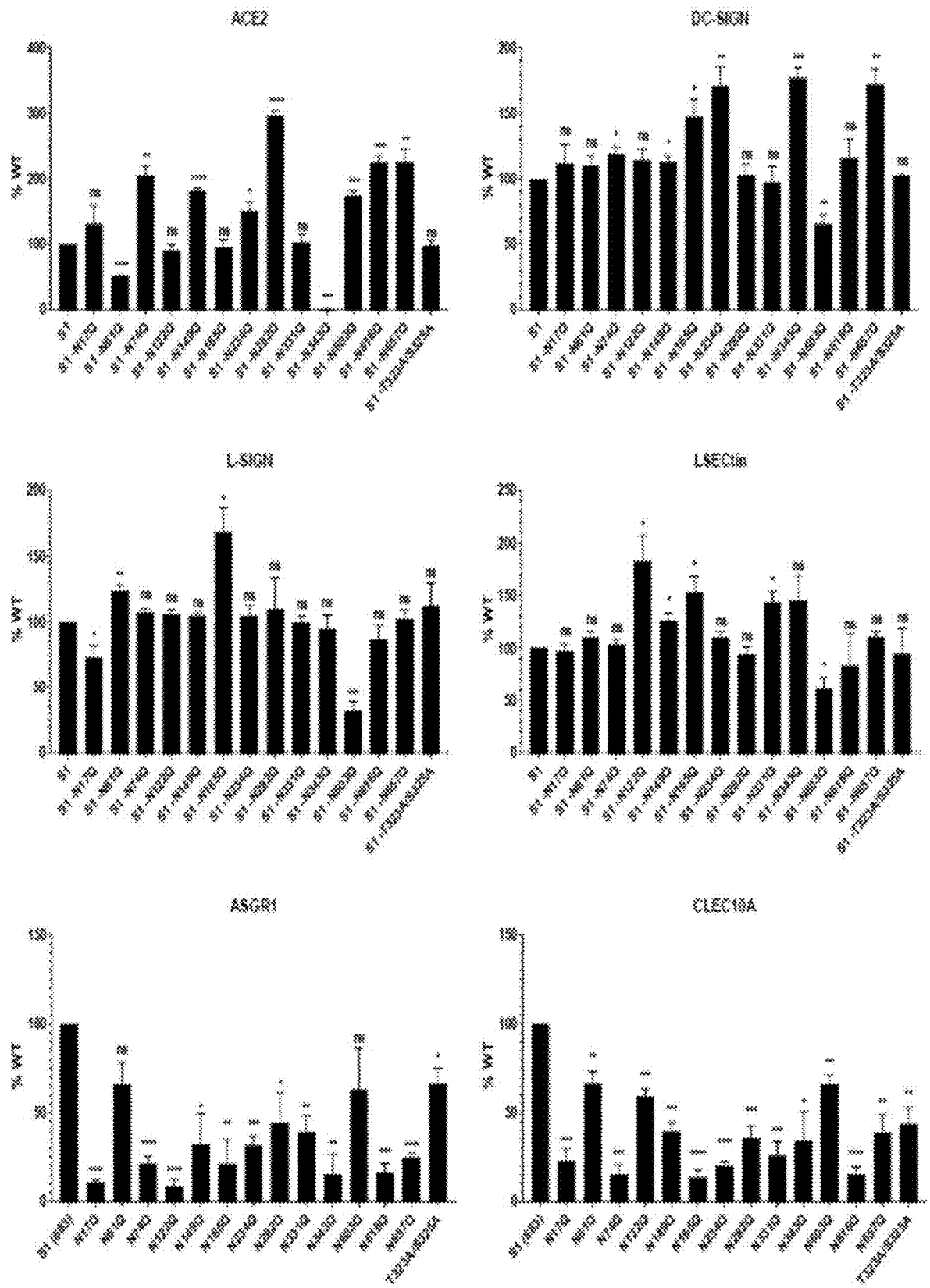

Glycosylation serves as a molecular shield for viruses to reduce immunogenicity, facilitating viral entry and immune escape (Gramberg et al., 2005; Han et al., 2007; Jeffers et al., 2004; Londrigan et al., 2011). HIV gp120, influenza hemagglutinin, Ebola GP protein, and SARS-CoV S protein contain high-mannose glycans, which can be recognized by DC-SIGN and L-SIGN (Alvarez et al., 2002; Pohlmann et al., 2001). SARS-CoV-2 S protein is also heavily glycosylated, with 22 N-linked glycans mainly located outside of the RBD (within the NTD, CTD, and S2), and 2 O-linked glycans in the RBD (Shajahan et al., 2020; Watanabe et al., 2020). Therefore, whether S protein glycosylation is involved in the SARS-CoV-2 cellular receptor binding was tested. It was found that the addition of mannan (a mannose polymer) competitively blocked the binding of S protein to DC-SIGN and L-SIGN but not to LSECtin, ACE2, LSECtin, ACE2ASGR1, CLEC10A or TTYH2 (FIG. 3D). Similarly, endoglycosidase H (Endo H), which exclusively removes the N-glycans in the high-mannose form (Trimble and Maley, 1984), only reduced S protein binding to DC-SIGN and L-SIGN (FIG. 4C). In contrast, treatment of SARS-CoV-2 S protein with peptide:N-glycosidase F (PNGase F), which removes all types of N-linked glycans, significantly reduced S-Fc protein binding to all myeloid cell receptors (FIG. 4C), and unexpectedly, to ACE2, suggesting the involvement of glycans in the interaction with ACE2 and the immune receptors. To pinpoint the specific glycosylated residues responsible for receptor binding, a mutagenesis screen was performed by disrupting the individual 13 N-glycosylation sites and 2 O-glycosylation sites within the S1 subunit. Functional mutants were observed that could be categorized to an inhibitory group (N61 and N343 to ACE2, and N603 to all five C-type lectins) and an enhancing group (N74, N149, N234, N282, N603, N616, and N657 to ACE2, N165 to DC-SIGN/L-SIGN/LSECtin, N234, N343 and N657 to DC-SIGN, and N122 to LSECtin) (FIG. 3E-FIG. 3H and FIG. 4D). Of note, the N343 mutation in the RBD (FIG. 3E) completely abolished ACE2 binding (FIG. 3F and FIG. 4D), which is consistent with a recent report that the N343 mutation led to reduced infectivity (Li, 2020). The N343 mutation also reduced the binding to ASGR1 and CLEC10A, but to a less extent. The N343 mutation had no effects on L-SIGN and LSECtin binding but enhanced the binding to DC-SIGN. Another N603 mutant in the CTD domain (FIG. 3E) had decreased binding to all the C-type lectins, which is opposite to ACE2 (FIG. 3F and FIG. 4D), suggesting that this may be one of the key glycosylation sites supporting C-type lectin binding but interfering with ACE2 interaction. While the N282Q mutation showed the most enhanced (3-fold) binding to ACE2 of all the glycosylation sites, it was observed that the N165Q mutation greatly enhanced the binding to the three C-type lectins binds predominantly to the CTD but not ACE2, ASGR1, and CLEC10A (FIG. 3G and FIG. 4D). In contrast, little effect of O-glycosylation mutation was observed on receptor interactions with S1-Fc, except for ASGR1 and CLEC10A (FIG. 4D). In parallel, over 5,000 genomes of SARS-CoV-2 natural variants documented as of May 2020 (Zhu et al., 2020) were analyzed, which reveal natural mutations at the majority of the N-linked glycosylation sites (FIG. 3H), possibly due to the host selective pressure. Taken together, these findings support a critical role of SARS-CoV-2 S protein N-linked glycosylation in the physical interaction with ACE2 and myeloid cell receptors.

Myeloid Cells from COVID-19 Patients have High C-Type Lectins and TTYH2 Expression and Display Hyper-Inflammatory Responses to SARS-CoV-2

Figure 5A:
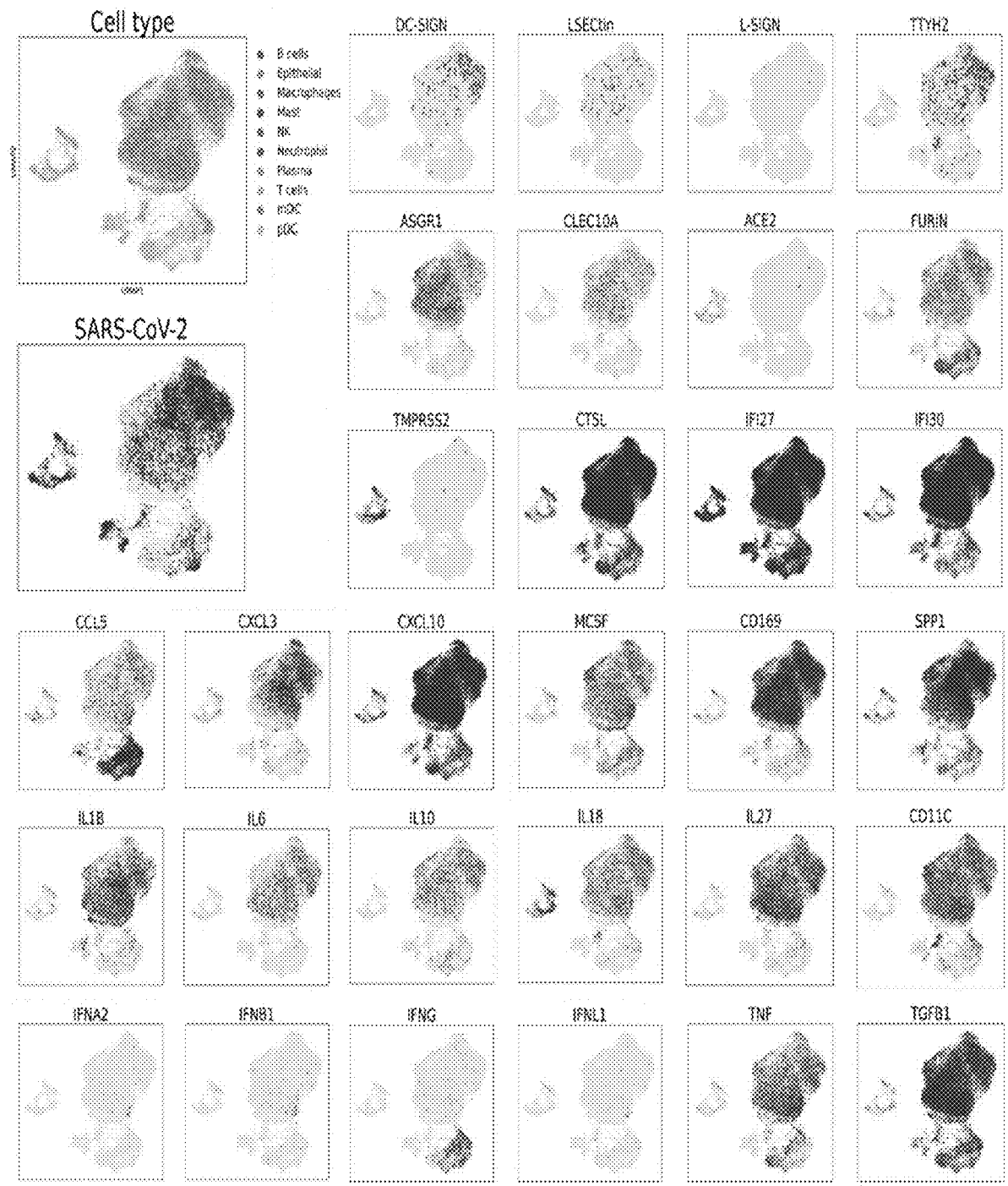
FIG. 5A through FIG. 5D depict exemplary experimental results demonstrating myeloid cell-associated expression of C-type lectins and TTYH2 in COVID-19 patients.
Figure 5B:
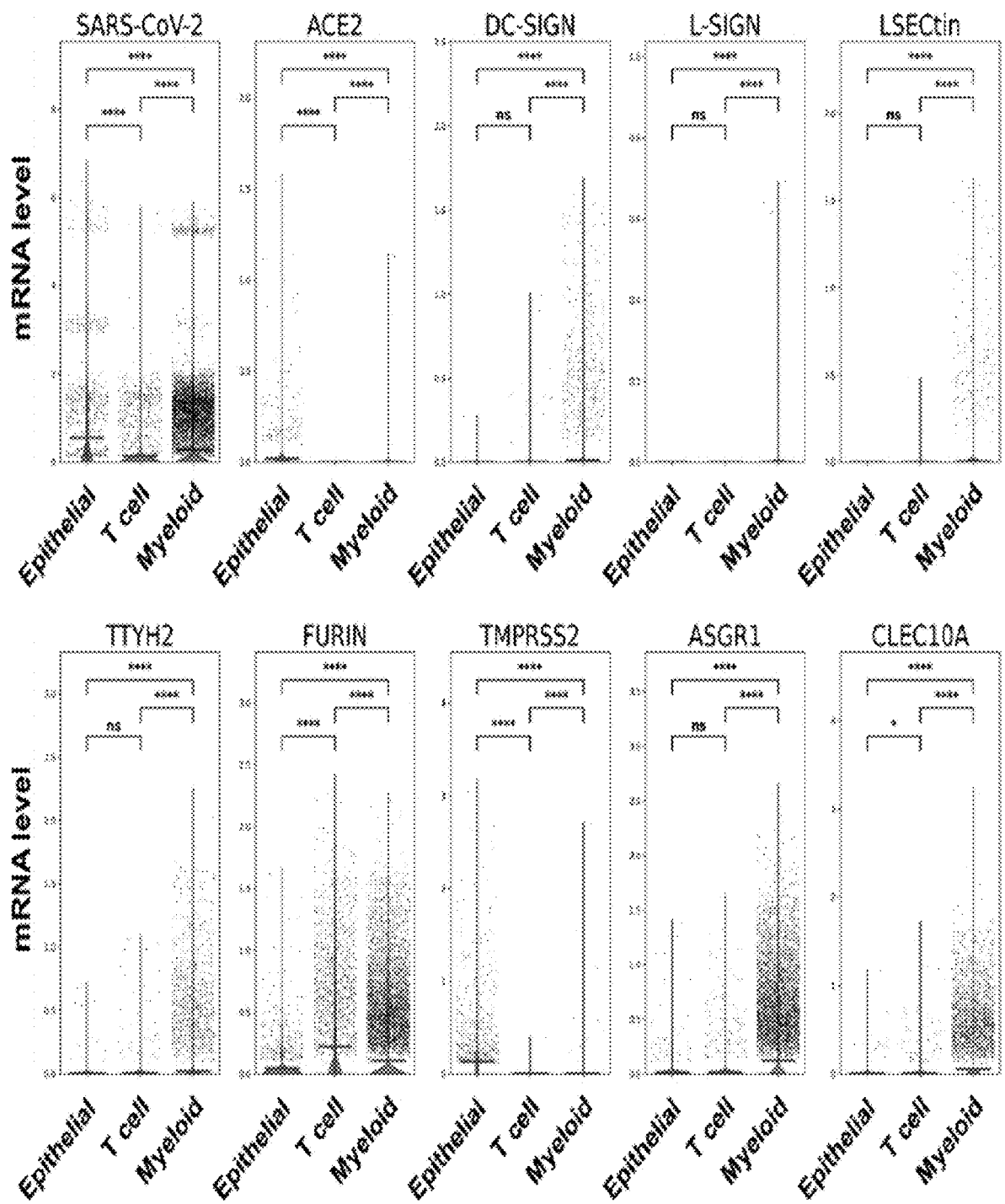
Figure 6D:
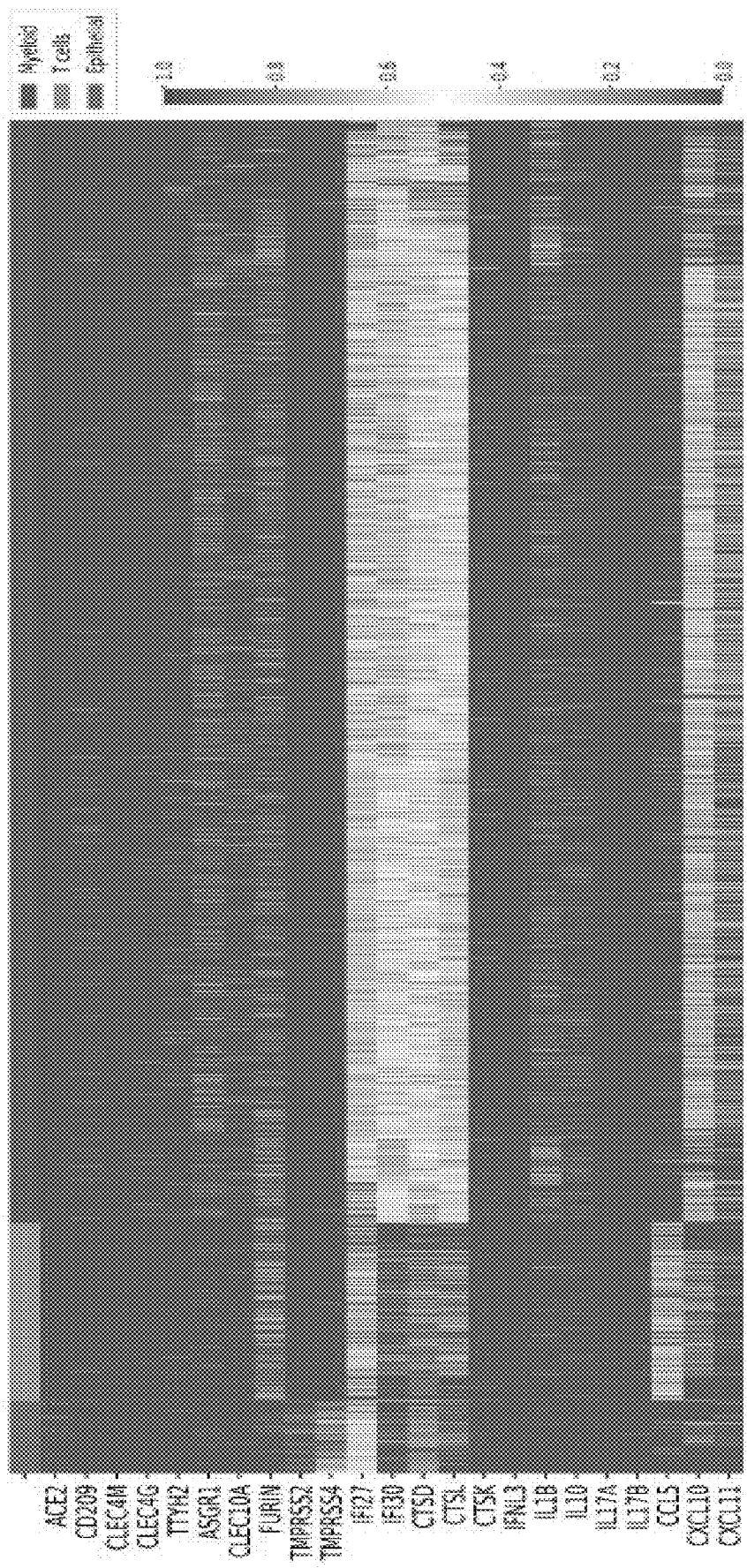

Macrophages and dendritic cells (DCs) are susceptible to SARS-CoV and MERS-CoV infections (Perlman and Dandekar, 2005; Zhou et al., 2014), and SARS-CoV-2 viral genome has been detected in SPP1+ lung macrophages (chen et al., 2020b). Published scRNA-seq data of the bronchoalveolar lavage fluids from severe COVID-19 patients (Bost et al., 2020) was re-analyzed. While SARS-CoV-2 positive cells account for 22% of all cell populations, cells expressing ACE2, the C-type lectins, and/or TTYH2 associate with a more likelihood of virus infection (51% for ACE2, 40% for DC-SIGN, 67% for L-SIGN, 33% for LSECtin, 26% for ASGR1, 27% for CLEC10A, and 42% for TTYH2) (FIG. 6A). The presence of SARS-CoV-2 viral RNA in the myeloid cell lineages (SPP1+, CD169+, CD11C+) was also verified and a positive correlation was found with enriched expression levels of DC-SIGN, LSECtin, ASGR1, CLEC10A, and TTYH2 (FIG. 5A), all of which are highly expressed in myeloid cells (macrophages and DCs), in contrast to ACE2 (FIG. 5A and FIG. 5B). Although the expression level of L-SIGN in the scRNA-seq was low, its expression was confirmed on peripheral blood mononuclear cell (PBMC)-derived DCs myeloid cells by flow cytometry (FIG. 6B). Expectedly, no ACE2 expression was observed in those myeloid cells (FIG. 6C).

Figure 5C:
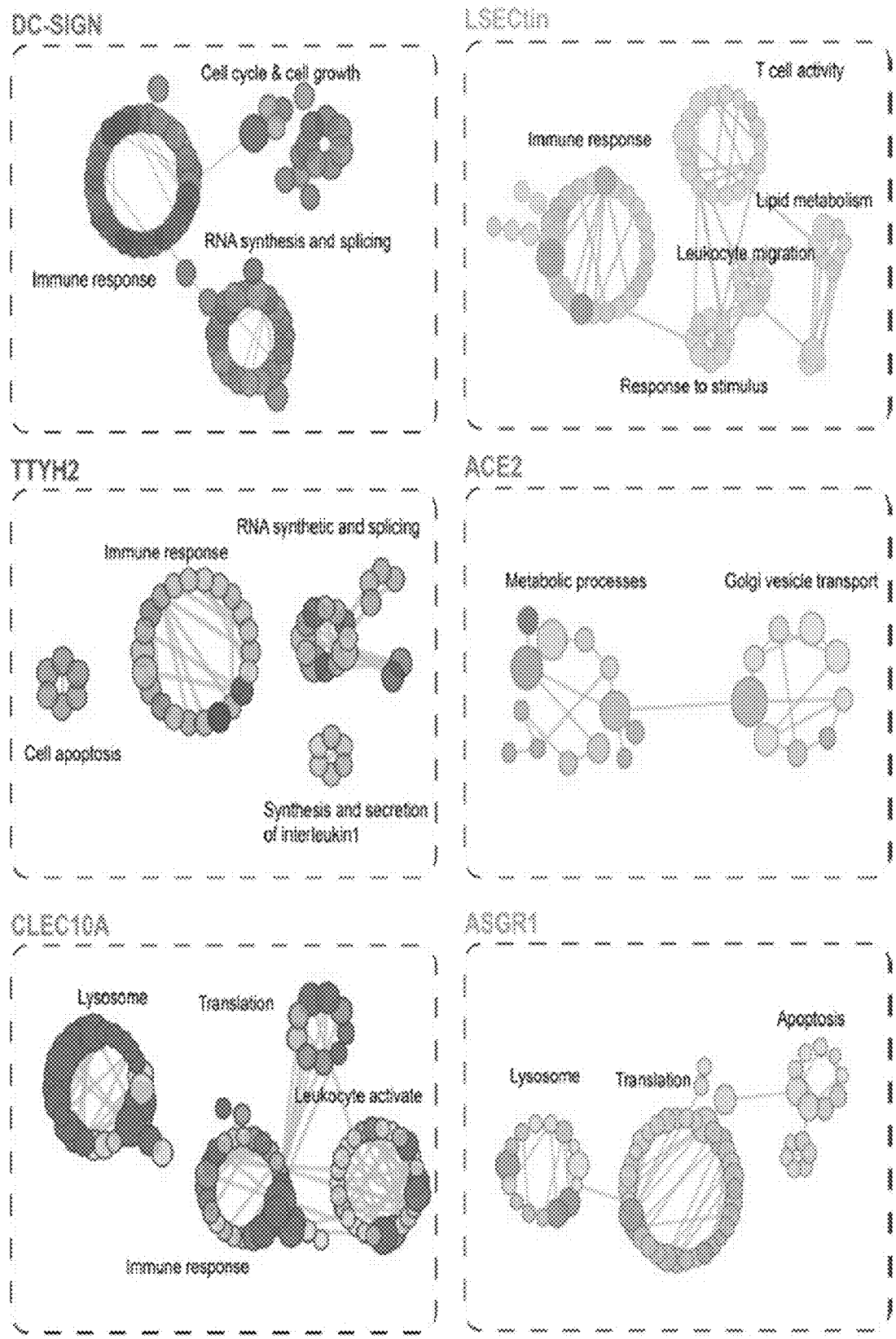
Figure 5D:
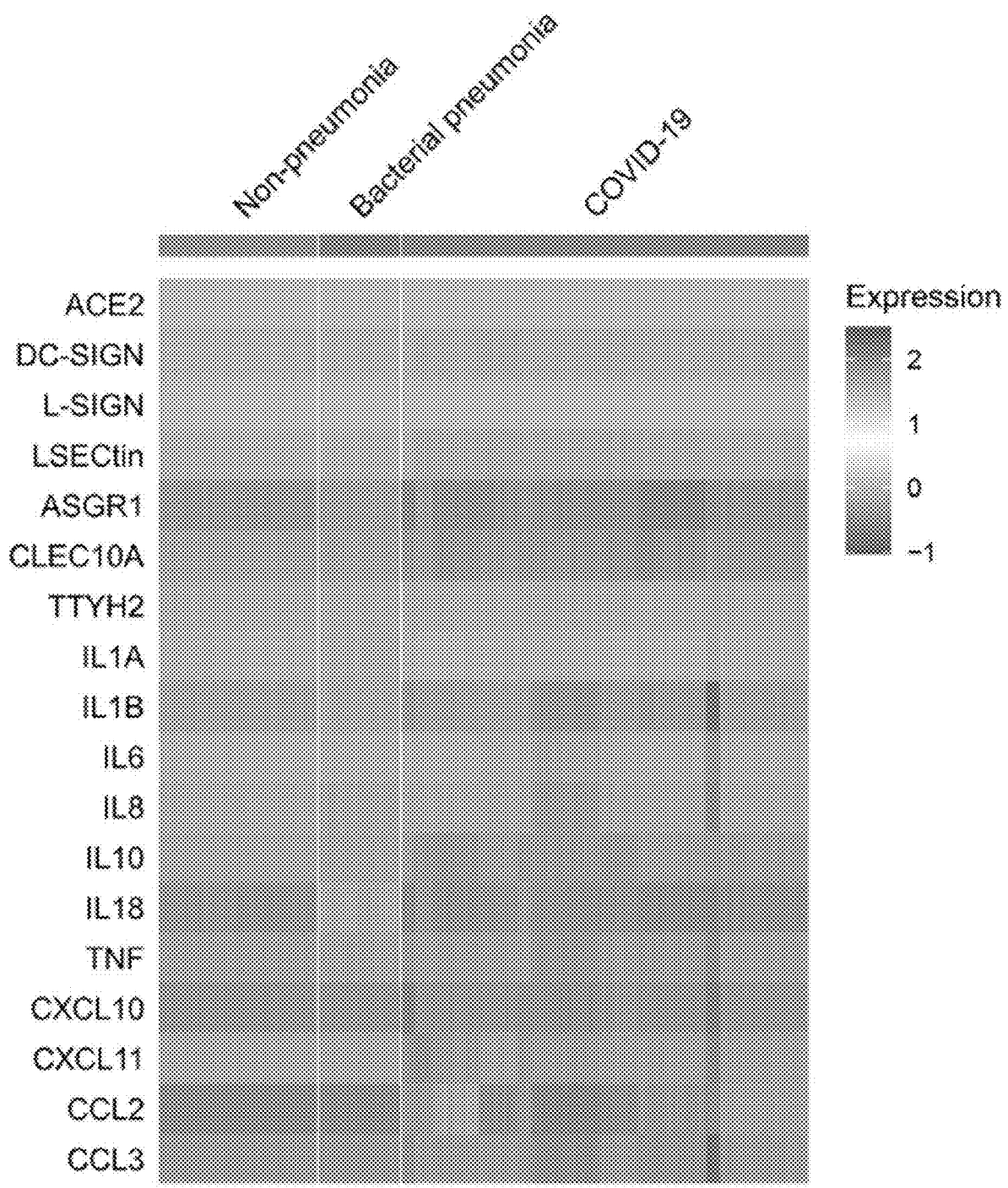

Other than viral attachment factors, host furin protease and cysteine proteases were expressed in myeloid cells (FIG. 5A and FIG. 5B). In contrast, TMPRSS2 and TMPRSS4, similar to ACE2, were restricted to epithelial cells (FIG. 5A, FIG. 5B, and FIG. 6D), implying a distinct viral entry pathway in myeloid cells than in epithelial cells. Moreover, it was found that immune receptor-expressing myeloid cells are associated with low levels of type I/III interferons (IFN) but high levels of cytokines and chemokines, such as IL-6, CXCL10, CCL5, IL-1B, IL-18, and TNF, as well as IFN stimulated genes with possible antiviral activity (IFI27, IFI30) (FIG. 5A and FIG. 6D), providing a possible clue to the origin of immune hyperactivation and the source of the "cytokine storm" seen in COVID-19 patients. Gene ontology pathway analysis revealed that, unlike in ACE2 positive epithelial cells, genes involved in immune responses were enriched in DC-SIGN, L-SIGN, CLEC10A and TTYH2 positive myeloid cells with viral infection compared to those without (FIG. 5C). FIG. 5D depicts the gene expression of myeloid receptors and pro-inflammatory cytokine/chemokines in BAL myeloid cells isolated from individuals without pneumonia and those with bacterial pneumonia and COVID-19.

Figure 6E:
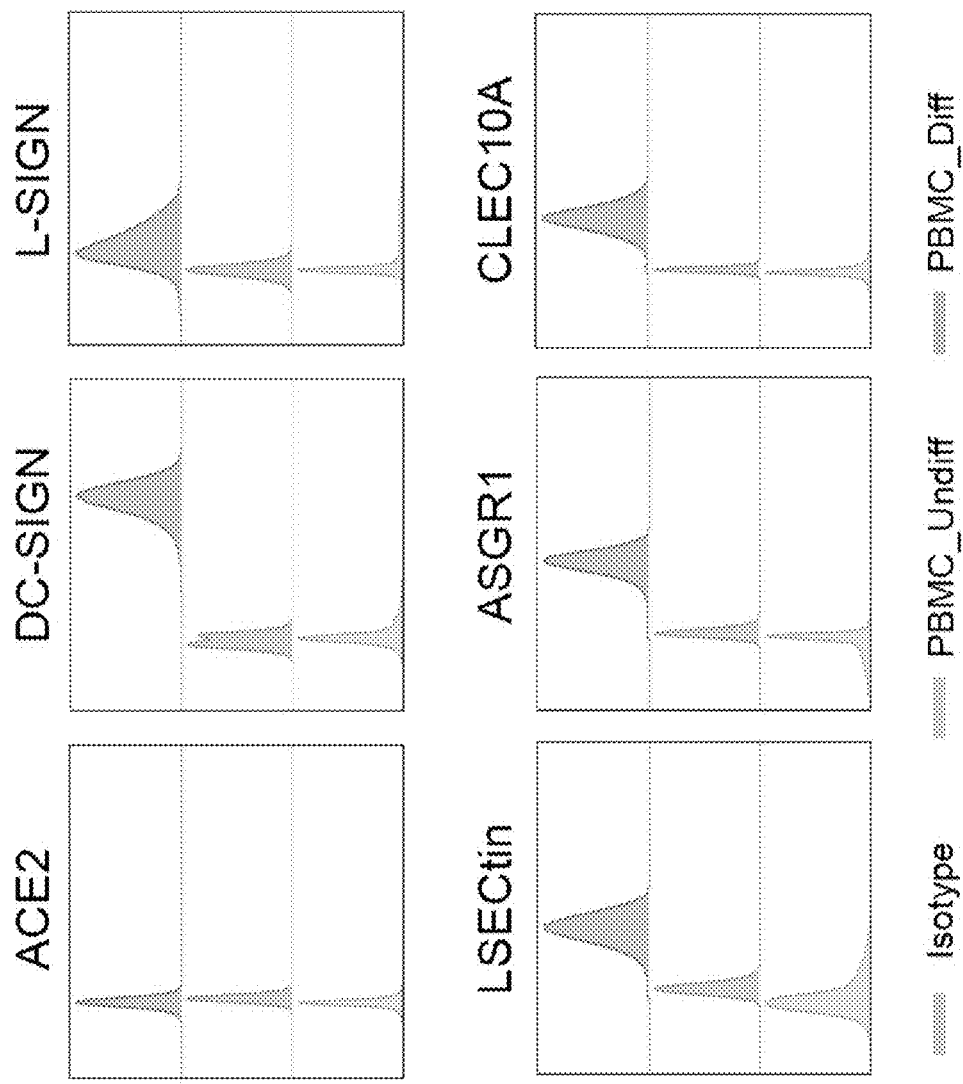

Myeloid Cell Receptors Mediate ACE2-Independent SARS-CoV-2 Virus-Immune Interactions FIG. 6E shows the expression of ACE2, DC-SIGN, L-SIGN, LSECTin, ASGR1, and CLEC10A in undifferentiated PBMC (Undiff) or differentiated PBMC-derived myeloid cells (Diff) isolated from healthy donors.

Figure 6F:
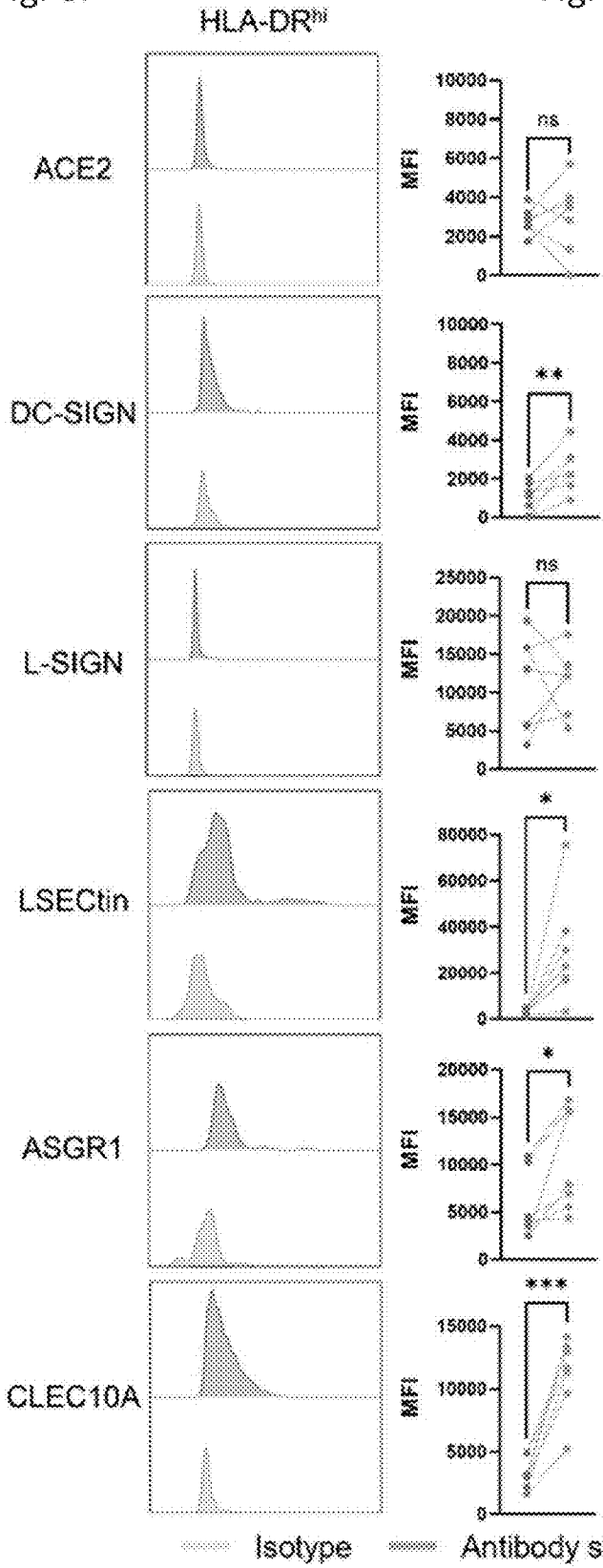
Figure 6G:
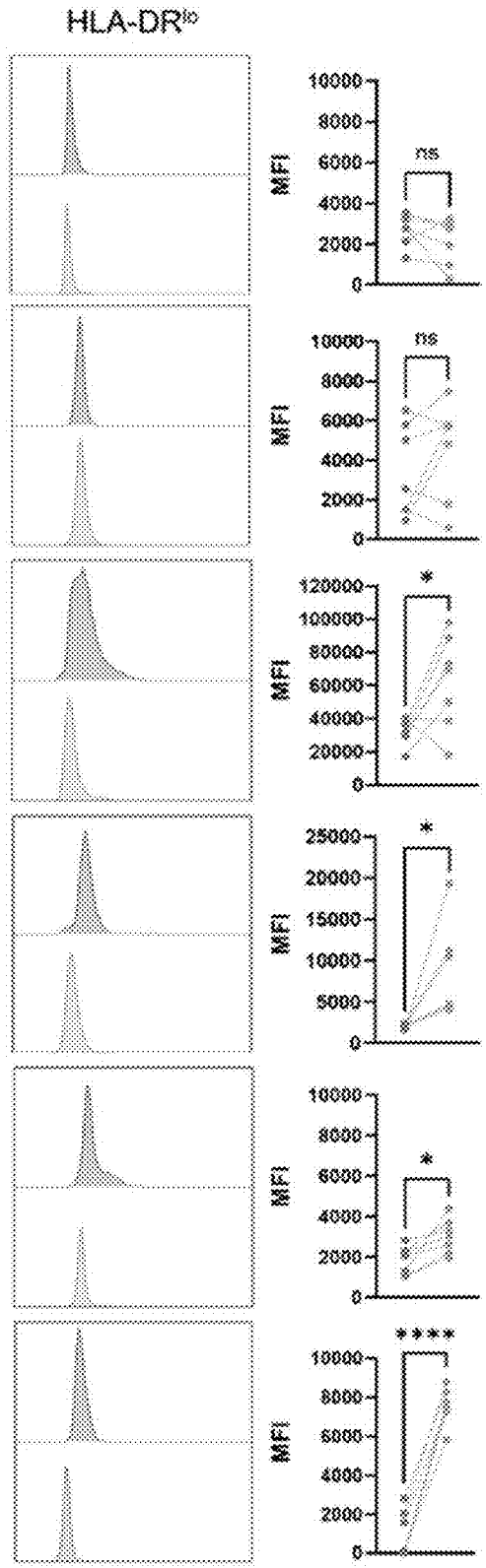

FIG. 6F and FIG. 6G show the expression of ACE2, DC-SIGN, L-SIGN, LSECTin, ASGR1, and CLEC10A in CD45+CD14$^{lo}$CD11c+CD206+ myeloid cells in BAL samples isolated from severe COVID-19 patients.

Figure 6H:
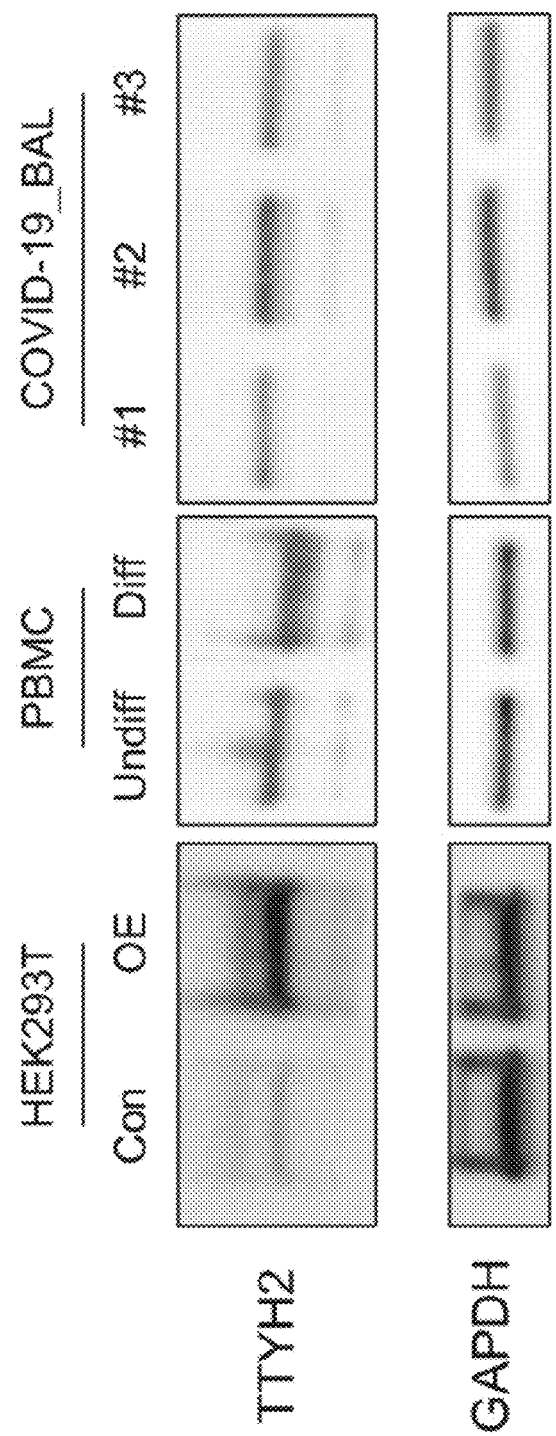

FIG. 6H shows the expression of TTYH2 in PBMC isolated from health donors and myeloid populations in BAL samples isolated from severe COVID19 patients.

Figure 7A:
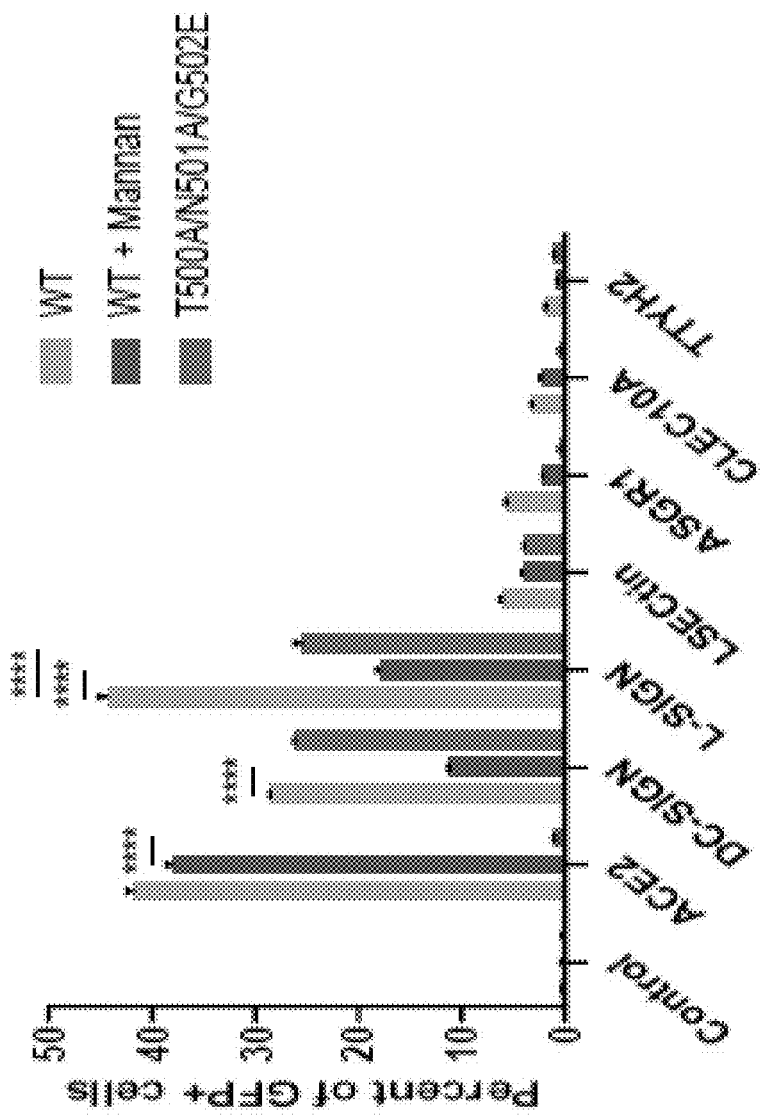
FIG. 7A through FIG. 7E depict exemplary experimental results demonstrating that Myeloid cell receptors mediate ACE2-independent SARS-CoV-2 virus-immune interactions.
Figure 7B:
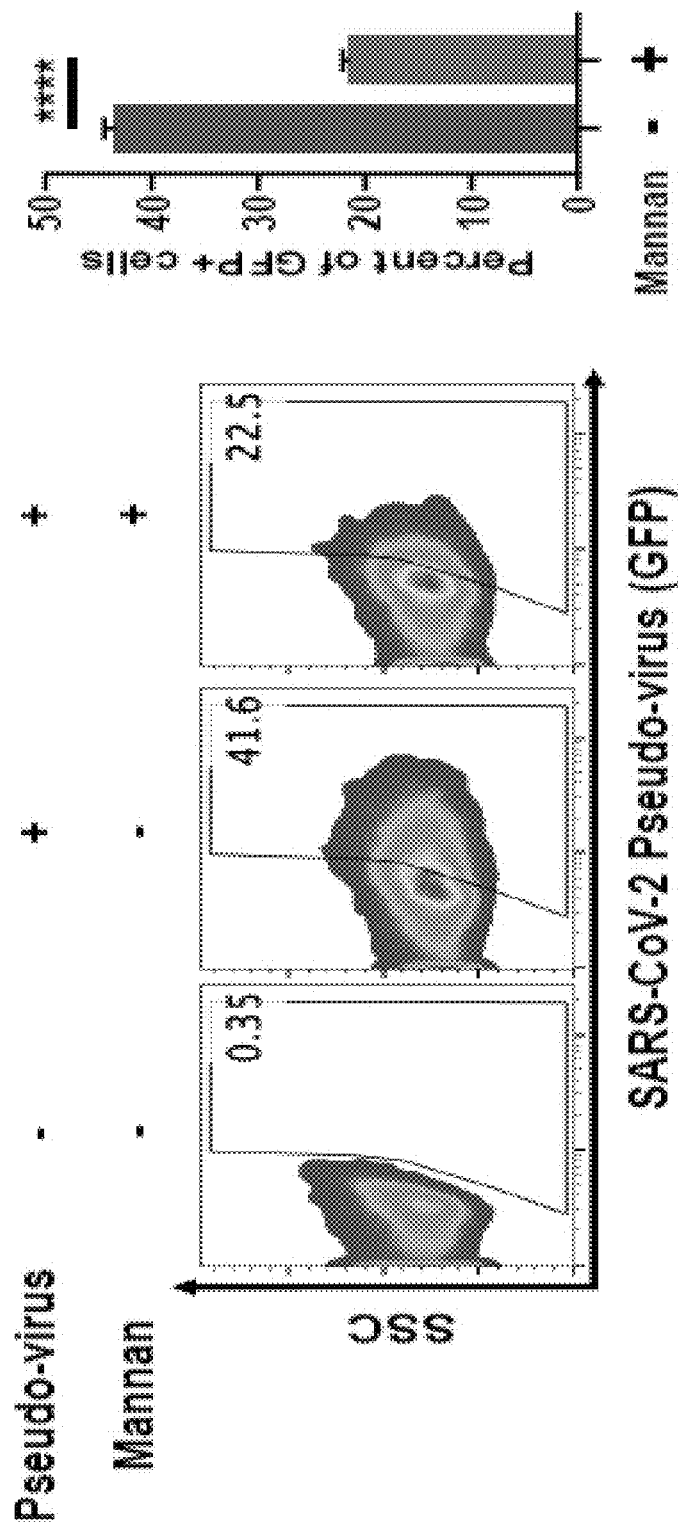
Figure 7C:
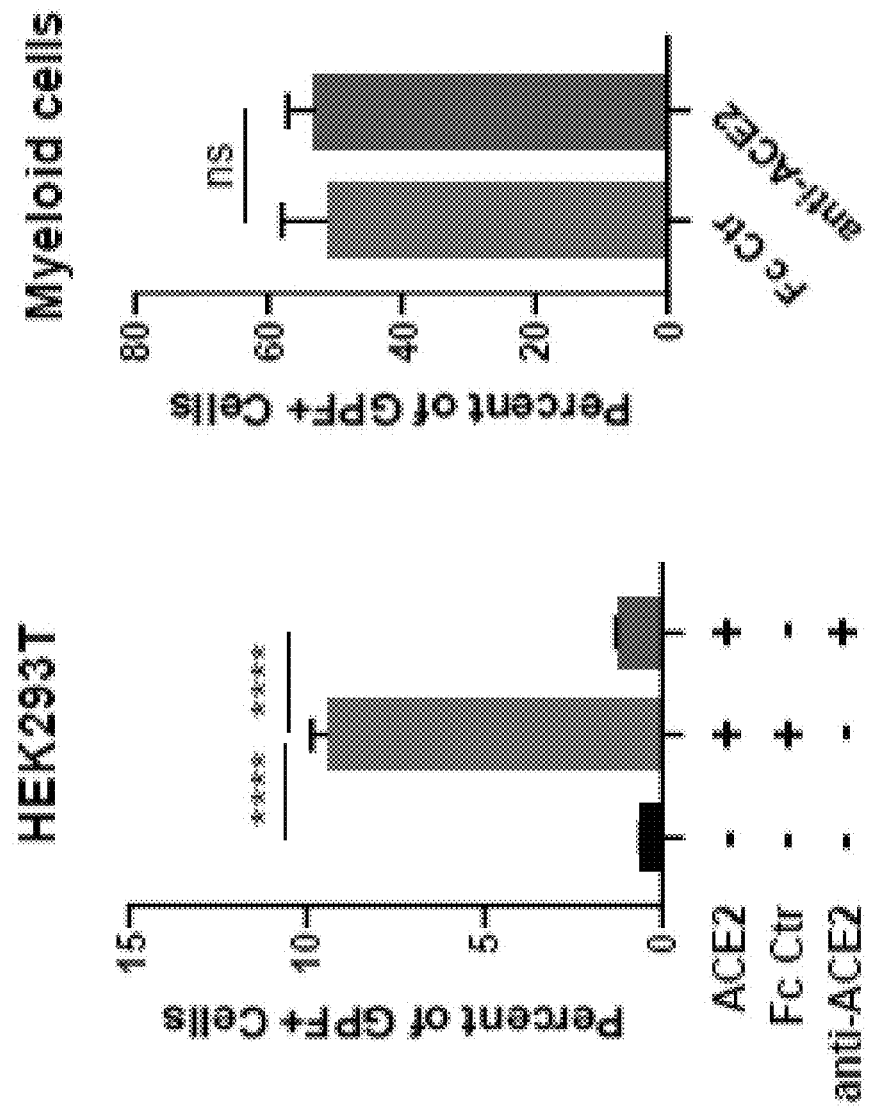
Figure 8A:
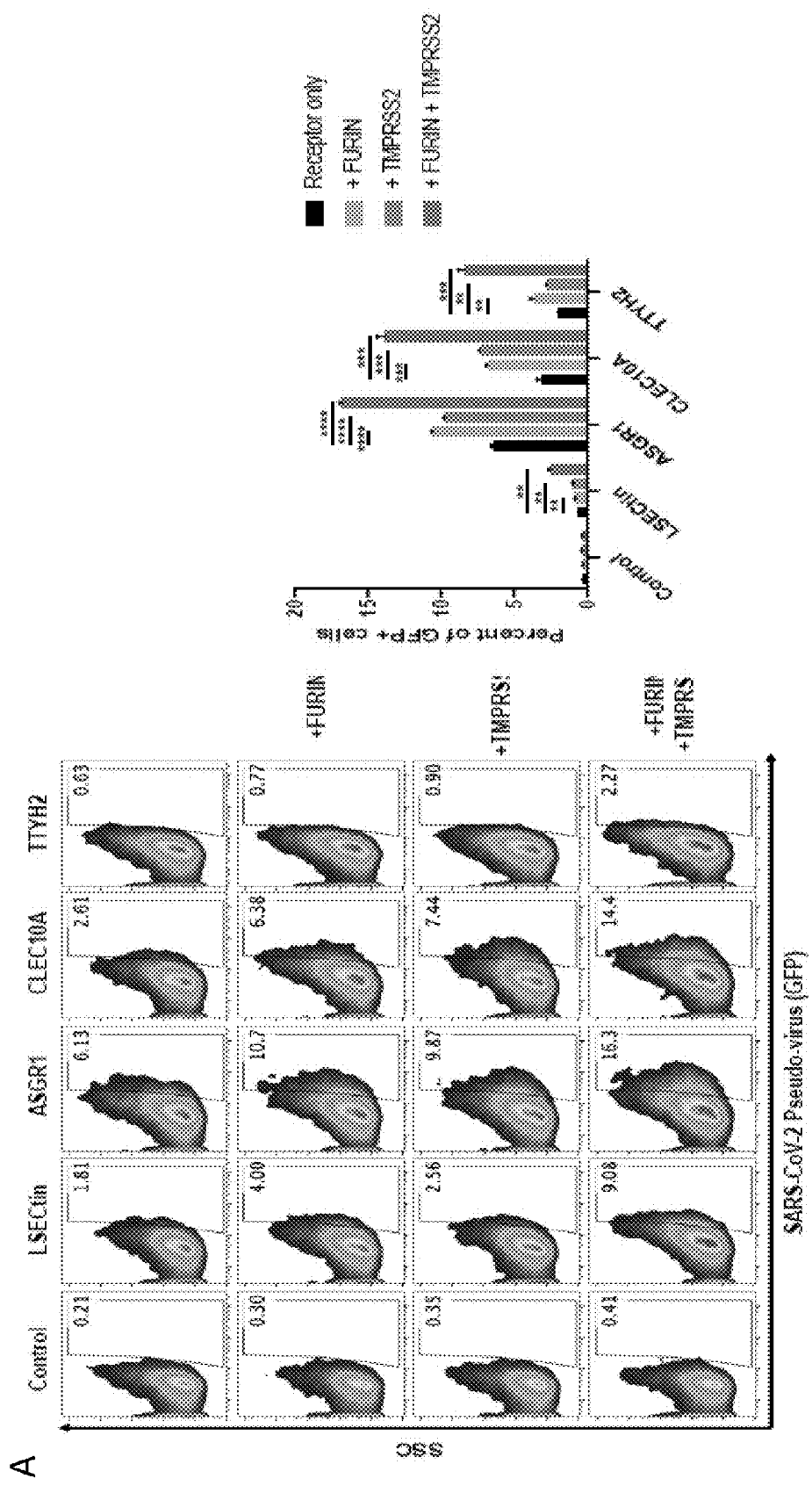
Figure 8B:
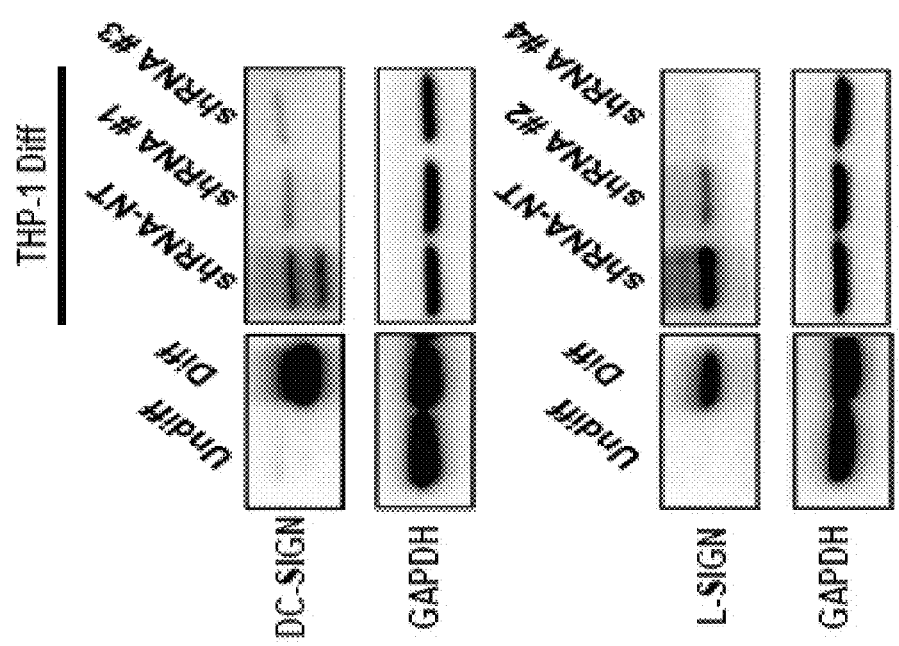
Figure 8C:
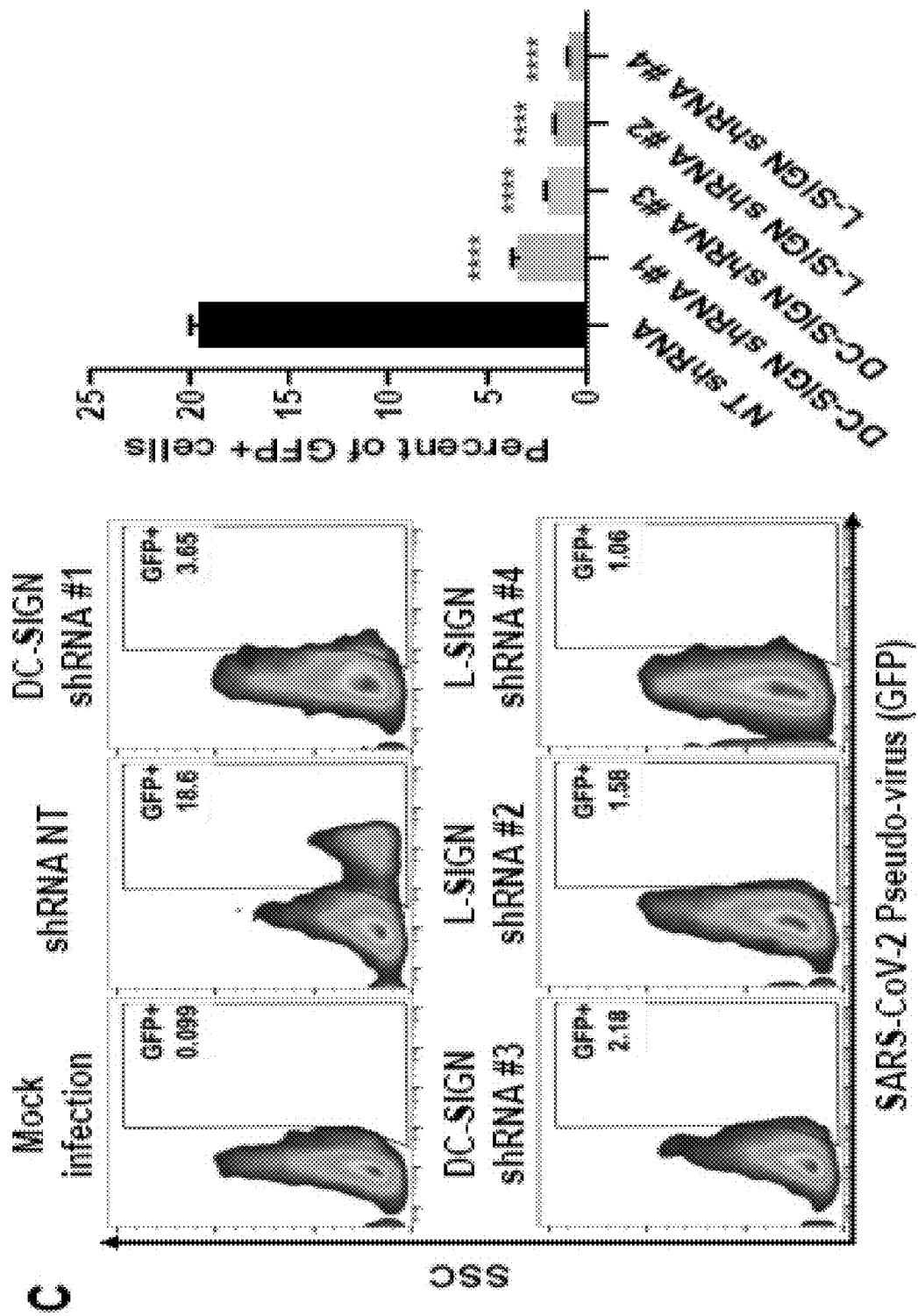

To establish the functional relevance of these myeloid cell receptors, it was examined whether they mediate SARS-CoV-2 binding to myeloid cells under several experimental conditions. HEK293T cells that overexpress DC-SIGN or L-SIGN mediated SARS-CoV-2 pseudotyped virus infection at levels comparable to those with ACE2 overexpression (FIG. 7A). Consistent with the S protein mannan blocking results (FIG. 3D), pseudotyped virus infection through DC-SIGN and L-SIGN was effectively inhibited by mannan treatment (FIG. 7A). Pseudoviruses with the mutated S protein (T500A/N501A/G502E) mainly retained their ability to infect DC-SIGN or L-SIGN, but not ACE2 expressing cells (FIG. 7A). The low level of infectivity through LSECtin, ASGR1, CLEC10A, and TTYH2 was enhanced by co-expressing furin and/or TMPRSS2 (FIG. 8A), both of which mediate S protein cleavage for viral entry (Hoffmann et al., 2020a; Hoffmann et al., 2020b; Zang et al., 2020). We also used human myeloid cell line THP-1, which gains surface expression of DC-SIGN and L-SIGN upon differentiation (FIG. 8B). Gene silencing of DC-SIGN or L-SIGN expression in differentiated THP-1 cells by short hairpin RNA (shRNA; Table 2) led to reduced SARS-CoV-2 pseudovirus infectivity (FIG. 8B-FIG. 8C). Furthermore, SARS-CoV-2 pseudovirus infection of the more physiologically relevant primary human PBMC-derived myeloid cells was blocked partially by mannan treatment (FIG. 7B). However, unlike the ACE2 expressing HEK293T cells, the myeloid cell infection by SARS-CoV-2 pseudovirus was not blocked by an ACE2 antibody, again highlighting an alternative usage of cell surface molecules in myeloid cells (FIG. 7C). Consistent with the low-level ACE2 expression on human myeloid cells (FIG. 5A and FIG. 6B), the data suggest an ACE2-independent SARS-CoV-2 S-myeloid cell interactions.

Figure 7D:
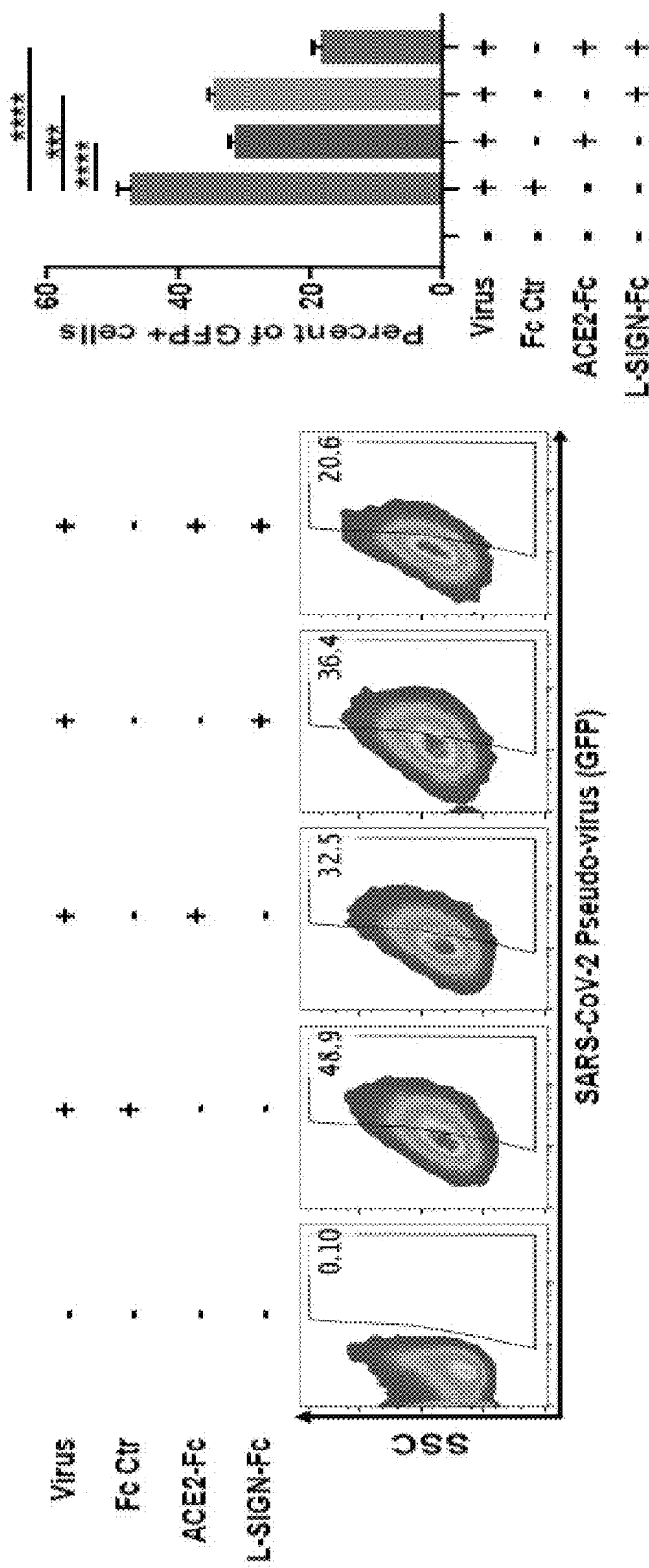
Figure 7E:
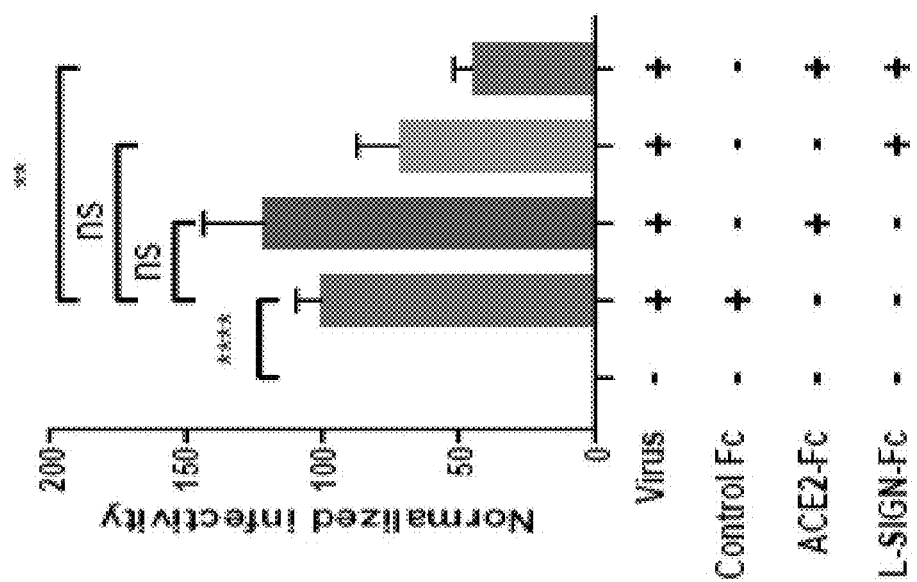
Figure 8D:
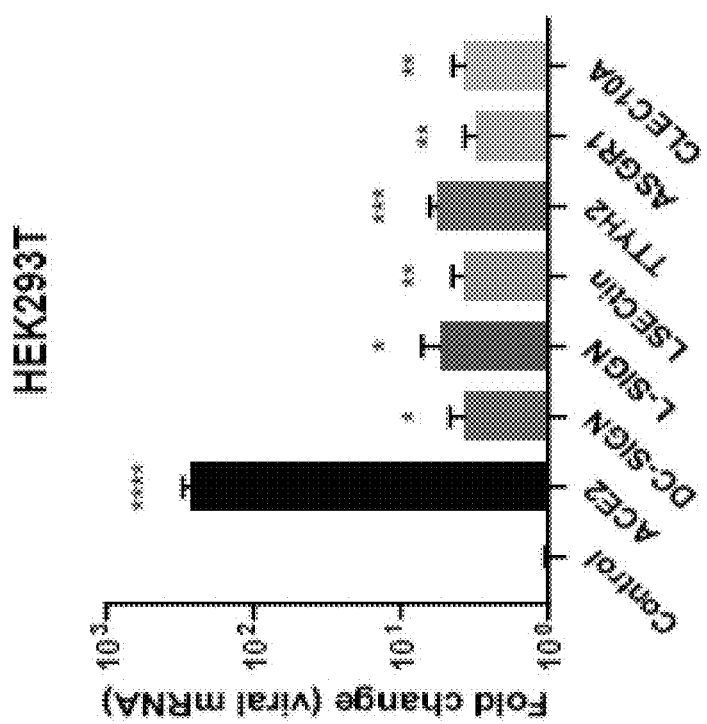
Figure 8E:
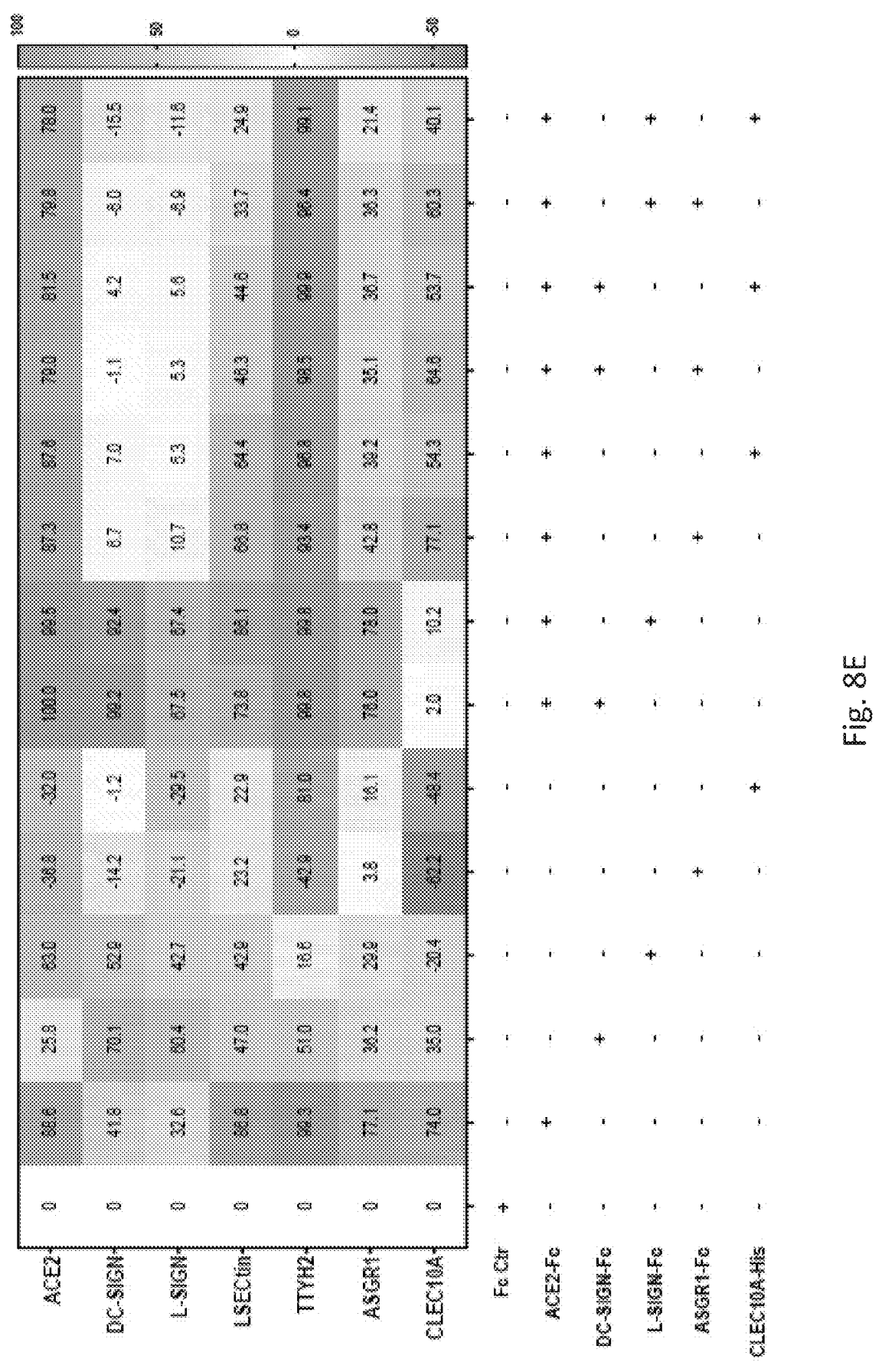

A clinical isolate of the authentic SARS-CoV-2 virus (2019-nCoV/USA-WA1/2020 strain) was used to infect HEK293T cells expressing ACE2 or individual myeloid cell receptors. Ectopic expression of the myeloid cell receptors in HEK293T cells supported SARS-CoV-2 engagement as indicated by viral mRNA levels at 24 hours post-infection (FIG. 8D). To corroborate these findings, the effect of soluble decoy receptors was tested, either alone or in combination, in the blockade of SARS-CoV-2 engagement to HEK293T cell overexpressing individual myeloid cell receptors. ACE2-Fc alone could block the majority of the S-receptor interactions, except for DC-SIGN or L-SIGN, while DC-SIGN-Fc or L-SIGN-Fc in combination with ACE2-Fc led to nearly complete blockade of ACE2, TTYH2, and DC-SIGN, and around ~70-80% percent blockade of L-SIGN, LSECtin, and ASGR1 binding (FIG. 8E). The L-SIGN-Fc and ACE2-Fc combination also significantly decreased pseudotyped SARS-CoV-2 infection of human myeloid cells (FIG. 7D) and authentic SARS-CoV-2 engagement with myeloid cells (FIG. 7E).

TABLE 2 shRNA information

| | | |
|---|---|---|
| MISSION ® pLKO.1-puro Non-Mammalian shRNA Control Plasmid DNA | Sigma | SHC002 |
| CD209 MISSION shRNA Bacterial Glycerol Stock CD209 molecule, Human, TRCN0000371754 | Sigma | SHCLNG-NM_021155.3-1666s21c1 |
| CD209 MISSION shRNA Bacterial Glycerol Stock CD209 molecule, Human, TRCN0000029690 | Sigma | SHCLNG-NM_021155.2-486s1c1 |

TABLE 2-continued shRNA information

| | | |
|---|---|---|
| MISSION ® pLKO.1-puro Non-Mammalian shRNA Control Plasmid DNA | Sigma | SHC002 |
| CLEC4M MISSION shRNA Bacterial Glycerol Stock C-type lectin domain family 4, member M, Human, TRCN0000426224 | Sigma | SHCLNG-NM_014257.4-1254s21c1 |
| CLEC4M MISSION shRNA Bacterial Glycerol Stock C-type lectin domain family 4, member M, Human, TRCN0000416897 | Sigma | SHCLNG-NM_014257.4-367s21c1 |

Figure 8G:
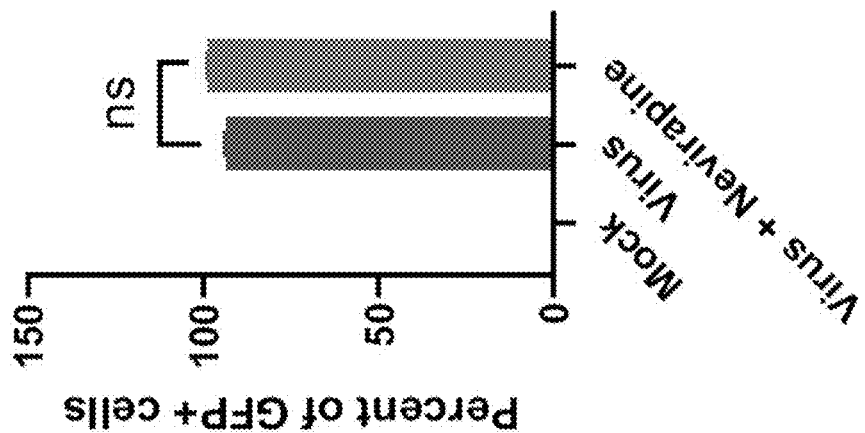
Figure 8F:
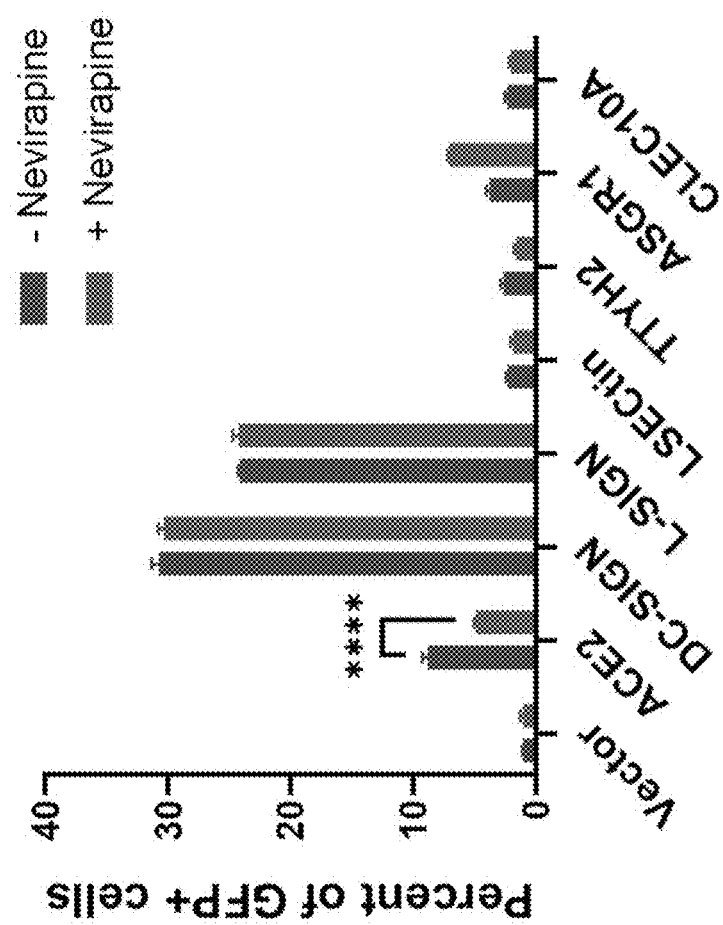
Figure 9A:
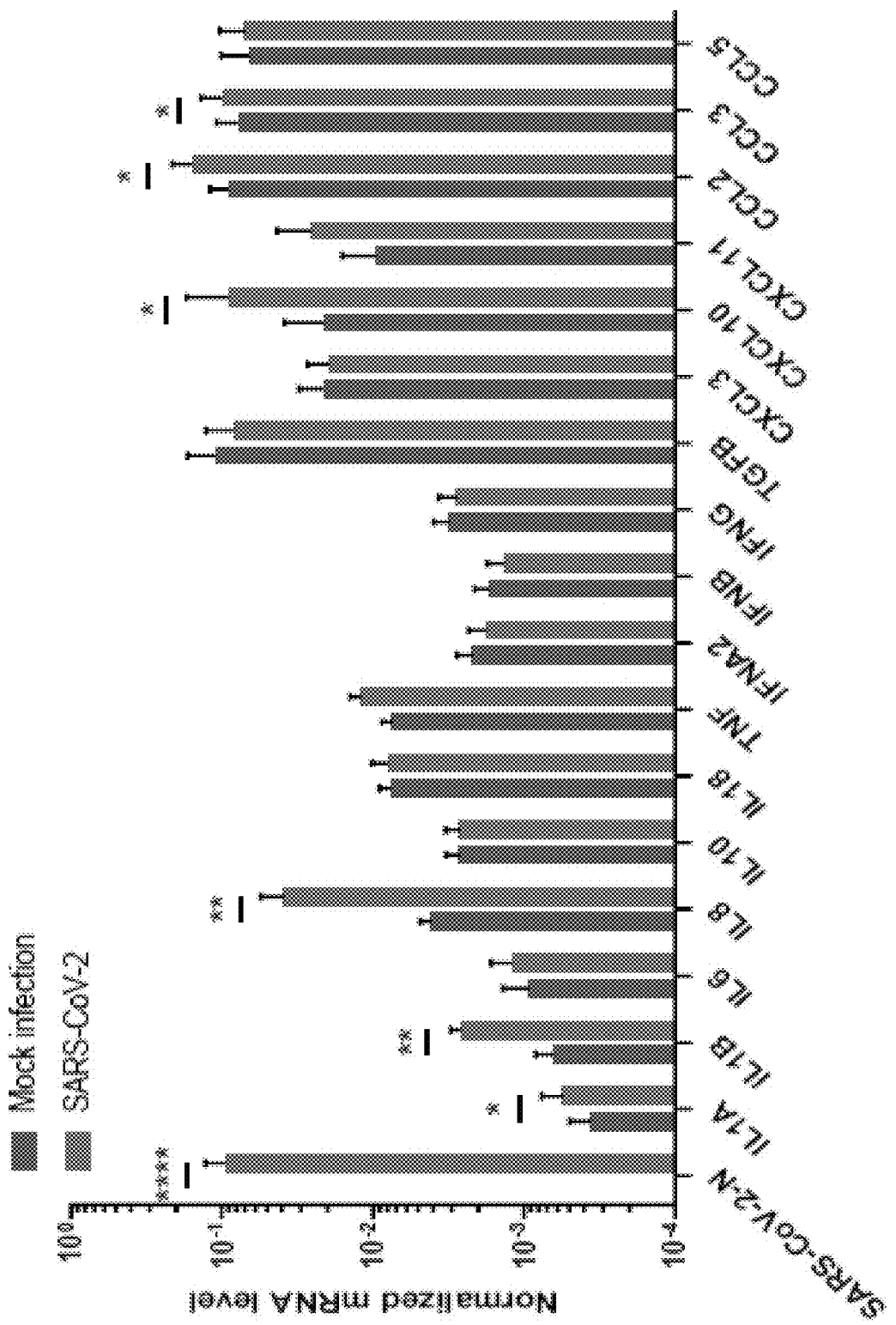
FIG. 9A through FIG. 9G depict exemplary experimental results demonstrating SARS-CoV-2 viral-immune interactions drive hyperinflammatory responses.
Figure 9B:
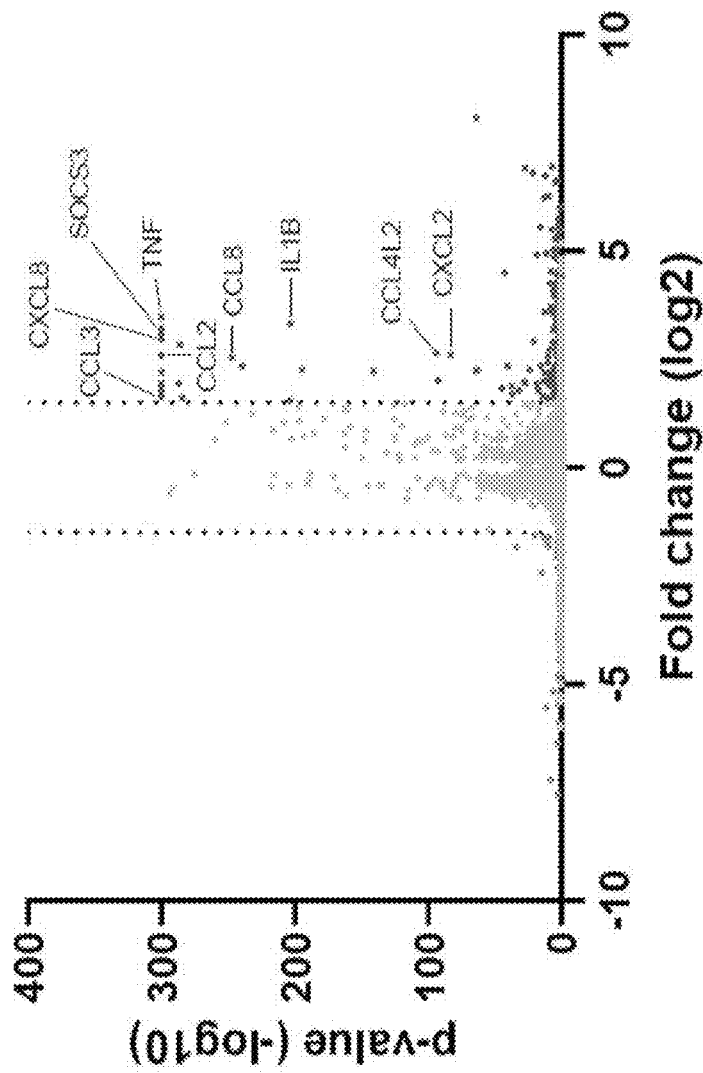
Figure 9C:
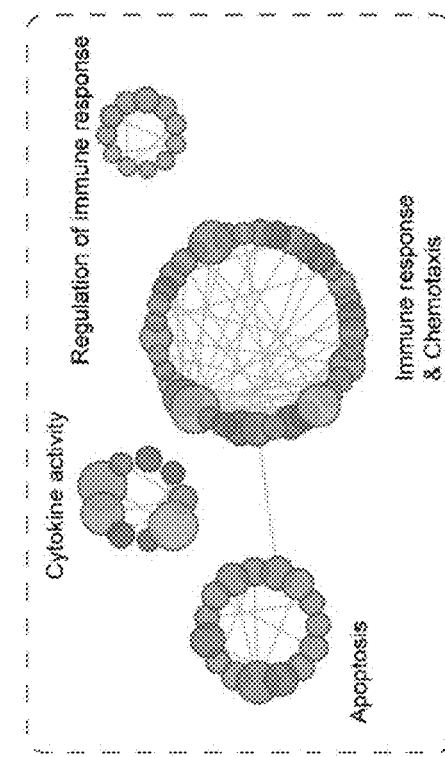
Figure 9D:
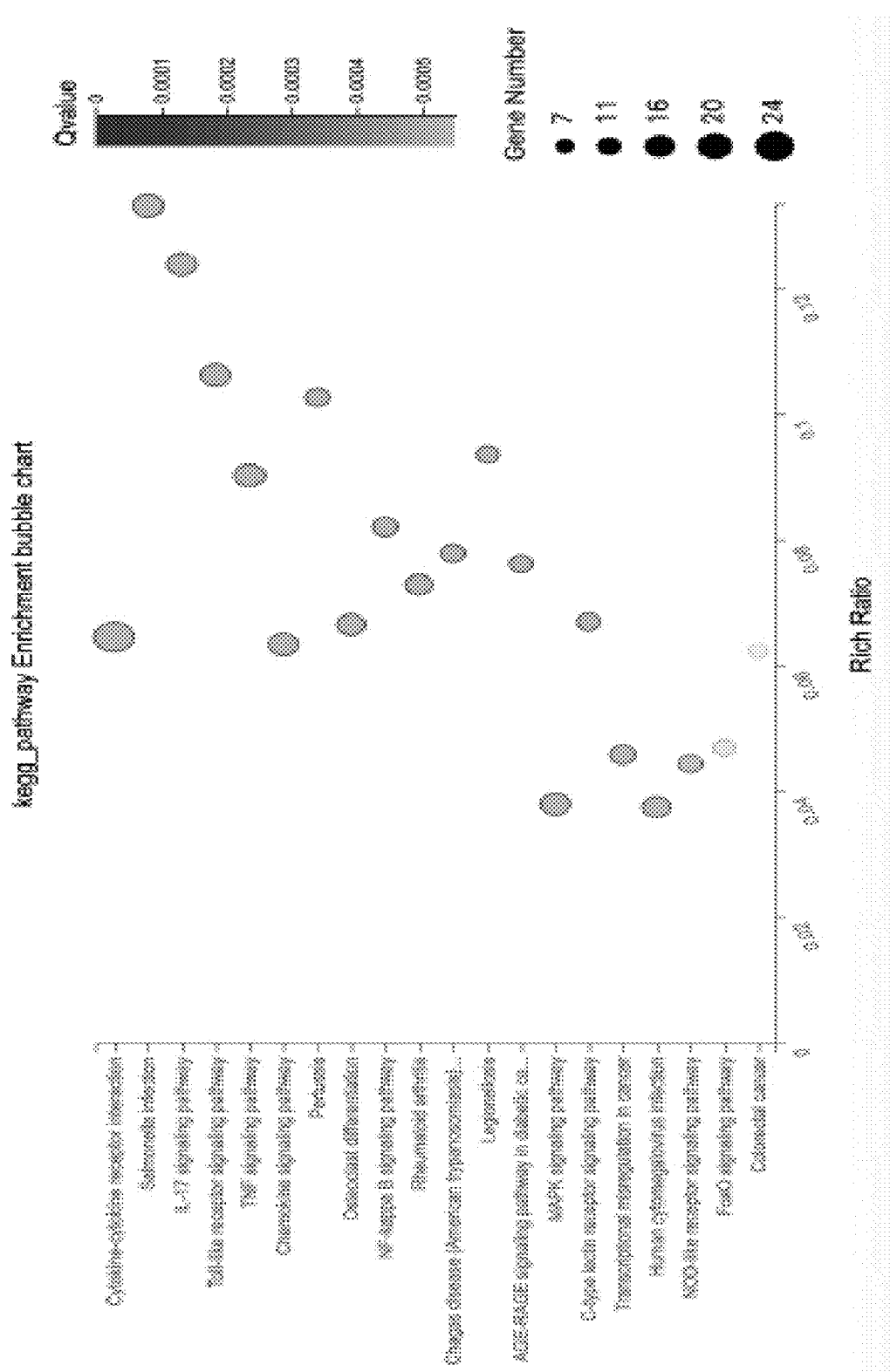
Figure 9E:
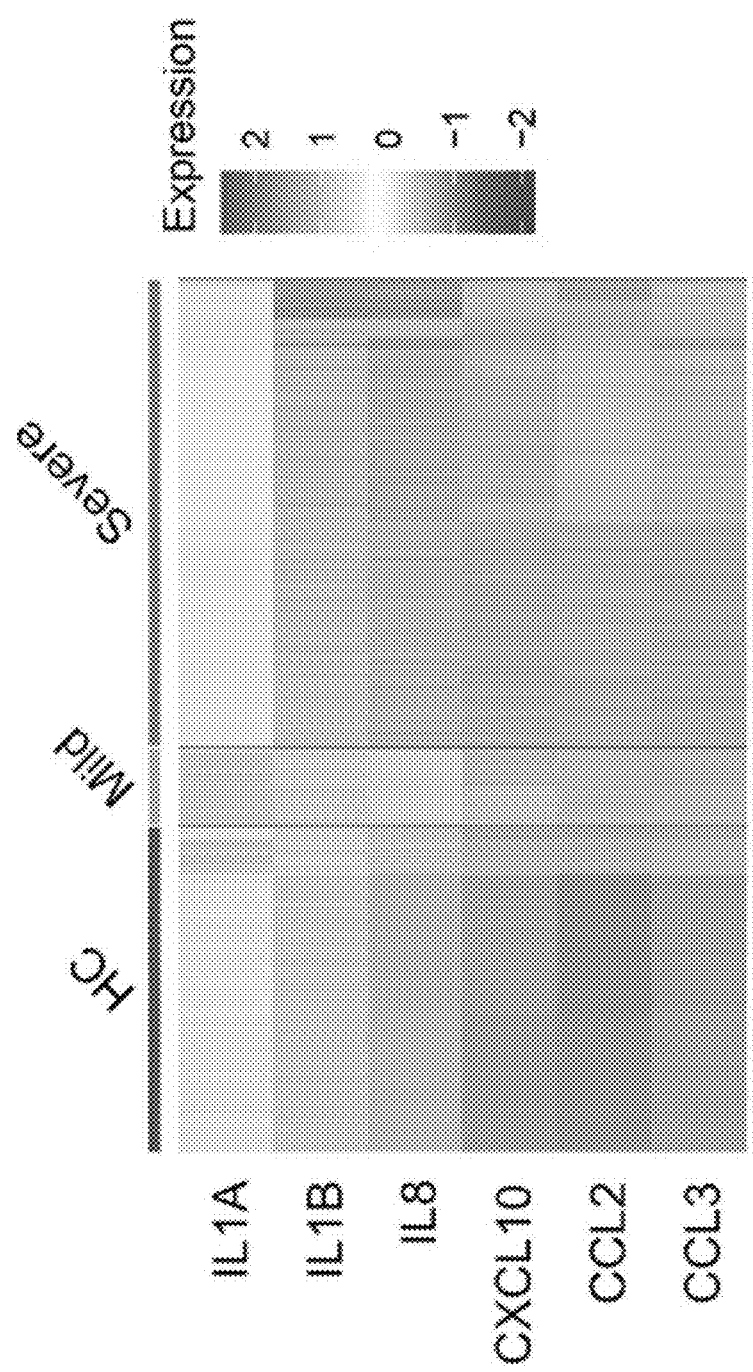
Figure 9F:
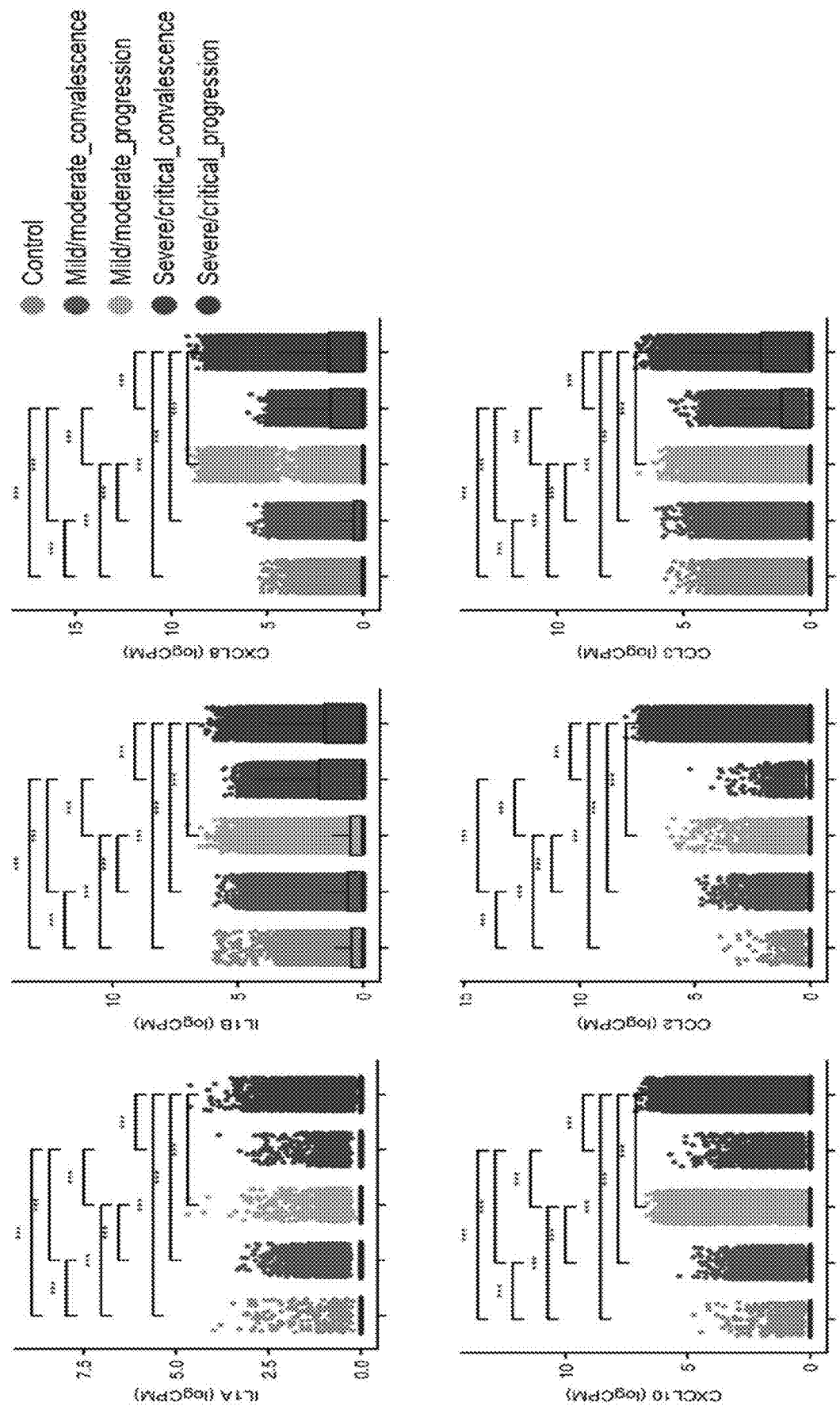
Figure 9G:
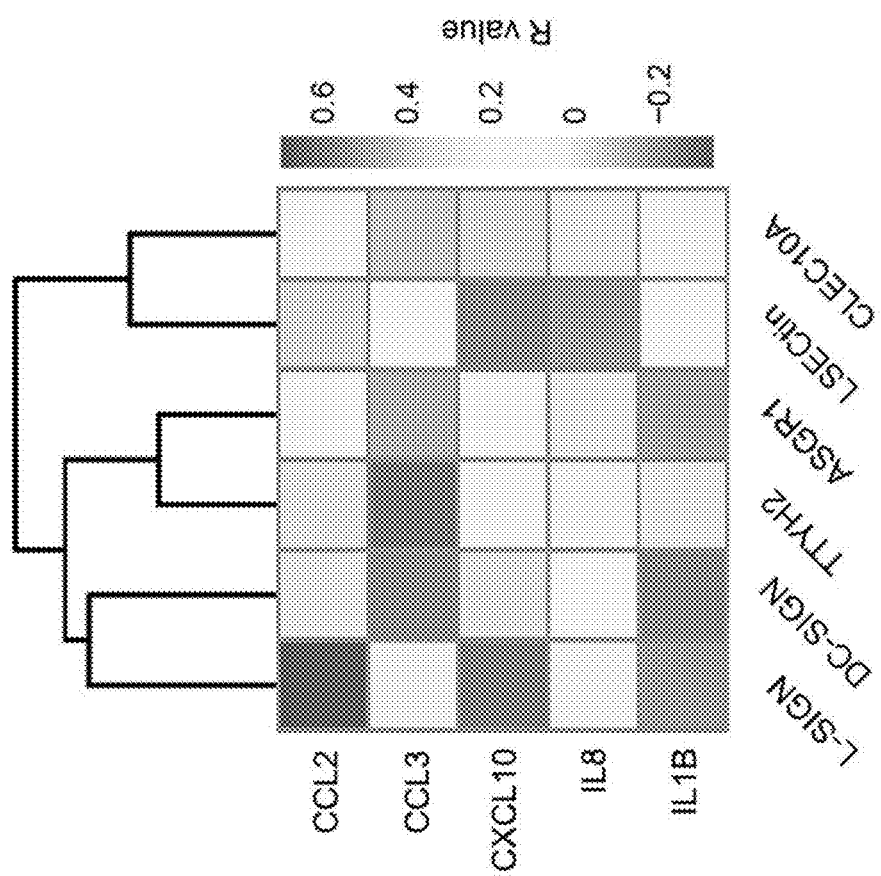
Figure 10A:
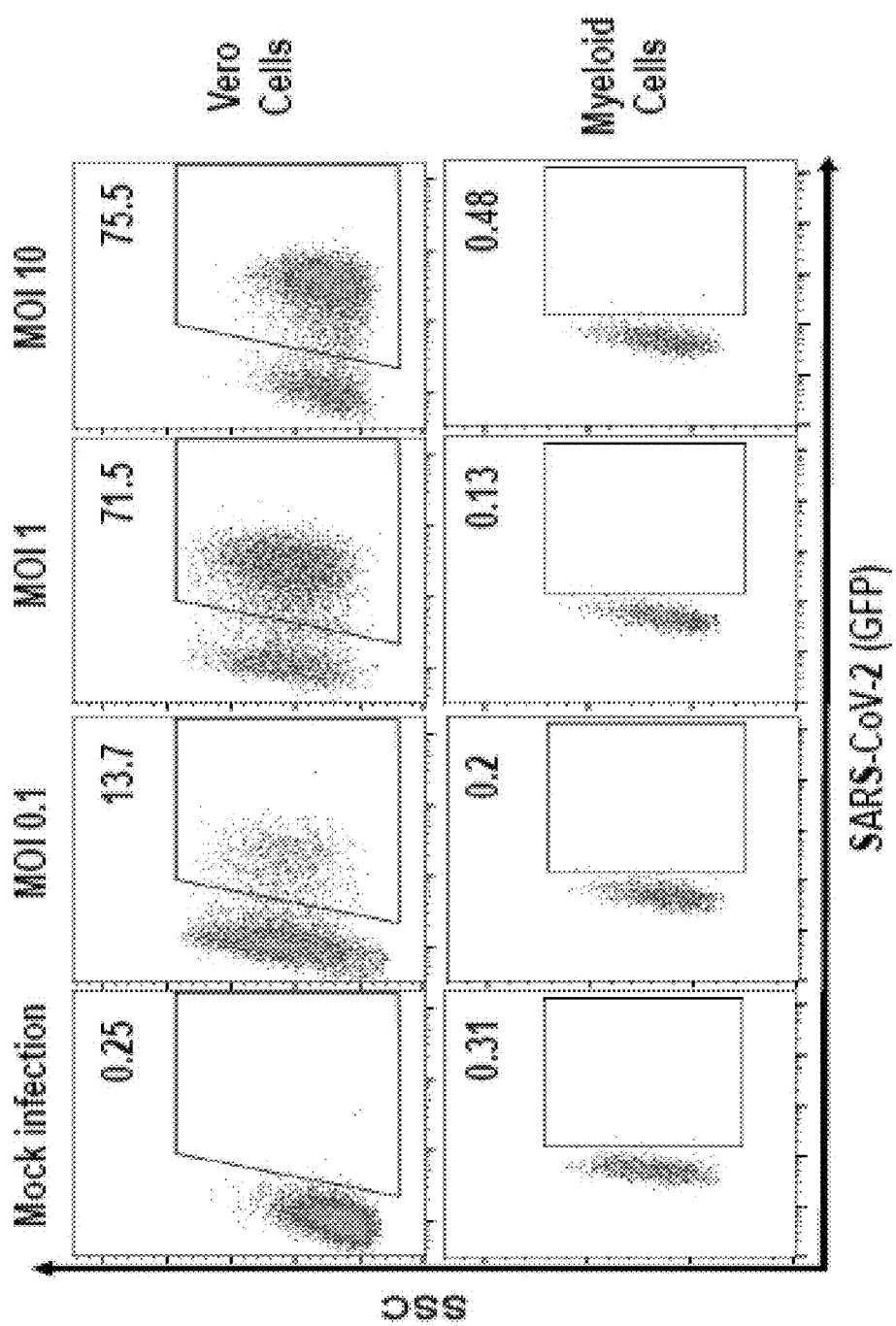
FIG. 10A through FIG. 10B depict exemplary experimental results demonstrating inactive replication of authentic SARS-CoV-2 in myeloid cells.
Figure 10B:
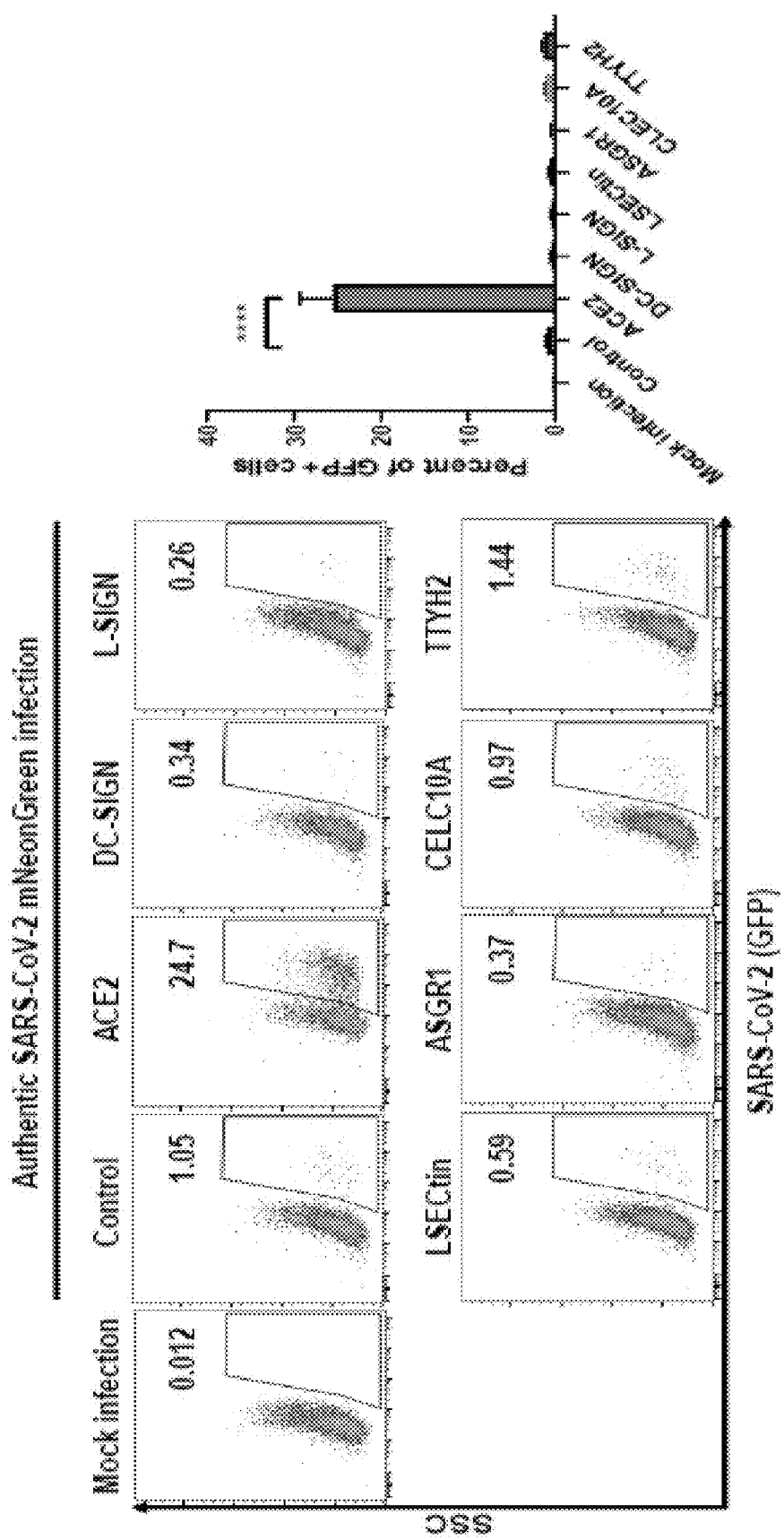
Figure 11B:
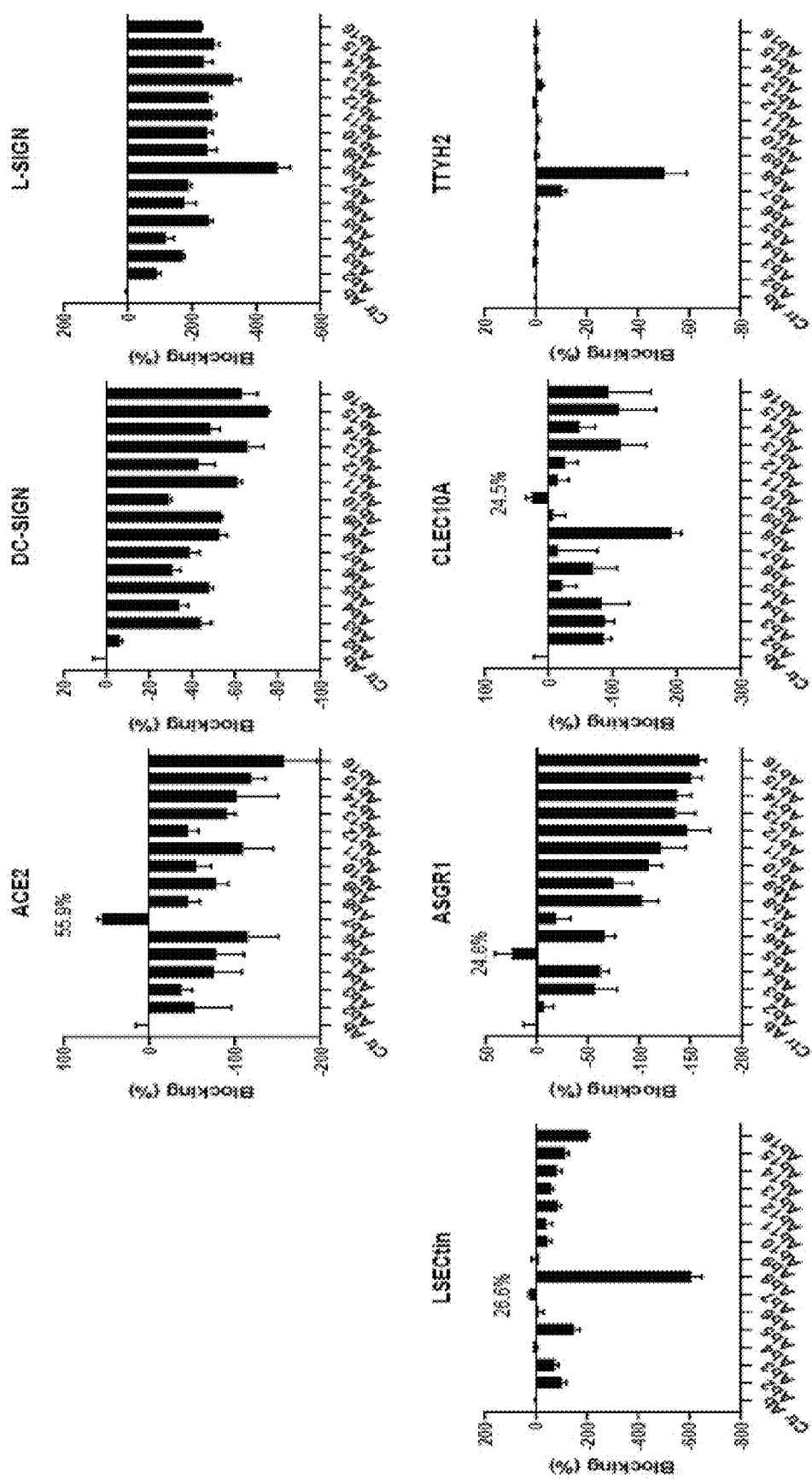
Figure 11C:
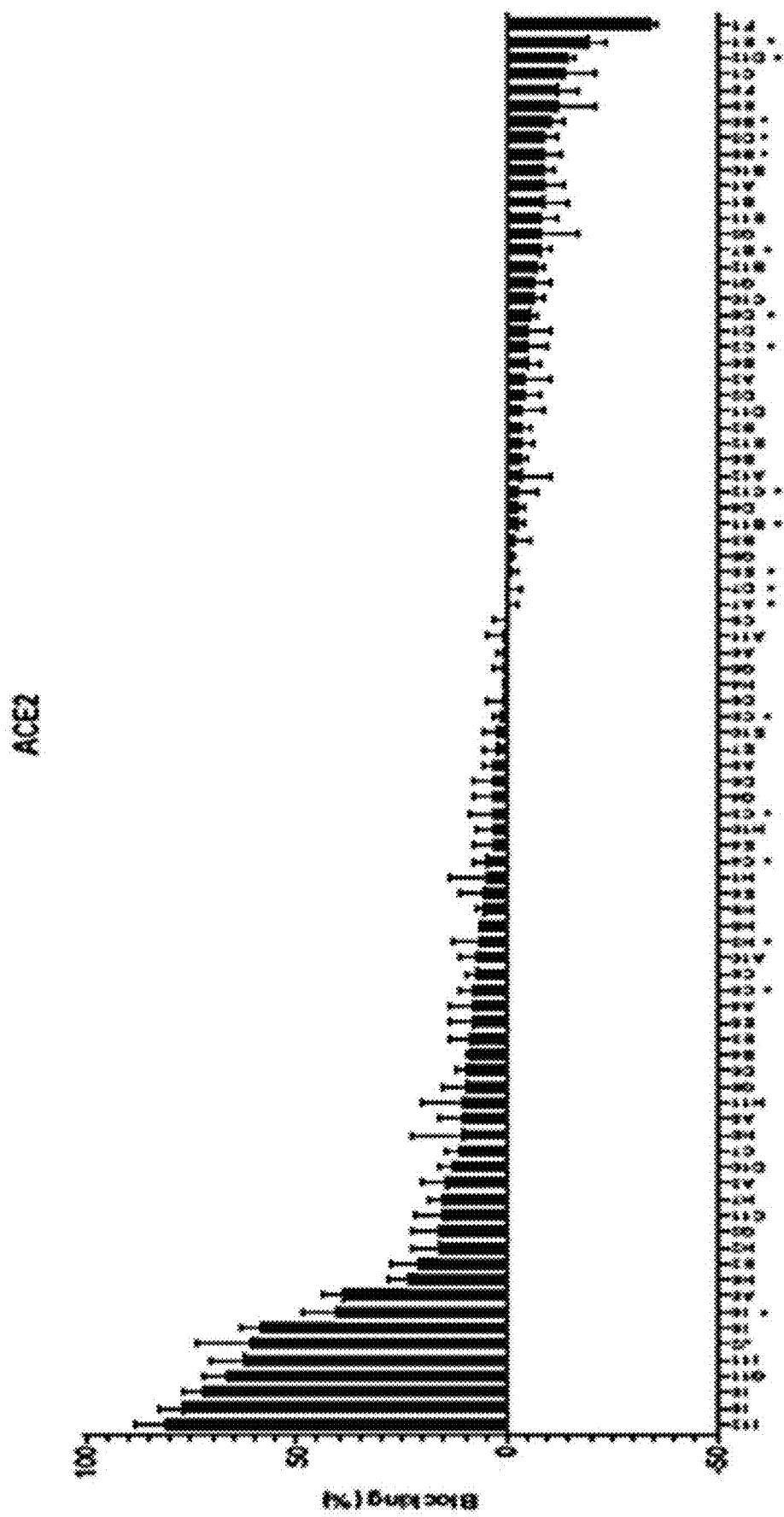
Figure 11C:
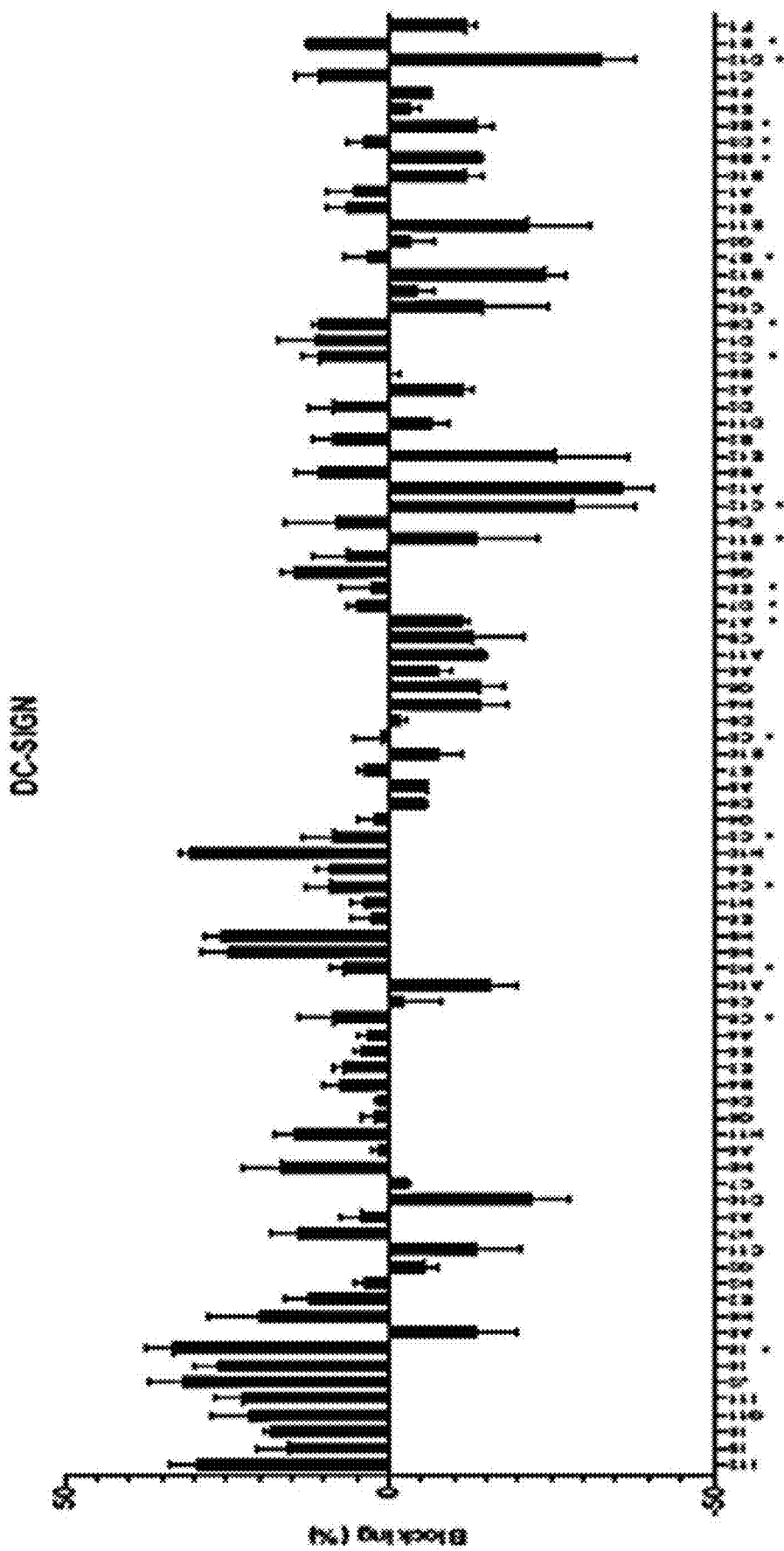
Figure 11C:
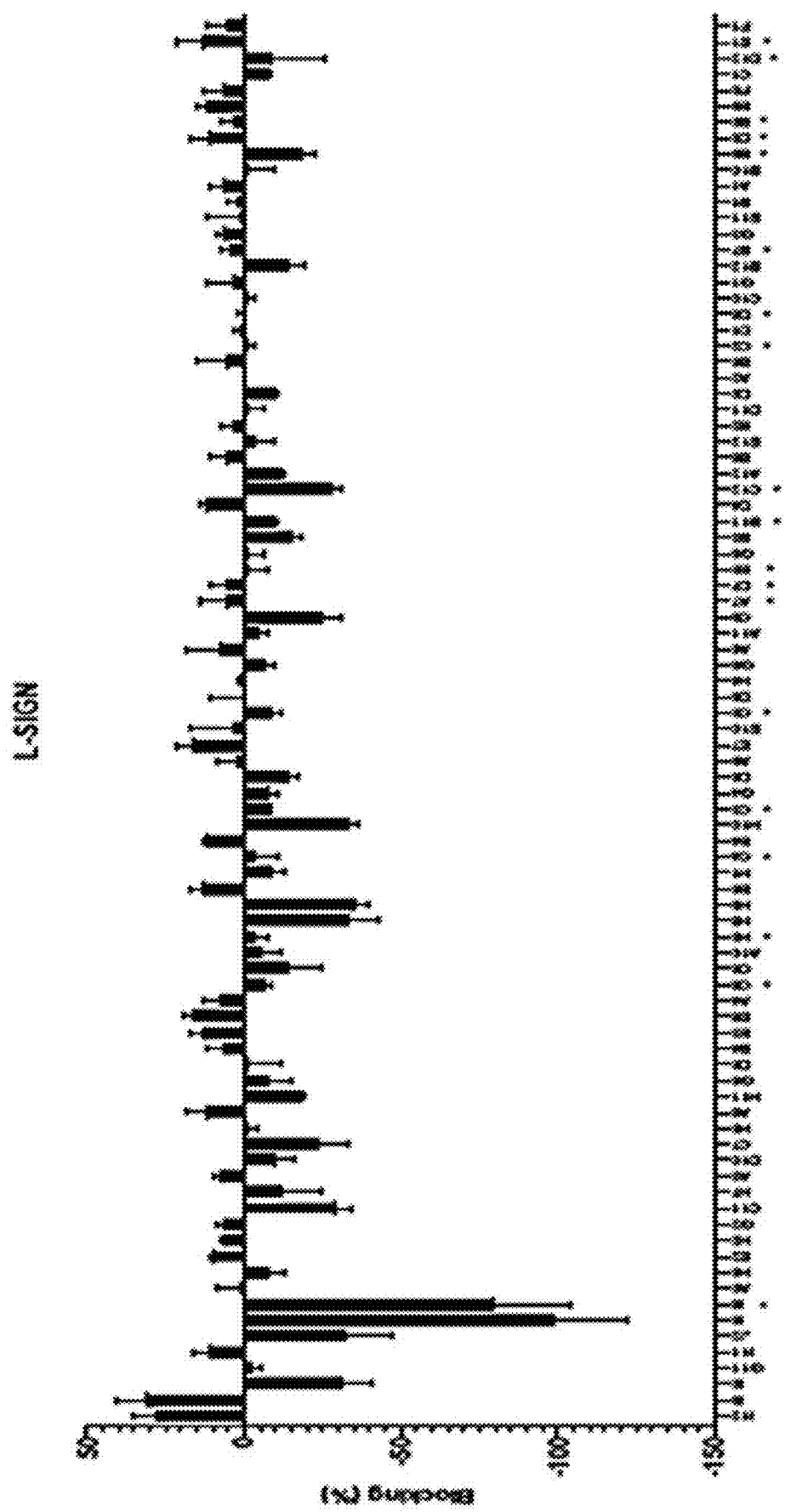
Figure 11C:
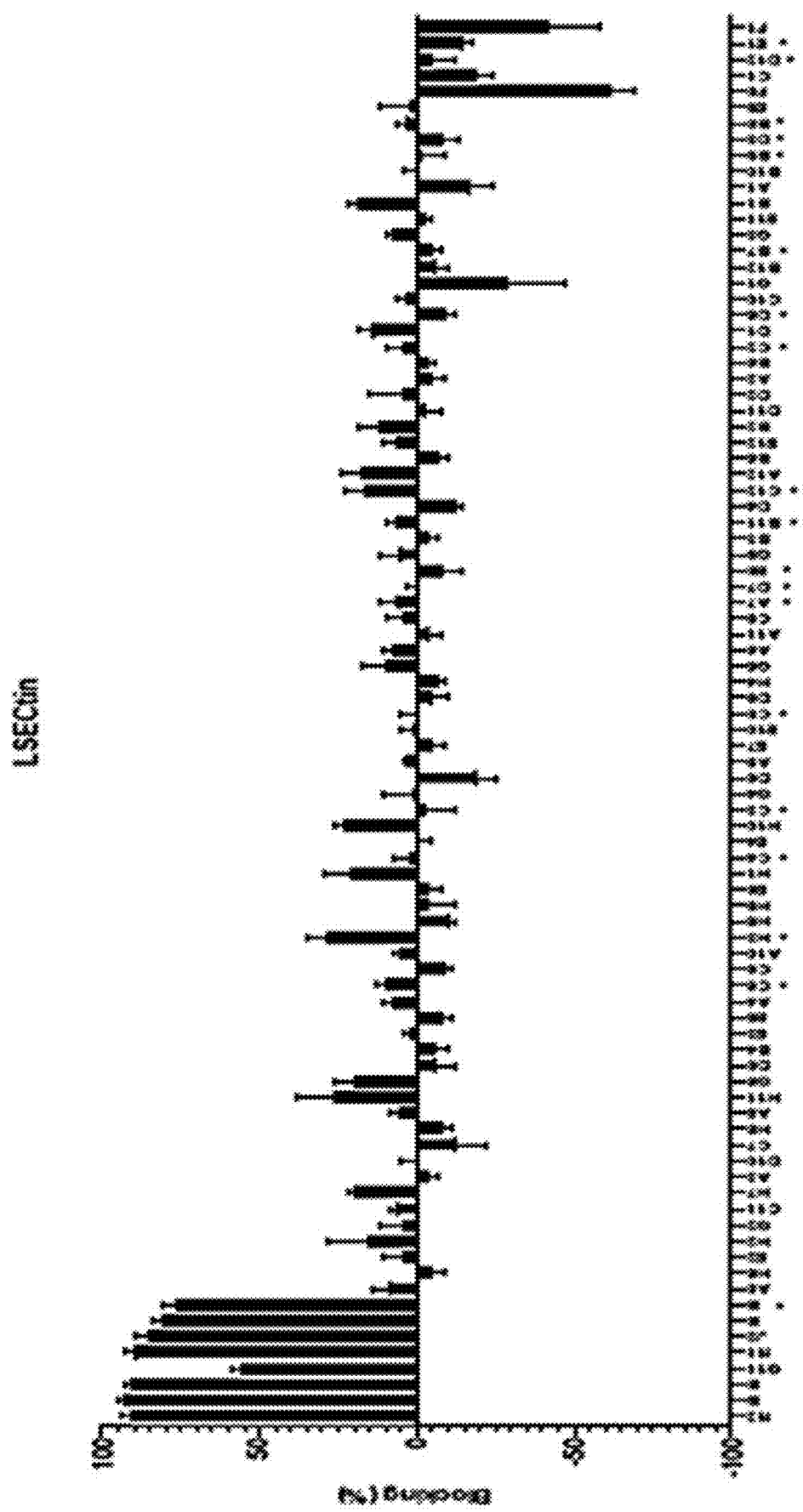
Figure 11C:
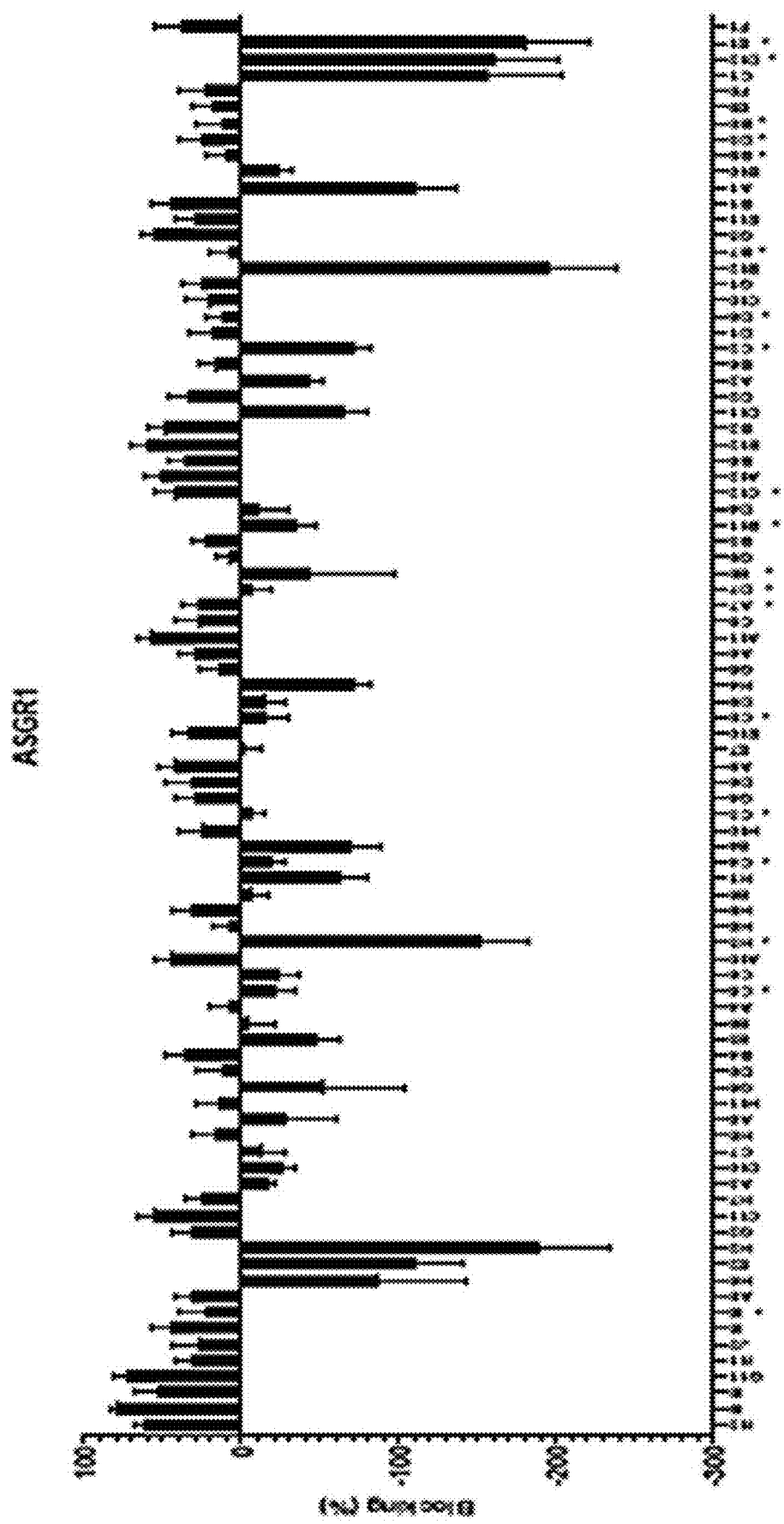
Figure 11C:
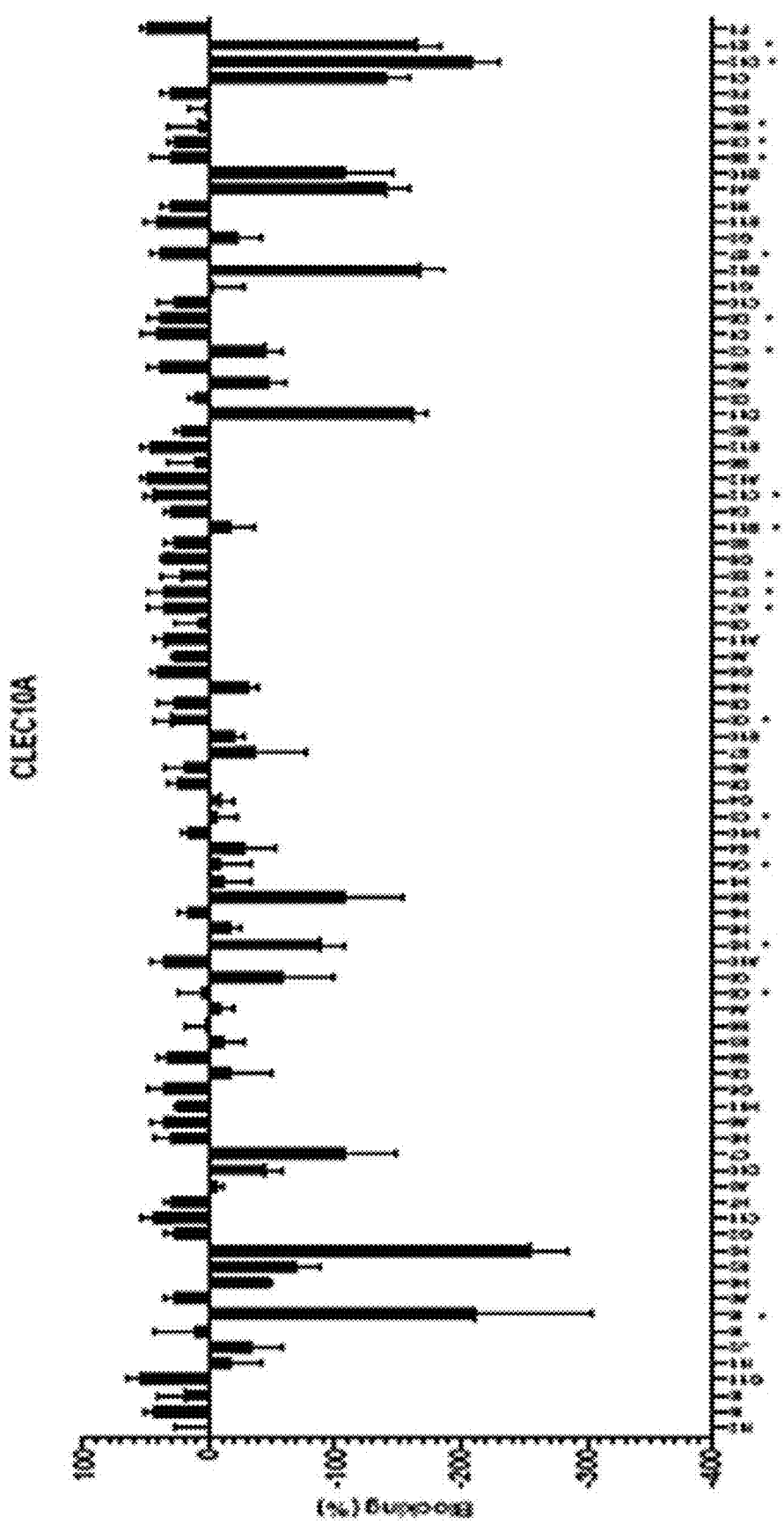
Figure 11C:
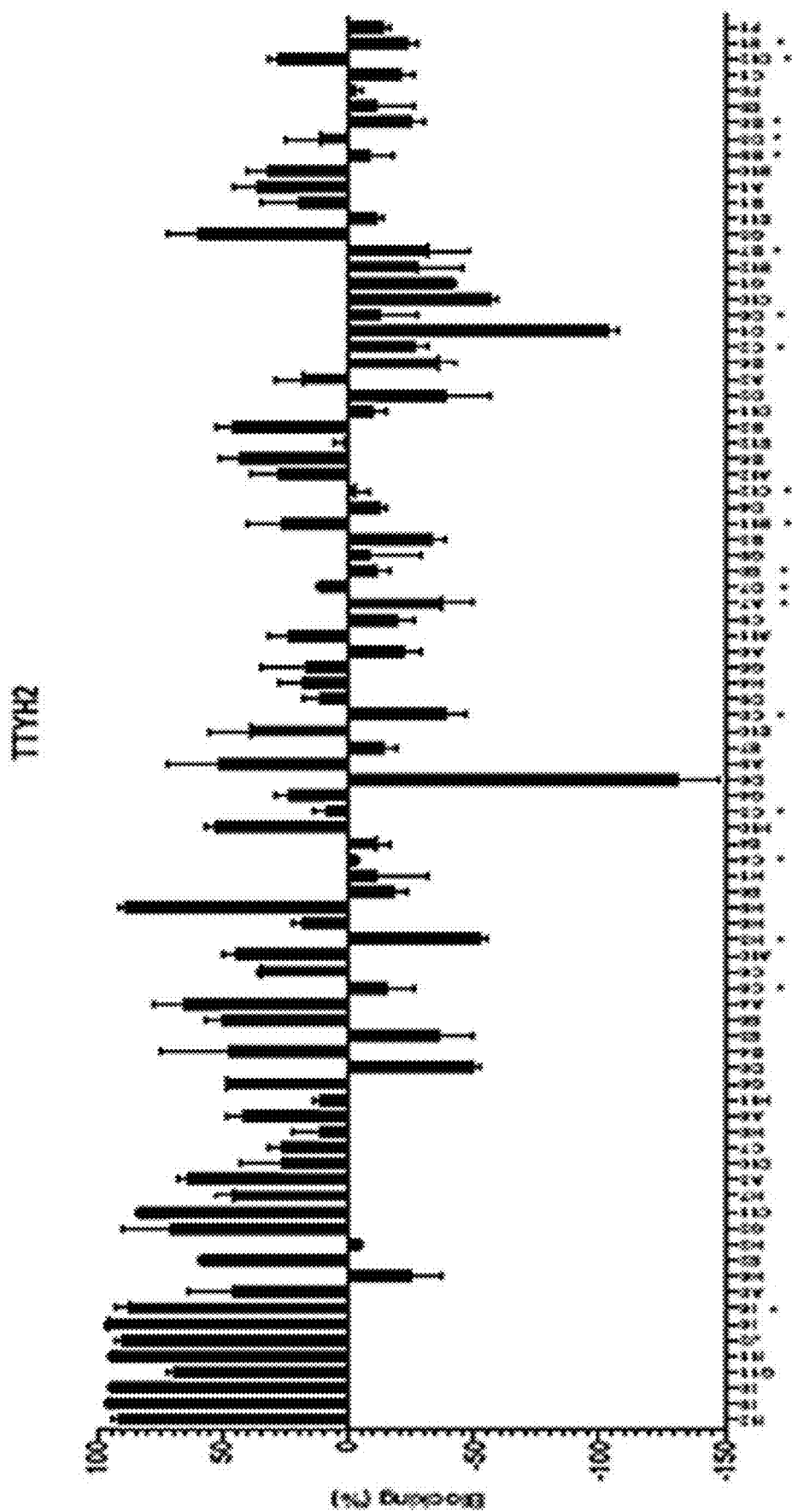
Figure 11E:
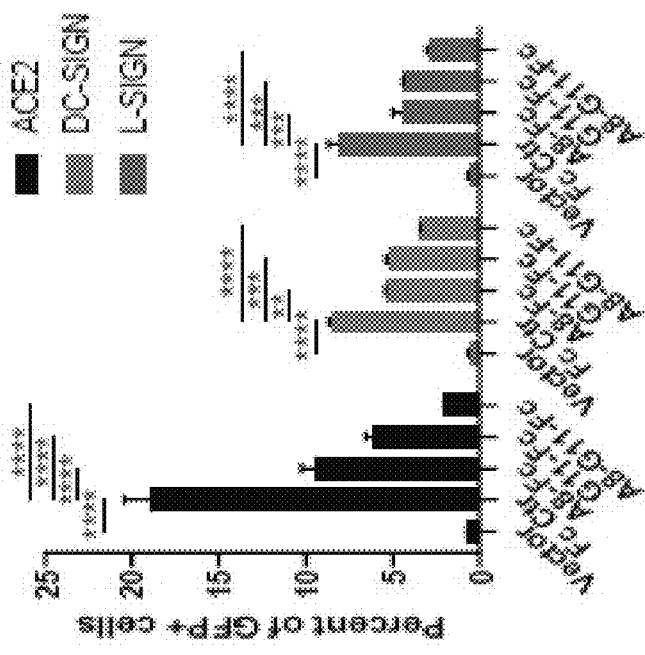
Figure 11D:
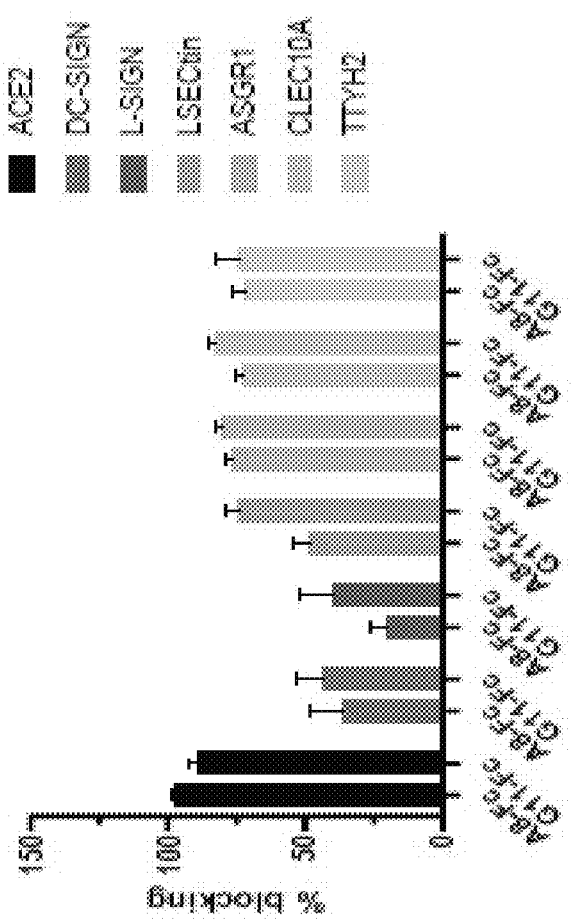
Figure 12A:
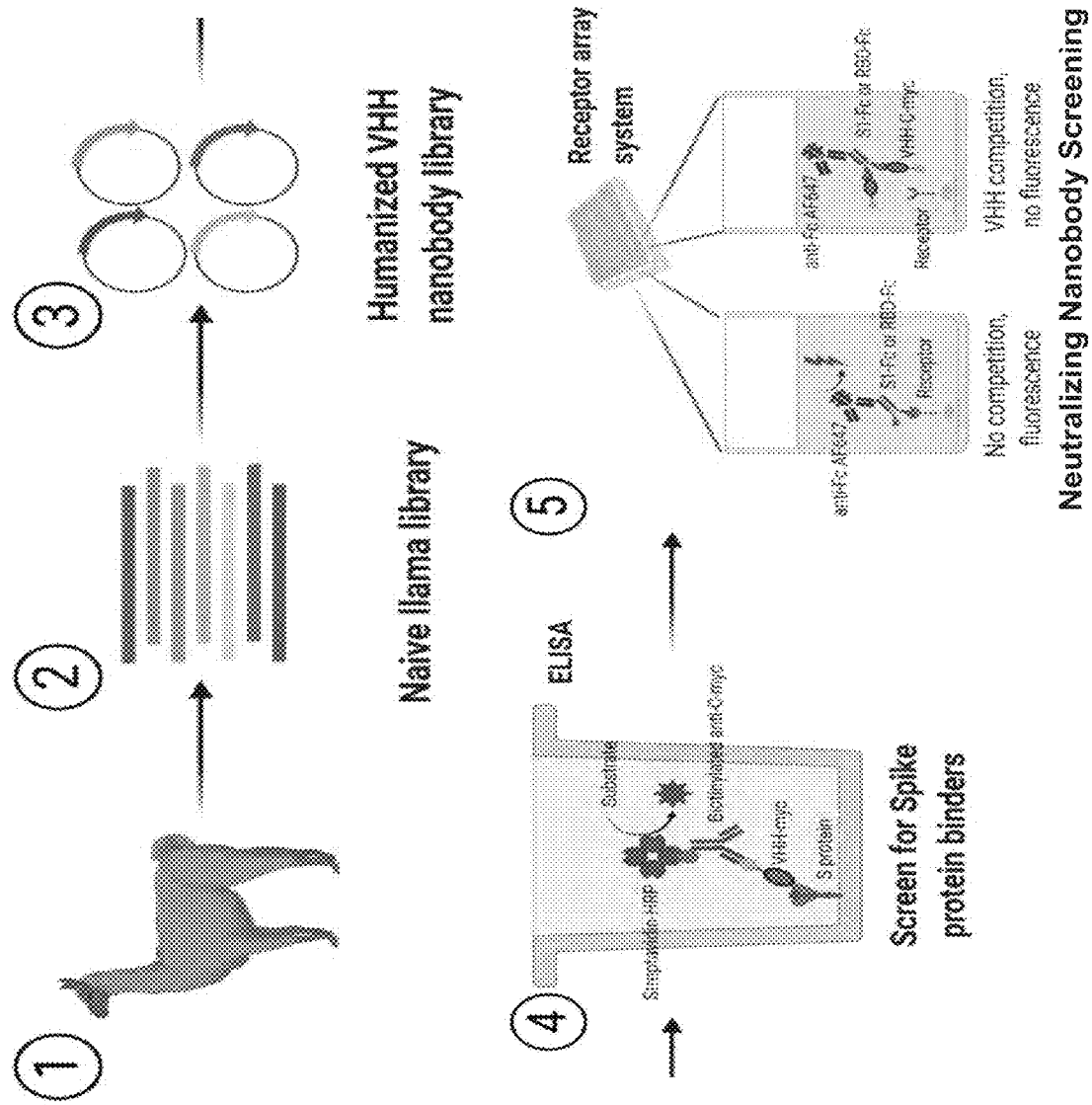
FIG. 12A through FIG. 12G depict exemplary experimental results demonstrating the identification of nanobodies capable of blocking SARS-CoV-2 induced hyperinflammatory responses.
Figure 12B:
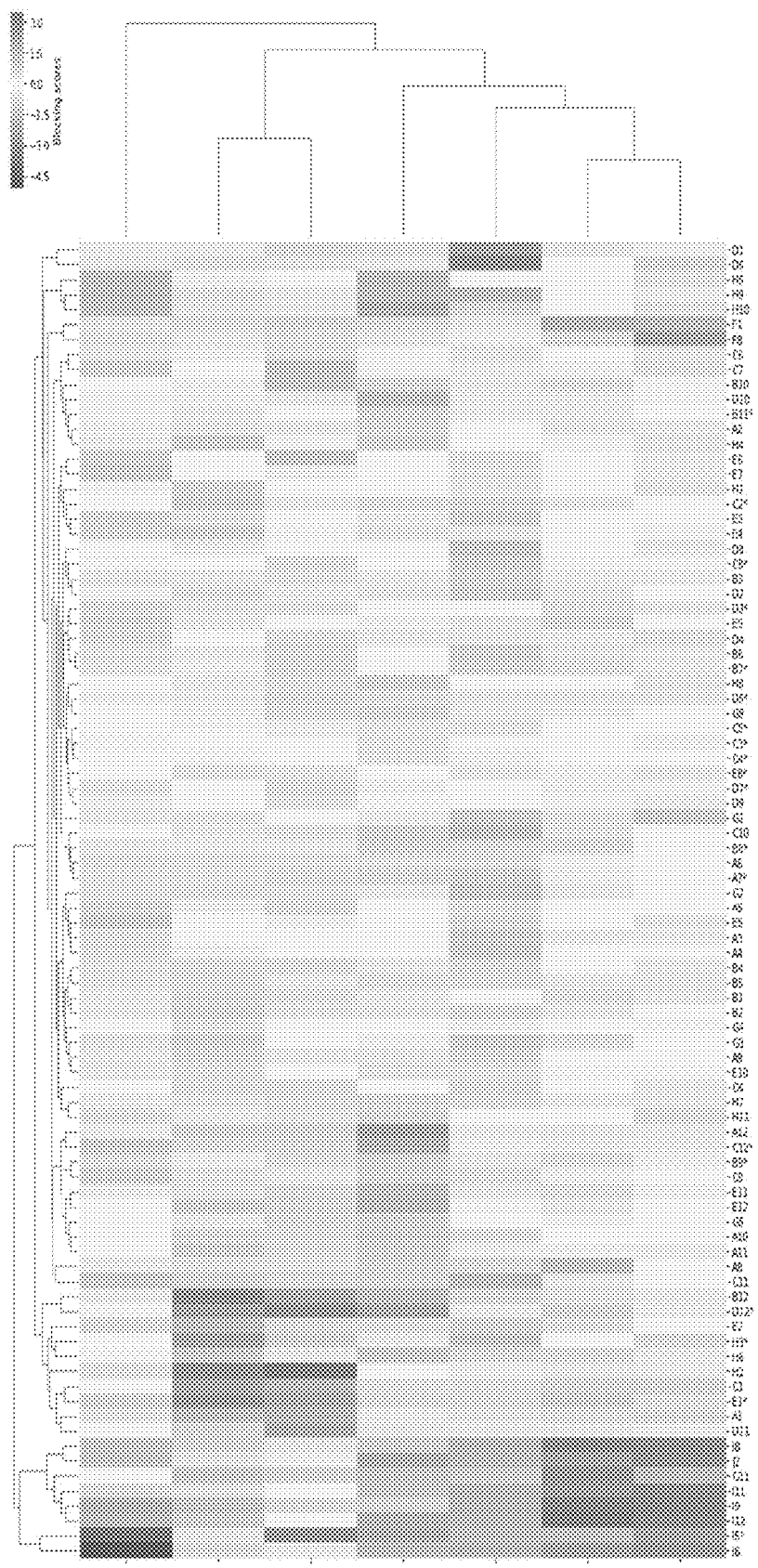
Figure 12C:
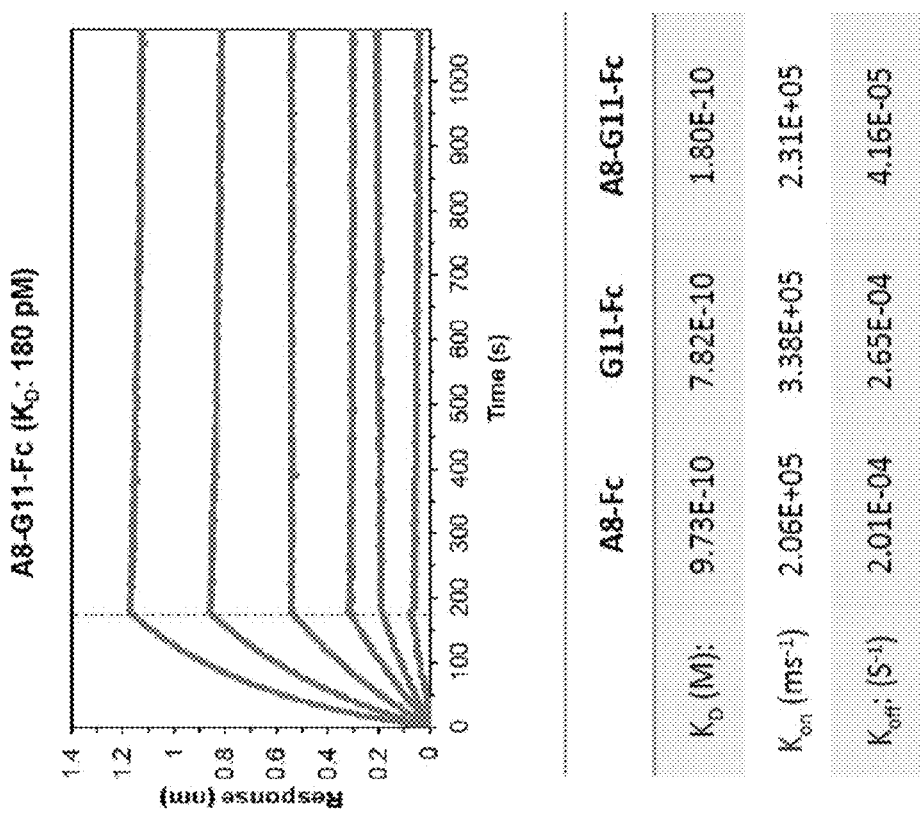
Figure 12C:
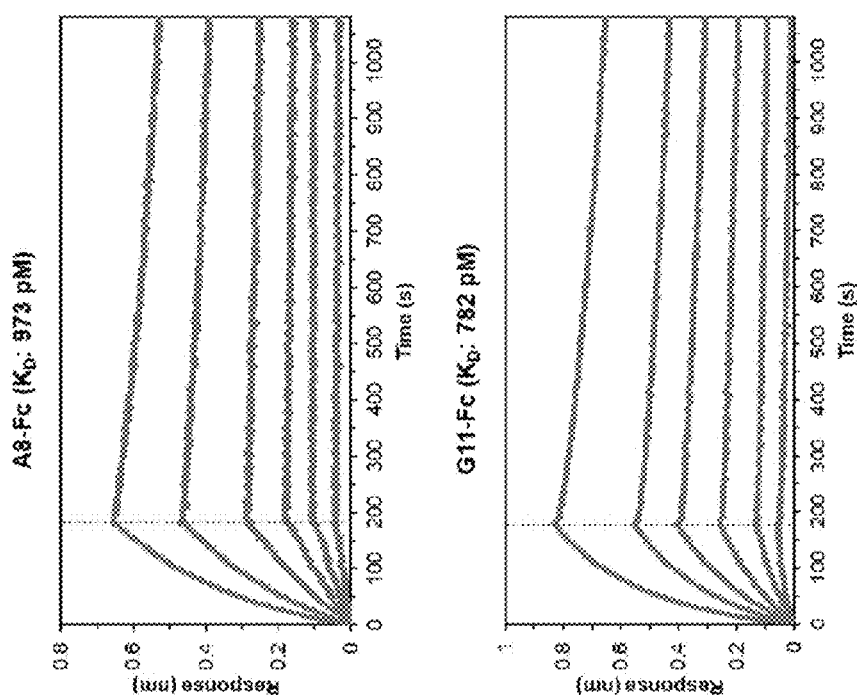
Figure 12D:
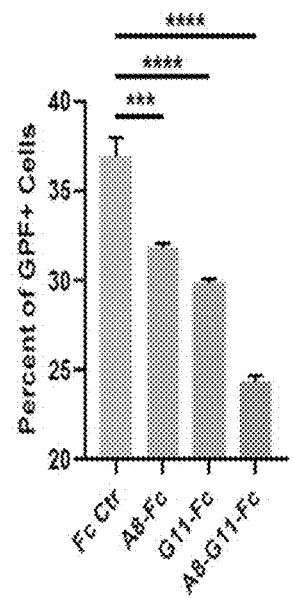
Figure 12E:
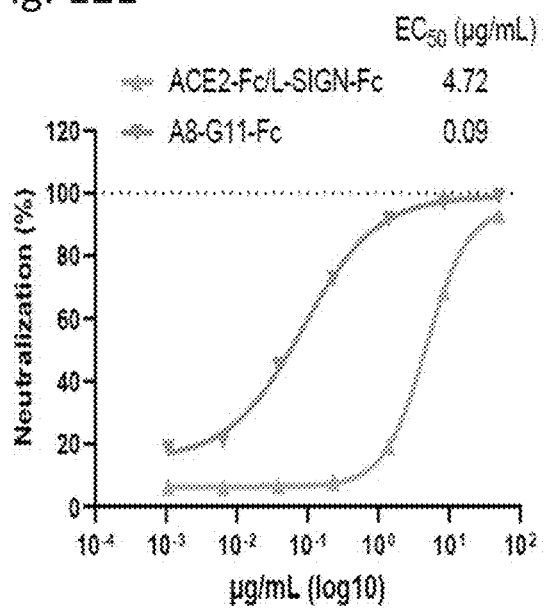
Figure 12F:
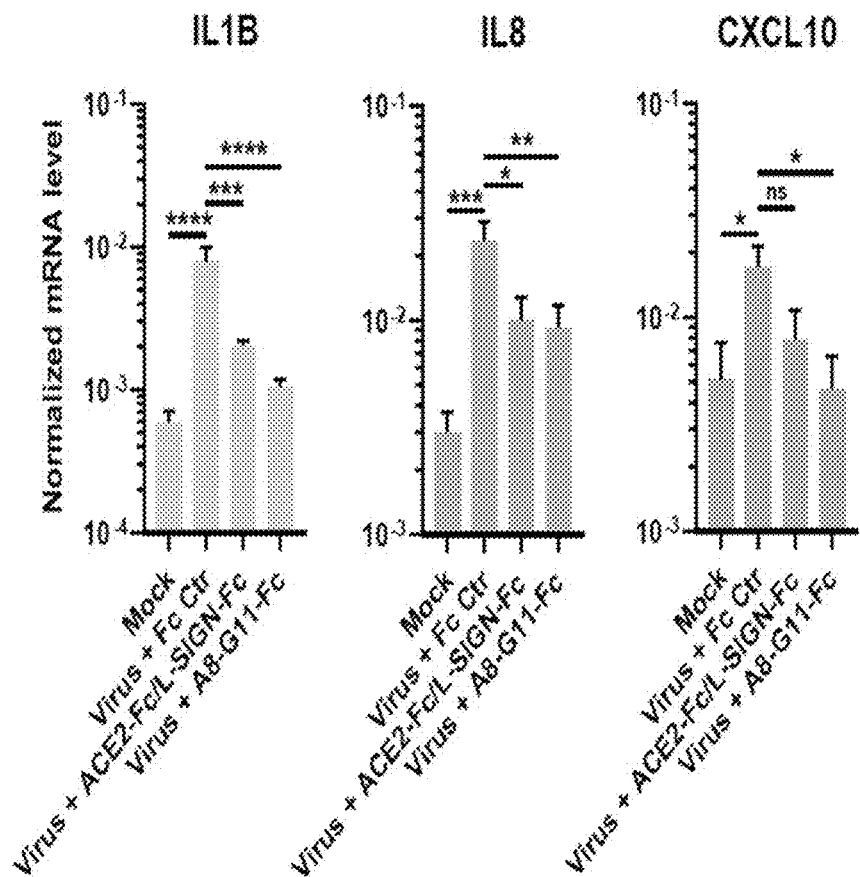
Figure 12G:
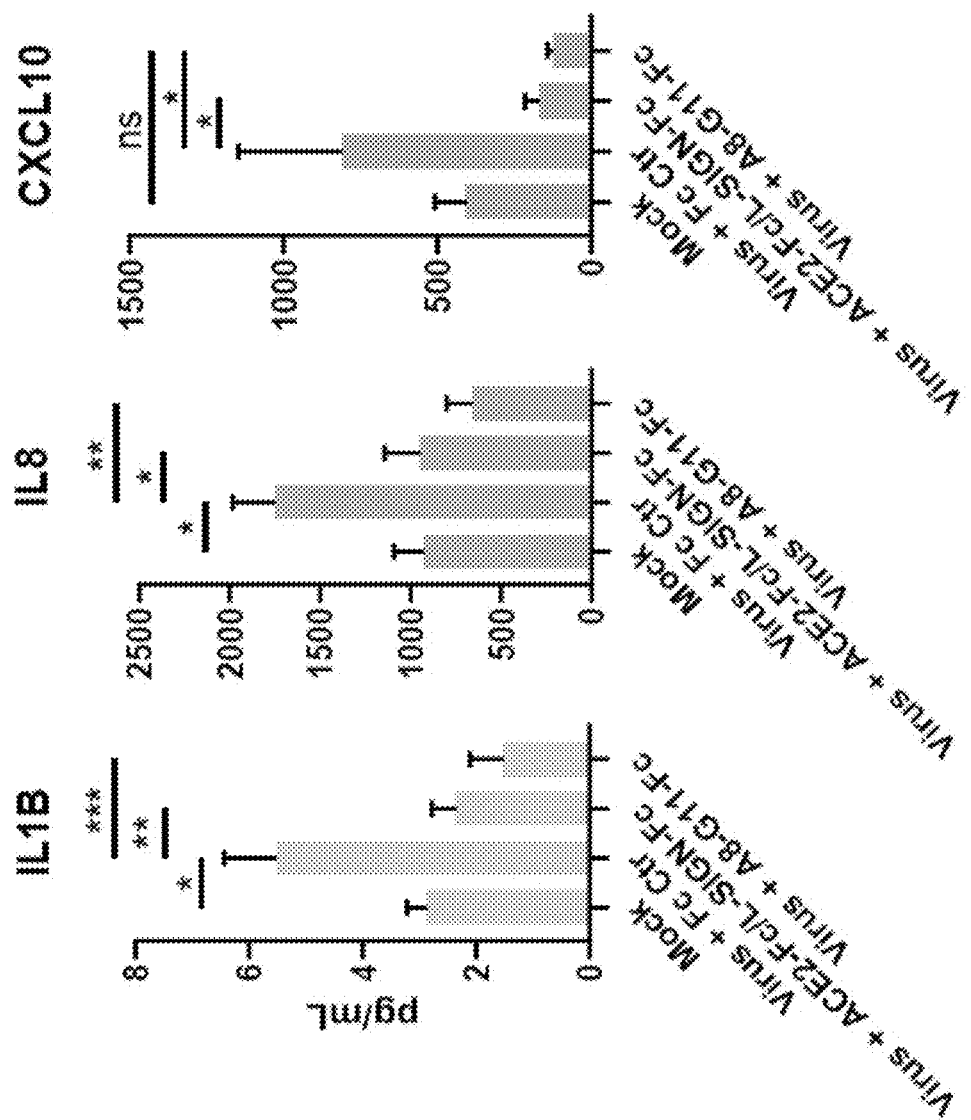
Figure 13A:
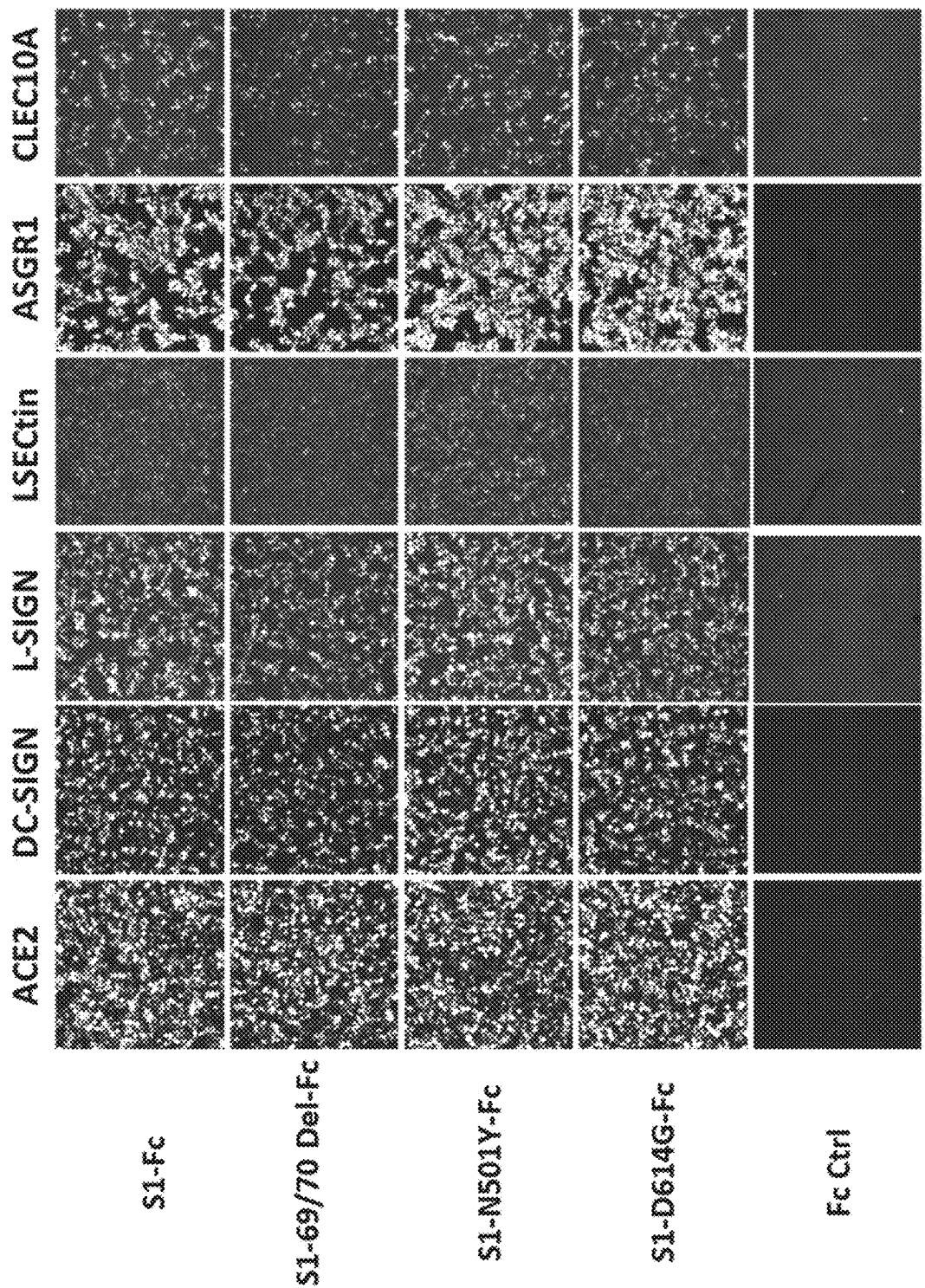
FIG. 13A through FIG. 13B depict exemplary experimental results demonstrating the binding of spike protein carrying indicated mutation(s) to the myeloid receptors.
Figure 13A:
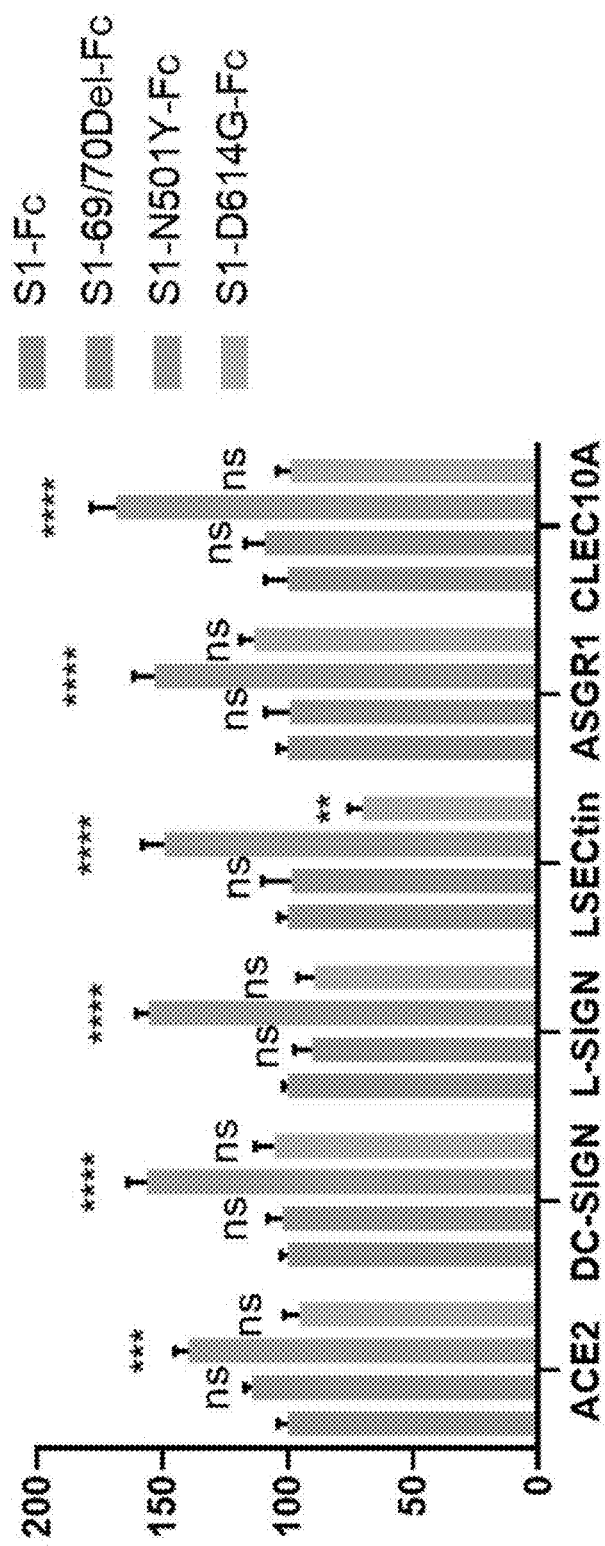
Figure 13B:
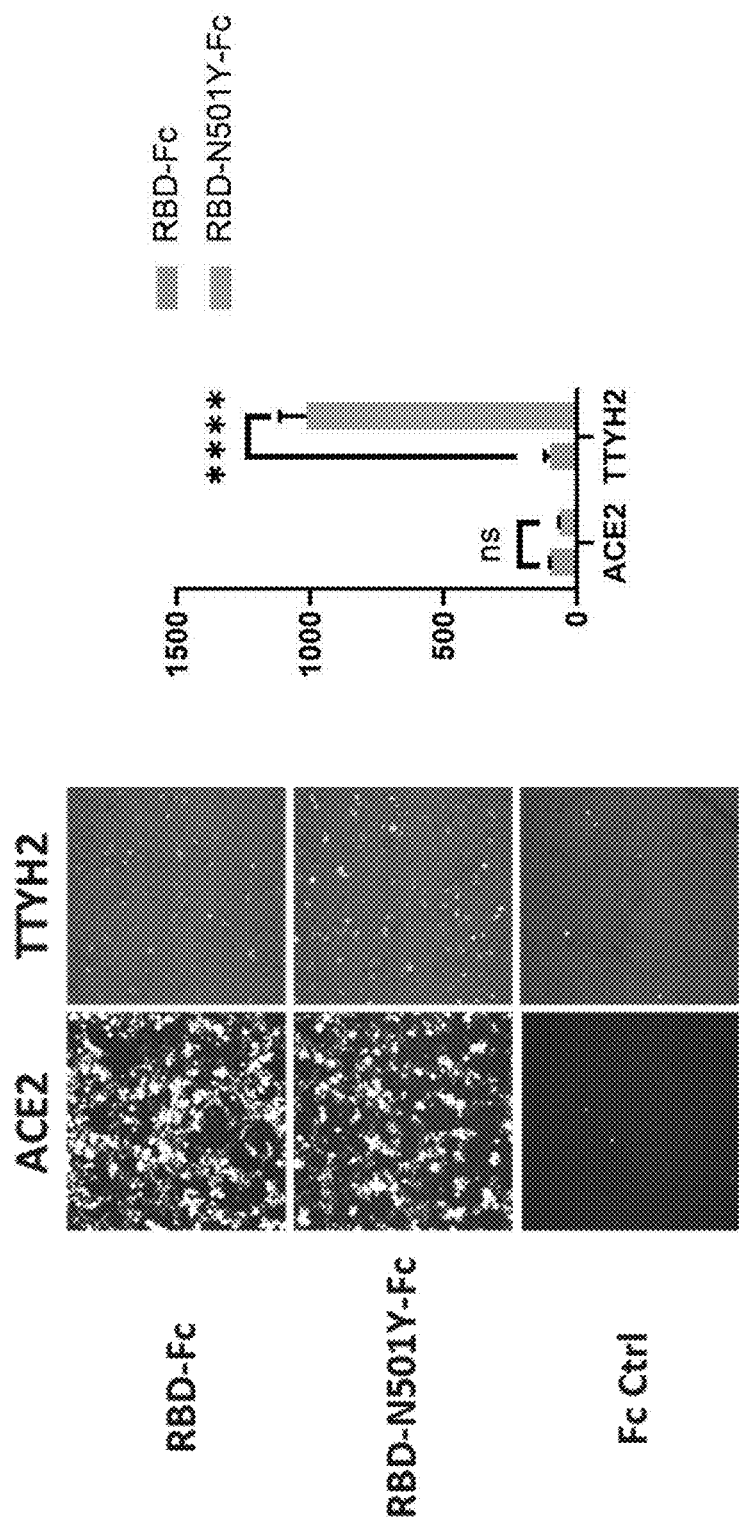

HEK293T cells expressing individual receptors (FIG. 8F) or human PBMC-derived myeloid cells (FIG. 8G) were co-cultured with HIV-GFP virus pseudotyped with SARS-CoV-2 S protein in the presence or absence of nevirapine (20 g/mL) followed by flow cytometry analysis 48 hours later.

SARS-CoV-2 Viral-Immune Interactions Promote Hyperinflammatory Responses

To understand the outcome of SARS-CoV-2 infected myeloid cells, i.e. virus replication versus immune cell signaling, a recombinant SARS-CoV-2 mNeonGreen reporter virus was used (Xie et al., 2020). mNeonGreen signals, reflective of viral antigens, were not detected in SARS-CoV-2 infected primary human myeloid cells or HEK293T cells overexpressing individual myeloid cell receptors, in contrast to the positive controls Vero E6 cells and HEK293T-ACE2 cells (FIG. 10A-FIG. 10B). These data suggested that these myeloid cell receptors did not facilitate SARS-CoV-2 replication. To address the role of these receptors in immune cell signaling, human PBMC-derived myeloid cells were mixed with authentic SARS-CoV-2 and analyzed pro-inflammatory cytokines by RT-PCR (FIG. 9A). IL1A, IL1B, IL-8, CXCL10, CCL2, and CCL3 levels were significantly up-regulated post-infection, some of which also are markedly elevated in the plasma of critically ill COVID-19 patients (Merad and Martin, 2020; Patterson, 2020). Type I and II IFNs were not affected, in line with the scRNA-seq results of the severe COVID19 patients (FIG. 5A). To profile the global transcriptomic responses of myeloid cells to SARS-CoV-2, RNA-sequencing was performed on primary human myeloid cells incubated with wild-type SARS-CoV-2. Similar to the RT-PCR data, robust amplification of a large number of pro-inflammatory cytokines (IL1B, IL8, CCL3, CCL2, CCL8, CCL4L2, CXCL2, CXCL14, TNF-α, etc.), as well as some inflammation related genes (EGR1, THBD, C4A, SOCS3 etc.) was found (FIG. 9B). The top enriched pathways were associated with cytokine activity, immune regulation, immune responses, and chemotaxis (FIG. 9C-FIG. 9D). Further, hyperinflammatory responses are correlated with COVID-19 diseases status and the expression of the myeloid receptors (FIG. 9E-9G).

Screening of Nanobodies that Block SARS-CoV-2 Viral-Immune Interactions

The data suggest that (1) SARS-CoV-2 S protein interacts with C-type lectins and TTYH2 through different interfaces than with ACE2 and (2) SARS-CoV-2 interaction with myeloid cells might have pathological pro-inflammatory effects. As such, we hypothesized that interference of undesired virus-immune cell receptor interactions via blocking antibodies could have therapeutic effects. The majority of therapeutic antibodies currently under development prevent the RBD-ACE2 interactions (Brouwer et al., 2020; Cao et al., 2020; Chen et al., 2020a; Ju et al., 2020; Pinto et al., 2020; Wu et al., 2020b). A panel of 15 previously reported human monoclonal antibodies (mAbs) against the NTD, RBD, CTD, and S2 domains that were derived from recovered COVID-19 patients (FIG. 11A) (Chi et al., 2020) were tested. However, none of these antibodies elicited robust effects in blocking the binding of S1-Fc or RBD-Fc to myeloid-cells receptors (FIG. 11B). In fact, many of these mAbs enhanced the interaction of S protein to myeloid cell receptors. To identify antibodies that block all SARS-CoV-2 viral-host interactions (both ACE2 and myeloid cell receptors), a set of naïve and another set of synthetic humanized llama VHH libraries (Dong et al., 2020) was screened (FIG. 12A). 88 S protein-specific single-domain nanobodies without Fc tag were clustered on the basis of VHH-blocking patterns to ACE2 and the individual immune receptors. A close relationship was identified between LSECtin, ACE2, and TTYH2 (FIG. 12B), in accordance with soluble ACE2 blocking data (FIG. 3A). The RBD domain in S1 protein was a dominant domain in the S1 protein panning (FIG. 12A). Some of the RBD interacting VHH nanobodies showed broad and potent blocking capacity on S1-Fc binding to ACE2 and all myeloid cell receptors (RBD-Fc to TTYH2) (FIGS. 12B and 11C). Therefore, although ACE2 and myeloid cell receptors engage with S protein through different epitopes (FIG. 1C, FIG. 1D and FIG. 3A), an individual nanobody still can broadly block those interactions, possibly through the specific features of nanobodies in the binding of discontinuous epitopes (McMahon et al., 2018), and/or the possible structural changes on the S protein upon the engagement with nanobodies. Importantly, it was observed that despite the lack of the Fc region, some nanobodies can enhance the binding to host myeloid cell receptors (e.g. clone F1, E1 to ACE2; A12, D12 to DC-SIGN; I5, I6 to L-SIGN; F1, F8 to LSECtin; B12, H2 to ASGR1; I5, H2 to CLEC10A; D1, D6 to TTYH2). Two nanobody clones (A8 and G11) were selected for the development of Fc-tagged antibody based on their complementary capacity to broadly block all the interactions between S1 protein and host interacting partners (ACE2 and all six myeloid cell receptors) (FIG. 12B), and the fact that these two nanobodies binds to S through different S epitopes. The Fc tagged version of both A8 and G11 also showed broad and potent blocking activity in S protein interaction with ACE2 and all the immune receptors (FIG. 12D). A bispecific antibody, A8-G11-Fc, was generated which demonstrated a higher affinity to S protein (FIG. 12C) as well as a superior capacity in inhibiting SARS-CoV-2 pseudovirus infection of human PBMC-derived myeloid cells (FIG. 12D) and HEK293T cells overexpressing ACE2 and myeloid cell receptors (DC-SIGN and L-SIGN) (FIG. 11E), when compared to either A8-Fc or G11-Fc alone. Notably, A8-G11-Fc not only efficiently blocked the infection of HEK293T cells expressing ACE2 by an mNeonGreen SARS-CoV-2 reporter virus (FIG. 12E), but also substantially blocked the authentic SARS-CoV-2-induced pro-inflammatory responses, more so than the soluble Fc-tagged receptor cocktails (ACE2-Fc/L-SIGN-Fc) (FIG. 12F-FIG. 12G). These data collectively highlight an important role of SARS-CoV-2 immune cell receptor interactions as potential therapeutic targets for immunopathogenesis and suggest that nanobodies can be potent modalities to broadly neutralize these activities beyond ACE2-mediated virus infection.

S1-Fc, S1-69/70 DelFc, S1-N501Y-Fc and S1-D614G-Fc all bind to HEK293T cells expressing ACE2, DC-SIGN, L-SIGN, LSECtin, ASGR1 and CLEC10A (FIG. 13A). In addition, RBD-Fc or RBD-N501Y-Fc binds to HEK293T cells expressing ACE2 or TTHY2 (FIG. 13B).

TABLE 3

| SEQ ID NO: | Antibody | Name |
|---|---|---|
| 1 | I1 | CDR1 |
| 2 | I1 | CDR2 |
| 3 | I1 | CDR3 |
| 4 | I1 | Full length HC variable region |
| 5 | I2 | CDR1 |
| 6 | I2 | CDR2 |
| 7 | I2 | CDR3 |
| 8 | I2 | Full length HC variable region |
| 9 | I3 | CDR1 |
| 10 | I3 | CDR2 |
| 11 | I3 | CDR3 |
| 12 | I3 | Full length HC variable region |
| 13 | I4 | CDR1 |
| 14 | I4 | CDR2 |
| 15 | I4 | CDR3 |
| 16 | I4 | Full length HC variable region |
| 17 | I5 | CDR1 |
| 18 | I5 | CDR2 |
| 19 | I5 | CDR3 |
| 20 | I5 | Full length HC variable region |
| 21 | I6 | CDR1 |
| 22 | I6 | CDR2 |
| 23 | I6 | CDR3 |
| 24 | I6 | Full length HC variable region |
| 25 | I7 | CDR1 |
| 26 | I7 | CDR2 |
| 27 | I7 | CDR3 |
| 28 | I7 | Full length HC variable region |
| 29 | I8 | CDR1 |
| 30 | I8 | CDR2 |
| 31 | I8 | CDR3 |
| 32 | I8 | Full length HC variable region |
| 33 | I9 | CDR1 |
| 34 | I9 | CDR2 |
| 35 | I9 | CDR3 |
| 36 | I9 | Full length HC variable region |
| 37 | I10 | CDR1 |
| 38 | I10 | CDR2 |
| 39 | I10 | CDR3 |
| 40 | I10 | Full length HC variable region |
| 41 | I11 | CDR1 |
| 42 | I11 | CDR2 |
| 43 | I11 | CDR3 |
| 44 | I11 | Full length HC variable region |
| 45 | I12 | CDR1 |
| 46 | I12 | CDR2 |
| 47 | I12 | CDR3 |
| 48 | I12 | Full length HC variable region |
| 49 | J2 | CDR1 |
| 50 | J2 | CDR2 |
| 51 | J2 | CDR3 |
| 52 | J2 | Full length HC |
| 53 | A3 | CDR1 |
| 54 | A3 | CDR2 |
| 55 | A3 | CDR3 |
| 56 | A3 | Full length HC variable region |
| 57 | A8 | CDR1 |
| 58 | A8 | CDR2 |
| 59 | A8 | CDR3 |
| 60 | A8 | Full length HC variable region |
| 61 | A10 | CDR1 |
| 62 | A10 | CDR2 |
| 63 | A10 | CDR3 |
| 64 | A10 | Full length HC variable region |
| 65 | B4 | CDR1 |
| 66 | B4 | CDR2 |
| 67 | B4 | CDR3 |
| 68 | B4 | Full length HC variable region |
| 69 | B5 | CDR1 |
| 70 | B5 | CDR2 |
| 71 | B5 | CDR3 |
| 72 | B5 | Full length HC variable region |
| 73 | C5 | CDR1 |
| 74 | C5 | CDR2 |
| 75 | C5 | CDR3 |
| 76 | C5 | Full length HC variable region |
| 77 | D8 | CDR1 |
| 78 | D8 | CDR2 |
| 79 | D8 | CDR3 |
| 80 | D8 | Full length HC variable region |
| 81 | E4 | CDR1 |
| 82 | E4 | CDR2 |
| 83 | E4 | CDR3 |
| 84 | E4 | Full length HC variable region |
| 85 | E10 | CDR1 |
| 86 | E10 | CDR2 |
| 87 | E10 | CDR3 |
| 88 | E10 | Full length HC variable region |
| 89 | G2 | CDR1 |
| 90 | G2 | CDR2 |
| 91 | G2 | CDR3 |
| 92 | G2 | Full length HC variable region |
| 93 | G11 | CDR1 |
| 94 | G11 | CDR2 |
| 95 | G11 | CDR3 |
| 96 | G11 | Full length HC variable region |
| 97 | H6 | CDR1 |
| 98 | H6 | CDR2 |
| 99 | H6 | CDR3 |
| 100 | H6 | Full length HC variable region |
| 101 | H8 | CDR1 |
| 102 | H8 | CDR2 |
| 103 | H8 | CDR3 |
| 104 | H8 | Full length HC variable region |
| 105 | H9 | CDR1 |
| 106 | H9 | CDR2 |
| 107 | H9 | CDR3 |
| 108 | H9 | Full length HC variable region |
| 109 | H10 | CDR1 |
| 110 | H10 | CDR2 |
| 111 | H10 | CDR3 |
| 112 | H10 | Full length HC variable region |
| 113 | H11 | CDR1 |
| 114 | H11 | CDR2 |
| 115 | H11 | CDR3 |
| 116 | H11 | Full length HC variable region |

SEQ ID NO: 117—A8-Fc
SEQ ID NO: 118—G11-Fc
SEQ ID NO: 119—A8-G11-Fc

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An inhibitor of the binding of SARS-CoV-2 S protein to one or more SARS-CoV-2 S protein interacting partner, wherein the inhibitor is a bispecific antibody comprising the CDR sequences of SEQ ID NO: 57-SEQ ID NO: 59 and the CDR sequences of SEQ ID NO: 93-SEQ ID NO: 95.

2. The inhibitor of claim 1, wherein the bispecific antibody comprises an amino acid sequence as set forth in SEQ ID NO: 60 and an amino acid sequence as set forth in SEQ ID NO: 96.

3. The inhibitor of claim 1, wherein the bispecific antibody comprises an amino acid sequence as set forth in SEQ ID NO: 119.

4. A composition comprising an inhibitor of claim 1.

5. The composition of claim 4, further comprising one or more additional antibody or antibody fragment comprising an amino acid sequence selected from the group consisting of SEQ ID NO: 4, SEQ ID NO: 8, SEQ ID NO: 12, SEQ ID NO: 16, SEQ ID NO: 20, SEQ ID NO: 24, SEQ ID NO: 28, SEQ ID NO: 32, SEQ ID NO: 36, SEQ ID NO: 40, SEQ ID NO: 44, SEQ ID NO: 48, SEQ ID NO: 52, SEQ ID NO: 56, SEQ ID NO: 60, SEQ ID NO: 64, SEQ ID NO: 68, SEQ ID NO: 72, SEQ ID NO: 76, SEQ ID NO: 80, SEQ ID NO: 84, SEQ ID NO: 88, SEQ ID NO: 92, SEQ ID NO: 96, SEQ ID NO: 100, SEQ ID NO: 104, SEQ ID NO: 108, SEQ ID NO: 112, and SEQ ID NO: 116.

6. The composition of claim 5, comprising three or more antibodies or antibody fragments comprising an amino acid sequence selected from the group consisting of SEQ ID NO: 4, SEQ ID NO: 8, SEQ ID NO: 12, SEQ ID NO: 16, SEQ ID NO: 20, SEQ ID NO: 24, SEQ ID NO: 28, SEQ ID NO: 32, SEQ ID NO: 36, SEQ ID NO: 40, SEQ ID NO: 44, SEQ ID NO: 48, SEQ ID NO: 52, SEQ ID NO: 56, SEQ ID NO: 60, SEQ ID NO: 64, SEQ ID NO: 68, SEQ ID NO: 72, SEQ ID NO: 76, SEQ ID NO: 80, SEQ ID NO: 84, SEQ ID NO: 88, SEQ ID NO: 92, SEQ ID NO: 96, SEQ ID NO: 100, SEQ ID NO: 104, SEQ ID NO: 108, SEQ ID NO: 112, and SEQ ID NO: 116.

7. A nucleic acid molecule comprising a nucleotide sequence encoding an inhibitor of claim 1.

8. A composition comprising a nucleic acid molecule of claim 7.

9. An expression vector comprising the nucleic acid molecule of claim 7.

10. A host cell comprising the nucleic acid molecule of claim 7.

11. A method of treating COVID-19 in a subject in need thereof, the method comprising the step of administering the inhibitor of claim 1 or a nucleic acid molecule encoding the same to the subject.

12. A method of detecting the presence of the SARS-CoV-2 S protein in a sample, the method comprising
  a. contacting a sample with the inhibitor of claim 1, or a composition comprising the same, and
  b. detecting the presence of SARS-CoV-2 S protein in the sample of the subject.

13. The method of claim 12, wherein the sample is a biological sample of a subject, and wherein the method further comprises diagnosing the subject as having a SARS-CoV-2 infection.

14. The method of claim 13, comprising the further step of administering a treatment to the subject that was diagnosed as having a SARS-CoV-2 infection.

* * * * *

SEQUENCE LISTING

<160> NUMBER OF SEQ ID NOS: 119

<210> SEQ ID NO 1
<211> LENGTH: 10

```
<212> TYPE: PRT
<213> ORGANISM: Artificial Sequence
<220> FEATURE:
<223> OTHER INFORMATION: Chemically Synthesized

<400> SEQUENCE: 1

Arg Asp Arg Pro Arg Phe Gly Ala Met Gly
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 2

Ser Ile Ser Arg Ser Gly Ile Arg Thr Tyr Tyr Thr Glu Ser Val Lys
1               5                   10                  15

Gly

<210> SEQ ID NO 3
<211> LENGTH: 14
<212> TYPE: PRT
<213> ORGANISM: Artificial Sequence
<220> FEATURE:
<223> OTHER INFORMATION: Chemically Synthesized

<400> SEQUENCE: 3

Ala Ala Ser Pro Arg Gly Ile Ala Tyr Ser Thr Gly Ala Ile
1               5                   10

<210> SEQ ID NO 4
<211> LENGTH: 121
<212> TYPE: PRT
<213> ORGANISM: Artificial Sequence
<220> FEATURE:
<223> OTHER INFORMATION: Chemically Synthesized

<400> SEQUENCE: 4

Glu Val Gln Leu Val Glu Ser Gly Gly Gly Leu Val Gln Pro Gly Gly
1               5                   10                  15

Ser Leu Arg Leu Ser Cys Ser Ala Ser Arg Asp Arg Pro Arg Phe Gly
                20                  25                  30

Ala Met Gly Trp Tyr Arg Gln Ala Pro Gly Lys Gly Arg Glu Val Val
            35                  40                  45

Ala Ser Ile Ser Arg Ser Gly Ile Arg Thr Tyr Tyr Thr Glu Ser Val
        50                  55                  60

Lys Gly Arg Phe Val Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Ser Pro Arg Gly Ile Ala Tyr Ser Thr Gly Ala Ile Trp Gly
            100                 105                 110

Gln Gly Thr Gln Val Thr Val Ser Ser
        115                 120

<210> SEQ ID NO 5
<211> LENGTH: 10
<212> TYPE: PRT
<213> ORGANISM: Artificial Sequence
<220> FEATURE:
<223> OTHER INFORMATION: Chemically Synthesized
```

```
<400> SEQUENCE: 5

Gly Phe Thr Phe Ser Ser Val Trp Met Tyr
1               5                   10

<210> SEQ ID NO 6
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 6

Ser Ile Thr Arg Leu Gly Tyr Thr Asn Tyr Ala Asp Ser Val Lys Asn
1               5                   10                  15

<210> SEQ ID NO 7
<211> LENGTH: 14
<212> TYPE: PRT
<213> ORGANISM: Artificial Sequence
<220> FEATURE:
<223> OTHER INFORMATION: Chemically Synthesized

<400> SEQUENCE: 7

Asn Val Ile Gly Ser Ser Trp Tyr Gly Arg Gly Leu Asn Tyr
1               5                   10

<210> SEQ ID NO 8
<211> LENGTH: 120
<212> TYPE: PRT
<213> ORGANISM: Artificial Sequence
<220> FEATURE:
<223> OTHER INFORMATION: Chemically Synthesized

<400> SEQUENCE: 8

Glu Val Gln Leu Val Glu Ser Gly Gly Gly Leu Val Gln Pro Gly Asp
1               5                   10                  15

Ser Leu Thr Leu Ser Cys Ala Ala Ser Gly Phe Thr Phe Ser Ser Val
            20                  25                  30

Trp Met Tyr Trp Tyr Arg Gln Ala Pro Gly Lys Gly Leu Glu Trp Val
        35                  40                  45

Ala Ser Ile Thr Arg Leu Gly Tyr Thr Asn Tyr Ala Asp Ser Val Lys
    50                  55                  60

Asn Arg Phe Thr Ile Ser Arg Asp Asn Ser Lys Asn Thr Leu Tyr Leu
65                  70                  75                  80

Gln Met Asn Ser Leu Arg Ala Glu Asp Thr Gly Val Tyr Tyr Cys Asn
                85                  90                  95

Val Ile Gly Ser Ser Trp Tyr Gly Arg Gly Leu Asn Tyr Trp Gly Asn
            100                 105                 110

Gly Thr Gln Val Thr Val Ser Ser
        115                 120

<210> SEQ ID NO 9
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 9

Thr Ser Thr Phe Arg Arg Tyr Pro Thr Gly
1               5                   10
```

```
<210> SEQ ID NO 10
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 10

Ser Ile Ser Arg Tyr Gly Asn Thr Asn Tyr Ala Asp Ser Val Lys Gly
1               5                   10                  15

<210> SEQ ID NO 11
<211> LENGTH: 9
<212> TYPE: PRT
<213> ORGANISM: Artificial Sequence
<220> FEATURE:
<223> OTHER INFORMATION: Chemically Synthesized

<400> SEQUENCE: 11

Asn Ala Val His Trp Gly Val Ala Tyr
1               5

<210> SEQ ID NO 12
<211> LENGTH: 115
<212> TYPE: PRT
<213> ORGANISM: Artificial Sequence
<220> FEATURE:
<223> OTHER INFORMATION: Chemically Synthesized

<400> SEQUENCE: 12

Glu Val Gln Leu Val Glu Ser Gly Gly Gly Leu Val Gln Pro Gly Gly
1               5                   10                  15

Ser Leu Arg Leu Ser Cys Ala Ala Ser Thr Ser Thr Phe Arg Arg Tyr
            20                  25                  30

Pro Thr Gly Trp Phe Arg Gln Ala Pro Gly Lys Gly Leu Glu Trp Val
        35                  40                  45

Ala Ser Ile Ser Arg Tyr Gly Asn Thr Asn Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Asn
                85                  90                  95

Ala Val His Trp Gly Val Ala Tyr Trp Gly Lys Gly Thr Leu Val Thr
            100                 105                 110

Val Ser Ser
        115

<210> SEQ ID NO 13
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 13

Gly Phe Ser Phe Gly Tyr Tyr Tyr Met Ala
1               5                   10

<210> SEQ ID NO 14
<211> LENGTH: 16
<212> TYPE: PRT
<213> ORGANISM: Artificial Sequence
<220> FEATURE:
```

```
<223> OTHER INFORMATION: Chemically Synthesized

<400> SEQUENCE: 14

Thr Ile Thr Arg Gly Gly Phe Thr Ser Tyr Ala Asp Ser Ala Lys Gly
1               5                   10                  15

<210> SEQ ID NO 15
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 15

Ala Ala Ala Gln Gly Arg Ala Ser Trp Tyr Leu Gly Trp Tyr Asp Tyr
1               5                   10                  15

<210> SEQ ID NO 16
<211> LENGTH: 122
<212> TYPE: PRT
<213> ORGANISM: Artificial Sequence
<220> FEATURE:
<223> OTHER INFORMATION: Chemically Synthesized

<400> SEQUENCE: 16

Glu Val Gln Leu Val Glu Ser Gly Gly Leu Val Gln Pro Gly Gly
1               5                   10                  15

Ser Leu Arg Val Ser Cys Ala Thr Ser Gly Phe Ser Phe Gly Tyr Tyr
                20                  25                  30

Tyr Met Ala Trp Val Arg Gln Ala Pro Gly Lys Gly Arg Glu Trp Val
            35                  40                  45

Ala Thr Ile Thr Arg Gly Gly Phe Thr Ser Tyr Ala Asp Ser Ala Lys
        50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Thr Tyr Tyr Cys Ala
                85                  90                  95

Ala Ala Gln Gly Arg Ala Ser Trp Tyr Leu Gly Trp Tyr Asp Tyr Val
            100                 105                 110

Gly Arg Gly Thr Gln Val Thr Val Ser Ser
        115                 120

<210> SEQ ID NO 17
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 17

Gly Ser Ile Leu Ser Met Asn Thr Met Gly
1               5                   10

<210> SEQ ID NO 18
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 18

Thr Ile Ala Pro Gly Gly Ala Phe Thr Tyr Phe Ser Asp Pro Val Lys
1               5                   10                  15
```

Gly

<210> SEQ ID NO 19
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 19

```
Tyr Val Lys Phe Val Gly Tyr Gly Asn Asp Tyr
1               5                   10
```

<210> SEQ ID NO 20
<211> LENGTH: 118
<212> TYPE: PRT
<213> ORGANISM: Artificial Sequence
<220> FEATURE:
<223> OTHER INFORMATION: Chemically Synthesized

<400> SEQUENCE: 20

```
Glu Val Gln Leu Val Glu Ser Gly Gly Leu Val Gln Pro Gly Gly
1               5                   10                  15

Ser Leu Arg Leu Ser Cys Ala Ala Ser Gly Ser Ile Leu Ser Met Asn
            20                  25                  30

Thr Met Gly Trp Tyr Arg Gln Ala Pro Gly Lys Gly Leu Glu Trp Val
        35                  40                  45

Ser Thr Ile Ala Pro Gly Gly Ala Phe Thr Tyr Phe Ser Asp Pro Val
    50                  55                  60

Lys Gly Arg Phe Ser Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Tyr Val Lys Phe Val Gly Tyr Gly Asn Asp Tyr Trp Gly Gln Gly Thr
            100                 105                 110

Gln Val Thr Val Ser Ser
        115
```

<210> SEQ ID NO 21
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 21

```
Ala Ser Gly Phe Ser Val Thr Arg Met Ala
1               5                   10
```

<210> SEQ ID NO 22
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 22

```
Leu Val Ser Phe Ser Gly Ala His Thr Asp Tyr Ala Arg Ser Ala Lys
1               5                   10                  15

Gly
```

```
<210> SEQ ID NO 23
<211> LENGTH: 23
<212> TYPE: PRT
<213> ORGANISM: Artificial Sequence
<220> FEATURE:
<223> OTHER INFORMATION: Chemically Synthesized

<400> SEQUENCE: 23

Asn Ala Tyr Gly Ile Leu Val Gly Ser Gln Glu Gly Glu Asp Tyr
1               5                   10                  15

Asp Tyr Tyr Gly Met Asp Tyr
            20

<210> SEQ ID NO 24
<211> LENGTH: 130
<212> TYPE: PRT
<213> ORGANISM: Artificial Sequence
<220> FEATURE:
<223> OTHER INFORMATION: Chemically Synthesized

<400> SEQUENCE: 24

Glu Val Gln Leu Val Glu Ser Gly Gly Gly Leu Val Gln Pro Gly Gly
1               5                   10                  15

Ser Leu Arg Leu Ser Cys Ala Ala Ser Ala Ser Gly Phe Ser Val Thr
            20                  25                  30

Arg Met Ala Trp Phe Arg Gln Ala Pro Gly Lys Gly Arg Glu Phe Val
        35                  40                  45

Ala Leu Val Ser Phe Ser Gly Ala His Thr Asp Tyr Ala Arg Ser Ala
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Asn Ala Tyr Gly Ile Leu Val Gly Ser Gln Glu Gly Glu Gly Asp Tyr
                100                 105                 110

Asp Tyr Tyr Gly Met Asp Tyr Trp Gly Asn Gly Thr Leu Val Thr Val
            115                 120                 125

Ser Ser
    130

<210> SEQ ID NO 25
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 25

Gly Asn Ile Ala Ser Ile Asp Ala Phe Asn
1               5                   10

<210> SEQ ID NO 26
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 26

Ser Ile Thr Thr Gly Gly Thr Ser Asn Tyr Ala Asp Ser Val Lys Gly
1               5                   10                  15
```

```
<210> SEQ ID NO 27
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 27

Asn Ala Asn Leu Gly Trp Tyr Lys Val Gly Ala
1               5                   10

<210> SEQ ID NO 28
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 28

Gln Val Gln Leu Val Glu Ser Gly Gly Leu Val Gln Pro Gly Gly
1               5                   10                  15

Ser Leu Arg Leu Ser Cys Ala Ala Ser Gly Asn Ile Ala Ser Ile Asp
            20                  25                  30

Ala Phe Asn Trp Tyr Arg Gln Ala Pro Gly Lys Gln Leu Glu Leu Val
        35                  40                  45

Ala Ser Ile Thr Thr Gly Gly Thr Ser Asn Tyr Ala Asp Ser Val Lys
    50                  55                  60

Gly Arg Phe Thr Ile Ser Arg Asp Ser Ala Lys Asn Thr Val Tyr Leu
65                  70                  75                  80

Gln Met Asn Asn Leu Lys Pro Glu Asp Thr Gly Val Tyr Arg Cys Asn
                85                  90                  95

Ala Asn Leu Gly Trp Tyr Lys Val Gly Ala Trp Gly Gln Gly Thr Gln
            100                 105                 110

Val Thr Val Ser Ser
        115

<210> SEQ ID NO 29
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 29

Gly Phe Thr Leu Asp Asn Tyr Gly Ile Gly
1               5                   10

<210> SEQ ID NO 30
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 30

Gly Leu Ser Arg Asp Gly Thr Ser Ser Tyr Ser Gly His Val Lys Gly
1               5                   10                  15

<210> SEQ ID NO 31
<211> LENGTH: 16
<212> TYPE: PRT
<213> ORGANISM: Artificial Sequence
<220> FEATURE:
<223> OTHER INFORMATION: Chemically Synthesized
```

<400> SEQUENCE: 31

Trp Gly Leu Val Ser Val Asp Pro Ser Arg Glu Tyr Glu Tyr Asp Tyr
1               5                   10                  15

<210> SEQ ID NO 32
<211> LENGTH: 122
<212> TYPE: PRT
<213> ORGANISM: Artificial Sequence
<220> FEATURE:
<223> OTHER INFORMATION: Chemically Synthesized

<400> SEQUENCE: 32

Glu Val Gln Leu Val Glu Ser Gly Gly Gly Leu Val Gln Pro Gly Gly
1               5                   10                  15

Ser Leu Arg Leu Ala Cys Thr Ala Ser Gly Phe Thr Leu Asp Asn Tyr
            20                  25                  30

Gly Ile Gly Trp Phe Arg Gln Ala Pro Gly Lys Gly Arg Glu Trp Val
        35                  40                  45

Ala Gly Leu Ser Arg Asp Gly Thr Ser Ser Tyr Ser Gly His Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Trp
                85                  90                  95

Gly Leu Val Ser Val Asp Pro Ser Arg Glu Tyr Glu Tyr Asp Tyr Trp
            100                 105                 110

Gly Gln Gly Thr Leu Val Thr Val Ser Ser
        115                 120

<210> SEQ ID NO 33
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 33

Gly Phe Thr Leu Asp Tyr Tyr Ala Val Ala
1               5                   10

<210> SEQ ID NO 34
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 34

Thr Ile Lys Gly Asn Gly Thr Thr Asn Tyr Lys Glu Ser Val Lys Gly
1               5                   10                  15

<210> SEQ ID NO 35
<211> LENGTH: 7
<212> TYPE: PRT
<213> ORGANISM: Artificial Sequence
<220> FEATURE:
<223> OTHER INFORMATION: Chemically Synthesized

<400> SEQUENCE: 35

Tyr Val Val Gly Thr Asp Leu
1               5

```
<210> SEQ ID NO 36
<211> LENGTH: 113
<212> TYPE: PRT
<213> ORGANISM: Artificial Sequence
<220> FEATURE:
<223> OTHER INFORMATION: Chemically Synthesized

<400> SEQUENCE: 36

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Leu Asp Tyr Tyr
            20                  25                  30

Ala Val Ala Trp Phe Arg Gln Ala Pro Gly Lys Gly Arg Glu Trp Val
        35                  40                  45

Ala Thr Ile Lys Gly Asn Gly Thr Thr Asn Tyr Lys Glu Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Tyr
                85                  90                  95

Val Val Gly Thr Asp Leu Trp Gly Gln Gly Thr Leu Val Thr Val Ser
            100                 105                 110

Ser

<210> SEQ ID NO 37
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 37

Ser Ser Arg Phe Val Leu His Ala Met Ser
1               5                   10

<210> SEQ ID NO 38
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 38

Gly Ile Arg Ala Asn Gly Gly Arg Thr Tyr Asn Thr Glu Ser Thr Lys
1               5                   10                  15

Asp

<210> SEQ ID NO 39
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 39

His Ala Arg Thr Val Thr Gly Arg Thr Tyr
1               5                   10

<210> SEQ ID NO 40
<211> LENGTH: 117
<212> TYPE: PRT
<213> ORGANISM: Artificial Sequence
```

```
<220> FEATURE:
<223> OTHER INFORMATION: Chemically Synthesized

<400> SEQUENCE: 40

Glu Val Gln Leu Val Glu Ser Gly Gly Gly Leu Val Gln Pro Gly Gly
1               5                   10                  15

Ser Leu Arg Leu Ser Cys Ser Ser Ser Ser Arg Phe Val Leu His
            20                  25                  30

Ala Met Ser Trp Val Arg Gln Ala Pro Gly Lys Gly Leu Glu Trp Val
        35                  40                  45

Ala Gly Ile Arg Ala Asn Gly Gly Arg Thr Tyr Asn Thr Glu Ser Thr
    50                  55                  60

Lys Asp Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

His Ala Arg Thr Val Thr Gly Arg Thr Tyr Trp Gly Gln Gly Thr Gln
            100                 105                 110

Val Thr Val Ser Ser
        115

<210> SEQ ID NO 41
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 41

Gly Phe Pro Leu Glu Arg Tyr Ser Met Gly
1               5                   10

<210> SEQ ID NO 42
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 42

Gln Ile Gly Pro Gly Gly Val Thr Asn Tyr Ala His Phe Val Lys Arg
1               5                   10                  15

<210> SEQ ID NO 43
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 43

His Val Asn Ser Phe Leu Asp Arg Gly Glu Asp Met Leu Phe Tyr Asp
1               5                   10                  15

Asp

<210> SEQ ID NO 44
<211> LENGTH: 123
<212> TYPE: PRT
<213> ORGANISM: Artificial Sequence
<220> FEATURE:
<223> OTHER INFORMATION: Chemically Synthesized

<400> SEQUENCE: 44
```

Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Pro Leu Glu Arg Tyr
            20                  25                  30

Ser Met Gly Trp Phe Arg Gln Ala Pro Gly Lys Gly Arg Glu Trp Val
        35                  40                  45

Ala Gln Ile Gly Pro Gly Gly Val Thr Asn Tyr Ala His Phe Val Lys
    50                  55                  60

Arg Arg Phe Thr Ile Ser Arg Asp Asn Ser Lys Asn Thr Leu Tyr Leu
65              70                  75                  80

Gln Met Asn Ser Leu Arg Ala Glu Asp Thr Gly Val Tyr Val Cys His
            85                  90                  95

Val Asn Ser Phe Leu Asp Arg Gly Glu Asp Met Leu Phe Tyr Asp Asp
            100                 105                 110

Trp Gly Gln Gly Thr Gln Val Thr Val Ser Ser
        115                 120

<210> SEQ ID NO 45
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 45

Gly Ile Ser Phe Thr Asp Tyr Ser Met Ser Phe
1               5                   10

<210> SEQ ID NO 46
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 46

Ser Ile Thr Ser Thr Gly Gly Thr Thr Tyr Ala Gly Ser Val Lys Gly
1               5                   10                  15

<210> SEQ ID NO 47
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 47

Leu Ile Val Pro Arg Asp Gly Met Asp Tyr
1               5                   10

<210> SEQ ID NO 48
<211> LENGTH: 116
<212> TYPE: PRT
<213> ORGANISM: Artificial Sequence
<220> FEATURE:
<223> OTHER INFORMATION: Chemically Synthesized

<400> SEQUENCE: 48

Glu Val Gln Leu Val Glu Ser Gly Gly Gly Leu Val Gln Pro Gly Gly
1               5                   10                  15

Ser Leu Lys Val Ser Cys Ala Ala Ser Gly Ile Ser Phe Thr Asp Tyr
            20                  25                  30

```
Ser Met Ser Phe Trp Arg Gln Ala Pro Gly Lys Gly Arg Glu Trp Val
        35                  40                  45

Ala Ser Ile Thr Ser Thr Gly Gly Thr Thr Tyr Ala Gly Ser Val Lys
 50                  55                  60

Gly Arg Phe Thr Ile Ser Arg Asp Asn Ser Lys Asn Thr Leu Tyr Leu
 65                  70                  75                  80

Gln Met Asn Ser Leu Arg Ala Glu Asp Thr Ala Val Tyr Tyr Cys Leu
                85                  90                  95

Ile Val Pro Arg Asp Gly Met Asp Tyr Trp Gly Lys Gly Thr Leu Val
            100                 105                 110

Thr Val Ser Ser
        115
```

<210> SEQ ID NO 49
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 49

```
Gly Ser Ile Leu Ser Met Asn Thr Met Gly
 1               5                  10
```

<210> SEQ ID NO 50
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 50

```
Thr Ile Ala Pro Gly Gly Ala Phe Thr Tyr Phe Ser Asp Pro Val Lys
 1               5                  10                  15

Gly
```

<210> SEQ ID NO 51
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 51

```
Tyr Val Lys Phe Val Gly Tyr Gly Asn Asp Tyr
 1               5                  10
```

<210> SEQ ID NO 52
<211> LENGTH: 118
<212> TYPE: PRT
<213> ORGANISM: Artificial Sequence
<220> FEATURE:
<223> OTHER INFORMATION: Chemically Synthesized

<400> SEQUENCE: 52

```
Glu Val Gln Leu Val Glu Ser Gly Gly Gly Leu Val Gln Pro Gly Gly
 1               5                  10                  15

Ser Leu Arg Leu Ser Cys Ala Ala Ser Gly Ser Ile Leu Ser Met Asn
                20                  25                  30

Thr Met Gly Trp Tyr Arg Gln Ala Pro Gly Lys Gly Leu Glu Trp Val
            35                  40                  45
```

Ser Thr Ile Ala Pro Gly Gly Ala Phe Thr Tyr Phe Ser Asp Pro Val
    50                  55                  60

Lys Gly Arg Phe Ser Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Tyr Val Lys Phe Val Gly Tyr Gly Asn Asp Tyr Trp Gly Gln Gly Thr
            100                 105                 110

Gln Val Thr Val Ser Ser
        115

<210> SEQ ID NO 53
<211> LENGTH: 8
<212> TYPE: PRT
<213> ORGANISM: Artificial Sequence
<220> FEATURE:
<223> OTHER INFORMATION: Chemically Synthesized

<400> SEQUENCE: 53

Gly Phe Lys Ile Asn Ala Met Ala
1               5

<210> SEQ ID NO 54
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 54

Ser Ile Thr Ala Gly Gly His Thr Asn Tyr Ala Asp Ser Val Glu Gly
1               5                   10                  15

<210> SEQ ID NO 55
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 55

Phe Ala Asp Val Tyr Gly Ser Asp Arg Pro Ser
1               5                   10

<210> SEQ ID NO 56
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 56

Gln Val Gln Leu Val Glu Ser Gly Gly Gly Leu Val Gln Ala Gly Glu
1               5                   10                  15

Ser Leu Arg Leu Thr Cys Ser Ala Ser Ser Val Gly Phe Lys Ile Asn
            20                  25                  30

Ala Met Ala Trp Tyr Arg Gln Ala Pro Gly Lys Gln Leu Glu Leu Val
        35                  40                  45

Ala Ser Ile Thr Ala Gly Gly His Thr Asn Tyr Ala Asp Ser Val Glu
    50                  55                  60

Gly Arg Phe Thr Ile Ser Arg Asp Asp Ala Lys Asn Thr Val Tyr Leu
 65                  70                  75                  80

Gln Met Asn Ala Leu Glu Pro Glu Asp Thr Ala Val Tyr Arg Cys Phe
                85                  90                  95

Ala Asp Val Tyr Gly Ser Asp Arg Pro Ser Trp Gly Arg Gly Thr Gln
            100                 105                 110

Val Thr Val Ser Ser
        115

<210> SEQ ID NO 57
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 57

Gly Arg Asp Ser Ser Arg Asp Ala Met Ala
1               5                   10

<210> SEQ ID NO 58
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 58

Ser Ile Thr Ala Gly Gly His Thr Asn Tyr Ala Asp Ser Val Glu Gly
1               5                   10                  15

<210> SEQ ID NO 59
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 59

Phe Ala Asp Val Tyr Gly Ser Asp Arg Pro Ser
1               5                   10

<210> SEQ ID NO 60
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 60

Gln Val Gln Leu Val Glu Ser Gly Gly Gly Leu Val Gln Ala Gly Asp
1               5                   10                  15

Ser Leu Arg Leu Ser Cys Ala Ala Ser Gly Arg Asp Ser Ser Arg Asp
            20                  25                  30

Ala Met Ala Trp Phe Arg Gln Ala Pro Gly Lys Gln Leu Glu Leu Val
        35                  40                  45

Ala Ser Ile Thr Ala Gly Gly His Thr Asn Tyr Ala Asp Ser Val Glu
    50                  55                  60

Gly Arg Phe Thr Ile Ser Arg Asp Asn Ala Lys Asn Thr Val Tyr Leu
65                  70                  75                  80

Gln Met Asn Ala Leu Glu Pro Glu Asp Thr Ala Val Tyr Arg Cys Phe
                85                  90                  95

Ala Asp Val Tyr Gly Ser Asp Arg Pro Ser Trp Gly Arg Gly Thr Leu
            100                 105                 110

```
Val Thr Val Ser Ser
        115

<210> SEQ ID NO 61
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 61

Gly Arg Ile Phe Ser Ile Asn Ala Met Gly
1               5                   10

<210> SEQ ID NO 62
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 62

Ala Ile Ala Met Thr Gly Ser Thr Ser Tyr Gly Asp Ser Val Lys Gly
1               5                   10                  15

<210> SEQ ID NO 63
<211> LENGTH: 19
<212> TYPE: PRT
<213> ORGANISM: Artificial Sequence
<220> FEATURE:
<223> OTHER INFORMATION: Chemically Synthesized

<400> SEQUENCE: 63

Tyr Ala Thr Val Phe Leu Ser Pro Pro Asp Asp Glu Asp Glu Gly Leu
1               5                   10                  15

Leu Glu Leu

<210> SEQ ID NO 64
<211> LENGTH: 125
<212> TYPE: PRT
<213> ORGANISM: Artificial Sequence
<220> FEATURE:
<223> OTHER INFORMATION: Chemically Synthesized

<400> SEQUENCE: 64

Gln Val Gln Leu Val Glu Ser Gly Gly Asp Ser Val Gln Pro Gly Gly
1               5                   10                  15

Ser Leu Arg Leu Ser Cys Thr Ala Ser Gly Arg Ile Phe Ser Ile Asn
                20                  25                  30

Ala Met Gly Trp Phe Arg Gln Ala Pro Gly Lys Glu Arg Gln Phe Val
            35                  40                  45

Ala Ala Ile Ala Met Thr Gly Ser Thr Ser Tyr Gly Asp Ser Val Lys
        50                  55                  60

Gly Arg Phe Ala Ile Ser Arg Asp Gly Ala Lys Asn Thr Val Tyr Leu
65                  70                  75                  80

Gln Met Asn Ser Leu Lys Pro Glu Asp Thr Ala Val Tyr Tyr Cys Tyr
                85                  90                  95

Ala Thr Val Phe Leu Ser Pro Pro Asp Asp Glu Asp Glu Gly Leu Leu
                100                 105                 110

Glu Leu Trp Gly Gln Gly Thr Thr Val Thr Val Ser Ser
            115                 120                 125
```

```
<210> SEQ ID NO 65
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 65

Gly Arg Ser Phe Ser Pro Tyr Thr Met Gly
1               5                   10

<210> SEQ ID NO 66
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 66

Ala Ser Ser Ala Ser Gly Gly Ser Thr Thr Tyr Ala Ser Ser Gly Lys
1               5                   10                  15

Asp

<210> SEQ ID NO 67
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 67

Tyr Val Asn Ile Trp Asn Gly Gly Asp Tyr
1               5                   10

<210> SEQ ID NO 68
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 68

Gln Val Gln Leu Val Glu Ser Gly Gly Gly Leu Val Gln Ala Gly Gly
1               5                   10                  15

Ser Leu Arg Leu Ser Cys Thr Pro Ser Gly Arg Ser Phe Ser Pro Tyr
            20                  25                  30

Thr Met Gly Trp Phe Arg Gln Ala Pro Gly Lys Glu Arg Glu Phe Val
        35                  40                  45

Ala Ala Ser Ser Ala Ser Gly Gly Ser Thr Thr Tyr Ala Ser Ser Gly
    50                  55                  60

Lys Asp Arg Phe Thr Ile Ser Arg Asp Arg Ala Lys Asn Thr Val Tyr
65                  70                  75                  80

Leu Gln Met Asn Ser Leu Lys Pro Glu Asp Thr Ala Val Tyr Tyr Cys
                85                  90                  95

Tyr Val Asn Ile Trp Asn Gly Gly Asp Tyr Trp Gly Gln Gly Thr Leu
            100                 105                 110

Val Thr Val Ser Ser
        115

<210> SEQ ID NO 69
<211> LENGTH: 10
<212> TYPE: PRT
<213> ORGANISM: Artificial Sequence
```

```
<220> FEATURE:
<223> OTHER INFORMATION: Chemically Synthesized

<400> SEQUENCE: 69

Thr Ser Ile Phe Asn Met Asn Ala Met Asn
1               5                   10

<210> SEQ ID NO 70
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 70

Thr Ile Asn Ser Gly Gly Thr Tyr Thr Ser Tyr Ala Asp Ser Val Lys
1               5                   10                  15

Gly

<210> SEQ ID NO 71
<211> LENGTH: 15
<212> TYPE: PRT
<213> ORGANISM: Artificial Sequence
<220> FEATURE:
<223> OTHER INFORMATION: Chemically Synthesized

<400> SEQUENCE: 71

Asn Ala Val Val Asn Thr Ile Leu Asp Phe Leu Pro Lys Asn Tyr
1               5                   10                  15

<210> SEQ ID NO 72
<211> LENGTH: 122
<212> TYPE: PRT
<213> ORGANISM: Artificial Sequence
<220> FEATURE:
<223> OTHER INFORMATION: Chemically Synthesized

<400> SEQUENCE: 72

Gln Val Gln Leu Val Glu Ser Gly Gly Gly Leu Val Gln Pro Gly Gly
1               5                   10                  15

Ser Leu Arg Leu Ser Cys Ala Ala Ser Thr Ser Ile Phe Asn Met Asn
            20                  25                  30

Ala Met Asn Trp Tyr Arg Gln Ala Pro Gly Lys Gly Leu Glu Trp Ile
        35                  40                  45

Ser Thr Ile Asn Ser Gly Gly Thr Tyr Thr Ser Tyr Ala Asp Ser Val
    50                  55                  60

Lys Gly Arg Phe Thr Ile Ser Ser Asp Asn Ala Lys Asn Thr Val Tyr
65                  70                  75                  80

Leu Gln Met Asn Gly Leu Gly Pro Glu Asp Thr Ala Val Tyr Tyr Cys
                85                  90                  95

Asn Ala Val Val Asn Thr Ile Leu Asp Phe Leu Pro Lys Asn Tyr Trp
            100                 105                 110

Gly Lys Gly Thr Leu Val Thr Val Ser Ser
        115                 120

<210> SEQ ID NO 73
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 73
```

Gly Ser Ile Ala Ser Ala Leu Asn Ala Met Gly
1               5                   10

<210> SEQ ID NO 74
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 74

Ser Ile Thr Ser Gly Gly Thr Thr Thr Tyr Ala Lys Ser Val Lys Gly
1               5                   10                  15

<210> SEQ ID NO 75
<211> LENGTH: 18
<212> TYPE: PRT
<213> ORGANISM: Artificial Sequence
<220> FEATURE:
<223> OTHER INFORMATION: Chemically Synthesized

<400> SEQUENCE: 75

Ala Ala Ser His Phe Asp Tyr Arg Asp Tyr Ala Phe Thr Ser Glu Tyr
1               5                   10                  15

Asp Tyr

<210> SEQ ID NO 76
<211> LENGTH: 125
<212> TYPE: PRT
<213> ORGANISM: Artificial Sequence
<220> FEATURE:
<223> OTHER INFORMATION: Chemically Synthesized

<400> SEQUENCE: 76

Gln Val Gln Leu Val Glu Ser Gly Gly Gly Leu Val Gln Ala Gly Asp
1               5                   10                  15

Ser Leu Arg Leu Ser Cys Ala Ala Ser Gly Ser Ile Ala Ser Ala Leu
            20                  25                  30

Asn Ala Met Gly Trp Gly Arg Gln Ala Pro Gly Lys Gln Arg Glu Leu
        35                  40                  45

Val Ala Ser Ile Thr Ser Gly Gly Thr Thr Thr Tyr Ala Lys Ser Val
    50                  55                  60

Lys Gly Arg Phe Thr Ile Ser Arg Asp Asn Ala Lys Asn Met Val Tyr
65                  70                  75                  80

Leu Glu Met Asn Asn Leu Lys Pro Glu Asp Thr Ala Val Tyr His Cys
                85                  90                  95

Ala Ala Ser His Phe Asp Tyr Arg Asp Tyr Ala Phe Thr Ser Glu Tyr
            100                 105                 110

Asp Tyr Trp Gly Gln Gly Thr Leu Val Thr Val Ser Ser
        115                 120                 125

<210> SEQ ID NO 77
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 77

Ser Glu Ser Arg Phe His Tyr Asn Thr Met Ala
1               5                   10

<210> SEQ ID NO 78
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 78

Ser Ile Thr Ala Gly Gly His Thr Asn Tyr Ala Asp Ser Val Glu Gly
1               5                   10                  15

<210> SEQ ID NO 79
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 79

Phe Ala Asp Val Tyr Gly Ser Asp Arg Pro Ser
1               5                   10

<210> SEQ ID NO 80
<211> LENGTH: 118
<212> TYPE: PRT
<213> ORGANISM: Artificial Sequence
<220> FEATURE:
<223> OTHER INFORMATION: Chemically Synthesized

<400> SEQUENCE: 80

Gln Val Gln Leu Val Glu Ser Gly Gly Gly Leu Val Gln Pro Gly Gly
1               5                   10                  15

Ser Leu Arg Leu Ser Cys Ala Ala Ala Ser Glu Ser Arg Phe His Tyr
            20                  25                  30

Asn Thr Met Ala Trp Phe Arg Gln Ala Pro Gly Lys Gln Leu Glu Leu
        35                  40                  45

Val Ala Ser Ile Thr Ala Gly Gly His Thr Asn Tyr Ala Asp Ser Val
    50                  55                  60

Glu Gly Arg Phe Thr Ile Ser Arg Asp Asn Ala Lys Asn Thr Val Tyr
65                  70                  75                  80

Leu Gln Met Asn Ala Leu Glu Pro Glu Asp Thr Ala Val Tyr Arg Cys
                85                  90                  95

Phe Ala Asp Val Tyr Gly Ser Asp Arg Pro Ser Trp Gly Arg Gly Thr
            100                 105                 110

Leu Val Thr Val Ser Ser
        115

<210> SEQ ID NO 81
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 81

Gly Ser Phe Tyr Ser Ile Asn Asp Met Gly
1               5                   10

<210> SEQ ID NO 82
<211> LENGTH: 16
<212> TYPE: PRT
<213> ORGANISM: Artificial Sequence
<220> FEATURE:

<223> OTHER INFORMATION: Chemically Synthesized

<400> SEQUENCE: 82

Thr Ile Thr Gly Arg Gly Arg Thr Asn Tyr Lys Asp Ser Val Lys Gly
1               5                   10                  15

<210> SEQ ID NO 83
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 83

Asn Val Arg Ala Val Val Arg Ile Leu Thr His Tyr Arg Gly Ser Glu
1               5                   10                  15
Val

<210> SEQ ID NO 84
<211> LENGTH: 123
<212> TYPE: PRT
<213> ORGANISM: Artificial Sequence
<220> FEATURE:
<223> OTHER INFORMATION: Chemically Synthesized

<400> SEQUENCE: 84

Gln Val Gln Leu Val Glu Ser Gly Gly Gly Leu Val Gln Pro Gly Gly
1               5                   10                  15

Ser Leu Arg Leu Ser Cys Ala Ala Ser Gly Ser Phe Tyr Ser Ile Asn
            20                  25                  30

Asp Met Gly Trp Tyr Arg Gln Ala Pro Gly Lys Gln Arg Glu Leu Val
        35                  40                  45

Ala Thr Ile Thr Gly Arg Gly Arg Thr Asn Tyr Lys Asp Ser Val Lys
    50                  55                  60

Gly Arg Phe Ala Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Asn
                85                  90                  95

Val Arg Ala Val Val Arg Ile Leu Thr His Tyr Arg Gly Ser Glu Val
            100                 105                 110

Trp Gly Gln Gly Thr Leu Val Thr Val Ser Ser
        115                 120

<210> SEQ ID NO 85
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 85

Gly Arg Ser Phe Gly Thr Tyr Ala Val Thr
1               5                   10

<210> SEQ ID NO 86
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 86

```
Ala Ile Ser Asn Ser Ala Thr Thr Ile Gln Tyr Thr His Ser Val Lys
1               5                   10                  15

Gly

<210> SEQ ID NO 87
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 87

His Ala Val Ala Trp Asp Tyr Gly Leu Asp His
1               5                   10

<210> SEQ ID NO 88
<211> LENGTH: 118
<212> TYPE: PRT
<213> ORGANISM: Artificial Sequence
<220> FEATURE:
<223> OTHER INFORMATION: Chemically Synthesized

<400> SEQUENCE: 88

Gln Val Gln Leu Val Glu Ser Gly Gly Gly Leu Val Arg Thr Gly Asp
1               5                   10                  15

Ser Leu Arg Leu Ser Cys Thr Ala Ser Gly Arg Ser Phe Gly Thr Tyr
            20                  25                  30

Ala Val Thr Trp Phe Arg Gln Val Pro Gly Lys Glu Arg Glu Phe Val
        35                  40                  45

Ala Ala Ile Ser Asn Ser Ala Thr Thr Ile Gln Tyr Thr His Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

His Ala Val Ala Trp Asp Tyr Gly Leu Asp His Trp Gly Gln Gly Thr
            100                 105                 110

Leu Val Thr Val Ser Ser
            115

<210> SEQ ID NO 89
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 89

Gly Ile Ser Phe Thr Asp Tyr Ser Met Ser Phe
1               5                   10

<210> SEQ ID NO 90
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 90

Ser Ile Thr Ser Thr Gly Gly Thr Thr Tyr Ala Gly Ser Val Lys Gly
1               5                   10                  15
```

```
<210> SEQ ID NO 91
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 91

Leu Ile Val Pro Arg Asp Gly Met Asp Tyr
1               5                   10

<210> SEQ ID NO 92
<211> LENGTH: 116
<212> TYPE: PRT
<213> ORGANISM: Artificial Sequence
<220> FEATURE:
<223> OTHER INFORMATION: Chemically Synthesized

<400> SEQUENCE: 92

Glu Val Gln Leu Val Glu Ser Gly Gly Gly Leu Val Gln Pro Gly Gly
1               5                   10                  15

Ser Leu Lys Val Ser Cys Ala Ala Ser Gly Ile Ser Phe Thr Asp Tyr
            20                  25                  30

Ser Met Ser Phe Trp Arg Gln Ala Pro Gly Lys Gly Arg Glu Trp Val
        35                  40                  45

Ala Ser Ile Thr Ser Thr Gly Gly Thr Thr Tyr Ala Gly Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Leu
                85                  90                  95

Ile Val Pro Arg Asp Gly Met Asp Tyr Trp Gly Lys Gly Thr Leu Val
            100                 105                 110

Thr Val Ser Ser
        115

<210> SEQ ID NO 93
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 93

Gly Arg Ser Ile Thr Met Tyr Thr Met Asp Trp
1               5                   10

<210> SEQ ID NO 94
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 94

Thr Ile Thr Ser Ser Gly Lys Pro Asn Tyr Ala Asn Ser Val Lys Gly
1               5                   10                  15

<210> SEQ ID NO 95
<211> LENGTH: 16
<212> TYPE: PRT
<213> ORGANISM: Artificial Sequence
<220> FEATURE:
<223> OTHER INFORMATION: Chemically Synthesized
```

<400> SEQUENCE: 95

His Ala Leu Leu Ser Thr His Ser Glu Leu Gly Pro Phe Tyr Asp Tyr
1               5                   10                  15

<210> SEQ ID NO 96
<211> LENGTH: 122
<212> TYPE: PRT
<213> ORGANISM: Artificial Sequence
<220> FEATURE:
<223> OTHER INFORMATION: Chemically Synthesized

<400> SEQUENCE: 96

Glu Val Gln Leu Val Glu Ser Gly Gly Gly Leu Val Gln Ala Gly Asp
1               5                   10                  15

Ser Val Arg Leu Ser Cys Thr Val Ser Gly Arg Ser Ile Thr Met Tyr
            20                  25                  30

Thr Met Asp Trp Trp Arg Gln Ala Pro Gly Lys Gly Arg Glu Phe Val
        35                  40                  45

Ala Thr Ile Thr Ser Ser Gly Lys Pro Asn Tyr Ala Asn Ser Val Lys
    50                  55                  60

Gly Arg Ala Thr Val Asp Arg Asp Asn Ser Lys Asn Thr Leu Tyr Leu
65                  70                  75                  80

Gln Met Asn Ser Leu Arg Ala Glu Asp Thr Ala Val Tyr Ser Cys His
                85                  90                  95

Ala Leu Leu Ser Thr His Ser Glu Leu Gly Pro Phe Tyr Asp Tyr Trp
            100                 105                 110

Gly Gln Gly Thr Leu Val Thr Val Ser Ser
        115                 120

<210> SEQ ID NO 97
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 97

Gly Pro Thr Phe Asn Pro Tyr Ala Met Ala
1               5                   10

<210> SEQ ID NO 98
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 98

Ser Ile Thr Ala Gly Gly His Thr Asn Tyr Ala Asp Ser Val Glu Gly
1               5                   10                  15

<210> SEQ ID NO 99
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 99

Phe Ala Asp Val Tyr Gly Ser Asp Arg Pro Ser
1               5                   10

<210> SEQ ID NO 100
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 100

```
Gln Val Gln Leu Val Glu Ser Gly Gly Arg Leu Val Gln Ala Gly Asp
1               5                   10                  15

Ser Leu Arg Leu Ser Cys Ala Ala Ser Gly Pro Thr Phe Asn Pro Tyr
            20                  25                  30

Ala Met Ala Trp Phe Arg Gln Ala Pro Gly Lys Gln Leu Glu Leu Val
        35                  40                  45

Ala Ser Ile Thr Ala Gly Gly His Thr Asn Tyr Ala Asp Ser Val Glu
    50                  55                  60

Gly Arg Phe Thr Ile Ser Arg Asp Asn Ala Lys Asn Thr Val Tyr Leu
65                  70                  75                  80

Gln Met Asn Ala Leu Glu Pro Glu Asp Thr Ala Val Tyr Arg Cys Phe
                85                  90                  95

Ala Asp Val Tyr Gly Ser Asp Arg Pro Ser Trp Gly Arg Gly Thr Gln
            100                 105                 110

Val Thr Val Ser Ser
        115
```

<210> SEQ ID NO 101
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 101

```
Gly Phe Thr Leu Pro Tyr Tyr Ala Ile Val
1               5                   10
```

<210> SEQ ID NO 102
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 102

```
Ser Ile Thr Ala Gly Gly His Thr Asn Tyr Ala Asp Ser Val Glu Gly
1               5                   10                  15
```

<210> SEQ ID NO 103
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 103

```
Phe Ala Asp Val Tyr Gly Ser Asp Arg Pro Ser
1               5                   10
```

<210> SEQ ID NO 104
<211> LENGTH: 117
<212> TYPE: PRT
<213> ORGANISM: Artificial Sequence
<220> FEATURE:

<223> OTHER INFORMATION: Chemically Synthesized

<400> SEQUENCE: 104

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Leu Pro Tyr Tyr
            20                  25                  30

Ala Ile Val Trp Phe Arg Gln Ala Pro Gly Lys Gln Leu Glu Leu Val
        35                  40                  45

Ala Ser Ile Thr Ala Gly Gly His Thr Asn Tyr Ala Asp Ser Val Glu
    50                  55                  60

Gly Arg Phe Thr Ile Ser Arg Asp Asn Ala Lys Asn Thr Val Tyr Leu
65                  70                  75                  80

Gln Met Asn Ala Leu Glu Pro Glu Asp Thr Ala Val Tyr Arg Cys Phe
                85                  90                  95

Ala Asp Val Tyr Gly Ser Asp Arg Pro Ser Trp Gly Arg Gly Thr Leu
            100                 105                 110

Val Thr Val Ser Ser
        115

<210> SEQ ID NO 105
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 105

Gly Arg Ala Val Asn Arg His Ile Met Gly
1               5                   10

<210> SEQ ID NO 106
<211> LENGTH: 17
<212> TYPE: PRT
<213> ORGANISM: Artificial Sequence
<220> FEATURE:
<223> OTHER INFORMATION: Chemically Synthesized

<400> SEQUENCE: 106

Ser Ile Ser Trp Asn Ser Gly Arg Thr Tyr Phe Ala Asp Phe Val Lys
1               5                   10                  15

Gly

<210> SEQ ID NO 107
<211> LENGTH: 18
<212> TYPE: PRT
<213> ORGANISM: Artificial Sequence
<220> FEATURE:
<223> OTHER INFORMATION: Chemically Synthesized

<400> SEQUENCE: 107

Arg Ala Asp Tyr Tyr Val Asp Tyr Glu Asp Asp Arg Met Gly Phe Phe
1               5                   10                  15

Asp Ala

<210> SEQ ID NO 108
<211> LENGTH: 123
<212> TYPE: PRT
<213> ORGANISM: Artificial Sequence
<220> FEATURE:
<223> OTHER INFORMATION: Chemically Synthesized

<400> SEQUENCE: 108

Gln Val Gln Leu Val Glu Ser Gly Gly Gly Leu Val Gln Thr Gly Gly
1               5                   10                  15

Ser Leu Arg Leu Ala Cys Ala Thr Ser Gly Arg Ala Val Asn Arg His
            20                  25                  30

Ile Met Gly Trp Phe Arg Gln Ala Pro Gly Lys Glu Arg Glu Phe Val
        35                  40                  45

Ala Ser Ile Ser Trp Asn Ser Gly Arg Thr Tyr Phe Ala Asp Phe Val
    50                  55                  60

Lys Gly Arg Phe Thr Ile Ser Arg Asp Asn Ala Lys Val Tyr Leu Gln
65                  70                  75                  80

Met Asn Ser Leu Lys Pro Glu Asp Thr Ala Val Tyr Tyr Cys Arg Ala
                85                  90                  95

Asp Tyr Tyr Val Asp Tyr Glu Asp Arg Met Gly Phe Phe Asp Ala
            100                 105                 110

Trp Gly Gln Gly Thr Gln Val Thr Val Ser Ser
        115                 120

<210> SEQ ID NO 109
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 109

Gly Ser Ile Phe Gly Ile Asn Val Met Ala
1               5                   10

<210> SEQ ID NO 110
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 110

Thr Ile Ser Ala Gly Gly Ile Ile Asn Tyr Ala Asp Phe Val Glu Gly
1               5                   10                  15

<210> SEQ ID NO 111
<211> LENGTH: 11
<212> TYPE: PRT
<213> ORGANISM: Artificial Sequence
<220> FEATURE:
<223> OTHER INFORMATION: Chemically Synthesized

<400> SEQUENCE: 111

Phe Ala Asp Val Ala Gly Ser Asp Arg Pro Ser
1               5                   10

<210> SEQ ID NO 112
<211> LENGTH: 117
<212> TYPE: PRT
<213> ORGANISM: Artificial Sequence
<220> FEATURE:
<223> OTHER INFORMATION: Chemically Synthesized

<400> SEQUENCE: 112

Gln Val Gln Leu Val Glu Ser Gly Gly Gly Trp Val Gln Ala Gly Gly
1               5                   10                  15

Ser Leu Arg Leu Ser Cys Ala Ala Ser Gly Ser Ile Phe Gly Ile Asn

```
              20                  25                  30
Val Met Ala Trp Tyr Arg Gln Ala Pro Gly Lys Gln Leu Asp Leu Val
            35                  40                  45

Ala Thr Ile Ser Ala Gly Gly Ile Ile Asn Tyr Ala Asp Phe Val Glu
        50                  55                  60

Gly Arg Phe Thr Ile Ser Arg Asp Asn Ser Lys Asn Thr Val Tyr Leu
65                  70                  75                  80

Gln Met Asn Ser Leu Glu Pro Glu Asp Thr Ala Val Tyr Arg Cys Phe
                85                  90                  95

Ala Asp Val Ala Gly Ser Asp Arg Pro Ser Trp Gly Gln Gly Thr Leu
            100                 105                 110

Val Thr Val Ser Ser
        115

<210> SEQ ID NO 113
<211> LENGTH: 10
<212> TYPE: PRT
<213> ORGANISM: Artificial Sequence
<220> FEATURE:
<223> OTHER INFORMATION: Chemically Synthesized

<400> SEQUENCE: 113

Gly Phe Thr Phe Ser Thr Tyr Trp Met His
1               5                   10

<210> SEQ ID NO 114
<211> LENGTH: 16
<212> TYPE: PRT
<213> ORGANISM: Artificial Sequence
<220> FEATURE:
<223> OTHER INFORMATION: Chemically Synthesized

<400> SEQUENCE: 114

Ala Ile Asn Ser Asp Ser Ser Ala Leu Tyr Ala Asp Ser Val Lys Gly
1               5                   10                  15

<210> SEQ ID NO 115
<211> LENGTH: 20
<212> TYPE: PRT
<213> ORGANISM: Artificial Sequence
<220> FEATURE:
<223> OTHER INFORMATION: Chemically Synthesized

<400> SEQUENCE: 115

Ser Ala Ser Ile Gly Val Arg Pro Tyr Ser Gly Ser Asp Leu Leu Arg
1               5                   10                  15

Arg Leu Glu Val
            20

<210> SEQ ID NO 116
<211> LENGTH: 126
<212> TYPE: PRT
<213> ORGANISM: Artificial Sequence
<220> FEATURE:
<223> OTHER INFORMATION: Chemically Synthesized

<400> SEQUENCE: 116

Gln Val Gln Leu Val Glu Ser Gly Gly Ala Leu Val Gln Pro Gly Gly
1               5                   10                  15

Ser Leu Arg Leu Ser Cys Ala Ala Ser Gly Phe Thr Phe Ser Thr Tyr
            20                  25                  30

Trp Met His Trp Val Arg Gln Ala Pro Gly Lys Gly Leu Glu Trp Val
```

```
            35                  40                  45
Ser Ala Ile Asn Ser Asp Ser Ala Leu Tyr Ala Asp Ser Val Lys
 50                  55                  60

Gly Arg Phe Ala Ile Ser Arg Asp Asn Ala Lys Asn Thr Val Tyr Leu
 65                  70                  75                  80

Gln Met Asn Ser Leu Lys Pro Glu Asp Thr Ala Lys Tyr Tyr Cys Ser
                 85                  90                  95

Ala Ser Ile Gly Val Arg Pro Tyr Ser Gly Ser Asp Leu Leu Arg Arg
                100                 105                 110

Leu Glu Val Trp Gly Gln Gly Thr Leu Val Thr Val Ser Ser
                115                 120                 125

<210> SEQ ID NO 117
<211> LENGTH: 348
<212> TYPE: PRT
<213> ORGANISM: Artificial Sequence
<220> FEATURE:
<223> OTHER INFORMATION: Chemically Synthesized

<400> SEQUENCE: 117

Gln Val Gln Leu Val Glu Ser Gly Gly Gly Leu Val Gln Ala Gly Asp
 1               5                  10                  15

Ser Leu Arg Leu Ser Cys Ala Ala Ser Gly Arg Asp Ser Ser Arg Asp
                 20                  25                  30

Ala Met Ala Trp Phe Arg Gln Ala Pro Gly Lys Gln Leu Glu Leu Val
             35                  40                  45

Ala Ser Ile Thr Ala Gly Gly His Thr Asn Tyr Ala Asp Ser Val Glu
 50                  55                  60

Gly Arg Phe Thr Ile Ser Arg Asp Asn Ala Lys Asn Thr Val Tyr Leu
 65                  70                  75                  80

Gln Met Asn Ala Leu Glu Pro Glu Asp Thr Ala Val Tyr Arg Cys Phe
                 85                  90                  95

Ala Asp Val Tyr Gly Ser Asp Arg Pro Ser Trp Gly Arg Gly Thr Leu
                100                 105                 110

Val Thr Val Ser Ser Glu Pro Lys Ser Cys Asp Lys Thr His Thr Cys
                115                 120                 125

Pro Pro Cys Pro Ala Pro Glu Leu Leu Gly Gly Pro Ser Val Phe Leu
130                 135                 140

Phe Pro Pro Lys Pro Lys Asp Thr Leu Met Ile Ser Arg Thr Pro Glu
145                 150                 155                 160

Val Thr Cys Val Val Val Asp Val Ser His Glu Asp Pro Glu Val Lys
                165                 170                 175

Phe Asn Trp Tyr Val Asp Gly Val Glu Val His Asn Ala Lys Thr Lys
                180                 185                 190

Pro Arg Glu Glu Gln Tyr Asn Ser Thr Tyr Arg Val Val Ser Val Leu
            195                 200                 205

Thr Val Leu His Gln Asp Trp Leu Asn Gly Lys Glu Tyr Lys Cys Lys
        210                 215                 220

Val Ser Asn Lys Ala Leu Pro Ala Pro Ile Glu Lys Thr Ile Ser Lys
225                 230                 235                 240

Ala Lys Gly Gln Pro Arg Glu Pro Gln Val Tyr Thr Leu Pro Pro Ser
                245                 250                 255

Arg Asp Glu Leu Thr Lys Asn Gln Val Ser Leu Thr Cys Leu Val Lys
            260                 265                 270

Gly Phe Tyr Pro Ser Asp Ile Ala Val Glu Trp Glu Ser Asn Gly Gln
```

```
                    275                 280                 285
Pro Glu Asn Asn Tyr Lys Thr Thr Pro Pro Val Leu Asp Ser Asp Gly
    290                 295                 300

Ser Phe Phe Leu Tyr Ser Lys Leu Thr Val Asp Lys Ser Arg Trp Gln
305                 310                 315                 320

Gln Gly Asn Val Phe Ser Cys Ser Val Met His Glu Ala Leu His Asn
                325                 330                 335

His Tyr Thr Gln Lys Ser Leu Ser Leu Ser Pro Gly
            340                 345

<210> SEQ ID NO 118
<211> LENGTH: 353
<212> TYPE: PRT
<213> ORGANISM: Artificial Sequence
<220> FEATURE:
<223> OTHER INFORMATION: Chemically Synthesized

<400> SEQUENCE: 118

Gln Val Gln Leu Val Glu Ser Gly Gly Gly Leu Val Gln Ala Gly Asp
1               5                   10                  15

Ser Val Arg Leu Ser Cys Thr Val Ser Gly Arg Ser Ile Thr Met Tyr
            20                  25                  30

Thr Met Asp Trp Trp Arg Gln Ala Pro Gly Lys Gly Arg Glu Phe Val
        35                  40                  45

Ala Thr Ile Thr Ser Ser Gly Lys Pro Asn Tyr Ala Asn Ser Val Lys
    50                  55                  60

Gly Arg Ala Thr Val Asp Arg Asp Asn Ser Lys Asn Thr Leu Tyr Leu
65                  70                  75                  80

Gln Met Asn Ser Leu Arg Ala Glu Asp Thr Ala Val Tyr Ser Cys His
                85                  90                  95

Ala Leu Leu Ser Thr His Ser Glu Leu Gly Pro Phe Tyr Asp Tyr Trp
            100                 105                 110

Gly Gln Gly Thr Leu Val Thr Val Ser Ser Pro Lys Ser Cys Asp
        115                 120                 125

Lys Thr His Thr Cys Pro Pro Cys Pro Ala Pro Glu Leu Leu Gly Gly
    130                 135                 140

Pro Ser Val Phe Leu Phe Pro Pro Lys Pro Lys Asp Thr Leu Met Ile
145                 150                 155                 160

Ser Arg Thr Pro Glu Val Thr Cys Val Val Val Asp Val Ser His Glu
                165                 170                 175

Asp Pro Glu Val Lys Phe Asn Trp Tyr Val Asp Gly Val Glu Val His
            180                 185                 190

Asn Ala Lys Thr Lys Pro Arg Glu Glu Gln Tyr Asn Ser Thr Tyr Arg
        195                 200                 205

Val Val Ser Val Leu Thr Val Leu His Gln Asp Trp Leu Asn Gly Lys
    210                 215                 220

Glu Tyr Lys Cys Lys Val Ser Asn Lys Ala Leu Pro Ala Pro Ile Glu
225                 230                 235                 240

Lys Thr Ile Ser Lys Ala Lys Gly Gln Pro Arg Glu Pro Gln Val Tyr
                245                 250                 255

Thr Leu Pro Pro Ser Arg Asp Glu Leu Thr Lys Asn Gln Val Ser Leu
            260                 265                 270

Thr Cys Leu Val Lys Gly Phe Tyr Pro Ser Asp Ile Ala Val Glu Trp
        275                 280                 285

Glu Ser Asn Gly Gln Pro Glu Asn Asn Tyr Lys Thr Thr Pro Pro Val
```

```
            290                 295                 300
Leu Asp Ser Asp Gly Ser Phe Phe Leu Tyr Ser Lys Leu Thr Val Asp
305                 310                 315                 320

Lys Ser Arg Trp Gln Gln Gly Asn Val Phe Ser Cys Ser Val Met His
                325                 330                 335

Glu Ala Leu His Asn His Tyr Thr Gln Lys Ser Leu Ser Leu Ser Pro
            340                 345                 350

Gly

<210> SEQ ID NO 119
<211> LENGTH: 486
<212> TYPE: PRT
<213> ORGANISM: Artificial Sequence
<220> FEATURE:
<223> OTHER INFORMATION: Chemically Synthesized

<400> SEQUENCE: 119

Gln Val Gln Leu Val Glu Ser Gly Gly Gly Leu Val Gln Ala Gly Asp
1               5                   10                  15

Ser Leu Arg Leu Ser Cys Ala Ala Ser Gly Arg Asp Ser Ser Arg Asp
            20                  25                  30

Ala Met Ala Trp Phe Arg Gln Ala Pro Gly Lys Gln Leu Glu Leu Val
        35                  40                  45

Ala Ser Ile Thr Ala Gly Gly His Thr Asn Tyr Ala Asp Ser Val Glu
    50                  55                  60

Gly Arg Phe Thr Ile Ser Arg Asp Asn Ala Lys Asn Thr Val Tyr Leu
65                  70                  75                  80

Gln Met Asn Ala Leu Glu Pro Glu Asp Thr Ala Val Tyr Arg Cys Phe
                85                  90                  95

Ala Asp Val Tyr Gly Ser Asp Arg Pro Ser Trp Gly Arg Gly Thr Leu
            100                 105                 110

Val Thr Val Ser Ser Gly Gly Gly Gly Ser Gly Gly Gly Gly Ser Gly
        115                 120                 125

Gly Gly Ser Gln Val Gln Leu Val Glu Ser Gly Gly Gly Leu Val
    130                 135                 140

Gln Ala Gly Asp Ser Val Arg Leu Ser Cys Thr Val Ser Gly Arg Ser
145                 150                 155                 160

Ile Thr Met Tyr Thr Met Asp Trp Trp Arg Gln Ala Pro Gly Lys Gly
                165                 170                 175

Arg Glu Phe Val Ala Thr Ile Thr Ser Ser Gly Lys Pro Asn Tyr Ala
            180                 185                 190

Asn Ser Val Lys Gly Arg Ala Thr Val Asp Arg Asp Asn Ser Lys Asn
        195                 200                 205

Thr Leu Tyr Leu Gln Met Asn Ser Leu Arg Ala Glu Asp Thr Ala Val
    210                 215                 220

Tyr Ser Cys His Ala Leu Leu Ser Thr His Ser Glu Leu Gly Pro Phe
225                 230                 235                 240

Tyr Asp Tyr Trp Gly Gln Gly Thr Leu Val Thr Val Ser Ser Glu Pro
                245                 250                 255

Lys Ser Cys Asp Lys Thr His Thr Cys Pro Pro Cys Pro Ala Pro Glu
            260                 265                 270

Leu Leu Gly Gly Pro Ser Val Phe Leu Phe Pro Pro Lys Pro Lys Asp
        275                 280                 285

Thr Leu Met Ile Ser Arg Thr Pro Glu Val Thr Cys Val Val Val Asp
    290                 295                 300
```

-continued

```
Val Ser His Glu Asp Pro Glu Val Lys Phe Asn Trp Tyr Val Asp Gly
305                 310                 315                 320

Val Glu Val His Asn Ala Lys Thr Lys Pro Arg Glu Glu Gln Tyr Asn
                325                 330                 335

Ser Thr Tyr Arg Val Val Ser Val Leu Thr Val Leu His Gln Asp Trp
            340                 345                 350

Leu Asn Gly Lys Glu Tyr Lys Cys Lys Val Ser Asn Lys Ala Leu Pro
        355                 360                 365

Ala Pro Ile Glu Lys Thr Ile Ser Lys Ala Lys Gly Gln Pro Arg Glu
    370                 375                 380

Pro Gln Val Tyr Thr Leu Pro Pro Ser Arg Asp Glu Leu Thr Lys Asn
385                 390                 395                 400

Gln Val Ser Leu Thr Cys Leu Val Lys Gly Phe Tyr Pro Ser Asp Ile
                405                 410                 415

Ala Val Glu Trp Glu Ser Asn Gly Gln Pro Glu Asn Asn Tyr Lys Thr
            420                 425                 430

Thr Pro Pro Val Leu Asp Ser Asp Gly Ser Phe Phe Leu Tyr Ser Lys
        435                 440                 445

Leu Thr Val Asp Lys Ser Arg Trp Gln Gln Gly Asn Val Phe Ser Cys
    450                 455                 460

Ser Val Met His Glu Ala Leu His Asn His Tyr Thr Gln Lys Ser Leu
465                 470                 475                 480

Ser Leu Ser Pro Gly Lys
                485
```